United States Patent
So et al.

(10) Patent No.: US 6,179,489 B1
(45) Date of Patent: Jan. 30, 2001

(54) DEVICES, METHODS, SYSTEMS AND SOFTWARE PRODUCTS FOR COORDINATION OF COMPUTER MAIN MICROPROCESSOR AND SECOND MICROPROCESSOR COUPLED THERETO

(75) Inventors: John Ling Wing So, Plano; Jeffrey L. Kerr, Garland; Steven R. Magee, Carrollton; Jun Tang, Richardson, all of TX (US)

(73) Assignee: Texas Instruments Incorporated, Dallas, TX (US)

(*) Notice: Under 35 U.S.C. 154(b), the term of this patent shall be extended for 0 days.

(21) Appl. No.: 08/833,267

(22) Filed: Apr. 4, 1997

(51) Int. Cl.⁷ .................................................. G06F 13/00
(52) U.S. Cl. ............................................................ 395/672
(58) Field of Search .................................. 395/130, 672, 395/676

(56) References Cited

U.S. PATENT DOCUMENTS

| | | | |
|---|---|---|---|
| 4,839,797 | 6/1989 | Katori et al. | 364/200 |
| 5,230,039 | 7/1993 | Grossman et al. | 395/130 |
| 5,266,941 | 11/1993 | Akeley et al. | 345/201 |
| 5,499,344 | 3/1996 | Elnashar et al. | 395/250 |
| 5,535,340 | 7/1996 | Bell et al. | 395/292 |

(List continued on next page.)

FOREIGN PATENT DOCUMENTS

| | | |
|---|---|---|
| WO 97/00533 | 1/1997 | (WO) . |
| WO 97/06486 | 2/1997 | (WO) . |

OTHER PUBLICATIONS

J. Peddie, "Focus—7 of 26 Stories", Computer & Communications OEM Magazine, Nov. 1, 1996, pp. 49–53.

A. MacLellan,"Challenge to Microsoft, SGI to License 8 for OpenGL", Electronic News, Mar. 24, 1997.

J. Yoshida, "Is DVD Becoming the TV/PC Bridge?", Electronic Engineering Times, March 31, 1997, pp 103.

Sigma Designs Bets 3D Chip will Prove Magic, Electronic News, Dec. 9, 1996.

"Analog Devices Announces First One–Chip Solution for PC Sound and Communications" PR Newswire Nov. 19, 1996.

P. Glaskowsky, "First Media Processors Reach the Market", Microprocessor Report, Jan. 27, 1997, pp 10–15.

(List continued on next page.)

Primary Examiner—Moustafa M. Meky
(74) Attorney, Agent, or Firm—Robert D. Marshall, Jr.; W. James Brady, III; Frederick J. Telecky, Jr.

(57) ABSTRACT

A process is provided for operating a computer system (100) having a storage holding an operating system (OS) and an application program (APP.exe) and a third program (VSP Kernel), a first processor (106) having an instruction set, and a second processor (1730) having a different instruction set. The process includes a first step of running the first processor (106) to determine whether a part of the application shall be run on the first processor or the second processor and then establishing a second processor object (VSP OBJECT1) if said part shall be run on the second processor and the first processor (106) sending a message that the second processor (1730) is to run said at least part of the application program. The third program establishes message handling functions and bus masters data transfer operations for the second processor between the host running the operating system and the second processor running the third program. The process concurrently runs the second processor to perform operations defined by the third program, including to access memory to detect the message that the second processor is to run said at least part of the application program, and runs the second processor (1730) to access the second processor object and thereby determine operations for the second processor to access second processor instructions for said part of the application program and data to be processed according to said second processor instructions.

3 Claims, 104 Drawing Sheets

U.S. PATENT DOCUMENTS

| | | | |
|---|---|---|---|
| 5,546,546 | 8/1996 | Bell et al. ............................... | 395/292 |
| 5,548,730 | 8/1996 | Young et al. ......................... | 395/280 |
| 5,590,128 | 12/1996 | Maloney et al. ...................... | 370/260 |
| 5,590,342 | 12/1996 | Marisetty .............................. | 395/750 |
| 5,594,882 | 1/1997 | Bell ................................... | 395/421.02 |
| 5,603,014 | 2/1997 | Woodring et al. .................... | 395/500 |
| 5,623,647 | 4/1997 | Maitra .................................. | 395/556 |
| 5,634,114 | 5/1997 | Shipley ................................ | 395/500 |
| 5,638,525 | 6/1997 | Hammond et al. ................... | 395/385 |
| 5,802,373 * | 9/1998 | Yates et al. ........................... | 395/705 |

OTHER PUBLICATIONS

A. Hierhager, "Web Videoconferencing Making Waves" Electronic Engineering Times, Nov. 18, 1996.

P. Clarke, "Philips Rolls out Trimedia" EE Times, Mar. 10, 1997, pp 74.

S. Oar, "Designers Find PC–Audio Path Strewn with Static", EE Times, March 3, 1997.

P. Glaskowsky, "Crystal SLIMD Speeds PCI Audio", Microprocessor Report, Mar. 31, 1997, pp 13–15.

T. Grimm et al, "Defining New Product Concepts and Architectures", Productivity Products for the Mobile Professional, Jan.–Feb. 1997, pp 39, 46–48.

P. Buckley et al, "Choosing a Platform Architecture for Cost Effective MPEG–2 Video Playback", Intel, Apr. 1996, pp 3–17.

T. Shanley et al, "Teleconferencing Performance Requirements", PCI System Architecture, pp 14–17, 31,32,34, 1995.

Chapter 5: "The Functional Signal Groups", PCI System Architecture, pp 53–57.

Chapter 6: "PCI Bus Arbitration", PCI System Architecture, pp 78–88, 124–127.

Chapter 11: "Interrupt–Related Issues", PCI System Architecture, pp 209–216.

Chapter 12: "Shared Resource Acquisition", PCI System Architecture, pp 231–242.

Chapter 13: "the 64–bit PCI Extension", PCI System Architecture, pp 259–269.

Chapter 15: "Intro to Configuration Address Space", PCI System Architecture, pp 297–301.

Chapter 17: "Configuration Registers", PCI System Architecture, pp 329–351.

Chapter 19: "PCI–to–PCI Bridge", PCI System Architecture, pp 381–392.

Chapter 21: "PCI Cache Support", PCI System Architecture, pp 471–478,489.

Chapter 23: "Overview of VL82C59x PCI Chipset", PCI System Architecture, pp 505–516.

L. Nederlof, "One–Chip TV", 1996 IEEE International Solid–State Circuits Conference, pp 26–29.

T. Mostad et al, "Designing a Low Cost, High Performance Platform for MPEG–1 Video Playback", Intel Corporation, pp 38.

A Tanenbaum, "Case Study 4: Mach", Modern Operating Systems, pp 637–652, 660–680, 1992.

F. Hady, "Efficient PCI Performance is no Mean Feat", EE Times, Mar. 10, 1997, pp 104.

Microsoft Corp. "Chapter 3 DirectSound" Version 4.04, Aug. 1996, pp 109.

* cited by examiner

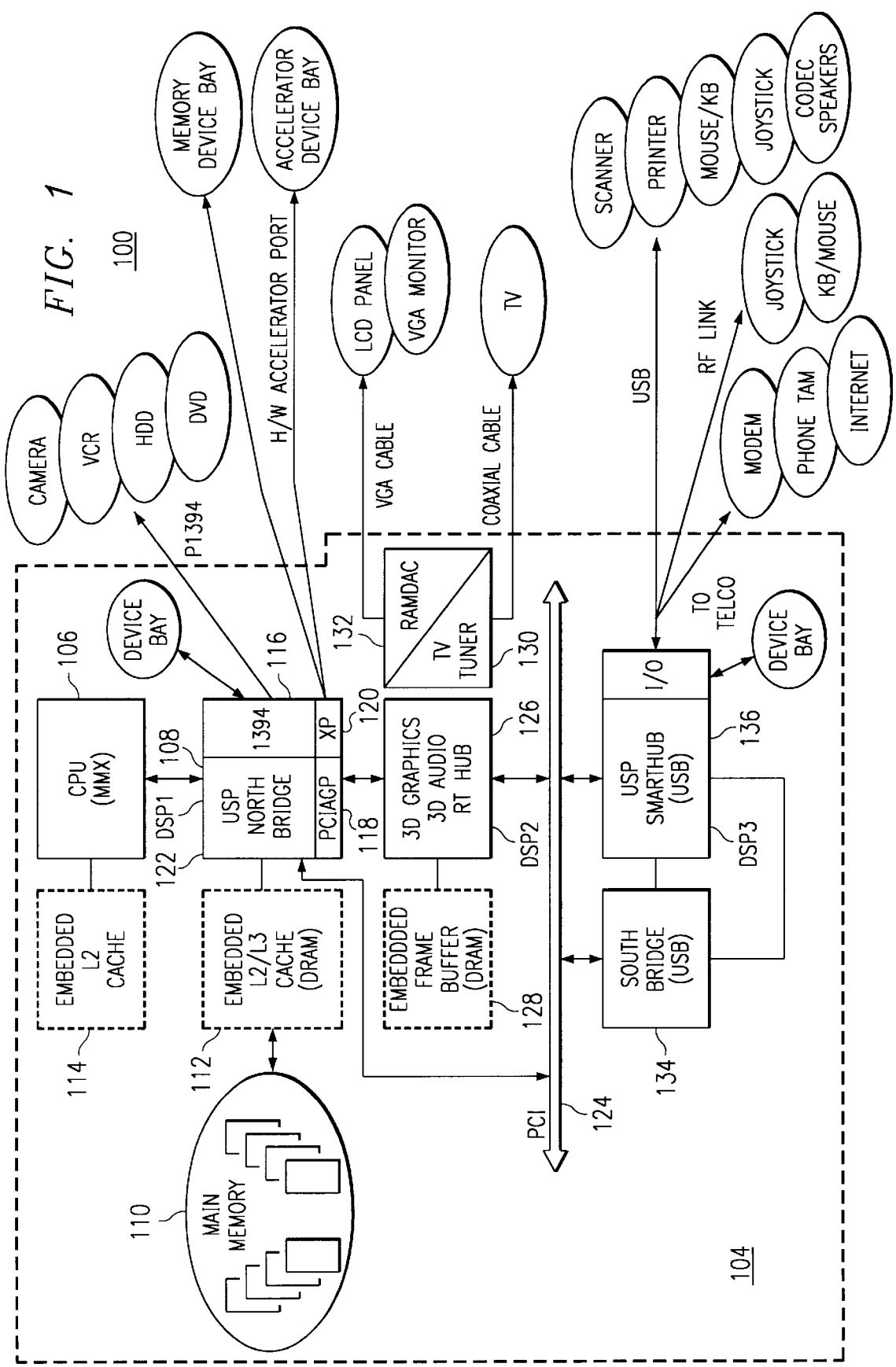

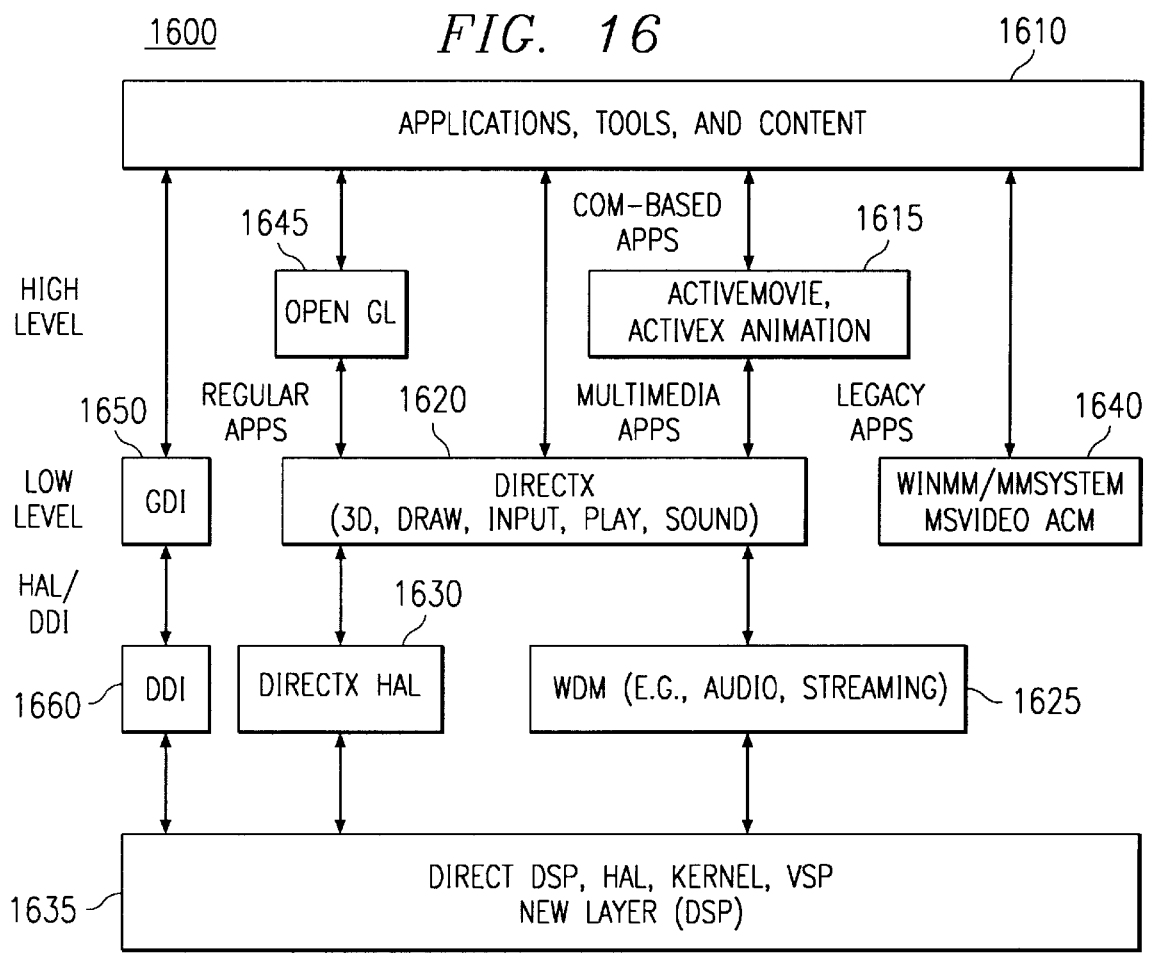
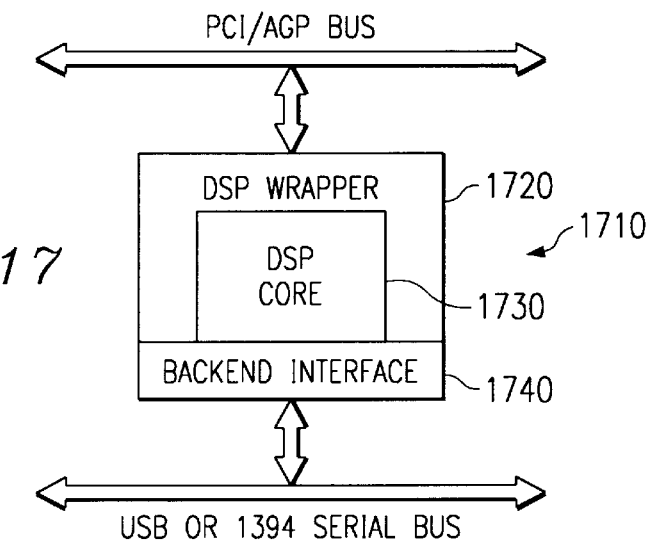

VIRTUALIZED DMA CONTROLLER/INTERRUPT HANDLER

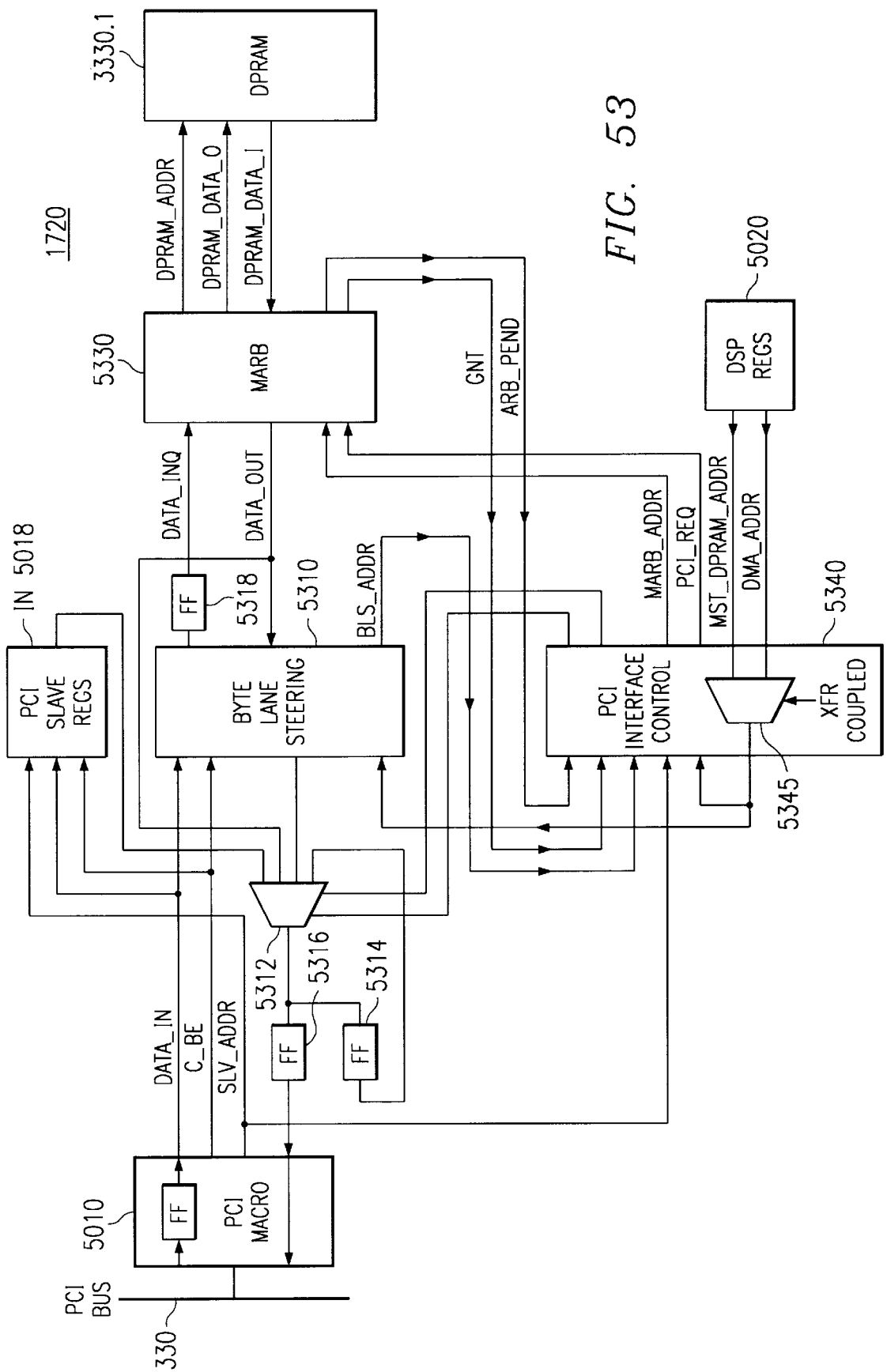

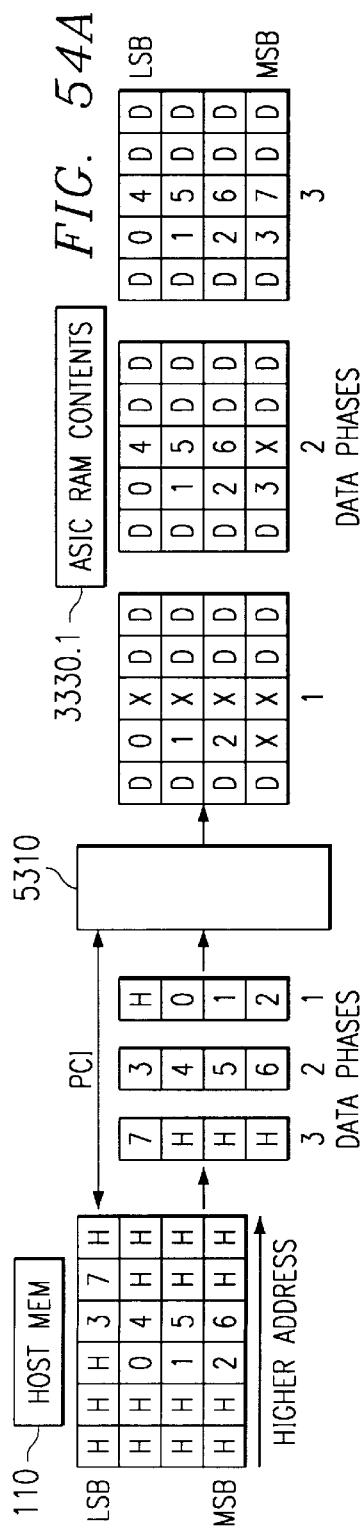
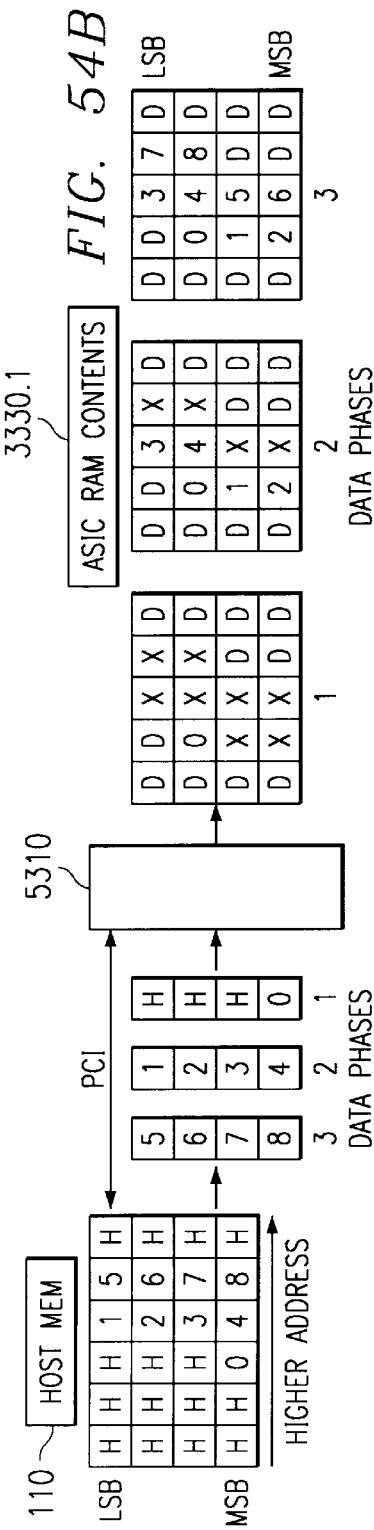
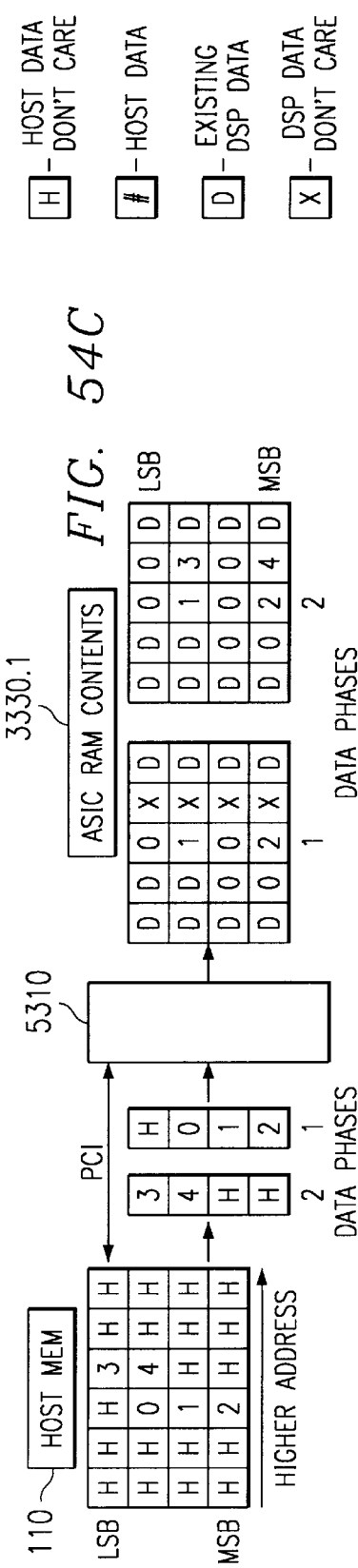

5012
CONFIGURATION REGISTERS

| ADDRESS | BYTE 3 | BYTE 2 | BYTE 1 | BYTE 0 | R/W | VALUE |
|---|---|---|---|---|---|---|
| 0X00 | DEVICE ID | | VENDOR ID | | R | 0000104C |
| 0X04 | STATUS | | COMMAND | | R/W | 00200017 |
| 0X08 | CLASS CODE | | | REVISION ID | R | 00000000 |
| 0X0C | BIST | HDR TYPE | LATENCY | CACHE LINE | R/W | 00001008 |
| 0X10 | BASE ADDRESS 0 (I/O) | | | | R/W | |
| 0X14 | BASE ADDRESS 1 (MEM) [BA0 MIRROR] | | | | R/W | |
| 0X18 | BASE ADDRESS 2 (4K) | | | | R/W | |
| 0X1C-28 | RESERVED (RETURNS "0" WHEN READ) | | | | | |
| 0X2C | SUBSYSTEM ID | | SUBSYS VENDOR ID | | R | |
| 0X30-0X38 | RESERVED (RETURNS "0" WHEN READ) | | | | R | |
| 0X3C | MAX_LAT | MIN_GNT | INT PIN | INT LINE | R/W | 00000100 |
| 0X40 | MISC CONTROL REGISTER | | | | R/W | 00000000 |
| 0X44 -> | RESERVED (RETURNS "0" WHEN READ) | | | | R | |

*FIG. 54D*

5014
PCI IO SPACE REGISTERS (32 BIT)

| | | | | |
|---|---|---|---|---|
| HOST MEMORY DSP PROGRAM SPACE | | R/W | 0X00 | REG0 |
| HOST MEMORY SOURCE DATA SPACE | | R/W | 0X04 | REG1 |
| HOST MEMORY DESTINATION DATA SPACE | | R/W | 0X08 | REG2 |
| C5x STATUS WORD    R | C5x COMMAND WORD    R/W | | 0X0C | REG3 |
| C5x HARDWARE CONTROL | BOOTLOAD DATA    W | | 0X10 | REG4 |
| RESERVED (RETURNS 0'S) | | | 0X14 | REG5 |
| RESERVED (RETURNS 0'S) | | | 0X18 | REG6 |
| RESERVED (RETURNS 0'S) | | | 0X1C | REG7 |

5014
PCI HOST ACCESSIBLE REGISTERS

| ADDRESS | MSB REGISTER FUNCTION LSB | | | R/W | BITS |
|---|---|---|---|---|---|
| 0X00 | PCI INTERRUPT MASK REGISTER | | | R/W | 6 |
| 0X04 | PCI INTERRUPT REGISTER | | | R/W | 6 |
| 0X08 | HOST MEMORY SPACE POINTER | | | R/W | 32 |
| 0X0C | SHARE CTL | C5X CLK | C5X CTL | R/W | 3 7 5 |
| 0X10 | MIDI REGISTER | JOYSTICK REGISTER | | R/W | 8 |
| 0X14 | *PCI VOICE CODEC CONTROL | PCI VOICE CODEC VOL CTL | | R/W | 8 7 |
| 0X18 | *PCI STEREO CODEC CONTROL | | | R/W | 8 |
| 0X1C | *PCI STEREO CODEC PIO CTL | *PIO ADDR | *PIO DATA | R/W | 7 8 8 |
| 0X20 | DMA PING (DSP) ADDR | DMA BUFFER SIZE | | R | 10 9 |
| 0X24 | VC XMIT PING (DSP) ADDR | VC XMIT BUFFER SIZE | | R | 10 9 |
| 0X28 | VC RECV PING (DSP) ADDR | VC RECV BUFFER SIZE | | R | 10 9 |
| 0X2C | SC XMIT PING (DSP) ADDR | SC XMIT BUFFER SIZE | | R | 10 9 |
| 0X30 | SC RECV PING (DSP) ADDR | SC RECV BUFFER SIZE | | R | 10 9 |
| 0X34 | EEPROM CONTROL REGISTER | | | R/W | 6 |
| 0X38-0X3C | RESERVED (RETURNS "0" WHEN READ) | | | R | |

VC = VOICE CODEC
SC = STEREO CODEC
*WRITE CAPABILITY SHARED AND CONTROLLED BY PCI

FIG. 75A

Pin listing (left side, top to bottom):
- C5XHOLDZ 157
- * 158
- C5XHOLDAZ 159
- TEST 160
- GND 161
- SRAM_CEZ 162
- SRAM_UWEZ 163
- SRAM_LWEZ 164
- * 165
- VCC 166
- VC_FSX 167
- VC_FSR 168
- VC_DIN 169
- VCC5V 170
- VC_DOUT 171
- VC_MCLK 172
- GND 173
- VC_VCLK 174
- VC_LINEAR 175
- VC_PDN 176
- VC_EMUTE 177
- VC_MMUTE 178
- GND 179
- PCLK 180
- VCCP 181
- COD_CSZ 182
- COD_RDZ 183
- COD_WRZ 184
- GND 185
- COD_ADR0 186
- COD_ADR1 187
- * 188
- COD_CDAKZ 189
- COD_PDAKZ 190
- VCC5V 191
- COD_DT0 192
- COD_DT1 193
- COD_DT2 194
- COD_DT3 195
- COD_DT4 196
- GND 197
- COD_DT5 198
- COD_DT6 199
- COD_DT7 200
- VCC5V 201
- IRQ 202
- CDRQ 203
- PDRQ 204
- VCC 205
- PCIRST 206
- GNT 207
- IDSEL 208

Top side (pins 156–131):
- 156 R_WZ
- 155 SRAM_U0EZ
- 154 SRAM_L0EZ
- 153 DSZ
- 152 PSZ
- 151 VCC
- 150 ADDR0
- 149 ADDR1
- 148 ADDR2
- 147 ADDR3
- 146 ADDR4
- 145 GND
- 144 ADDR5
- 143 ADDR6
- 142 ADDR7
- 141 ADDR8
- 140 ADDR9
- 139 VCC
- 138 ADDR10
- 137 ADDR11
- 136 ADDR12
- 135 ADDR13
- 134 ADDR14
- 133 GND
- 132 ADDR15
- 131 READY Bottom side (pins 1–26):
- 1 INTA
- 2 ADB31
- 3 ADB30
- 4 ADB29
- 5 VCCP
- 6 ADB28
- 7 ADB27
- 8 ADB26
- 9 ADB25
- 10 ADB24
- 11 VCC
- 12 C_BE3
- 13 REQ
- 14 ADB23
- 15 ADB22
- 16 ADB21
- 17 VCCP
- 18 ADB20
- 19 ADB19
- 20 ADB18
- 21 ADB17
- 22 ADB16
- 23 VCC
- 24 C_BE2
- 25 FRAME
- 26 IRDY Labels: 3.3V (top), VCCP (bottom), 5V / VCCP / 5V (left side), TO FIG. 75B (right)

FIG. 75B 3.3V

| Pin | Signal |
|---|---|
| 130 | STRBZ |
| 129 | ISZ |
| 128 | CLKOUT1 |
| 127 | VCC |
| 126 | DATA15 |
| 125 | DATA14 |
| 124 | DATA13 |
| 123 | DATA12 |
| 122 | DATA11 |
| 121 | GND |
| 120 | DATA10 |
| 119 | DATA9 |
| 118 | DATA8 |
| 117 | DATA7 |
| 116 | DATA6 |
| 115 | VCC |
| 114 | DATA5 |
| 113 | DATA4 |
| 112 | DATA3 |
| 111 | DATA2 |
| 110 | DATA1 |
| 109 | GND |
| 108 | DATA0 |
| 107 | IOSTRBZ |
| 106 | XF |
| 105 | BRZ |
| 104 | C5XRST |
| 103 | CLKMD1 |
| 102 | CLKMD2 |
| 101 | CLKMD3 |
| 100 | * |
| 99 | VCC |
| 98 | INT_4 |
| 97 | INT_3 |
| 96 | INT_2 |
| 95 | INT_1 |
| 94 | INT_ABORT |
| 93 | GND |
| 92 | BIOZ |
| 91 | * |
| 90 | SCL |
| 89 | SDA |
| 88 | WCZ |
| 87 | VCC |
| 86 | PCLK_OUT |
| 85 | * |
| 84 | * |
| 83 | * |
| 82 | * |
| 81 | GND |
| 80 | GND |
| 79 | * |
| 78 | * |
| 77 | * |
| 76 | * |
| 75 | VCC |
| 74 | * |
| 73 | JOYCAL |
| 72 | CBY |
| 71 | CBX |
| 70 | CAY |
| 69 | CAX |
| 68 | VCC5V |
| 67 | BB2 |
| 66 | BB1 |
| 65 | BA2 |
| 64 | BA1 |
| 63 | MIDI_IN |
| 62 | VCC |
| 61 | MIDI_OUT |
| 60 | * |
| 59 | * |
| 58 | * |
| 57 | GND |
| 56 | * |
| 55 | PAR |
| 54 | PERR |
| 53 | SERR |

5V

FROM FIG. 75A

| Pin | Signal |
|---|---|
| 27 | TRDY |
| 28 | DEVSEL |
| 29 | GND |
| 30 | STOP |
| 31 | VCCP |
| 32 | C_BE1 |
| 33 | ADB15 |
| 34 | ADB14 |
| 35 | VCC |
| 36 | ADB13 |
| 37 | ADB12 |
| 38 | ADB11 |
| 39 | ADB10 |
| 40 | ADB9 |
| 41 | GND |
| 42 | ADB8 |
| 43 | C_BE0 |
| 44 | VCCP |
| 45 | ADB7 |
| 46 | ADB6 |
| 47 | ADB5 |
| 48 | ADB4 |
| 49 | ADB3 |
| 50 | ADB2 |
| 51 | ADB1 |
| 52 | ADB0 |

VCCP

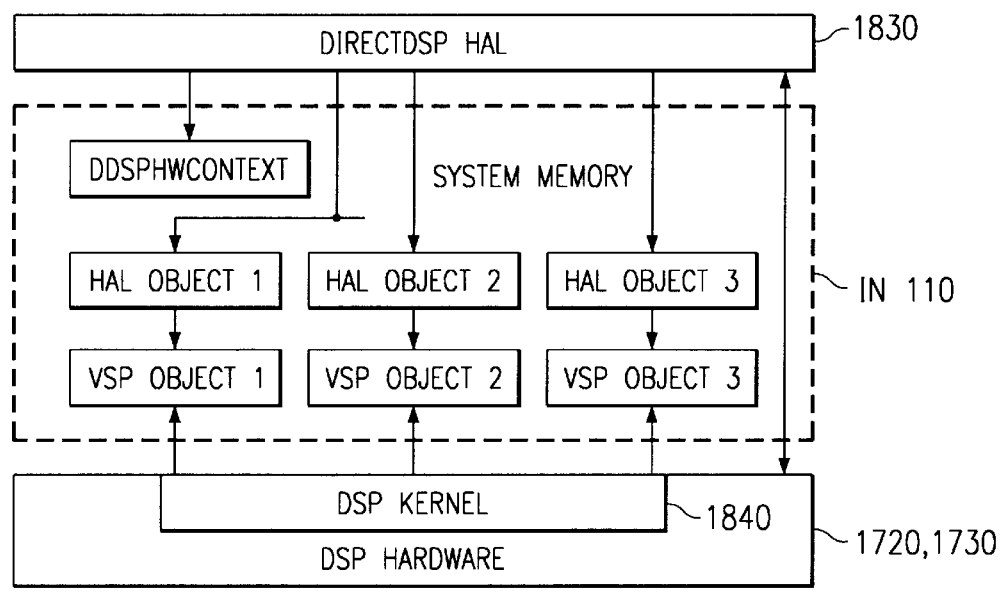
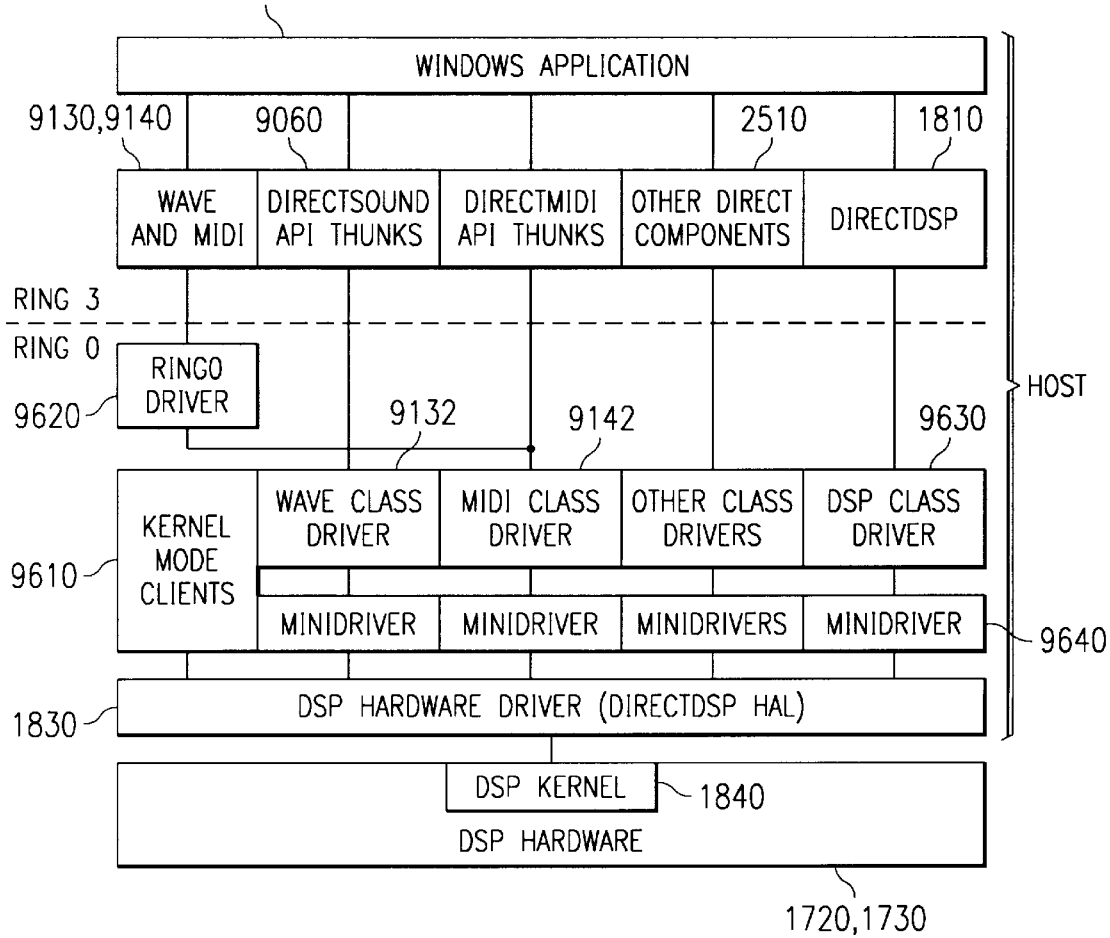

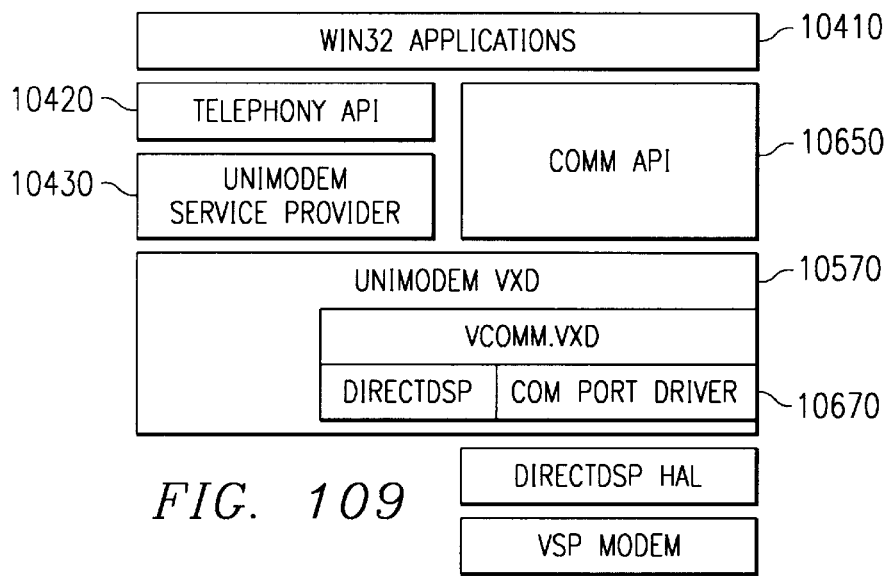
FIG. 109
FIG. 110
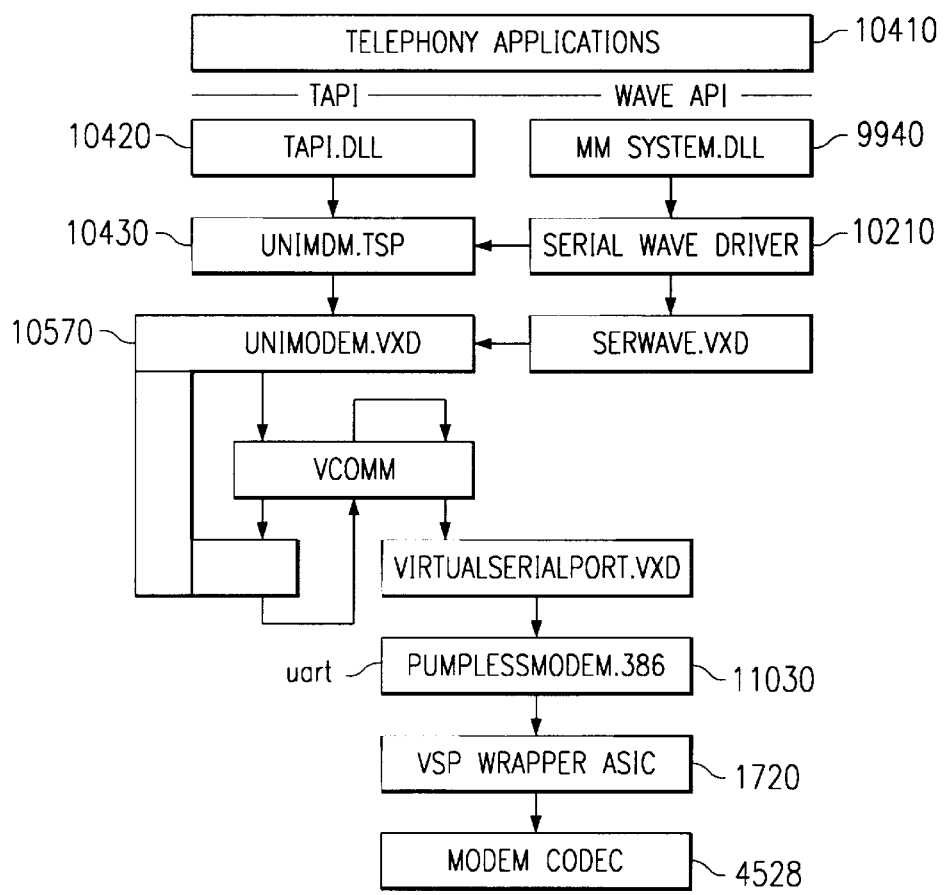

| | | | | | | | | | | | | | | CTRL | | | | |
|---|---|---|---|---|---|---|---|---|---|---|---|---|---|---|---|---|---|---|
| | ADDR | | DATA | | | | | | | | | | | RD | WE | | | FS |
| PHN+ | SPARE | 0 | 2 | 4 | 14 | 0 | 2 | 4 | 6 | 8 | 10 | 12 | 14 | | | +12 V | AGND | DX |
| PHN− | SPARE | 1 | 3 | 13 | 15 | 1 | 3 | 5 | 7 | 9 | 11 | 13 | 15 | IS | R/W | +12 V | AGND | DR | CLK |

11120

TOP ROW / BOTTOM ROW

C5X IO BUS

C5X SERIAL PORT

SIDE NEAREST MOTHERBOARD

*FIG. 111B*

DEVICES, METHODS, SYSTEMS AND SOFTWARE PRODUCTS FOR COORDINATION OF COMPUTER MAIN MICROPROCESSOR AND SECOND MICROPROCESSOR COUPLED THERETO

CROSS-REFERENCE TO RELATED APPLICATIONS

The following simultaneously filed, coassigned patent applications are hereby incorporated herein by reference:

U.S. Pat. No. 5,909,559 entitled BUS BRIDGE DEVICE INCLUDING DATA BUS OF FIRST WIDTH FOR A FIRST PROCESSOR, MEMORY CONTROLLER, ARBITER CIRCUIT AND SECOND PROCESSOR HAVING A DIFFERENT SECOND DATA WIDTH.

U.S. patent application Ser. No. 08/833,153 entitled DATA TRANSFER CIRCUITRY, DSP WRAPPER CIRCUITRY AND IMPROVED PROCESSOR DEVICES, METHODS AND SYSTEMS, still pending.

U.S. patent application Ser. No. 08/833,152 entitled COMPUTER PROCESSOR DRIVER METHODS, METHODOLOGY, DEVICES AND SYSTEMS, still pending.

U.S. patent application Ser. No. 08/833,266 entitled PROCESSOR INTERFACE ENHANCEMENTS METHODS, METHODOLOGY, DEVICES AND SYSTEMS, still pending.

The following coassigned U.S. patents, U.S. patent applications, and laid-open foreign analogs, are hereby incorporated herein by reference:

U.S. patent application Ser. No. 08/823,257 filed Mar. 24, 1997 entitled PC CIRCUITS, SYSTEMS AND METHODS, now U.S. Pat. No. 5,987,590.

U.S. Pat. No. 4,577,282 issued Mar. 18, 1986 entitled MICROCOMPUTER SYSTEM FOR DIGITAL SIGNAL PROCESSING.

U.S. Pat. No. 4,912,636 issued Mar. 27, 1990 entitled DATA PROCESSING DEVICE WITH MULTIPLE ON CHIP MEMORY BUSES.

U.S. Pat. No. 5,109,494 issued Apr. 28, 1992 entitled PASSIVE PROCESSOR COMMUNICATIONS INTERFACE.

U.S. Pat. No. 5,586,275 issued Dec. 17, 1996 entitled DEVICES AND SYSTEMS WITH PARALLEL LOGIC UNIT OPERABLE ON DATA MEMORY LOCATIONS, AND METHODS.

U.S. Pat. No. 5,471,592 issued Nov. 28, 1995 entitled MULTI-PROCESSOR WITH CROSSBAR LINK OF PROCESSORS AND MEMORIES AND METHOD OF OPERATION.

U.S. Pat. No. 5,594,914 issued Jan. 14, 1997 entitled METHOD AND APPARATUS FOR ACCESSING MULTIPLE MEMORY DEVICES.

U.S. Pat. No. 5,754,837 issued May 19, 1998 entitled CLOCK CONTROL CIRCUITS, SYSTEMS AND METHODS.

U.S. Pat. No. 5,737,748 issued Apr. 7, 1998 entitled MICROPROCESSOR UNIT HAVING A FIRST LEVEL WRITE-THROUGH CACHE MEMORY AND A SMALLER SECOND-LEVEL WRITE-BACK CACHE MEMORY.

U.S. patent application Ser. No. 09/012,813 filed Jan. 23, 1998 entitled MICROPROCESSOR, still pending.

NOTICE (C) Copyright, *M* Texas Instruments Incorporated 1997. A portion of the disclosure of this patent document contains material which is subject to copyright and mask work protection. The copyright and mask work owner has no objection to the facsimile reproduction by anyone of the patent document or the patent disclosure, as it appears in the Patent and Trademark Office patent file or records, but otherwise reserves all copyright and mask work rights whatsoever.

Digital signal processors can be adapted for voice recognition, voice synthesis, image processing, image recognition, and telephone communications for teleconferencing and videoteleconferencing. For example, Texas Instruments TMS320C2x, TMS320C5x, TMS320C54x, TMS320C3x and TMS320C4x, TMS320C6x and TMS320C8x DSP chips, as described in coassigned U.S. Pat. Nos. 5,072,418, and 5,099,417, and as to the C8x: coassigned U.S. Pat. No. 5,212,777 "SIMD/MIMD Reconfigurable Multi-Processor and Method of Operation," coassigned U.S. Pat. No. 5,420,809, Ser. No. 08/160,116 filed Nov. 30, 1993 "Method, Apparatus and System Method for Correlation,",now U.S. Pat. No. 5,420,809 and above-cited Ser. No. 09/012,813 still pending all of which patents and application are hereby incorporated herein by reference.

The above documents describe various computer systems, digital signal processors, and integrated circuits for use in those systems to further disclose some elements utilized in various inventive embodiments for purposes of the present patent application.

Other patent applications and patents are incorporated herein by reference by specific statements to that effect elsewhere in this application.

FIELD OF THE INVENTION

This invention generally relates to improved integrated circuits, computer systems, software products, and processes of operating integrated circuits and computers.

BACKGROUND OF THE INVENTION

Early computers required large amounts of space, occupying whole rooms. Since then minicomputers and desktop computers entered the marketplace.

Popular desktop computers have included the "Apple" (Motorola 680x0 microprocessor-based) and "IBM-compatible" (Intel or other x86 microprocessor-based) varieties, also known as personal computers (PCs) which have become very popular for office and home use. Also, high-end desk top computers called workstations based on a number of superscalar and other very-high-performance microprocessors such as the SuperSPARC microprocessor have been introduced.

In a further development, a notebook-size or palm-top computer is optionally battery powered for portable user applications. Such notebook and smaller computers challenge the art in demands for conflicting goals of miniaturization, ever higher speed, performance and flexibility, and long life between battery recharges. Also, a desktop enclosure called a docking station has the portable computer fit into the docking station, and improvements in such portable-computer/docking-station systems are desirable. However, all these systems are generally CPU-centric in the sense that the selection of the CPU determines the system's processing capabilities and add-in-cards are added to the CPU to add specific applications or functions, such as modem or multimedia.

Software for computers and the processes and concepts for Developing and understanding both hardware and software have spawned an intricate terminology. For an introduction, see references hereby incorporated herein by reference, and listed below:

1. The Computer Glossary, by A. Freedman, AMACOM, American Management Association, New York, in various editions up to 1991 and later.
2. Modern Operating Systems, by A.S. Tanenbaum, Prentice-Hall, Englewood Cliffs, N.J. 1992.
3. Peripheral Component Interconnect (PCI) Bus Specification 2.0, 1993, by PCISIG (Special Interest Group), and its updates.
4. PCI System Architecture, by T. Shanley, Mindshare Press.
5. Microsoft Corporation: publications:
   A. DirectSound Hardware Abstraction Layer
   B. DirectSound Application Programming Interface (API)
   C. Microsoft Windows: Guide to Programming, Software Development Kit.
6. Texas Instruments Incorporated: publications
   A. TMS320C5x User's Guide, 1993.
   B. TCM320ACXX Voice Band Audio Processor-Application Report Hitherto, modem, voice, stereo audio, and other interfaces have often been implemented on respective add-in cards with respective software drivers and respective slave bus interfaces. Such system architecture has burdened OEM and business and consuming public with space requirements and financial expense. CPU MIPS are expended on the numerous slave transactions as well.

Improvements in circuits, integrated circuit devices, computer systems of all types, methods and processes of their operation, and software products, to address all the above-mentioned challenges, among others, are desirable, as described herein.

SUMMARY OF THE INVENTION

Generally, and in one form of the present invention, a process is provided for operating a computer system having a storage holding an operating system and an application program and a third program, a first processor having an instruction set, and a second processor having a different instruction set. The process includes a first step of running the first processor to determine whether a part of the application shall be run on the first processor or the second processor and then establishing a second processor object if said part shall be run on the second processor and the first processor sending a message that the second processor is to run said at least part of the application program. The third program establishes message handling functions and bus masters data transfer operations for the second processor between the host running the operating system and the second processor running the third program. The process concurrently runs the second processor to perform operations defined by the third program, including to access memory to detect the message that the second processor is to run said at least part of the application program, and runs the second processor to access the second processor object and thereby determine operations for the second processor to access second processor instructions for said part of the application program and data to be processed according to said second processor instructions. Further, the process runs the second processor to process data according to said at least part of the application program and supplying data thus processed by bus mastering operations defined by the third program.

BRIEF DESCRIPTION OF THE DRAWINGS

In the drawings:

FIG. 1 is a block diagram of improved integrated circuits and computer system embodiments for desktop and mobile computers, television sets, set-top boxes and appliances improved with asymmetrical multiprocessors;

FIG. 16 is a process diagram or method-of-operation diagram showing interrelated improved processes and structure in a network videoconferencing and full-featured system of FIG. 1;

FIG. 17 is a block diagram and layout diagram of an improved DSP (digital signal processor) integrated circuit embodiment having a wrapper-and-DSP-core (called VSP herein) and a serial bus backend interface on-chip, the improved integrated circuit connected to busses for some system embodiments herein;

FIG. 53 is an electrical block diagram of a circuitry embodiment coupling a wrapper ASIC DPRAM to a PCI macro, or block, and showing ASIC control registers read/writeable by DSP in a portion of the wrapper ASIC embodiment of FIG. 50;

FIG. 54A is a partially-schematic, partially real-time process flow diagram of an eight-byte read with byte alignment in an example using 3 PCI data phases in the process of FIG. 54;

FIG. 54B is a partially-schematic, partially real-time process flow diagram of a nine-byte read with byte alignment in an example using 3 PCI data phases in the process of FIG. 54;

FIG. 54C is a partially-schematic, partially real-time process flow diagram of a five-byte read with byte alignment and byte padding in an example using 2 PCI data phases in the process of FIG. 54;

FIG. 54D is an electrical block diagram of the PCI configuration registers in PCI configuration space of FIG. 128, their address decodes and read or read/write circuits associated with those configuration registers in the wrapper ASIC of VSP;

FIG. 54E is an electrical block diagram of PCI I/O space registers in PCI I/O space of FIG. 128, their address decodes and write or read/write circuits associated with those I/O space registers in the wrapper ASIC of VSP;

FIG. 54I is an electrical block diagram of PCI host accessible registers starting at base address BA0 in PCI I/O space and replicated and starting at base address BA1 in PCI memory space of FIG. 128, (BA0, BA1 defined in PCI configuration register 0x10, 0x14), and FIG. 54I further indicates address offset decodes and read or read/write circuits associated with those PCI host accessible registers in the wrapper ASIC of VSP;

FIGS. 72-1 and 72-2 are both halves of an electrical schematic diagram of a zero-wait-state read interface circuit and method embodiment coupled between wrapper ASIC DPRAM and a DSP;

FIGS. 75A and 75B are both halves of a pinout diagram for the VSP wrapper ASIC;

FIG. 91 is a process diagram or method-of-operation diagram showing interrelated improved processes in sound-related driver and HAL interface technology using unified signal processing ActiveDSP, DirectDSP and VSP herein;

FIG. 92 is a process diagram or method-of-operation diagram emphasizing interrelated improved processes in an ActiveDSP level of FIG. 92 in system embodiments;

FIG. 93 is a process diagram or method-of-operation diagram emphasizing data streaming aspects of interrelated improved processes in an ActiveDSP level of FIG. 92 in system embodiments;

FIG. 94 is a process diagram or method-of-operation diagram emphasizing a shared memory model coupling interrelated improved processes of DirectDSP HAL and DSP Kernel in system embodiments;

FIG. 95 is a process diagram or method-of-operation diagram emphasizing DSP task object structure in the shared memory model of FIG. 94 in system embodiments;

FIG. 96 is a process diagram or method-of-operation diagram showing interrelated improved processes at ring 3 and ring 0 levels of privilege in sound-related driver processes using unified signal processing improvements herein;

FIG. 97 is a process diagram or method-of-operation diagram Showing interrelated improved processes at ring 3 and ring 0 levels of privilege in sound-related driver processes using unified signal processing improvements herein, and showing a different way of handling kernel mode clients compared to FIG. 96;

FIG. 98 is a process diagram or method-of-operation diagram showing interrelated improved processes in MIDI multimedia driver interface using unified signal processing improvements herein;

FIG. 99 is a another process diagram or method-of-operation diagram showing interrelated improved processes in MIDI multimedia driver interface with wave tables using unified signal processing improvements herein;

FIG. 100 is a process diagram or method-of-operation diagram showing interrelated improved processes in a WDM (32-bit Windows Driver Model) for data streaming using unified signal processing improvements herein;

FIG. 101 is an electrical block diagram and/or method-of-operation diagram showing a 2-channel MPEG audio decoder to run on VSP and have other unified signal processing improvements herein;

FIG. 102 is a process diagram or method-of-operation diagram showing interrelated processes and virtual sound blaster SB and a 16-bit and 32-bit WDM DirectSound multimedia (MM system) installable driver environment for unified signal processing improvements herein;

Figure 103:
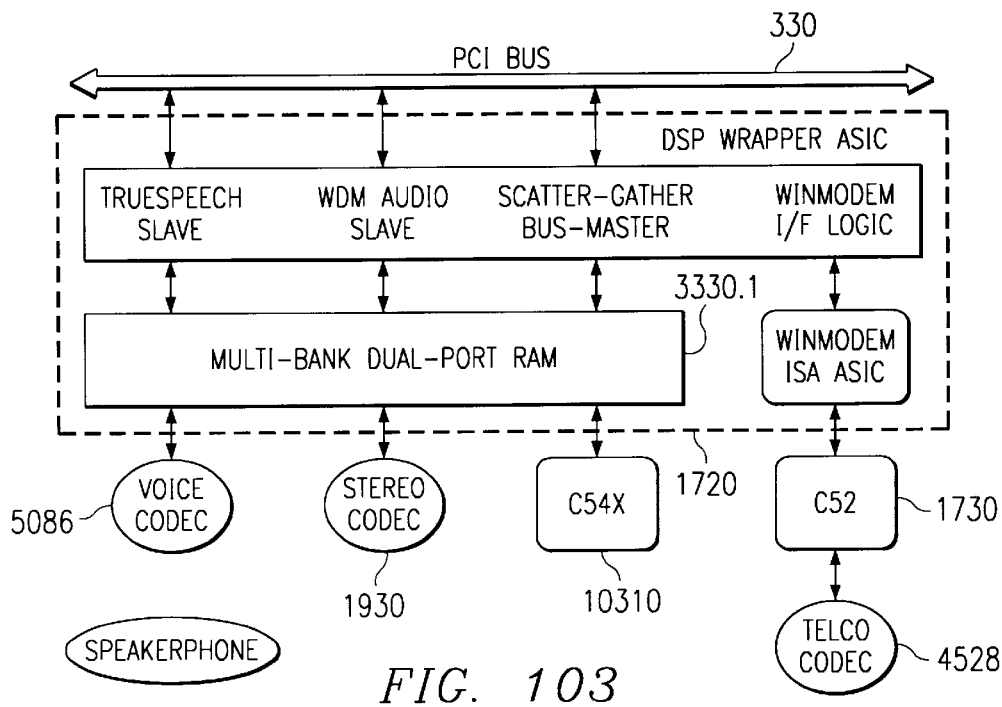
Figure 104:
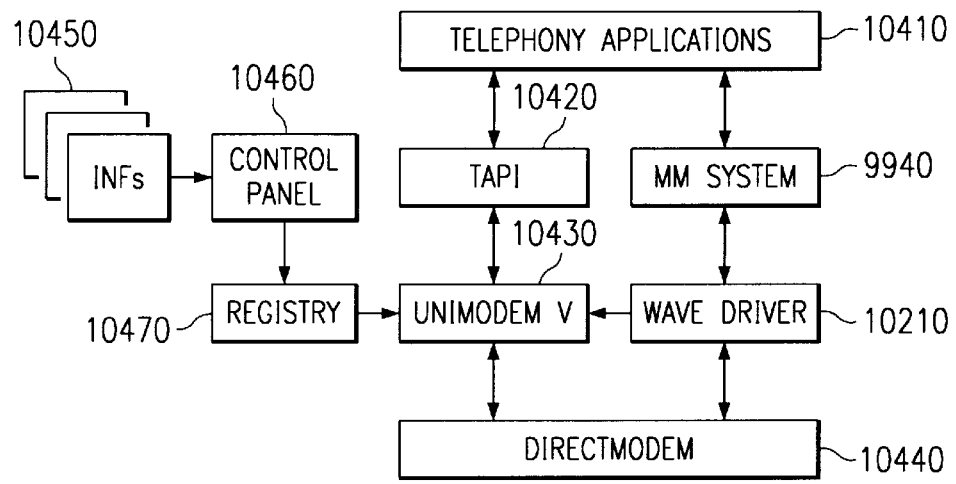
Figure 105:
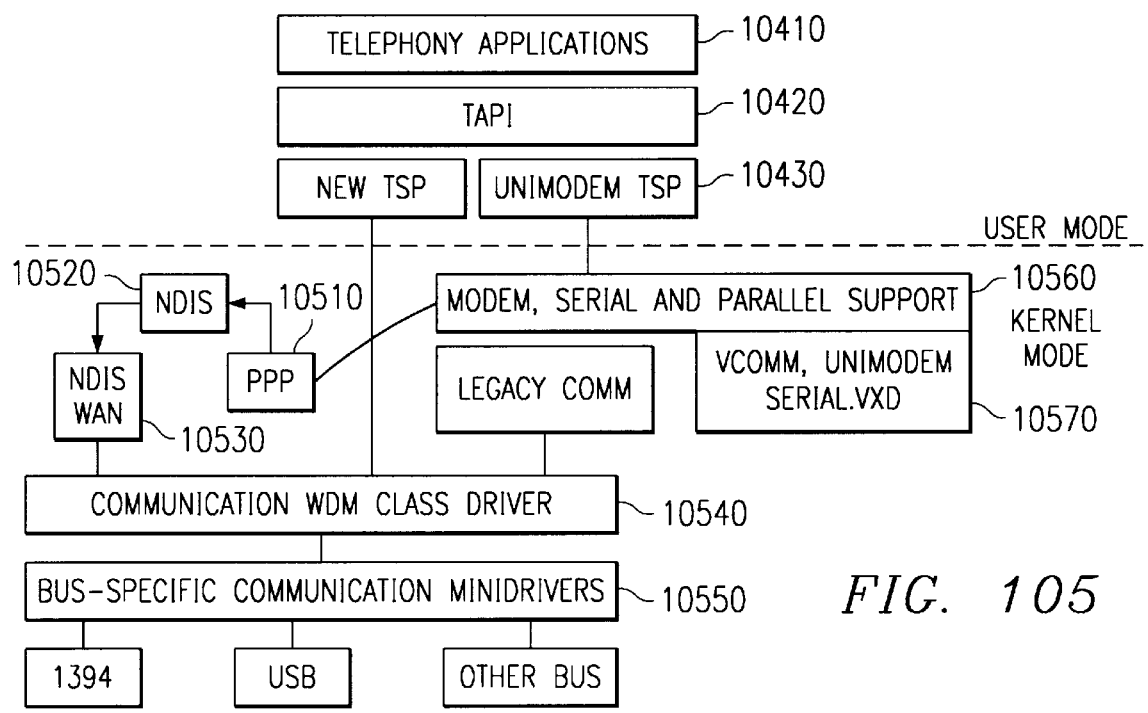
Figure 106:
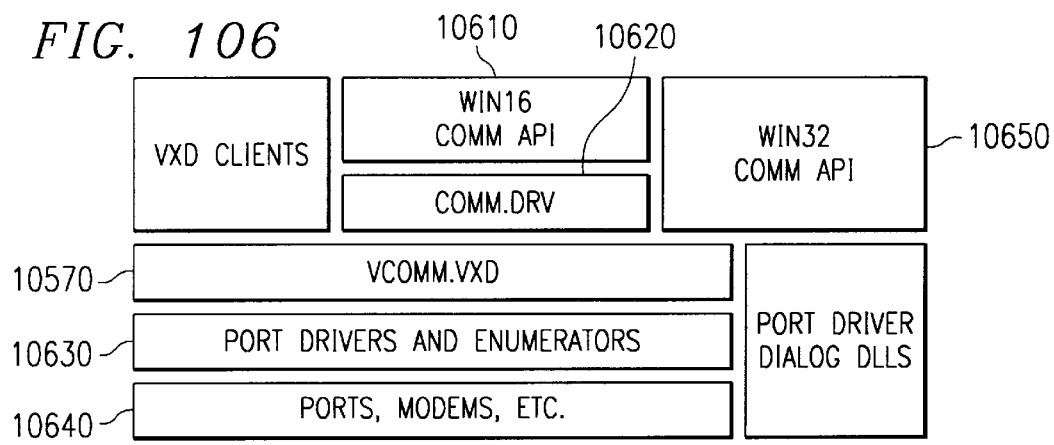
Figure 107:
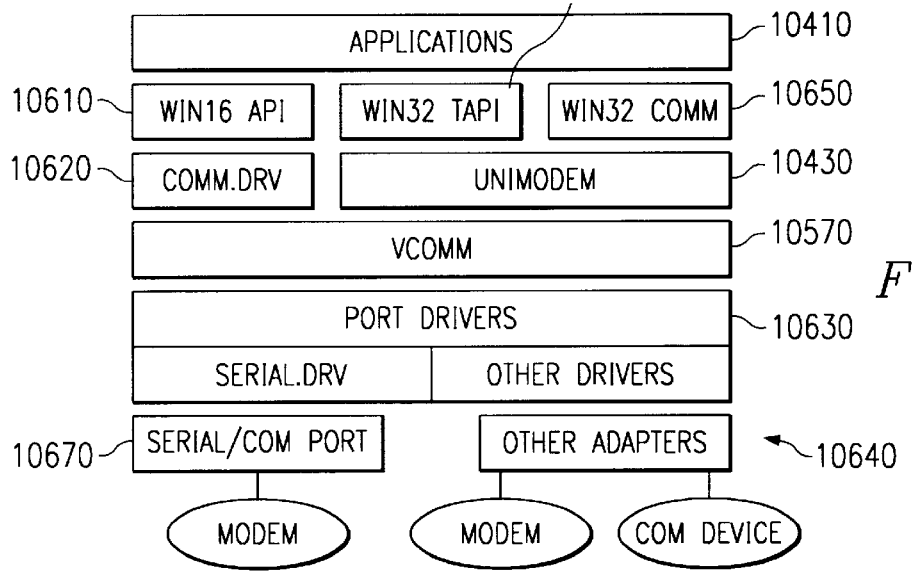
Figure 108:
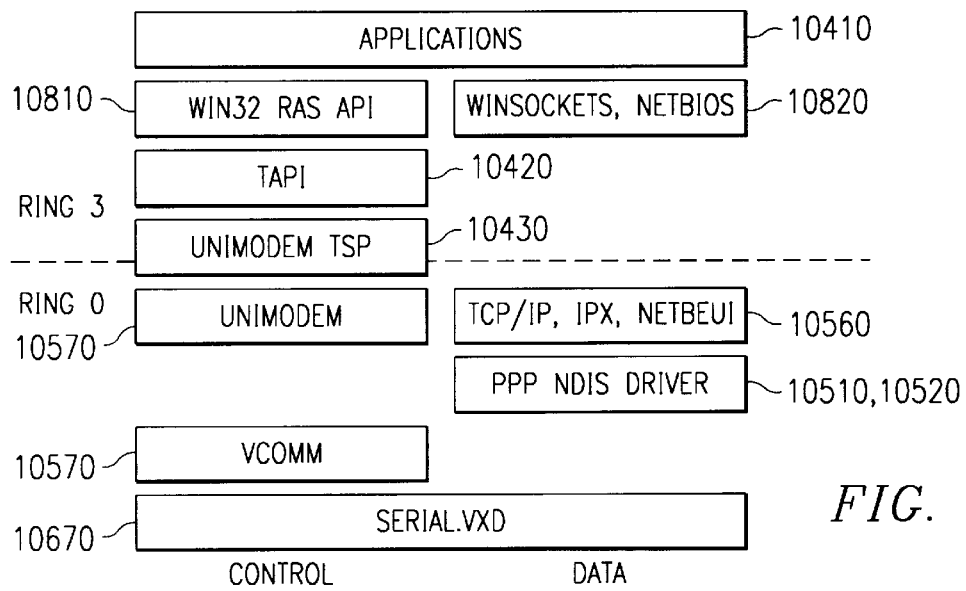
Figure 111:
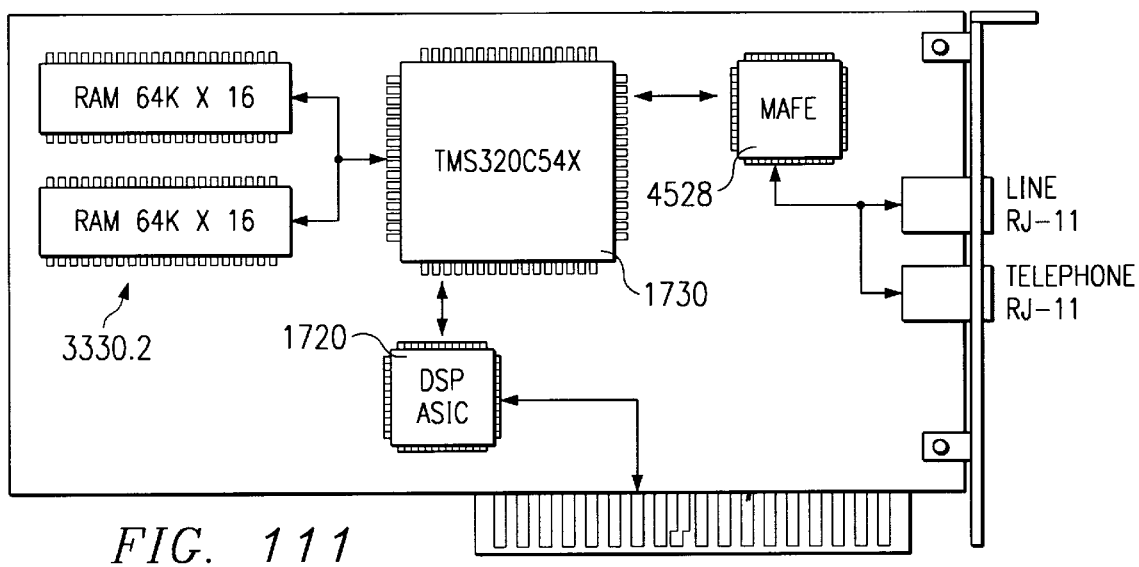
Figure 111A:
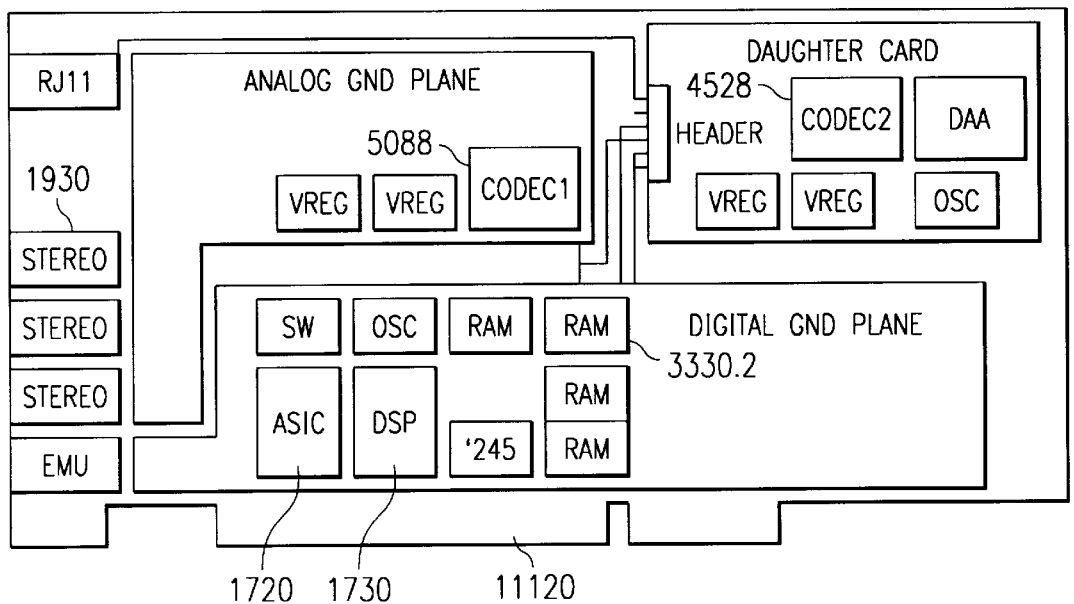
Figure 112:
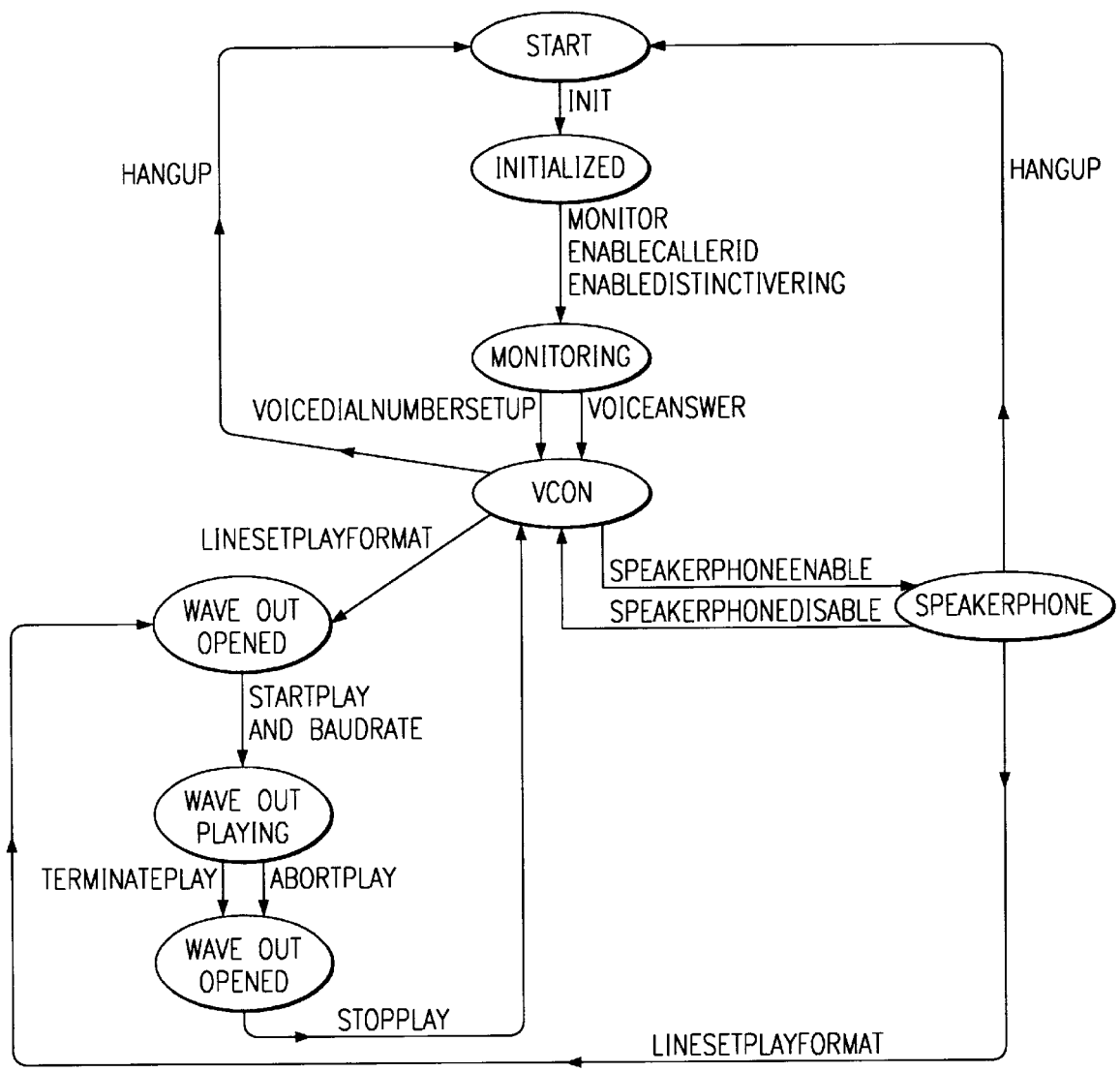
Figure 113:
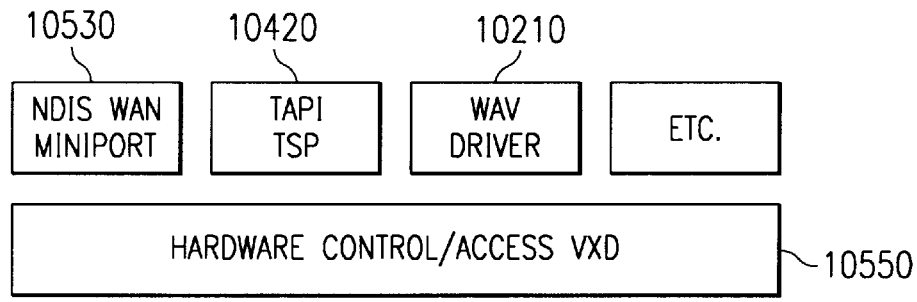
Figure 114:
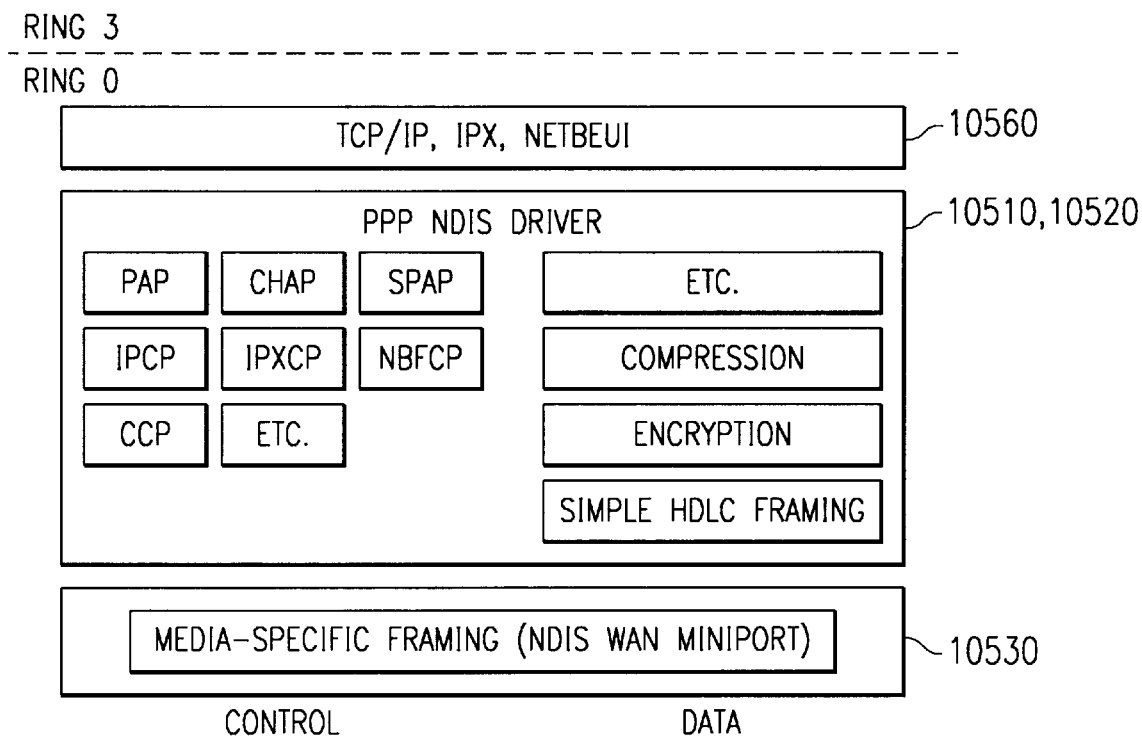
Figure 115:
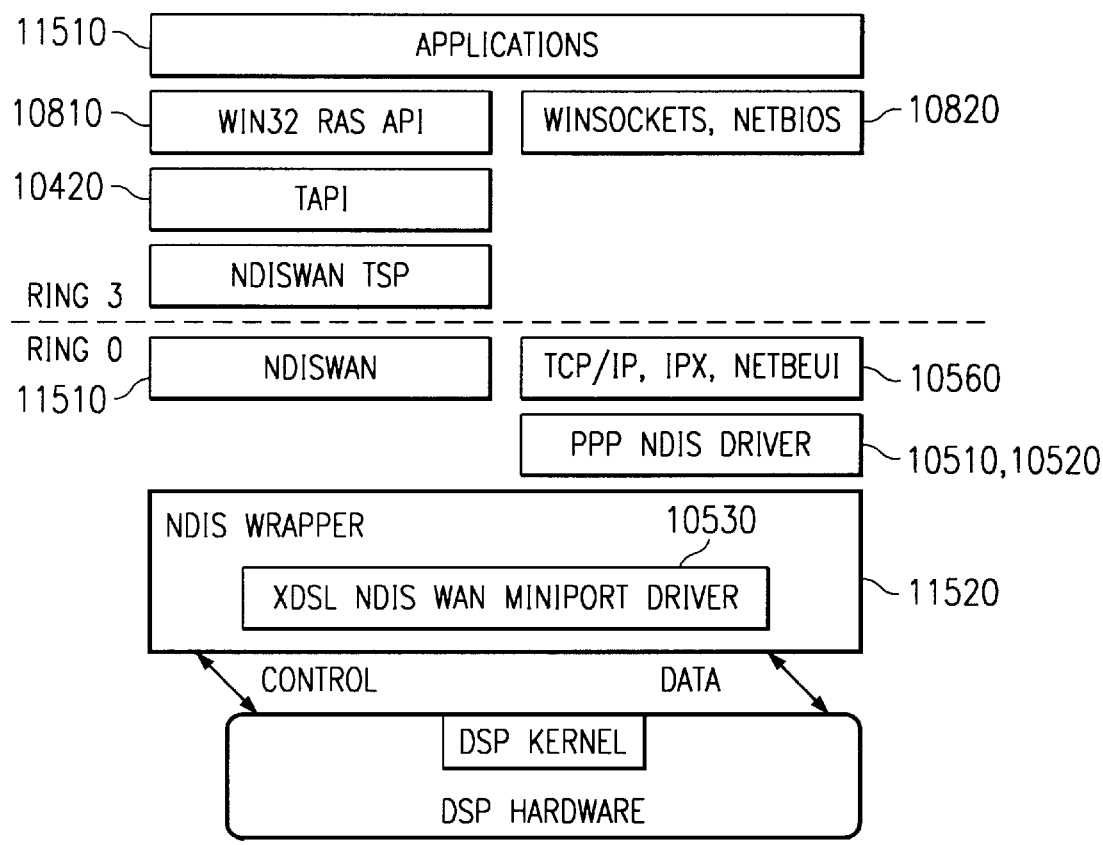
Figure 116:
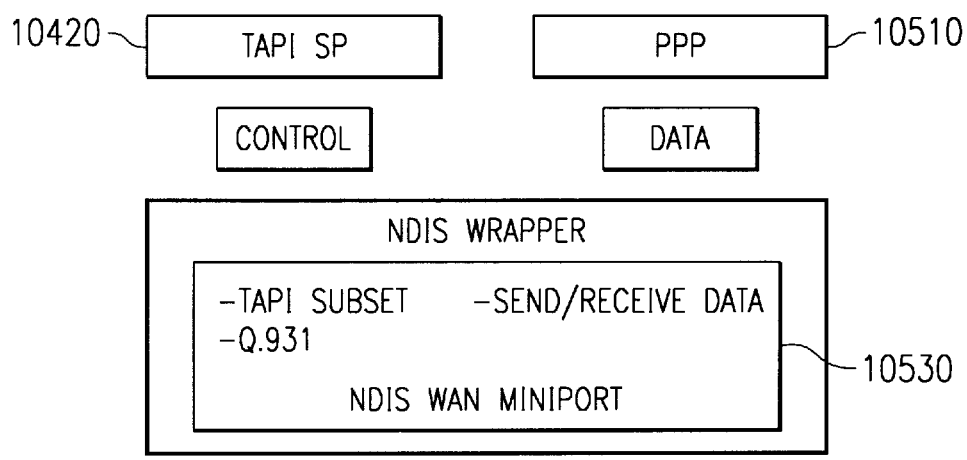
Figures 117, 118:
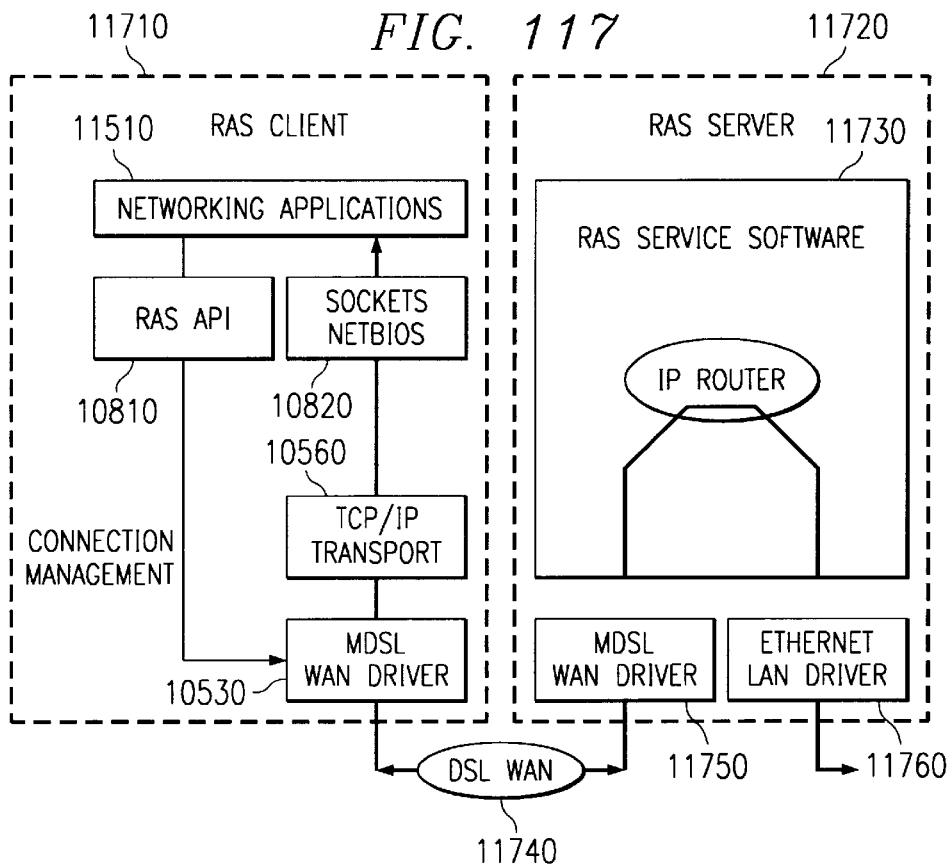
Figure 119:
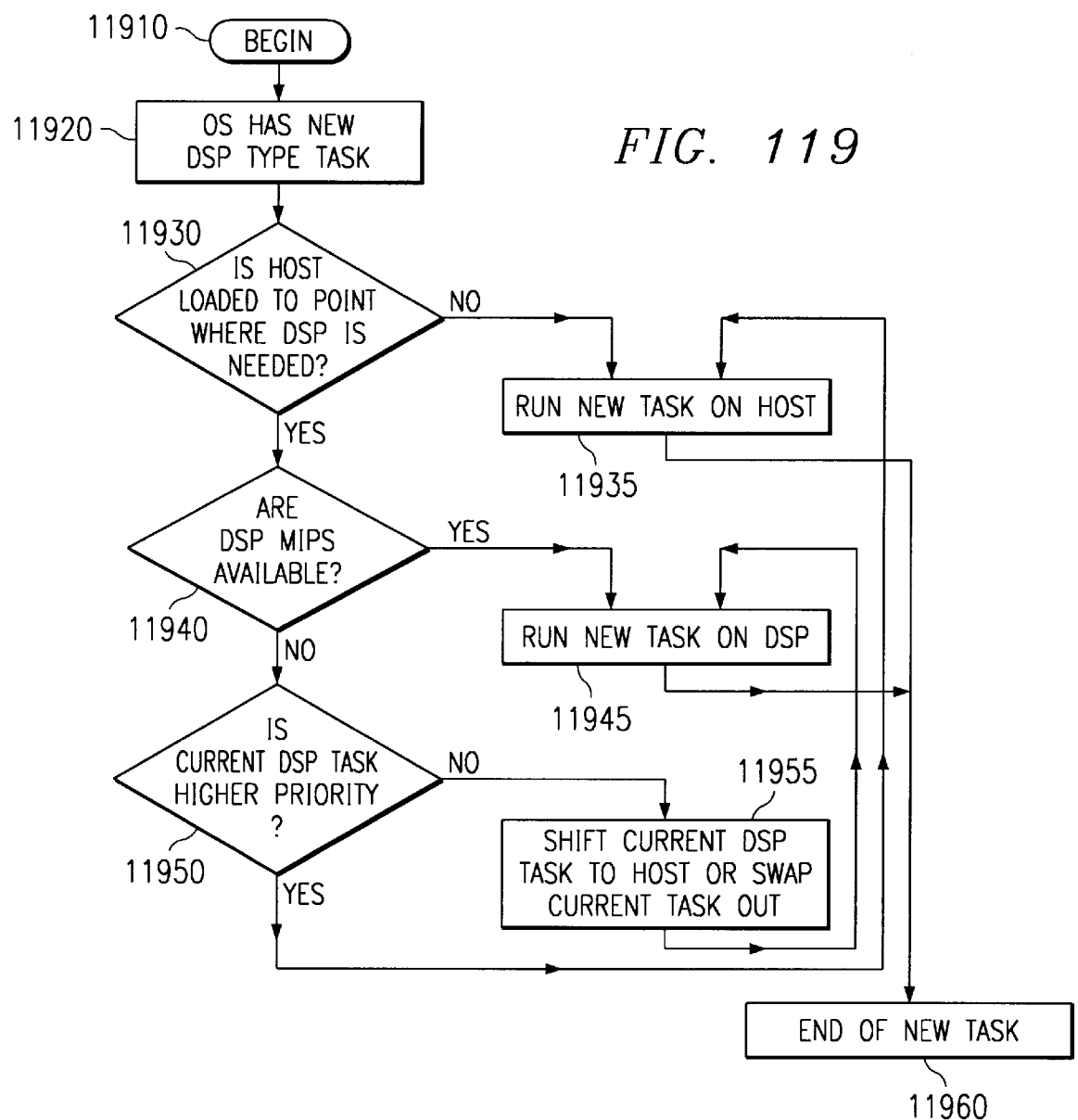
Figure 120:
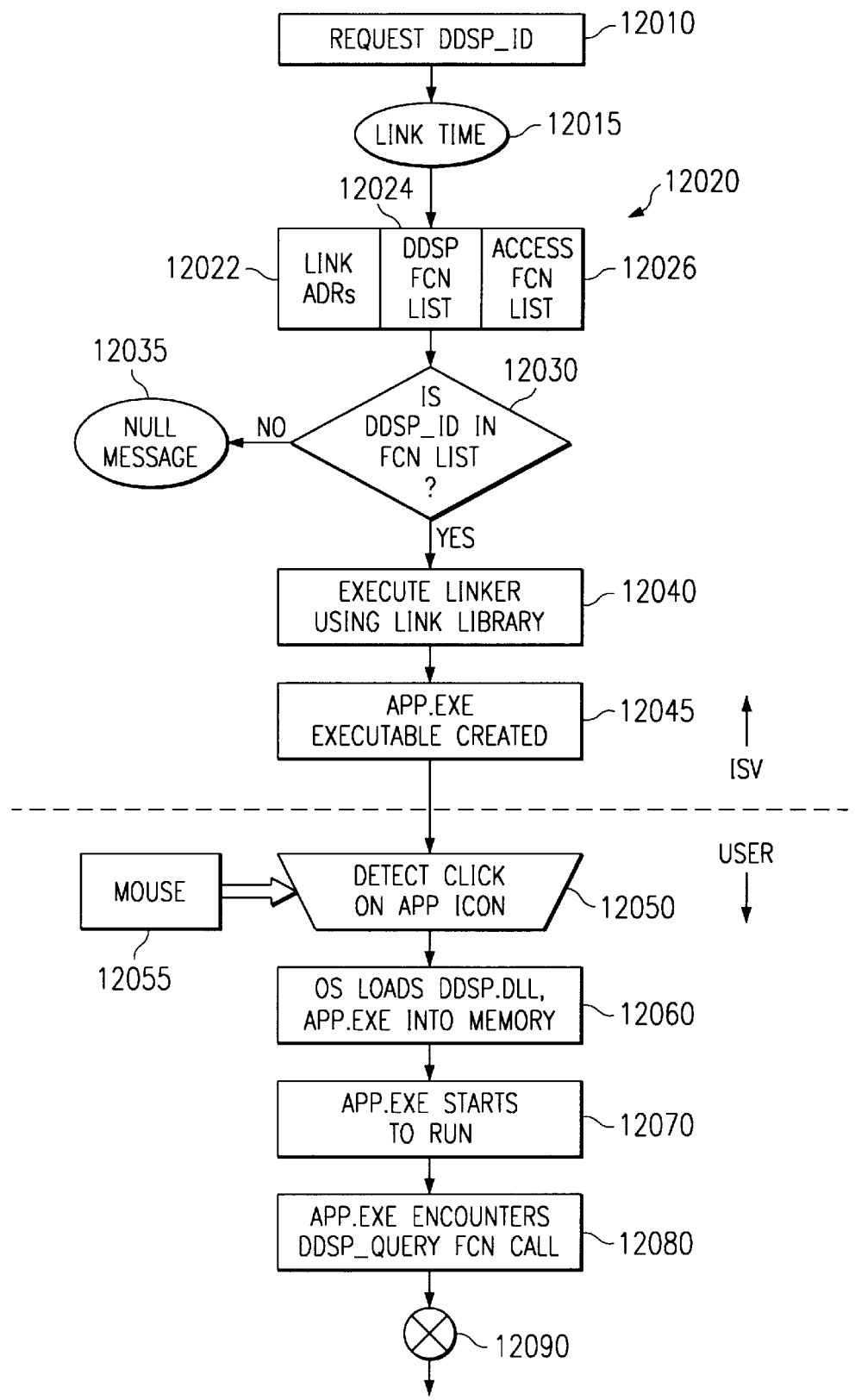
Figure 121:
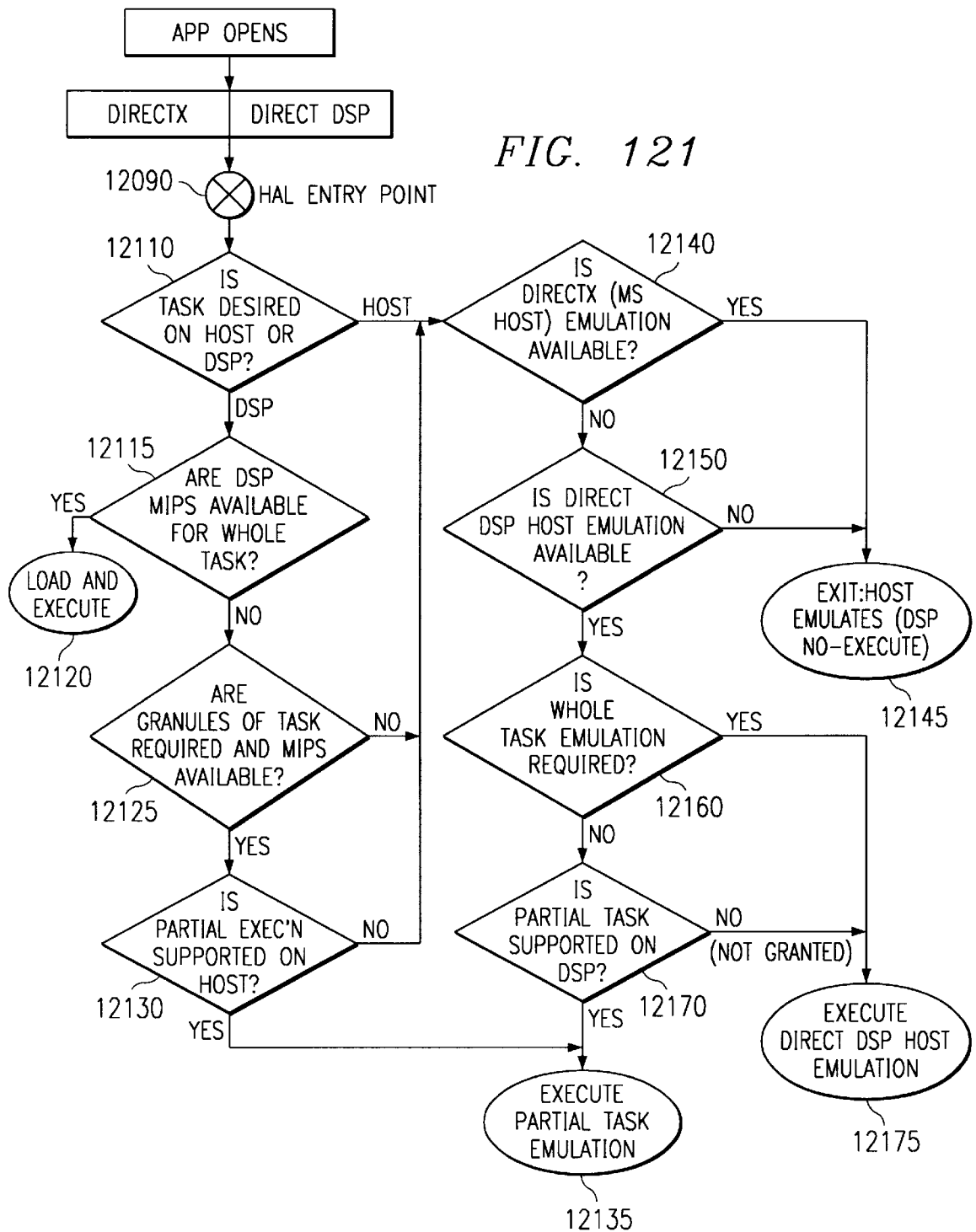
Figure 122:
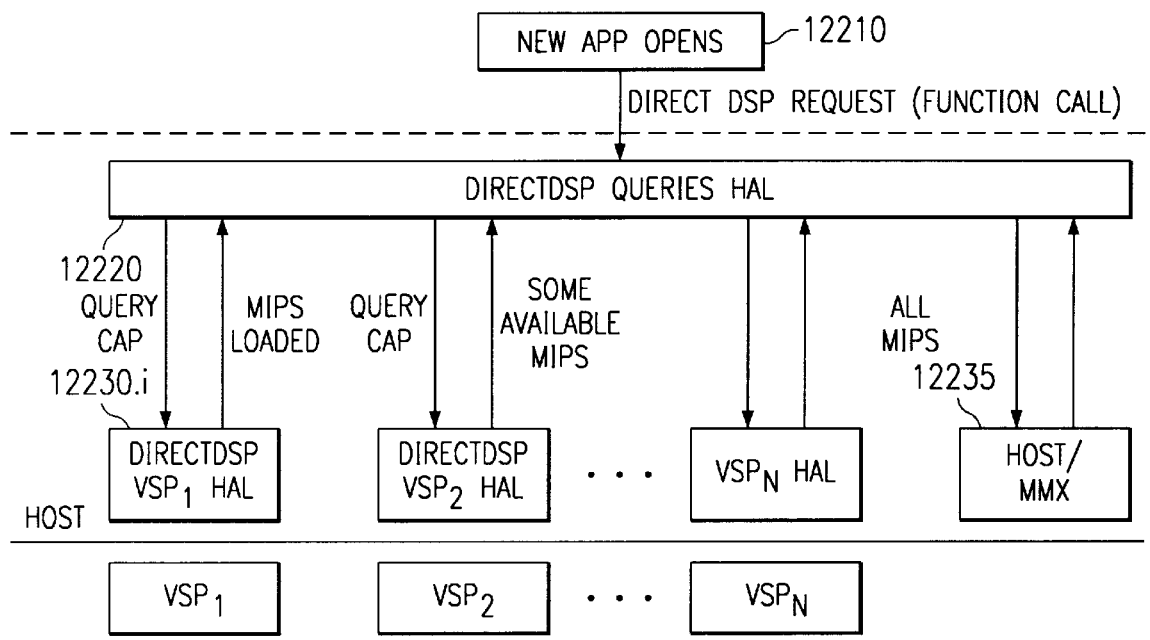
Figure 123:
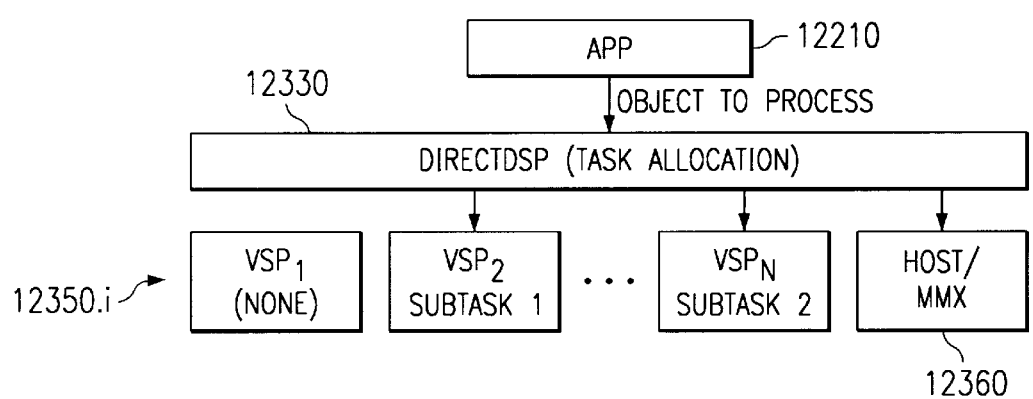
Figure 124:
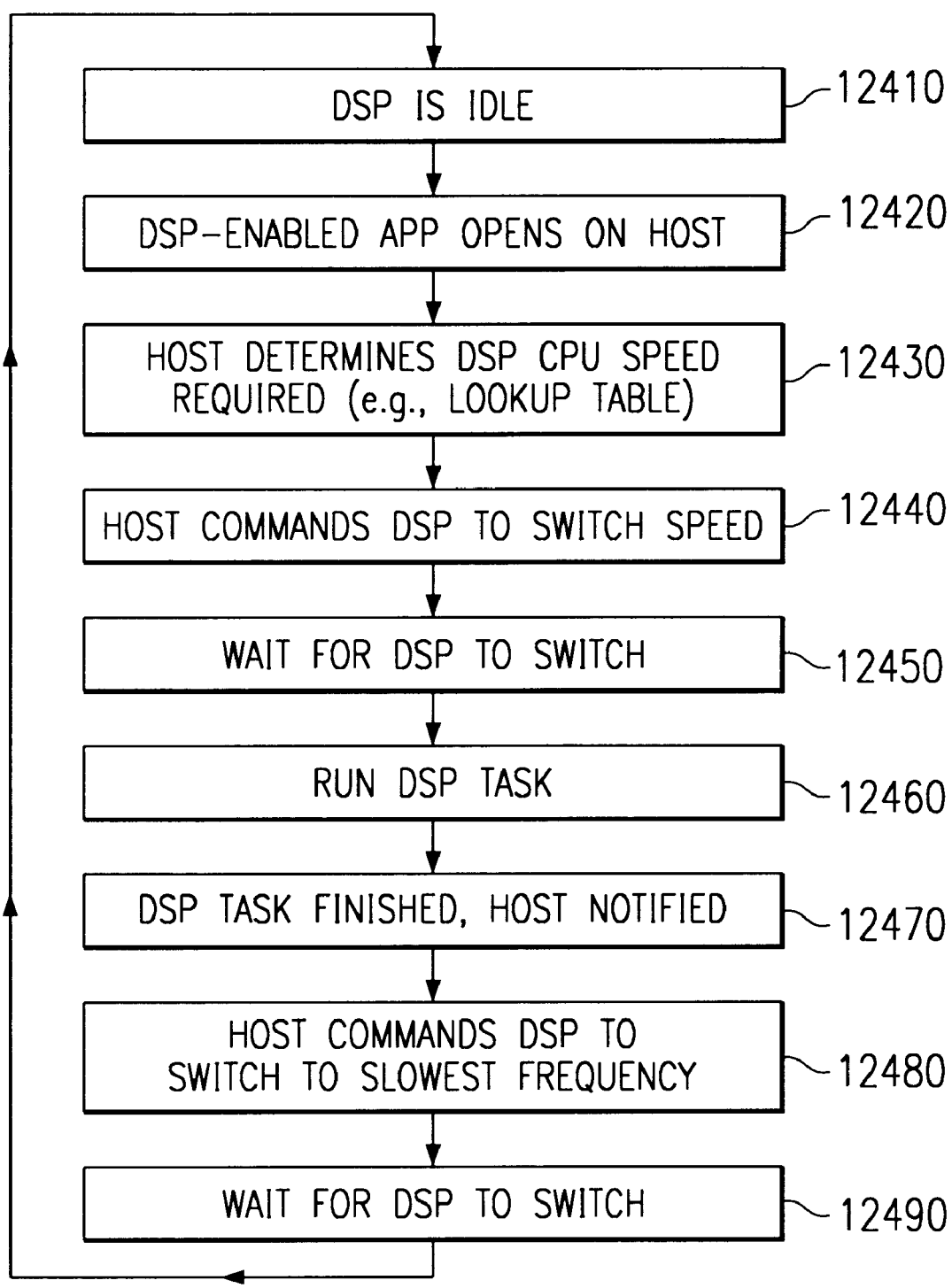
Figure 125:
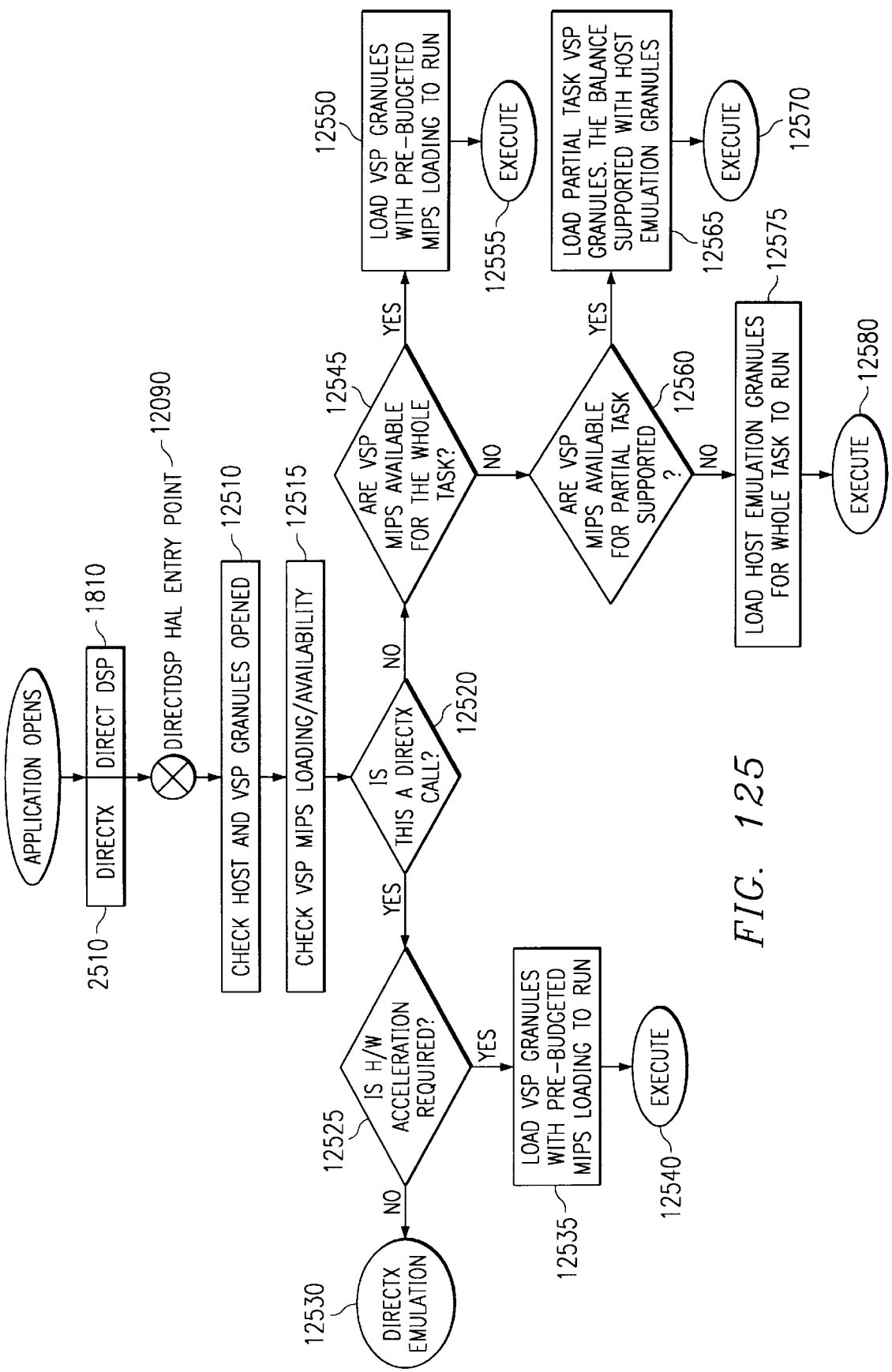
Figure 126:
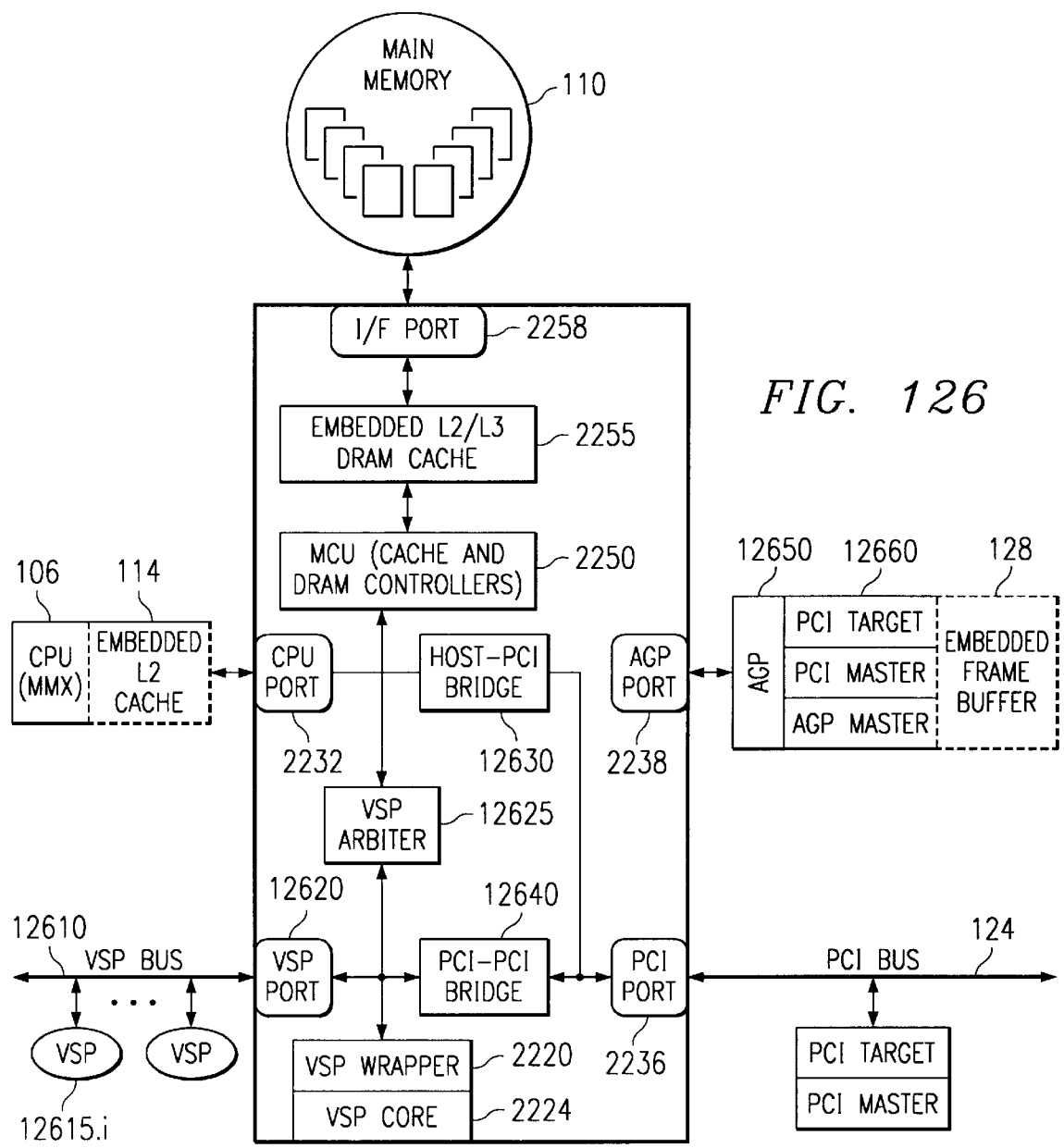
Figure 127:
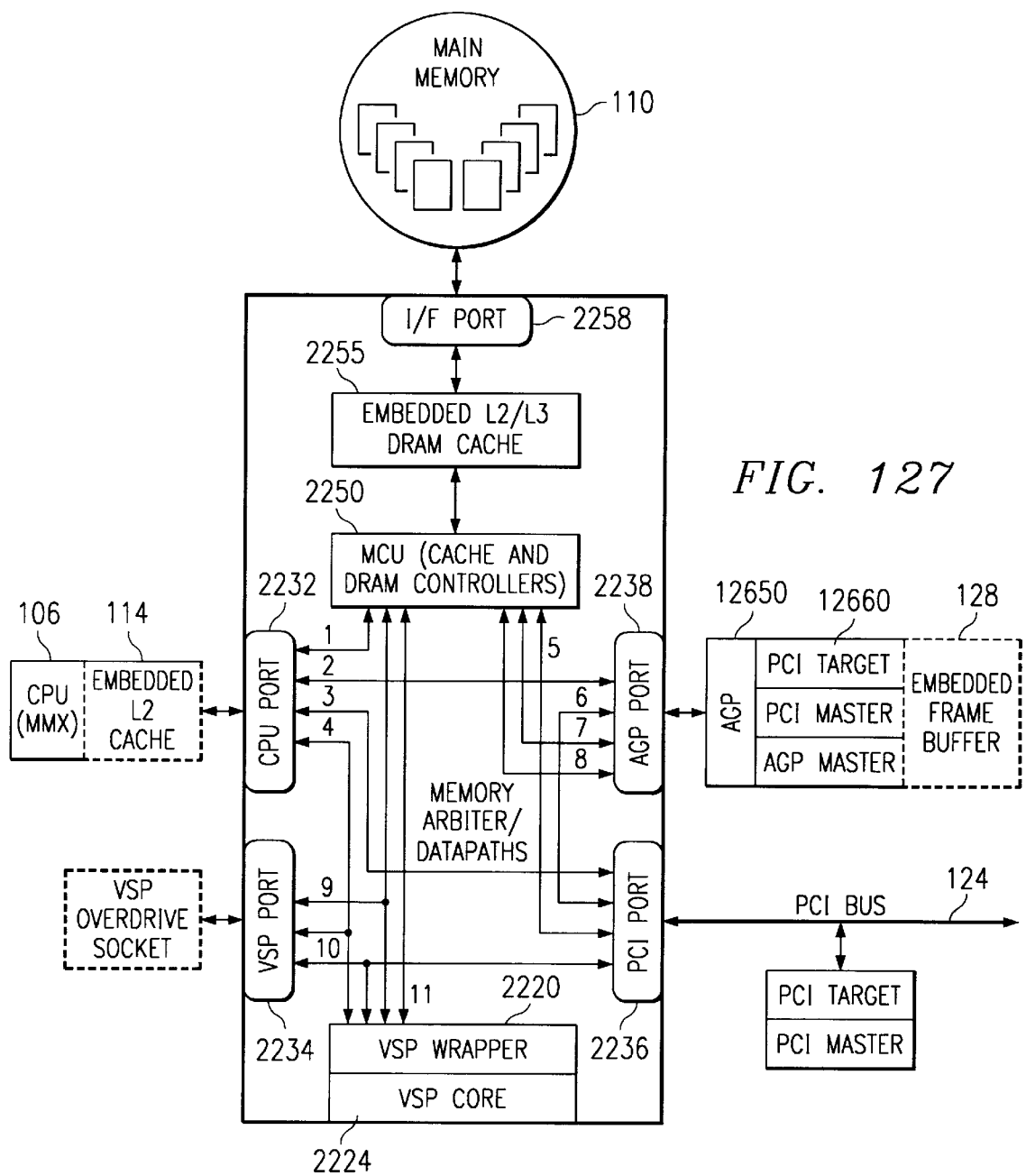

FIG. 103 is an electrical block diagram and/or process diagram showing combined audio and modem functions in a VSP system embodiment;

FIG. 104 is a process diagram or method-of-operation diagram showing interrelated processes and structures in a telephony driver (TAPI telephony API) and wave driver architecture for unified signal processing improvements herein;

FIG. 105 is a process diagram or method-of-operation diagram emphasizing (compared to FIG. 104) interrelated processes for interfaces to telephone line, NDIS WAN (network driver interface specification, wide area network), and serial buses in kernel mode or unified signal processing improvements herein;

FIG. 106 is a process diagram or method-of-operation diagram showing interrelated processes in a Windows95 virtual communications driver model for unified signal processing improvements herein;

FIG. 107 is a process diagram or method-of-operation diagram showing interrelated processes in Windows95 voice-line communications for unified signal processing improvements herein;

FIG. 108 is a process diagram or method-of-operation diagram showing interrelated processes in a Windows95 RAS (remote access service and PPP (point-to-point protocol internet dialup) for unified signal processing improvements herein;

FIG. 109 is a process diagram or method-of-operation diagram showing interrelated improved processes in a Windows95 unimodem and driver interface for unified signal processing improvements herein;

FIG. 110 is a process diagram or method-of-operation diagram showing interrelated improved data flow-processes in a combined Windows95 unimodem, telephony, wave driver and pumpless modem model for unified signal processing herein;

FIG. 111 is a pictorial diagram of a VSP add-in card or printed wiring board with wrapper ASIC, DSP (C54x), two SRAMs, MAFE (modem analog front end) and connector jacks;

FIG. 111A is another pictorial diagram of a VSP add-in card or printed wiring board with wrapper ASIC, DSP (C54x), SRAMs, codecs, daughter card and connectors;

FIG. 111B is a detail diagram of a card connector for the VSP add-in card of FIG. 111A;

FIG. 112 is a process diagram or method-of-operation diagram including state transitions in a Windows95 Unimodem V interface for unified signal processing improvements herein;

FIG. 113 is a simplified process diagram or method-of-operation diagram showing interrelated improved processes for data and voice for unified signal processing improvements herein;

FIG. 114 is a process diagram or method-of-operation diagram showing interrelated improved processes in a PPP NDIS driver for unified signal processing improvements herein;

FIG. 115 is a process diagram or method-of-operation diagram showing interrelated improved processes for telephony and networking (including ISDN integrated services digital network, and xDSL digital subscriber line) in a driver interface using unified signal processing, with PPP NDIS driver shown in FIG. 114;

FIG. 116 is a process diagram or method-of-operation diagram summarizing interrelated improved TAPI, PPP and NDIS WAN processes for unified signal processing improvements herein;

FIG. 117 is an electrical block diagram and/or process diagram showing RAS client and RAS server coupled by DSL WAN for unified signal processing improvements herein;

FIG. 118 is a process diagram or method-of-operation diagram showing interrelated improved processes in MDSL WAN system for unified signal processing improvements herein;

FIG. 119 is a process diagram or method-of-operation diagram showing one process embodiment for dynamic balancing of a system embodiment herein;

FIG. 120 is a process flow diagram or method-of-operation diagram showing linking of a granule and launching of a software application according to improvements herein;

FIG. 121 is a process diagram or method-of-operation diagram showing improved operations loading a Host and/or loading a VSP subsequent to FIG. 120 operations;

FIG. 122 is a process diagram or method-of-operation diagram showing interrelated improved processes wherein multiple VSPs are coupled to and supply VSP MIPS-load information for the improved DirectDSP process to do unified signal processing;

FIG. 123 is a process diagram or method-of-operation diagram showing interrelated improved processes wherein multiple VSPs are coupled to improved DirectDSP process to do unified signal processing involving task allocation to the multiple VSPs;

FIG. 124 is a process diagram or method-of-operation diagram showing an improved process for speed scaling of VSP by Host using unified signal processing improvements herein;

FIG. 125 is another process diagram or method-of-operation diagram emphasizing improved process coordination with DirectX showing improved operations loading a Host and/or loading a VSP subsequent to FIG. 120 operations;

FIG. 126 is an electrical block and/or process diagram showing a VSP-improved north bridge coupled to VSP bus, to Host CPU, to Main Memory, to AGP port and AGP chip, and to PCI bus with PCI agent(s) thereon in system embodiments; and FIG. 127 is another electrical block and/or process diagram emphasizing data paths in a VSP-improved north bridge coupled to VSP bus, to Host CPU, to Main Memory, to AGP port and AGP chip, and to PCI bus with PCI agent(s) thereon in system embodiments.

Corresponding numerals and symbols in the different figures refer to corresponding parts unless otherwise indicated.

DETAILED DESCRIPTION OF PREFERRED EMBODIMENTS

Given an optimal way to deploy a "pool" of MIPS available in a computer system at any given time, a dynamically balanced system as described herein distributes and/or re-allocates its collective computational resources to satisfy a broad range of functional requirements on-the-fly. By comparison, a statically balanced system fails to perform some combinations of tasks even though there may be large "pools" of unused trapped MIPS in particular chip(s) in the system. This is actually a not uncommon occurrence. With a dynamic balance, computational resources within the system are linked at run-time and allocated by the operating system, providing a much greater flexibility for resource scheduling.

Scalability impacts balance herein. Scalability suggests that applications or media processing tasks adapt to instantaneous or long term change in the availability of system computational resources. Different types of functions or applications respond differently to upward and downward scaling.

Upward scaling is generally a positive phenomenon, though not all functions can take advantage of it. Either by upgrading the CPU, or accelerating a CPU-bound function, additional MIPS become available to the system. Performance down-scaling occurs when host MIPS are consumed by an increasing number of concurrently running tasks. Some functions handle downward scaling gracefully, while others catastrophically fail.

Down scaled performance is an annoyance in recalculating a spreadsheet. But for decoding a movie, using Internet telephony, or tele-gaming, downward scaling means losing real world data and compromising quality of service and accuracy. When real-time media streaming functions lack enough MIPS to run, catastrophic failure results.

A statically balanced system does not prevent non-scalable real time functions from failing and scalable operations do not scale upward even though unused MIPS exist in the system.

The kernel of evolving Windows operating system (OS) and device driver models and the Application Programming Interface(API) for multimedia peripherals and data types is embodied in DirectX, ActiveX and WDM. The OS is herein improved for balance and scalability by coordinating abstraction, virtualization and emulation.

Windows OS is device-independent. A variety of differentiated modular fixed-function physical hardware peripheral devices are adapted to Windows through abstraction via a thin layer of Hardware Abstraction Layer (HAL) software (also called device drivers) in Windows. Through abstraction, the OS and application need not care what brand of graphics accelerator, audio chip, modem or printer are resident in the system.

Once the system peripherals have been abstracted in software, the basic hardware peripherals in the system are virtualized for advanced multitasking. Some software utilized for virtualization herein is located in the core of the Windows OS—the Windows Virtual Machine Manager (VMM) and Virtual Device Drivers (VxD).

The Windows OS software creates a separate software instantiation (or abstraction) of a complete system, or Virtual Machine (VM), for each application running concurrently. Each application uses and changes the state of its own virtual machine (virtual peripherals, virtual memory, etc.) independently of other tasks.

Abstraction provides the OS with device independence, and device emulation delivers hardware independence. Windows APIs establish uniform program access to acceleration hardware, while host emulation allows the API to operate correctly even if acceleration hardware is absent.

Peripheral hardware emulation relies on CPU computational resources rather than fixed function resources. A powerful host CPU within the system, running the appropriate code, is functionally indistinguishable from a fixed function peripheral. Within the limits of the CPU computational resources, emulated functions are synthesized, suspended or eliminated at will.

When an emulated peripheral function is no longer required, it desirably ceases to consume host MIPS, while fixed function MIPS cannot be re-allocated.

Although host emulation is useful, flexibility is constrained, and the host CPU may stall due to system imbalance when the virtualization and emulation capabilities of the OS can only be directed to the host CPU.

A system which uses the host exclusively for emulation is not balanced. As each emulation task robs performance from the applications and OS which spawned them, host emulation of one or more complex media processing functions can quickly bring the system to its knees. Since device emulation code is mutually exclusive or non-concurrent with the execution of application or operating system code, host emulation forces downward scaling of all other active applications or functions.

A multimedia extension MMX single instruction multiple data (SIMD) unit inside the CPU can accelerate host emulation of some of the more real-time applications such as video and to some extent parallel pixel operations, using x86 emulation code ported to MMX code. However, issues include inefficient physical partitioning, integration, and concurrency of highly specialized processing elements. Since MMX is on-host and on-chip it competes directly with other x86 processing units for system resources.

In some of the embodiments herein called Unified Signal Processing (USP), the Windows OS is improved for OS directed device emulation, dynamic control, reconfiguration and allocation of system resources. Host emulation is augmented by distributed and asymmetrical device emulation acceleration. (Asymmetrical devices have different instruction sets or architecture.) Balanced system resources prevent or alleviate bus (CPU, memory and I/O) overloading, memory and I/O bottlenecks, and CPU stalls. By properly distributing computational resources in the system, device emulation tasks are directed by the OS to run on any appropriate processing elements to achieve balance.

In some improved system embodiments, the OS controls multiple modular, stackable, concurrent computational resources (processors or hardware accelerators), and the improved system supports a wider variety of multimedia device emulation tasks. Modularity adds processing MIPs or elements, and the improved system gracefully orchestrates their operation with the host CPU/MMX for audio, video, graphics, communication and other functions. These modular and distributed processing elements in the improved system can better control latency for real-time events.

VSP Hardware

VSP or VSP interface is a logic wrapper around a digital signal processor (DSP) core, that interfaces the DSP with the PC via the PCI/AGP Bus or PC system core logic.

Backend interface logic enables VSP to become an intelligent hub or bridge to universal serial bus (USB), IEEE 1394 bus.

Host-independent PCI interface allows VSP to be integrated with other system functions or reside on an add-in cards (PCI or PC card).

Advanced CPU Architecture

Advanced CPU architecture with multiple Processing Elements (PEs).

The main PE is the x86 CISC core. Other PEs are implemented as VSPs.

VSP1 is the MMX core (as in the Pentium and Pentium Pro designs). VSP2 is a very long instruction word (VLIW) core and VSP3 is a RISC core etc.

Coprocessor bus couples to VSPs.

Superscalar extension with VSP(s) on the coprocessor bus.

Shared memory architecture with Distributed AMP and out-of-order execution on mem.tran.boundary.

All processors and bus suitably tabbed on single chip.

Advanced RISC Machines (ARM) With VSP Coprocessors

Coprocessor bus couples with VSPs.

Superscalar extension with VSP(s) on the coprocessor bus.

Shared memory architecture.

Distributed AMP.

VSP uses C54x Core and follow on DSPs

OS independent: Java or Windows CE.

All processors ARM+VSP suitably fabbed on single chip.

Implementation 1: Add-In Card

The USP architecture suitably utilizes any bus interface. USP with a PCI interface is easily implemented as an external PCI adapter card or cardbus PC card. Functional integration with a PCI graphics video controller, card bus, IEEE 1394 bus, communications (comm) and/or audio controller are possible.

Implementation 2: Core Logic Integration (Motherboard or Planar)

The USP architecture integrates a VSP(s) into the PC such that a VSP is embedded into the north Bridge, south bridge and super I/O core logic. Functional integration with a 3D graphics/video controller, comm block and/or cardbus controller are feasible too.

Implementation 3: CPU Integration (Motherboard or Planar)

Like MMX, VSP(s) are integrated on-chip, e.g. a P7 with a VLIW VSP block.

Implementation 4: External to PC Box

VSPs are suitably provided on IEEE 1394 link layers, USB hubs, xDSL (digital subscriber line) modems and Internet/Intranet.

USP is cost effective by intelligently distributing processing requirements between the host and VSP. Various USP improvements avoid overhead associated with a standalone DSP system and its inherently inefficient host-to-DSP (and vice versa) communication. Therefore, under the USP architecture, new media applications are performed more efficiently with less MIPS and memory. The ultimately translates to lower system costs. This efficiency results from applying the most optimal processing architecture for various tasks of a new media application, and intelligently offloading the host to optimally use the host and VSP resources. In addition, VSP accesses host resources (e.g. virtual memory) while intelligent memory schemes are employed to address system cost. The VSP hardware as part of the host resources and can directly be integrated with I/O and pad-bound system core-logic for cost reduction.

USP provides full time functionality integrated to the PC architecture. USP buys back host MIPs where the host is in high demand, and provides reusability by helping with host functions when not processing multimedia tasks. USP permits true bi-directional scalability of system hardware (in either the host or DSP direction) when an application opens. System can be rescaled when the application closes, whereby USP truly enables virtual hardware. Expandability through a distributed rescalable architecture with asymmetrical multi-processing leads to embodiments with multiple VSPs on multiple buses (PCI, AGP, IEEE 1394, USB etc) or integrated with system core-logic to multi-process on task execution. USP's COM-based S/W allows gradual porting of baseline host code to VSP code such that complicated DSP algorithms may be developed in C and piecemeal ported to VSP code as DSP COM objects or threads.

SUMMARY OF SOME EMBODIMENTS

A conventional x86 PC having a bursty bus such as PCI has multimedia performance improved by adding application specific integrated circuit (ASIC) "wrapper" circuitry to smooth out the data transfers into a desired stream-like flow of multimedia data. The data transfers are from host (system) memory to ASIC "wrapper" buffer memory for VSP consumption and vice versa.

The smoothing-out function is accomplished by "wrapper" byte-channeling logic as follows. Dword (4 bytes) data transfers takes place in bursts on the PCI bus. In multimedia data the first byte may be anywhere in the Dword (i.e. one out of 4 possible locations). From the address of the first byte in host memory and the "wrapper" memory address for storing the first byte, the shift factor (represented by two control bits) for mapping host bytes correctly into 16-bit VSP word format can be determined. The control bits along with the length of the transfer (in bytes or words) are used to perform data shifts according to the shift factor (implemented with data multiplexers) for unpacking the host Dwords into 16-bit VSP word format. In this way the VSP enjoys a transparent 32-bit to 16-bit data format conversion with the correct starting byte. This saves about 7 VSP instructions (minimum of 7 clocks with no wait states) per byte transfer and saves even more host clocks.

Associated with the ASIC wrapper circuitry is a DSP which adds substantial computing power to the system, especially because the DSP is already architected for modem, voice, audio, and imaging/video processing. This VSP is the wrapper/DSP combination and this ASIC wrapper is known as the VSP wrapper ASIC. A VSP to be used as a graphic accelerator does not need a different wrapper ASIC circuit architecture compared to a modem/audio VSP except insofar as some fine tuning of memory size may be desired. A frame buffer is provided external to the wrapper either separate from or unified with host system memory. On the other hand, additional features can be added to an existing VSP wrapper to enhance its functionality to take advantage of unique system configurations/component features.

Legacy architecture and IEEE 1394 peripherals can require the PCI bus to carry video data. Where an IEEE 1394 camera is used for image/video capturing and the output of the camera is to be stored in the PC system, the VSP can first perform image/video data compression to prevent undue PCI bus congestion then bus-master the data across the PCI bus to host memory further relieving the host of the I/O chore. Conversely in a video/image playback function, the VSP can bus-master compressed MPEG/JPEG data from the host memory across the PCI bus to avoid congestion of the PCI bus. The VSP can then decompress the MPEG/JPEG data and pass the video/image data via a zoom video private bus directly to the frame buffer of the graphics/video adapter without congesting the PCI bus unduly.

The VSP interleaves processing with bursting of data and overcomes the PCI bus latency issue. A PCI agent may have to wait, for example, 2 microseconds on average because of PCI bus latency due to other PCI agents using the bus. The VSP can be advantageously processing data in this time interval while dovetailing or interleaving its processing with the PCI operations. This is not mere buffering because DSP processing is transforming data to useful outputs during the latency period.

In an architecture where no video is carried on the PCI bus, a VSP used as a graphic accelerator is still important because it is then advantageously provided either at the North Bridge or AGP graphics/video chip location so that advantageous MIPS are provided without substantially loading the PCI bus. For instance, DSP MIPS can be advantageously allocated to texture map decompression at either end of AGP. There need not be limitations on amount of texture stored in main memory, as suffered hitherto.

The VSP wrapper does not constitute a new bottleneck because the data conveyed to it from the PCI bus will generally be in some compressed form requiring DSP processing such that the wrapper is conveying data through a smaller bandwidth across the PCI bus thereby alleviating bus congestion. After processing, this data will then be passed out the back end with higher bandwidth. Advantageously, the VSP works in compressed data space. The VSP is situated in a place where no bottleneck is introduced because the VSP is located where the video, audio, or serial output is situated. By contrast, the host may be located too far away from the I/O peripherals and on the wrong side of the PCI bus to solve bottleneck problems that the VSP advantageously solves.

At first glance, it might appear that VSP modem/audio processing might relieve the host of only an inconsequential 0.5 Mbyte/s (48 KHz AC-3×6 channels×2 bytes/channel) I/O function over the 32/64-bit 33/66 MHz pCI bus where the host can easily do the I/O processing. Actually, however, every application has compute, memory and I/O requirements. The memory and I/O bandwidth issues are indeed somewhat secondary in audio and modem. The burden is mostly in the compute area, especially in new media applications such as softmodem, AC-3 and 3D positional audio. Pentium needs 50 MHz for soft-modem and 20–30MHz for AC-3, for example. While accessing video/audio files, opening zip files, diverting modem data to LAN, may not be extremely compute intensive, making/sustaining modem connection, performing data pump code, computing head-related transfer functions and 3D positioning are all highly compute intensive. In worst case, the video freezes up when the system is overloaded. And the memory and I/O requirements are not trivial. The host has to be fed with PCI bus raw audio data traffic and intermediate memory accesses (64-bit with padding to boot) before it can do the computing. Since these new media applications often entail non-cacheable data, the host L1 and L2 caches will frequently be thrashed which is not an optimal way of using caches. This is simply an inefficient use of host MIPS when the VSP has specialized multimedia instructions and is better situated architecturally to handle the applications. The host as an expensive, centralized single chip simply cannot be distributed over outlying computing locations in the PC system architecture that a far more inexpensive VSP(s) can advantageously service at the I/O locations. Simply increasing host CPU computing power in successive generations only exacerbates the bottleneck problems to the point of stalling the host CPU, unless these bottlenecks are relieved by the appropriate VSP(s).

The VSP wrapper is not redundant to the audio, MIDI or graphics interface because it replaces and permits virtualization of major hardware elements that have to be purchased today. The VSP wrapper (and even the VSP as a whole i.e. wrapper/DSP) offers modular circuitry available to integrate essentially for free on the spare die (or spare gates) real estate that hitherto have existed in the I/O bound and bond-pad-limited North Bridge and South Bridge chips.

VSPs provide plenty of DSP MIPS to differentiate new designs from those based only on the main microprocessor i.e. host CPU. For example, a 233 MHz Klamath processor with 2 instructions/cycle may offer 400–500 host MIPS and can do 30 frames/sec DVD decoding (AC-3 audio and MPEG-2 video) entirely in software. Hardware assists for Klamath (and other host CPUs) at I/O locations are, however, needed. The VSP approach not only provides these hardware assists but also leverages DSP MIPS to do more than the same number of host MIPS can do. This leveraging can be measured in raw MIPS, effective MIPS, and bandwidth reduction.

The DSP MIPS permit compressed data to travel on PCI bus, advantageously preventing congestion thereon and consequent host processor stalls. A TI DSP such as one of the TMS320C5x family provides up to 100 MIPS and future members of the C54x DSP can go up to 500 MIPS. A C6x DSP provides up to 1600 MIPS. Even though any benchmark is a debatable comparison, the DSP computing power is clearly comparable (if not more powerful) to host computing power for specific multimedia functions. No fixed CPU architecture is perfect for every application, and therefore the ability to optimally allocate MIPS over the host CPU and various VSPs in the proposed dynamic or transformable USP architecture helps it approach perfection more closely for a wider range of applications than existing architectures. The VSP approach further augments a general purpose DSP chip or core with the VSP wrapper ASIC circuitry for streamlined data operations.

MMX involves misalignment and data padding operation problems and the lack of circular addressing and other DSP addressing modes and instruction features. While a VSP can enjoy mere Kbytes in program space with 16-bit instructions, the host may require megabytes in its program space with MMX variable length instructions. Therefore, code size compression in VSP objects is another advantage. The VSP alleviates congestion in memory accesses as well as the PCI bus. Thus, a very key advantage of the new architecture relates to bandwidth problems in new media applications hitherto. The host processor aggravates the problems before trying to solve them. The VSP of the present proposal alleviates the problems while the best features of host processor performance remain.

The amount of local VSP SRAM memory needed to run a whole application is about half a megabit, and in many cases much less especially when only granules (software objects) of the application are run on the VSP. A VSP with minimal amount of on-chip memory may have to be augmented with external local SRAM memory which occupies an acceptable amount of printed circuit board real estate because the VSP circuitry replaces modem and audio cards of today. Also, the VSP chip can be designed to have adequate SRAM on-chip thereby obviating the need of external local SRAM memory.

A common data structure is used for each respective host software object and the corresponding VSP software object. At times, PCI bus traffic of not only VSP code but also large amounts of data can occur between the VSP and the host system memory. This PCI bus traffic is quite acceptable because it is bursty due to VSP data processing or interleaving, and because the VSP can spread out the transaction over time, thereby reducing bus bandwidth demanded by the VSP. PCI bandwidth is ample: maximum is 66 MHz×8 bytes=528 Mbytes/sec. Moreover, in the proposed USP architecture, the data passing over PCI is compressed and not already inefficiently decompressed by host processing. VSP instruction code size is minuscule compared to host code size. The whole premise of today's high-performance host CPU is to have host extract data from memory for decompression by the host CPU. But then the host CPU has to send the decompressed data over the PCI bus to the peripherals precisely because PCI is the mezzanine bus. Therefore, for host to decompress data and send decompressed data over the PCI bus is a much greater burden than for compressed data to be sent to the VSP wherein it is decompressed and sent without PCI burden to the I/O ports.

Multitasking operating systems such as Windows 95 and NT have multithreading capabilities on which the improvements piggyback. The operating system (OS) runs exclusively on the host, and not on the VSP. The OS is augmented with a DirectDSP API (application program interface) analogous to DirectX APIs under Windows through which applications can call VSP functionality. Further, the OS is endowed with a DirectDSP HAL (hardware abstraction layer) which interfaces to the DirectDSP software layer. To the system software is added software called a VSP Kernel which runs exclusively on the VSP and provides the software interface of the VSP to the DirectDSP HAL, DirectDSP software layer and ultimately the OS and the calling application.

Time-slicing operating system code prevents an application from monopolizing the host by allotting runtime for the application in time slices thereby allowing other applications to be time-division-multiplexed. A preemptive multitasking OS further introduces a priority scheme to allow preemption of one task by another of a high priority. The improved USP system software granulates, or breaks up, applications into software objects called granules. Time-slicing and granulation do not conflict or introduce complications in each other's presence. Time-slicing and prioritization are ways used for scheduling in Windows. Time-slicing comes below prioritization in the scheduling scheme. A granule can simply be a software thread scheduled and run under the Windows regime.

A software decoder, for example, has lower priority than that of a hardware event. The VSP by means of hardware interrupts can naturally preempt a host-based program and work to advantage in the Windows OS scheduler environment. The VSP briefly interrupts the host to raise its priority with the Windows OS scheduler. If the host were to lock out interrupts, it would simply become a single-tasking system, therefore the host should not do so. Thus, VSP is a "very good citizen" for the Windows OS.

Software tasks are each largely broken into fine granules that are easily modified and compiled not only on an x86 compiler but also a DSP compiler. ISVs (independent software vendors) can also download third-party granules of VSP code. VSP object code for a given origin source code of a granule is provided in a software object distinct from a software object containing x86 or other host processor object code compiled from the same origin source code.

The DirectDSP software schedules granules and responds when their execution completes. Indeed, the host CPU is multitasking and multithreading between granules which can be simply written as threads. Even though the host source code is granulated and recompiled, such recompiled source code which has the OS active with multiple threads actually helps host performance on recompiled code compared to old code because the multitasking overhead of the OS is already taken for granted when a multitasking OS is chosen for the system. Even with "loose" or time-consuming OS code, which is sometimes encountered, the burden of OS multithreading is insignificant compared to the benefits gained when the old code is broken up into threads which will be run more optimally under Windows. When a thread which is waiting on resources is suspended, the rest of the task is still active. Alternatively when the old code is not broken up into multiple granules, it will bog down the host CPU while it is waiting on resources (akin to a single tasking environment).

If the DirectDSP software allocates two granules wherein one creates data and the other uses the data, a data dependency or synchronization issue is avoided by the system of "handles" by which pieces of software under Windows hand off from one piece to another. Transactions under Windows OS are essentially file-based where source and destination handles are passed from one process/thread to another to facilitate program execution. Analogy with dataflow architecture applies except that software granules are linked between a host and DSP, rather than using close-coupled dataflow hardware. Analogy with link-list processing applies except that handles, not pointers, link the granules.

Advantageously, because of the judicious use of the system of handles as well as semaphores and interrupt preemption in a multitasking OS, no special synchronization flags are needed to resolve dependencies. Dataflow introduces overhead; Windows handles overhead already exist, and the granules introduce no extra overhead.

Consider an example: The handles help create the software analog of a hardware pipeline wherein operations overlap in different processes between the host CPU and the VSP. With granules and no DSP, MPEG (in FIG. 12 of incorporated U.S. patent application Ser. No. 08/823,257) is executed by the host in frames each comprising a series of functions including Picture Reorder, Motion Estimation, DCT, Q, VLC, Q-inverse, DCT-inverse for each frame wherein each granule hands off to the next granule via the handles. With granules and with VSP, MPEG is further executed with a software application pipeline and is load balanced efficiently as follows: Do previous-frame (N−1) Motion Estimation on VSP while host does current-frame (N) Picture Reorder. The host Picture Reorder hands off to VSP current-frame (N) Motion Estimation. Concurrently, previous-frame (N−1) Motion Estimation on VSP hands off to previous-frame (N−1) DCT on host. Host executes granules to end of previous frame (N−1) and then does next-frame (N+1) Picture Reorder as VSP completes current-frame (N) Motion Estimation, whereupon the cycle repeats. All granules execute in the correct order, but with advantageous overlap of processing of two frames at once in the software pipelining approach under the proposal. The granules can be allocated differently between host and VSP without confusion provided the allocation algorithm detects sufficient available MIPs in either host or VSP to do the allocation differently.

Both the x86 object and VSP object have the same data structure. Advantageously, the task either of them represents is executable by first selecting the host or the VSP, and then launching the corresponding software object for the task in the selected processor. The same data results either way.

Source code (e.g., C) leads to identically located data structures no matter which compiler flavor is used, because the header file in the DirectDSP API (application program interface) guarantees that the compiler will use the common data structure. The Windows OS manufacturer supplies a kit called the SDK to the ISVs and a kit called the DDK to the IHVs which they use in developing their software. If the software tasks are not revised into the granular form, the old application simply runs on the host as in the past. When the software tasks are rewritten into granular form for execution on the host and/or VSP(s) under Windows, the handles are already in the overhead. Therefore, calls to the DirectDSP API do not introduce new overhead. Furthermore, handoff transactions between granules occur within the thread and do not represent any call overhead to the OS.

To launch an object, the host runs the augmented Windows OS which determines relative loading of x86 and VSP MIPS at run-time. According to an allocation algorithm, the augmented Windows OS will either allocate the host software object to the host CPU or the corresponding VSP software object to the VSP. Meanwhile, data passes to and through system memory space according to the common data structure so that the processing site, as host or VSP, does not matter. This implies processor independence.

The above technology is applied at any advantageous point in the PC system using one or more VSPs (wrappers and DSPs). Improvements or additions occur primarily at the location of the North Bridge, AGP Graphics (advanced graphics port), South Bridge, or elsewhere on the PCI bus as PCI agents.

The wrapper acts as a scatter-gather bus master and I/O accelerator by itself that boosts throughput of a multitasking system (even without a DSP chip or core) by relieving the host of I/O chores and providing byte channeling of 32-bit Dword host data into byte-aligned 16-bit VSP word format without host or VSP intervention. The wrapper also has a memory buffer for modem, voice/telephony and audio data. With a DSP, the VSP wrapper can "walk" the entire virtual memory space of the host memory system without host intervention thereby making the VSP a super bus master with virtual memory addressing capability beyond simple scatter-gather bus mastering. With a DSP, the VSP wrapper can further create ping-pong and circular buffers to advantageously unify the buffers currently used in modem, voice and audio applications by replacing modem, voice/telephony and audio add-in cards with the VSP circuitry.

Figure 19:
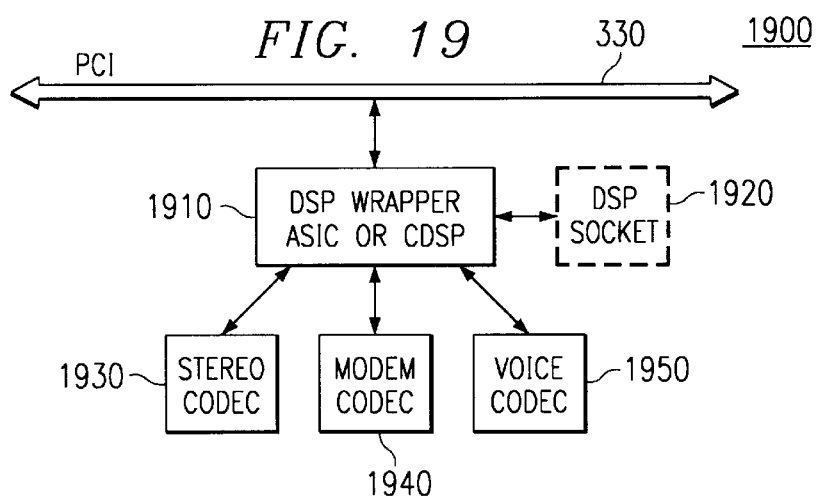
FIG. 19 is an electrical block diagram of an upgradable VSP with overdrive socket in another embodiment of an improved computer system for stereo, telecom, and voice.

In one system approach, the original equipment manufacturer (OEM) sells the PC with the wrapper chip on the motherboard. In FIG. 19, a small DSP socket on the motherboard is provided but left empty for an overdrive DSP retrofit. The overdrive DSP is sold by retailers to users who wish to upgrade with VSP capability. Or the OEM itself fills the DSP socket in a differentiated computer system product. Alternatively, for added power, the VSP wrapper can be upgraded into a full-blown VSP as in FIG. 20 with an embedded DSP core leaving the external overdrive socket for the second DSP upgrade to the system.

Much of the OEM business cost derives from product support activity. The VSP (wrapper-DSP chip) approach advantageously adds substantial computing power and fits well into the existing PC business model. This added power allows the OEM to install software that virtualizes some of today's hardware. Accordingly, the field-support cost of fixing real hardware is reduced. Moreover, bugs in the software that virtualizes the hardware can be fixed by the OEM directly, by downloading diagnostics and patches over the Internet.

Each OEM can customize the software that virtualizes the hardware, thereby allowing differentiation of its products from those of other OEMs, even those products of other OEMs who adopt the wrapper and DSP improvements too. Also, OEMs can differentiate their products by adding the VSP wrapper and/or DSP on their own OEM-determined schedule between introductions of various generations of the host microprocessor. But suppose a next-generation host microprocessor will add capabilities that may make that next-generation host able to do much of the work that a current host-plus-VSP would do. In such case, the OEM advantageously adds differentiation by combining the VSP into its next-generation host system too.

To leverage software value via the above improved technology, vendors advantageously write software tasks in a popular source code such as C code. They compile the application with an x86 compiler into x86 code, and compile it again, but with a DSP compiler, into DSP code. They purchase the DSP compiler from the DSP manufacturer for purposes of the second compile.

By using C code, vendors are free of any need to actually write in DSP native (assembly) code itself, if DSP code is unfamiliar to them. The compilation from C code to DSP object code is not burdensome. Vendors may want to recompile their software anyway, such as to accommodate host microprocessor MMX multimedia instruction extensions. Embedding the DSP software objects into the software product is as convenient as embedding MMX video graphics in applications.

In this way, the software vendors supplies user-attractive code which not only runs adequately on conventional x86 machines lacking a VSP, but also later provides a substantial performance improvement on machines having or updated to have a VSP. Since the applications, such as DirectX games software, check for presence of all relevant hardware capability in a given system anyway, the presence of the VSP wrapper alone or with VSP is detected by the application. Therefore improvements provided by this embodiment is totally transparent to the applications.

An example of a prior art system, from which more hardware is removed than which the wrapper/DSP adds, has a modem add-in card and an audio add-in card, among other add-in cards. These add-in cards are replaced by a single wrapper/DSP add-in card (or PCMCIA Cardbus dongle) which costs less, largely virtualizes application hardware, and more readily accommodates field testing remotely. Even greater savings occur when the wrapper/DSP is put on the motherboard.

Improved Software Operations and Processes

Figure 7:
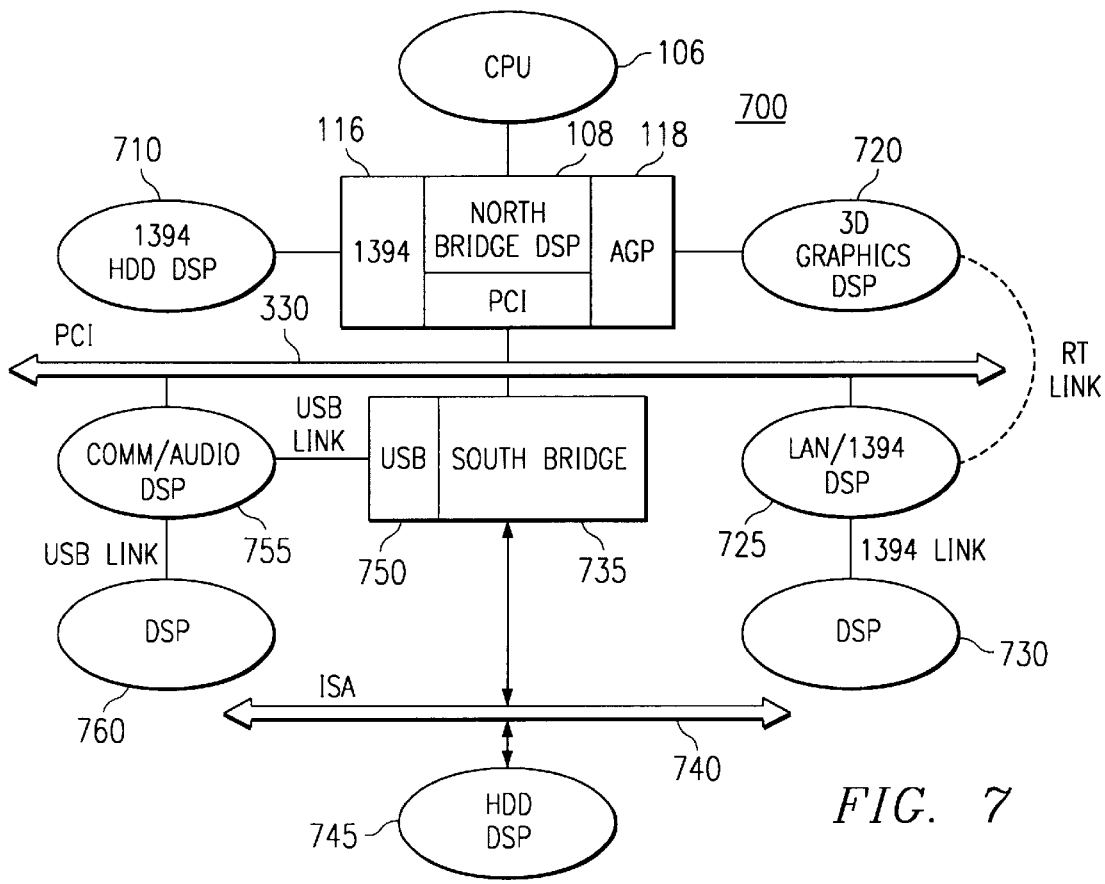
FIG. 7 is an electrical block diagram of another embodiment of an improved computer system for hard disk drive control, telecom, 3D audio, networking, and graphics.

USP provides flexible digital signal processing MIPs for the PC and/or the Internet/Intranet platform. Various USP embodiments include improved methods, circuits and systems for combining and operating asymmetrical processors as VSPs (Virtual Signal Processors) as flexible, scalable, dynamically linked multi-processing virtual hardware for dynamically balancing MIPs among various processors (VSPs) in a system or a distributed/networked computing environment. In FIG. 7, VSPs are coupled to the system resources via internal (e.g. PCI/AGP, CPU) and external (e.g. IEEE 1394, USB) buses, LAN and WAN (e.g. ethernet, ATM). All VSPs are coupled to the computer main processor via software, the operating system, and shared main (host) memory.

Figure 50:
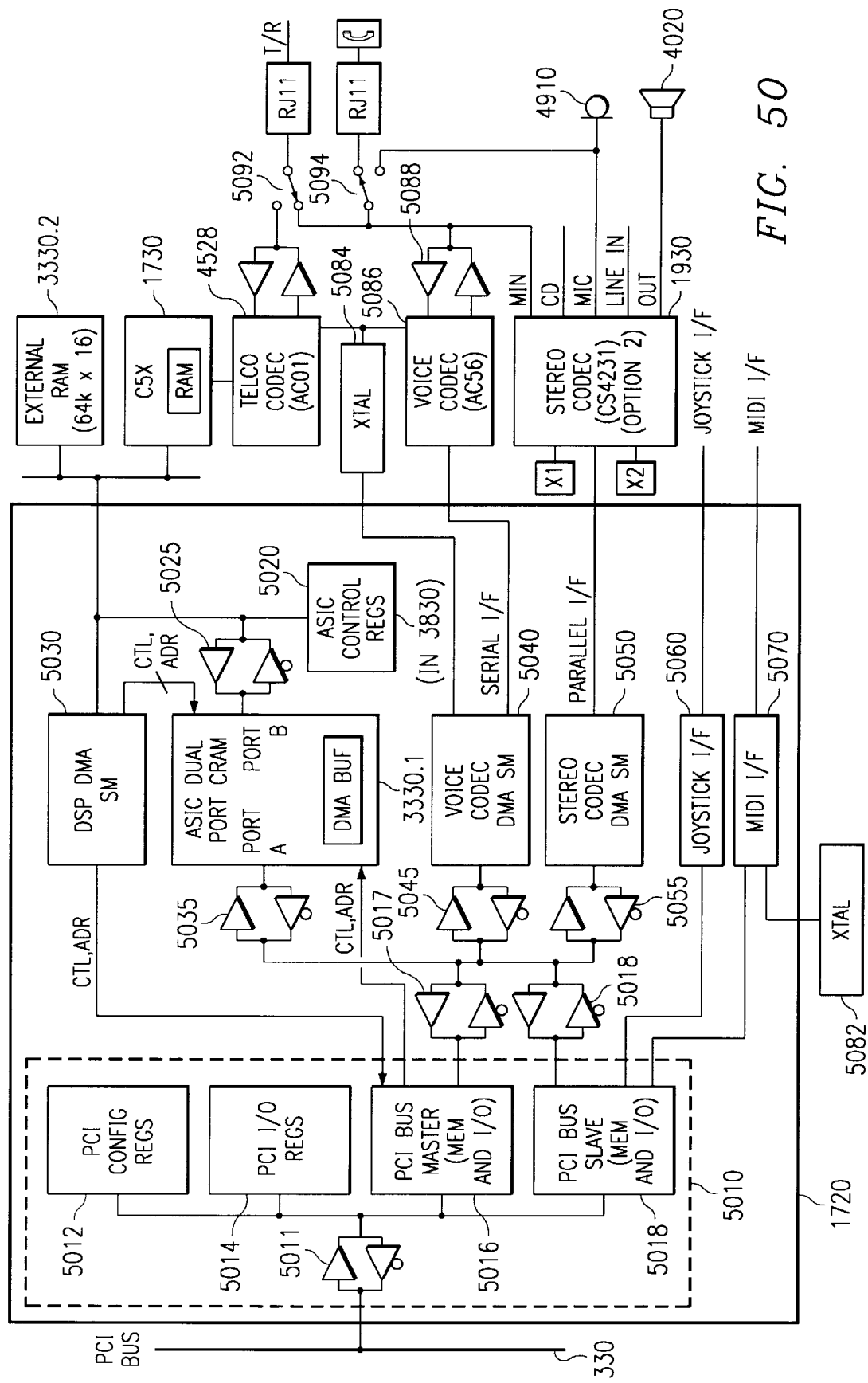
FIG. 50 is a more detailed electrical block diagram of the system of FIG. 49 including a block diagram of circuitry in the wrapper ASIC.

FIGS. 17 and 50 show a VSP wrapper ASIC as logic coupled to a DSP. DSP backend interface logic couples the VSP to serial buses such as USB and IEEE 1394 to external peripherals.

Figures 25, 27:
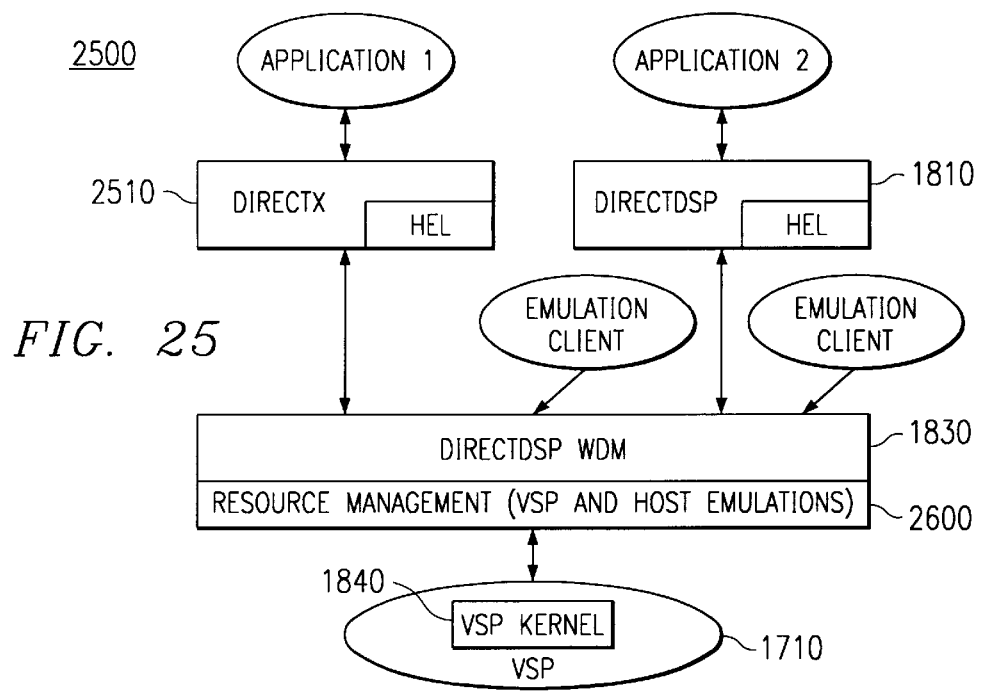
FIG. 25 is a process diagram or method-of-operation diagram showing interrelated improved processes related to DirectX and 32-bit WDM operating system, the improved processes called DirectDSP WDM, DirectDSP HEL, DirectDSP HAL, and VSP Kernel herein.
FIG. 27 is a process diagram or method-of-operation diagram showing interrelated improved processes related to operating system, DirectDSP HAL, and VSP Kernel herein.
Figure 92:
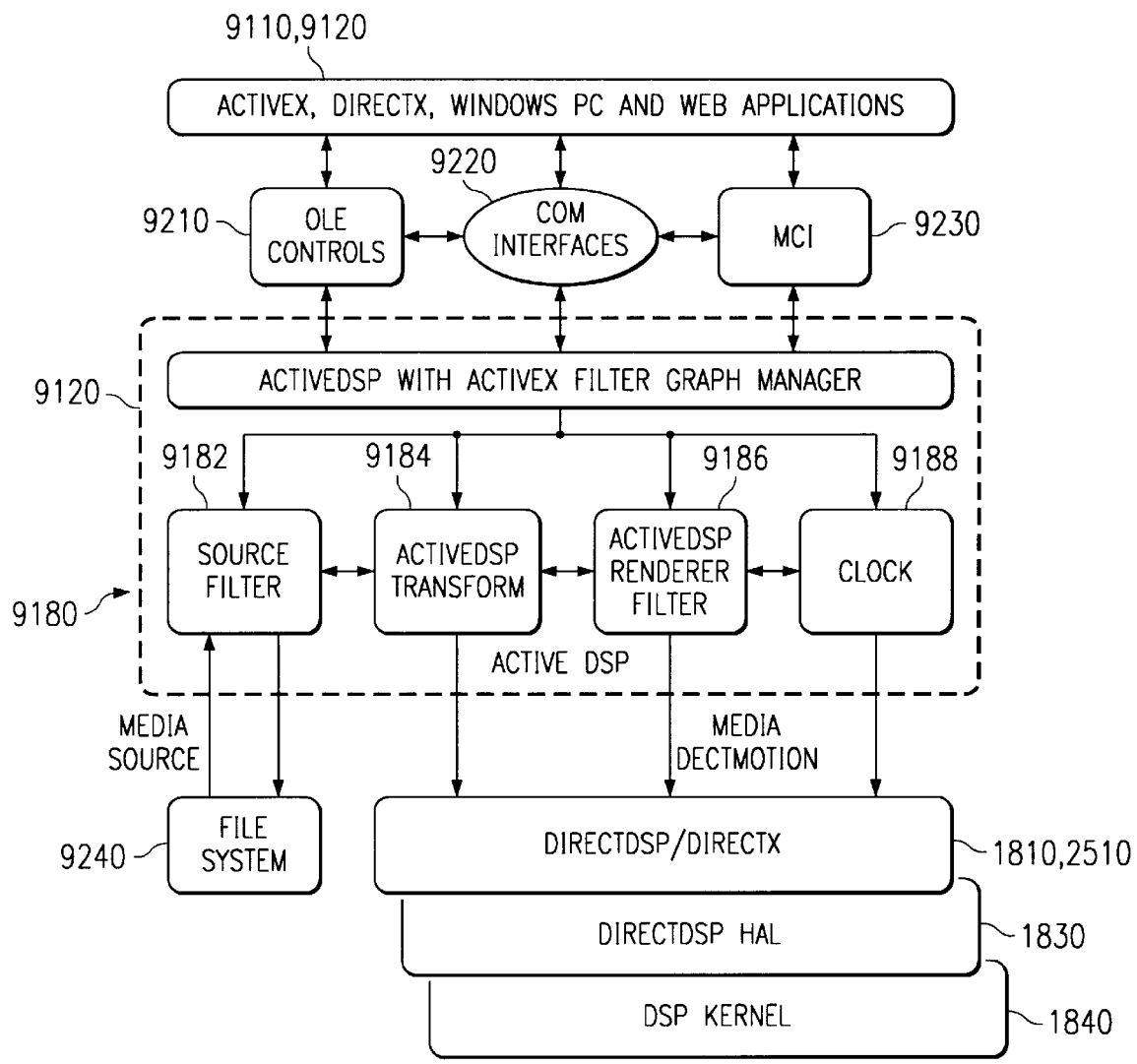

In FIG. 92, improved software, herein called Direct DSP, DirectDSP HAL, DirectDSP WDM and ActiveDSP run on the host CPU/MMX. Further, software embodiments called VSP kernel and application granules (sub-tasks) run on the VSP core(s). FIG. 27 shows the relative software layers from the Host OS to the VSP Kernel and VSP application granules below it (host application granules via emulation not shown). With multiple VSPs and kernels, multi-VSP resource management code is included in the Direct DSP HAL.

DirectDSP extends DirectX to intelligently distribute processing MIPs between the host CPU/MMX and the VSP(s) by parsing tasks into sub-tasks (granules) which then are run by either the host or VSP(s) in a dynamic and balanced fashion. Both host and VSP application granules are called by DirectDSP/DirectDSP HAL using multitasking and multithreaded Windows OS, COM-based (Component Object Model) DirectX and ActiveX as well as the host CPU/MMX and PC core logic. Direct DSP runs on top of the DirectDSP HAL or the DirectDSP WDM stack.

ActiveDSP is a name for same process embodiments for hardware accelerated multimedia services to ActiveX PC and Web applications. ActiveDSP is a software layer running on top of DirectDSP just as ActiveX is a layer on top of DirectX. ActiveDSP alternatively uses WDM Data Streaming provided by DirectDSP WDM or DirectDSP HAL to access VSP hardware.

The VSP Kernel and VSP application granules are DSP (digital signal processing) software modules running on a DSP core or DSP chip. DSP cores or chips from Texas Instruments range from the simple single instruction single data (SISD) type to the advanced VLIW type and the choice should be both application and cost driven.

Computations burn up CPU MIPs. Memory transactions include program execution and data manipulation, I/O transactions include busmaster or slave system peripherals data transfers.

Because Windows is multi-tasking and multi-threaded, several tasks can use system memory simultaneously, wherein Windows manages the available memory and schedules multiple tasks. Blocks of memory called memory objects are allocated for run-time requirements. Allocated memory can also be movable and discardable wherein the memory objects are scattered around in the system memory map. A physically contiguous block of memory is allocated by gathering movable objects together into one contiguous object.

When a memory object is allocated, a handle, rather than a pointer, is generated to identify and to refer to the memory object. The handle is used to retrieve the current address of the allocated memory object. For example, a source handle references a source memory buffer. Processing puts data in a destination memory buffer which is referenced by a destination handle. When a task needs to access the memory object, the handle for that memory object is preferably locked down. The action of locking down a memory handle temporarily fixes the address of the memory object and provides a pointer to its beginning. While a memory handle is locked, Windows cannot move or discard the memory object. After the object is accessed or the object is not in use, the object handle is then unlocked to facilitate Windows memory management.

USP utilizes this fundamental memory management scheme to make a VSP an extension of the host CPU and to share host system memory and resources. USP provides a method for the VSP to grab memory object handles. Since Windows provides OS services for ascertaining the physical addresses of memory objects when they are locked down, the VSP grabs these handles by Direct DSP software operations that obtain the physical addresses of these handles through Windows and pass them on to the VSP. With these physical addresses, the VSP accesses memory objects (e.g. via the PCI bus) with VSP acting as a super busmaster for scatter-gather DMA transactions within the entire host accessible virtual memory space. The host CPU/MMX has elaborate paging hardware on-chip for accessing 64T bytes of virtual memory. VSP conveniently traverses the host virtual memory space as a super busmaster by using these handles (translated to physical addresses) provided by host and OS enhanced with DirectDSP operations.

In the hierarchy of a preemptive multi-threaded multi-tasking software system, each task (running state of a program) includes processes, threads (execution paths of a process) and procedures or function calls. In Windows, tasks are known as processes and the scheduler manages multiple threads on a preemptive basis. Improvements involve breaking down application tasks or processes into manageable threads and sub-tasks (granules) with fine granularity. A USP thread is written in host code which calls embedded application granules either written in host code or VSP code. Each granule can be as fine in granularity as a function call and uses memory transactions and VSP or host MIPS. The granule may also do I/O transactions which are regarded as memory transactions to and from system peripherals.

With the above handle mechanism, USP via DirectDSP dynamically allocates VSP MIPs and/or host CPU/MMX MIPs for computational loads and memory and I/O transactions. USP threads are written so that either host CPU/MMX or the VSP can perform computations and memory or I/O transactions by grabbing the suitable source handles and returning the results to the appropriate destination handles or peripherals (the VSP grabs these handles with the help of DirectDSP). This scheme allows MIPs distribution between the host and VSP.

If DirectDSP/DirectDSP HAL allocates two application granules wherein one creates data and the other uses the data, a data dependency or synchronization issue is avoided with this system of handles by which granules hand off from each to the next. Transactions under Windows OS are essentially file-based where source and destination handles are passed from one process/thread to another to facilitate program execution. Since Windows is a multi-tasking, multi-threaded OS, USP threads are synchronized with host operations (tasks or threads) with semaphores and mutexes which are synchronization objects in Windows for controlling process entry and exit of critical sections. Since Windows is also preemptive, a VSP application granule (embedded in a USP thread) suitably preempts a host thread for Windows OS attention. This preemption is achieved through the hardware interrupt mechanism of the host CPU/MMX.

Figure 47:
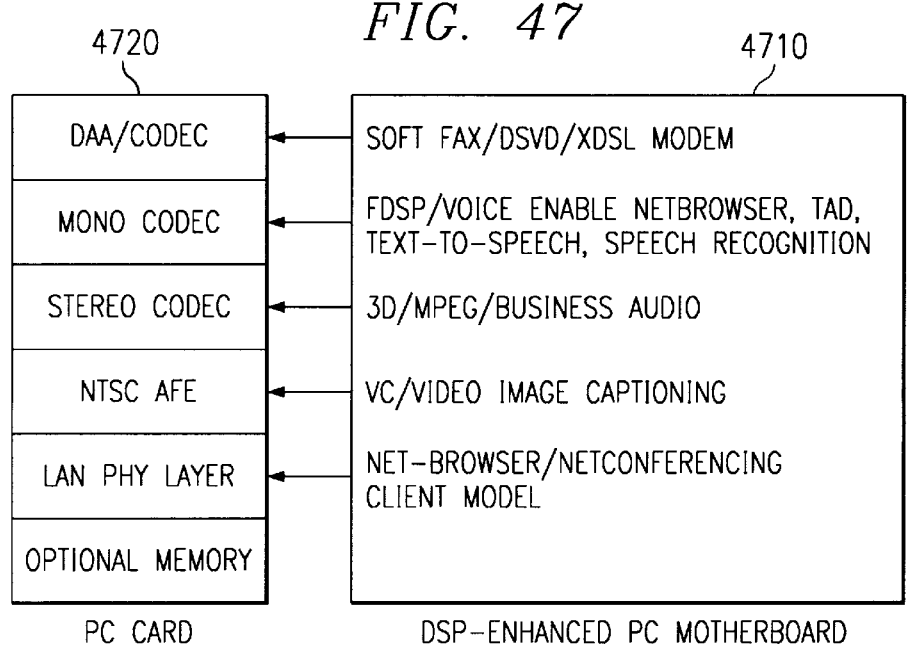
FIG. 47 is an electrical block diagram of a printed circuit add-in card reduced essentially to physical layer elements, and connected to a DSP-enhanced computer motherboard according to methods herein for various system embodiments.

FIG. 47 (of incorporated U.S. patent application Ser. No. 08/823,257) shows a 32-bit Windows preemptive multi-tasking multi-threaded software environment wherein a 32-bit USP driver thread (which either calls host granule(s) or is called by a client host granule for services) executes in full synchronization with a VSP application granule(s) running on the VSP hardware. The VSP granule as code embedded in a VSP thread is called from the DirectDSP HAL. In general, a VSP thread (vertical rectangle under DSP32.DLL) is a USP thread that either calls VSP granule(s) or is called by VSP granule(s) for services via a VSP hardware interrupt to the host CPU/MMX. A synchronization mechanism in the Windows OS is the event signaling semaphore mechanism and its associated event, as well as hardware interrupt preemption. In the above example, the synchronization mechanism comprises a WaitForSingleOBject semaphore for the USP driver thread, the SignalObject semaphore processed by the DirectDSP HAL, and VSP hardware interrupt preemption. The sequence of events is as follows:

USP driver thread (Host Granule) calls DirectDSP HAL and waits on processing results from the VSP granule by synchronizing its operation with that of the VSP granule.

At this point, the USP host granule thread is actually suspended by waiting on the semaphore WaitForSingleObject i.e. waiting on resources that it needs from the VSP granule.

The VSP has finished processing and issues a hardware interrupt to the host.

The DirectDSP HAL sees this interrupt and services it while scheduling an Event (part of the signaling mechanism) which is associated with a SignalObject semaphore.

The signaling mechanism is complete by processing the Event in which the SignalObject semaphore is called to signal a WaitForSignalObject semaphore which suspends the host granule thread.

Processing now returns to the Virtual Machine (VM) where the host granule thread resides.

The host granule thread is now signaled by the Signal Object semaphore and comes out of suspension to grab the VSP processing results.

The host granule thread now continues its processing to completion with the VSP processing results i.e. resources it needed to complete its processing.

Figure 48:
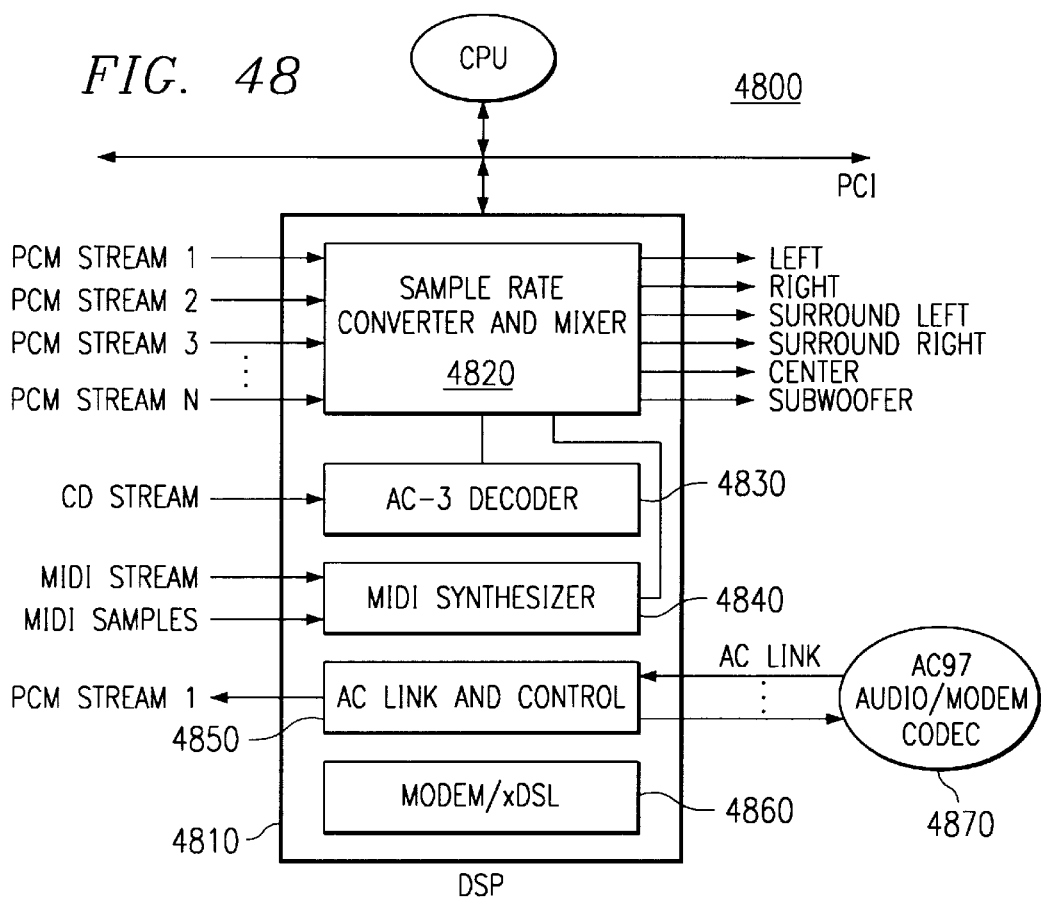
FIG. 48 is an electrical block diagram of a system embodiment having a VSP-based combined audio controller and modem according to methods herein.

FIG. 48 (of incorporated U.S. patent application Ser. No. 08/823,257) shows the 16-bit Windows software environment wherein a 16-bit USP driver process (vertical rectangle under DLL, which either calls host granule(s) or is called by a client host granule for services) executes in full synchronization with a VSP application granule(s) running on the VSP hardware. Again, the VSP granule is called from the DirectDSP HAL. Synchronization mechanism used is a callback notification mechanism and its associated event as well as hardware interrupt preemption.

The sequence of events is as follows:

The application register a callback function with the USP driver process via Windows. This callback function is now tied to the VSP hardware interrupt.

At this point, the USP driver process (DirectDSP DLL) calls the DirectDSP HAL to signal processing of the VSP granule(s).

The VSP has finished processing and issues a hardware interrupt to the host.

The DirectDSP HAL sees this interrupt and services it while scheduling an Event (part of the signaling mechanism).

The signaling mechanism is complete by processing the Event in which the Callback function (small vertical rectangle) is called to signal the application that the VSP has done processing.

Processing now returns to the Virtual Machine (VM) where the host application resides.

With the VSP in the PC, the host suitably also performs parallel processing and application pipelining using the handle mechanism. Tasks are set up to masquerade as I/O transactions using I/O busmasters to offload the host and avoid overtaxing the OS. As a super I/O busmaster, the VSP offloads the host using scatter-gather DMA capability for I/O transactions.

The VSP is tightly coupled to the host processor in task execution through the Windows OS and DirectDSP and yet physically decoupled (i.e. distributed) from the host to avoid a host-centric processing bottleneck cause of system imbalance wherein a very powerful host CPU hogs bus and memory bandwidth.

Figure 6:
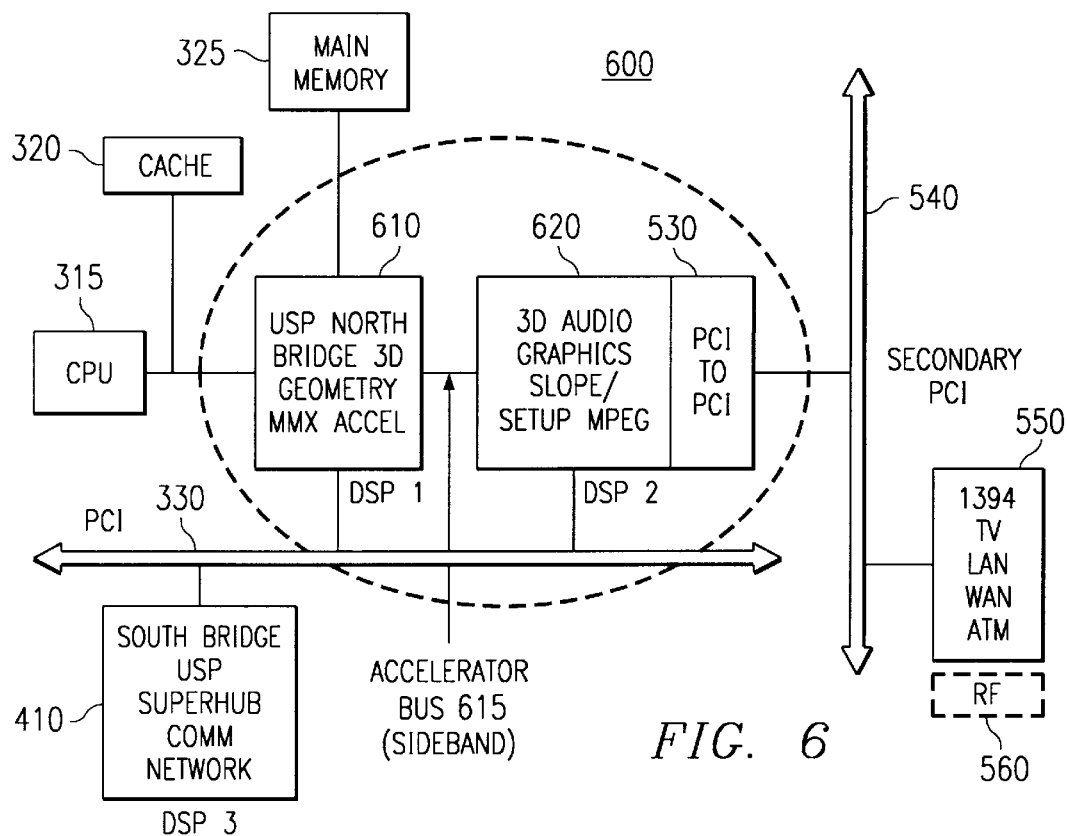
FIG. 6 is an electrical block diagram of another embodiment of an improved computer system for telecom, audio, networking, and 3D graphics.

In FIG. 6 of incorporated U.S. patent application Ser. No. 08/823,257, USP enhances the basic superscalar Pentium CPU by providing a third processing or execution pipe with out-of-order execution of DSPops (DSP macro operations comprised of DSP instructions) running on the VSP. An application program comprises processes (tasks) and/or threads with a series of Memory and/or I/O transactions. If the memory handles were pointers, this execution scheme resembles a processing link-list for the granules of each application. With each granule executing on a combination of the U, V pipes or the DSP pipe, the VSP constitutes a superscalar extension of the CPU/MMX with DSPops scheduled and dispatched to it via DirectDSP. The VSP can be programmed as a Scalar (SISD), Vector (SIMD), or VLIW macrostore for DSPops.

In the Pentium CPU/MMX, instructions are dispatched to the U and V Pipes and execution is complete on instruction boundary. In the Pentium Pro, instructions are further executed out-of-order and results are only committed as the execution of a group of instructions are complete with branch predictions correctly made. In the VSP Pipe, DSPops are dispatched in groups (granules) by DirectDSP and executed out-of-order with the instructions of the Pentium (or Pentium Pro). Executions of DSPops complete on I/O and memory transaction rather than CPU/MMX instruction boundary. Both the host CPU/MMX and the VSP application granules use the same data structures as defined by DirectDSP.

Porting applications to the USP platform is suitably a very gradual process and begins by replacing a small part of existing host code with a VSP application granule. For example, such host granules written to perform USP subtasks as function are recompiled to run on the VSP as application granules with little or no change necessary. This allows a gradual migration but with a quick-time-to-market productization approach for acceleration with VSP(s).

Some methods herein utilize file-based transactions under Windows OS where source and destination handles are passed from one process/thread to another to facilitate task execution. Handles resemble pointers, but they are distinct in this technology. In FIG. 7 of incorporated U.S. patent application Ser. No. 08/823,257, CPU/MMX works on source data in source memory space by obtaining a source handle. The results are then passed to destination memory space via a handle for further processing by the VSP which grabs a destination handle via DirectDSP. The VSP processing results in destination space are forwarded with a handle to the next processing stage, perhaps by the CPU/MMX and so on. If handles are thought of as pointers (once the memory objects are locked down), some embodiments create a link-list of transactions and a task is broken up into a series of system memory transactions and/or I/O transactions performed with CPU/MMX or VSP MIPs where the CPU/MMX and VSP are essentially coupled together via shared host system memory.

Figure 28:
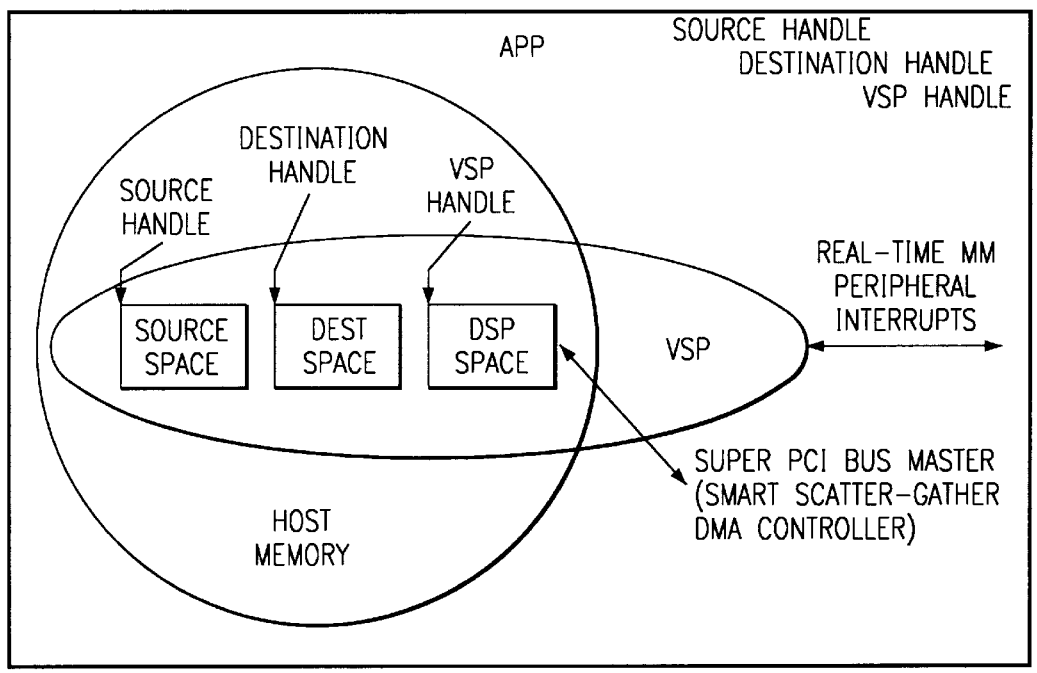
FIG. 28 is a diagram of memory spaces representing a shared memory model utilized in embodiments of processes, devices and systems herein.

In FIG. 28, the VSP program and data memory required for DSPops reside in the host system memory accessible via the VSP memory handle. USP utilizes system memory to reduce the VSP implementation cost. Example, for downloadable Wavetable Synthesis and using an instantiation of the USP architecture that supports DLS Wavetable (32 voices), the host system (main) memory utilization is about 512K bytes. For a typical application, the average amount of main memory required is less than 100K bytes. For fine granules such as DSP functions (e.g. DCT or FFT), the code size is only a few K bytes and for filtering operations it would be as negligible as a few bytes (VSP has single 16-bit instruction for filtering).

USP implements a software caching scheme to insert the VSP memory spaces into the host virtual memory space thereby utilizing the host's caching mechanism as well as its own for memory accesses. The program code and data for the VSP are continually cached into the DSP core or chip from the VSP wrapper program and data space in host (system) virtual memory for execution as shown in the VSP software caching model, FIG. 19 of incorporated U.S. patent application Ser. No. 08/823,257. Since the data processed by the VSP are real-time digital signals or non-cacheable data, a software (paging) caching scheme rather than a traditional Pentium CPU caching scheme is used for the VSP. A traditional L1, L2 type of write-back or write-through cache might have the undesirable effect of cache thrashing when used with non-cacheable data. The VSP software or paging cache acts as macrostore for DSPops executed in parallel with Host CPU/MMX instructions.

Only portions of program and/or data are cached in local VSP memory at any given time. This means that little or no VSP local memory is needed for applications, compared to dedicated-function DSP cards. Caching is performed on a host cache line basis and VSP application granules are dynamically replaced in VSP local memory, obviating burdens on host system operations for VSP download transactions.

In the host, most application data is byte oriented and stream I/O in nature. DirectDSP sets up streaming buffers avoiding the overhead of static buffers. The host application cannot guarantee that the data in its main memory is byte aligned or aligned to doubleword boundary. The VSP, however, uses data aligned as 16-bit words. In VSP implementation, the VSP wrapper logic utilizes a hardware channel Steering technique to speed up data transfers between host system memory and VSP over the PCI bus. Basically, the VSP can access any byte in random order out of a 32-bit double word within a cache line during a PCI transfer. No valuable VSP MIPs are lost to re-ordering data bytes or formatting bytes for VSP consumption.

In FIGS. 54, 54A, 54B, 54C, byte channeling refers to ordering bytes into word aligned boundaries. The hardware logic looks at the address in host system memory from which to start a transfer, and the destination address in VSP wrapper DPRAM (dual-ported memory organized as four byte columns.) From these addresses, a variable shift count is determined as: 0, 1 byte, 2 byte and 3 byte. As part of the FIFO I/F to the DPRAM, a counter is provided for each byte column in the memory. By incrementing these counters when the memory is enabled, the desired bytes are entered into the DPRAM in the correct position by the shifter (implemented as a data multiplexer).

Because the majority of VSP instructions are single word type, automatic DSP code compression and data size compression advantageously result, compared to 64-bit CPU/MMX application codes that require 64-bit program and data alignment to avoid a speed penalty. Since VSP program and data widths are only 16-bit wide and VSP instructions and addressing modes are more powerful than those of the host, VSP threads are much more compact in size than a host thread. This built-in program and data compression is very attractive for very memory intensive multimedia applications.

With a link-list of memory transactions and asymmetrical VSP multi-processing an application software pipeline is established wherein the CPU/MMX and asymmetrical VSP collaborate on task execution with pipeline stages as shown in FIGS. 12, 13, 14 and 17 of incorporated U.S. patent application Ser. No. 08/823,257. Each pipeline stage can be executed by either the host CPU or the VSP to speed up the system throughput. If the host CPU is more efficient in writing to the screen, it suitably performs the pipeline stage for displaying graphics by a granule allocation from DirectDSP. The VSP, due to its efficiency in signal decompression should perhaps work with compressed data upstream in the application pipeline to conserve system bus bandwidth. Accordingly, a decompression granule is allocated to VSP by DirectDSP. On the other hand, if the Graphics/Video controller has a Zoom Video Port, the granules are allocated to the VSP to write directly to the frame buffer. This shows the flexibility afforded by the USP architecture.

Some process embodiments advantageously redirect data to where it needs to be processed, thereby redistributing system MIPs and bandwidth utilized for compression and decompression tasks. For example, DirectDSP granule allocation dispatches compressed MPEG video/audio or AC3 audio to the VSP for processing where compressed audio transfers across the system bus instead of host-decompressed video/audio. In addition, both bus bandwidth and memory utilization are less burdened if the video/audio output is further sent to codec coupled to the VSP back-end. If the host CPU were to decompress MPEG or AC3 audio, it would have to send decompressed audio output across the system bus to the codec, thereby causing more bus bandwidth utilization. Also, because of program and data alignment issues of the host CPU/MMX architecture, more memory bandwidth/utilization is required. By contrast, the VSP decompression utilizes very compact DSP program code and efficiently handles non-cacheable audio/video data. Not only does hot processing use up more data and code memory bandwidth, but also multimedia non-cacheable data will also thrash the host L1 and L2 caches, with excessive uncontrollable latency detrimental to real-time signal processing.

Figure 12:
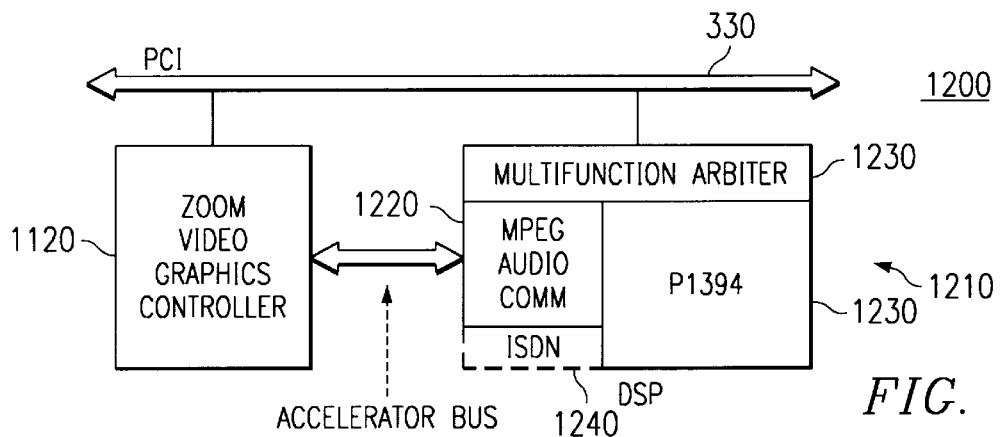
FIG. 12 is an electrical block diagram of integrated circuits and buses in another embodiment of an improved computer system for telecom, audio, networking, and graphics.

In FIG. 12 of the incorporated U.S. patent application Ser. No. 08/823,257, with host CPU only, MPEG tasks are sequentially executed and the CPU only devotes a portion of the real-time to each task. Therefore, the time slots outside of each task are devoted to other tasks and can be considered as "dead time" as far as the current task is concerned.

In the lower two bands of this FIG. 12, the system has VSP and host processing the tasks in parallel. For example, DirectDSP may allocate the motion estimation task to the VSP which can devote most of the frame time to motion estimation alone for higher system throughput. In this way, the VSP advantageously uses system "dead time" inaccessible to the host CPU. Also, MIPs demand on the VSP is less than that of the host CPU since it has effectively borrowed more time (a whole frame interval) for executing the motion estimation task. In other words, lower bandwidth VSP can perform tasks previously requiring a high bandwidth CPU to perform.

In the MPEG example, at the end of Frame N−1, the host picture re-order processing block sets up the memory buffers for motion estimation for the VSP to perform in frame N so that the results are used by the host in frame N+1. This parallel pipelining method enhances other algorithms generally that use multiple frame for decode purposes wherein the method "steals" system dead time across a frame boundary, achieving a time dilation unavailable to a single CPU system. The VSP is fully integrated into the host architecture by operating as a second CPU which directly accesses or shares host resources. Advantageously, task partitioning into sub-tasks (granules like re-order, motion estimation, DCT and Q) fully utilizes the very different architectures of the host CPU/MMX and the VSP(s), resulting in compact code and efficient task execution.

In FIG. 28, all VSP memory and I/O transfers to and from the host system virtual memory are cacheline-based stream I/O operations. The VSP virtualizes the DMA controller and interrupt handler as follows:

Super busmaster with scatter-gather DMA to access all (e.g., 64 Tbytes) of virtual memory space in host memory. This entails "walking" individually scattered 4K pages under Windows 9x. I/O re-direction of data for bus-independent output or re-targeting of data to different output devices.

Stream I/O facilitates I/O and memory transfers at byte boundaries for host applications reducing the data alignment issues in the x86 architecture. Byte Steering is used to pick out the correct byte in a doubleword for the VSP word-based operations.

DSPops interleaved with memory and I/O transactions to minimize latency issues on the PCI bus and to maximize throughput. When there is another PCI agent on the bus, the VSP processes data instead of performing I/O or memory transfers thereby avoiding PCI bus latency.

Real-time multimedia interrupts are effectively virtualized and handled by the VSP instead of the host CPU/MMX to avoid host context switching overhead for external interrupts under Windows. Another implementation slows down an external high-frequency interrupt by splitting interrupt processing into two stages wherein the high-frequency stage is handled by the VSP with a guaranteed response time and the processed interrupt is passed on to the host if necessary as a low-frequency interrupt from the VSP. The host CPU/MMX then processes the low-frequency interrupt with a short interrupt service routine (ISR) which schedules a deferred procedural call (DPC) to finish off the processing for the external event. DPC does not interfere with the processing of other Windows threads, since the ISR is extremely short (i.e. small fixed overhead). Advantageously, other events, threads or processes are minimally locked out, thereby streamlining operations in a multi-tasking multi-threaded system and/or multiprocessor system.

Deterministic response time for real-time applications is afforded when the VSP is used to guarantee processing time to the external events/interrupts and control latency due to its processing for the most critical (high-frequency portion) part of the real-time event processing. The VSP operations blend into the Windows OS operations for optimum execution. In real time systems, latency refers to the total time that it takes the host CPU to acknowledge and handle an interrupt. Consider a time interval occupied by high-frequency VSP interrupt handling followed by low-frequency host ISR and then non-time-critical Windows thread execution with a DPC. That time interval encompasses all operations that handle an external real-time multimedia interrupt, and can be substantially determined and controlled according to the processes of operation and architectural embodiments disclosed herein.

In general, a multi-tasking, multi-threaded OS schedules tasks more efficiently if they appear to the OS as asynchronous I/O tasks which require minimal host intervention and less "thrashing" of the host cache(s). The DirectDSP, HAL, DSP kernel and VSP arrange multimedia tasks into this form. In this way, the system is more balanced and its throughput accelerates. Asynchronous I/O is a very powerful mechanism for real-time applications where each task can queue I/O loads (tasks) and continue processing without having to either wait or respond immediately to some end-of-I/O event. Apart from minimal host intervention and less cache "thrashing", this pays enormous dividends on multi-processor systems and reduces I/O overhead on single processor systems.

The VSP acting as a super busmaster becomes an asynchronous I/O controller which not only comprehends, spans and traverses the entire host virtual memory space but also provides processing MIPs with each transfer. The VSP acts as a powerful I/O "traffic cop" that streamlines host operations and increases system throughput.

USP can advantageously operate even with the wrapper only, in host-based signal processing. The wrapper ASIC acts as a standalone chip with a pass-through mode for I/O devices such as the audio, voice and modem codecs (or AC97 codec). In this pass-through mode, the VSP wrapper is either a slave or busmaster. As a busmaster, the VSP wrapper relieves the host of I/O chores.

Advantageously, USP does not need an OS of its own. See FIG. 8 of incorporated U.S. patent application Ser. No. 08/823,257, now U.S. Pat. No. 5,987,590. Instead, USP uses Windows OS as its own OS via DirectDSP and the real-time VSP Kernel software (USP resource management is built into DirectDSP and the VSP kernel). This software architecture is both complementary and non-competing with the Windows OS. In the preemptive, multi-threaded, multi-tasking Windows OS, processes and threads are normally running at S/W IRQLs with lower priorities than the H/W IRQLs. Although threads can be raised to real-time high priority via software, they are still at or below IRQ2 (dispatch). In FIGS. 29, 30, 31 and 32, by tying a process or thread to a H/W event/interrupt (IRQ12–IRQ27), USP raises the process or thread priority to above other software (host-based) processes or threads.

Short interrupt service routines (ISRs) are used along with deferred procedural calls (DPCs) as well as I/O request packets (IRPs) to improve system latency and turnaround time. DirectDSP WDM (or DirectDSP HAL) operates at ring 0 to reduce ring transitions to ring 3 for resources. This provides software latency control for real-time applications.

Not only do VSPs efficiently handle real-time events and multimedia, they further enhance the Windows OS by virtualizing real-time Interrupts and DMAs. A VSP can even act as an MMX emulator/accelerator or a WDM accelerator accelerating the Windows OS.

Balancing system resources with USP to prevent or alleviate bus (CPU, memory and I/O) overloading, memory and I/O bottlenecks as well as the undesirable CPU-bound MIPs (i.e. stalled CPU) involves carefully analyzing resource (MIPs, memory and bus I/O) utilization of each application against run-time resources available. Along with each computational load, comes the associated memory and I/O loads to sustain its MIPs requirements. Load balancing options depend on remaining or available system resources.

Figures 1, 72:
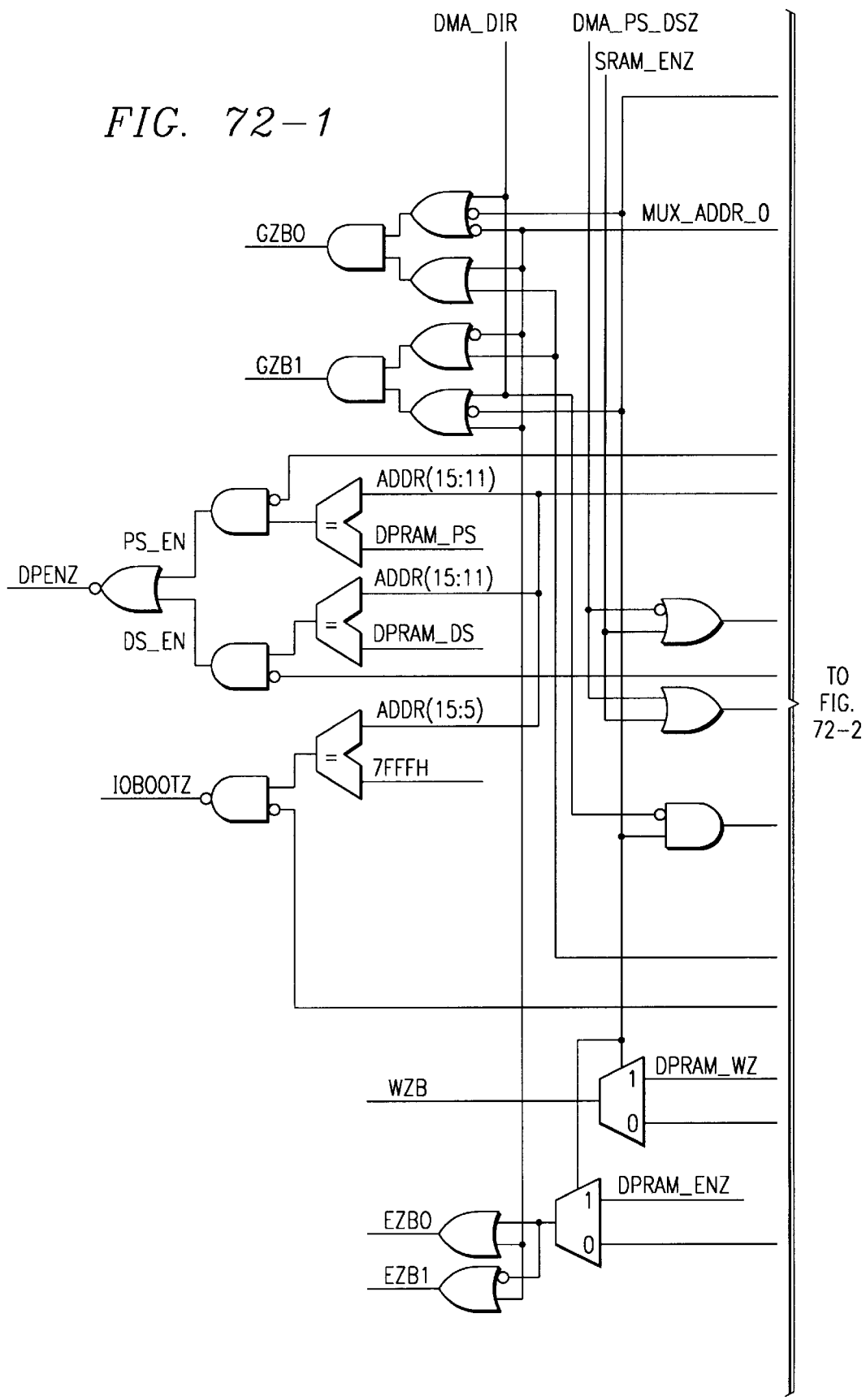
Figures 2, 72:
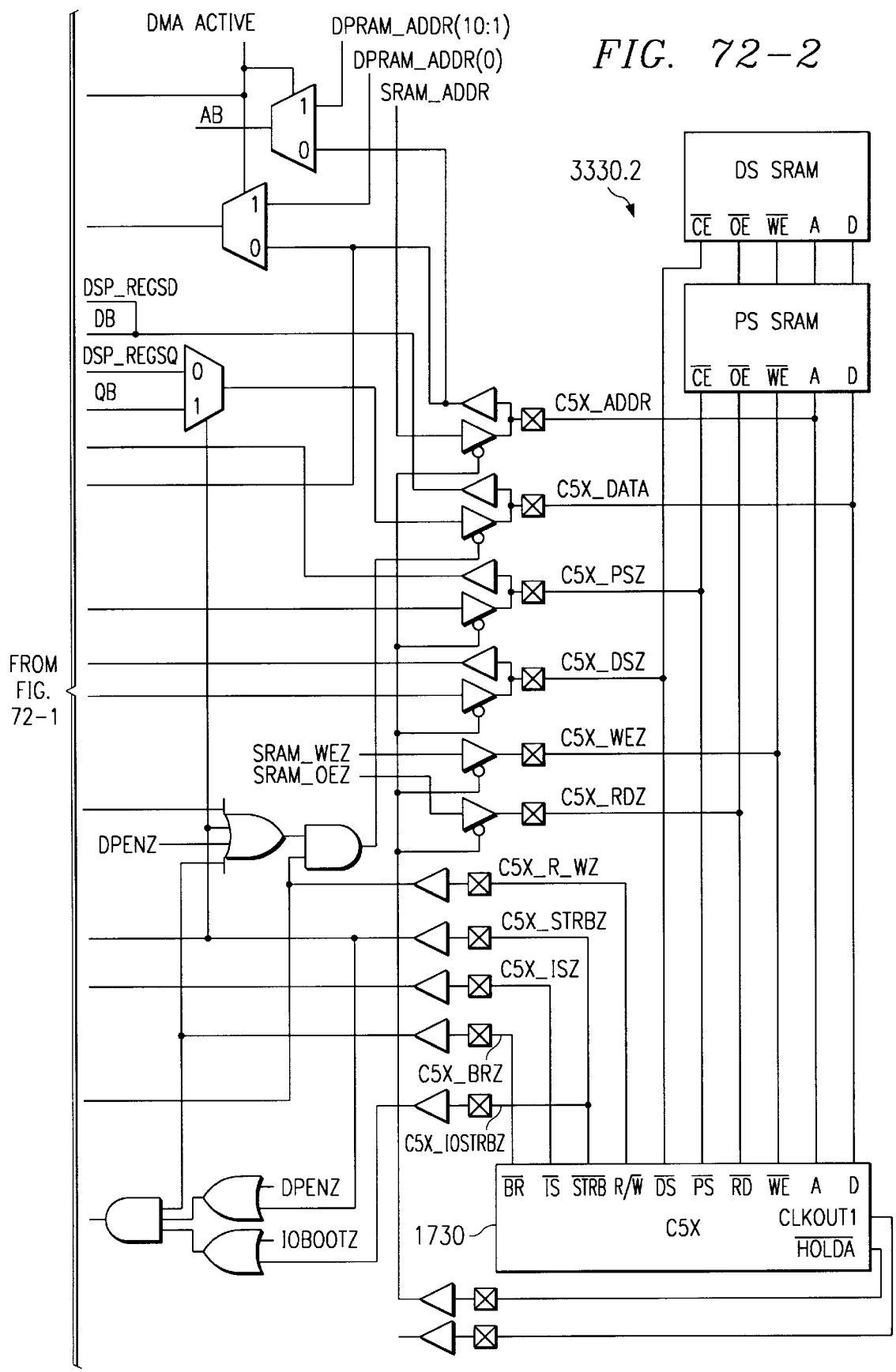

USP architecture handles acceleration for multimedia tasks using in-line and multi-pass models and achieves dynamic load balancing in systems such as FIG. 1 of incorporated U.S. patent application Ser. No. 08/823,257 and FIG. 1 herein. Improvements herein are provided in:

In-line acceleration model (Source to I/O & I/O to Destination)
   Host memory data to be processed for output to I/O devices
     In-place processing of real-time stream I/O data for input to host memory Multi-pass acceleration model (Source & Destination Handles)
   File-format conversion where files in host memory have to be converted and then returned to host memory
   Frame-based compression & decompression algorithms in conjunction with host CPU for parallel processing In dynamic load balancing the DirectDSP software uses Microsoft's multitasking and multithreaded Windows OS and COM-based software to dynamically sense the system hardware capabilities when an application opens, and when it loads/unloads hardware resources for plug and play. COM-based objects are controlled by the COM-interface which allows an application to hange the characteristics of the available hardware platform when interrogated by the application. Thus, the USP architecture achieves system scalability and flexibility through dynamic hardware linking.

The DirectX COM-based API has an application query a system for hardware description and capabilities at run-time while substituting the absent hardware features with host emulation where possible. Unlike DirectX, which merely substitutes host emulation for absent hardware features, the improved process herein uses available VSP MIPS for emulation as well, and dynamically balances application loads.

Unlike DirectX, however, the improved process does not limit host emulation to absent hardware only. Instead, the process does use host emulation when the host is best for performing the application granules for load balancing purposes. An important difference is task allocation based on fine granularity.

Figure 18:
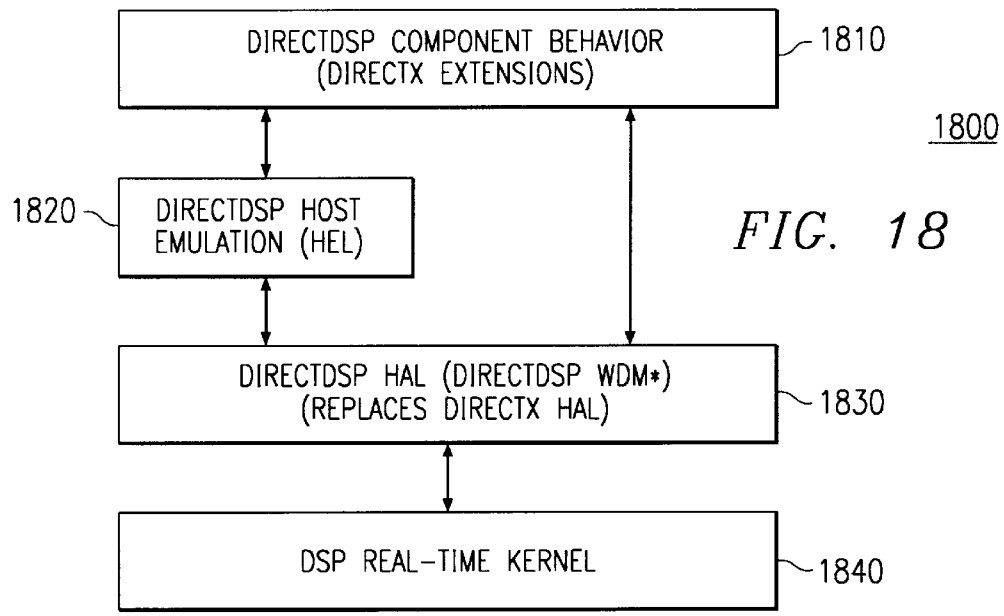
FIG. 18 is a process diagram or method-of-operation diagram showing interrelated improved processes called DirectDSP, DirectDSP HEL (host emulation), DirectDSP HAL (hardware abstraction layer), and VSP Kernel (DSP Real-Time Kernel) herein.

For example, an application queries the DirectDSP API embodiment for system device configuration at run-time. DirectDSP in turn queries the DirectDSP HAL embodiment regarding the H/W device capabilities. In other words, DirectDSP dynamically interrogates the DirectDSP HAL for hardware availability and reports available VSP MIPs to the application in terms of hardware description and capabilities supported for a balanced system. Applications, however, cannot access DirectDSP HAL directly. They have to go through the DirectDSP layer. FIGS. 18 and 25 show the model of DirectDSP which is compliant with the DirectX model.

Instead of reporting a static set of VSP capabilities to DirectX or DirectDSP, the DirectDSP HAL reports VSP capabilities on a dynamic basis depending on the load balancing options available to the caller. The options range from fully balanced to less balanced with graceful degradation of performance depending on the application resource requirements and the available MIPs.

In the case where there are no available VSP MIPs, DirectDSP allocates to the host for emulation to support a hardware feature. In other words, the balance of MIPs can be allocated under the process to the host CPU/MMX even though the host is less suited to perform the required application granules. However, since system loading changes dynamically, the next time the same application opens, the VSP may not be overloaded and the process selects a more balanced system option whereby the process allocates or runs the granules on the VSP instead.

At any given time, applications opened are normally running on a mix of host and VSP MIPs and the process sets the proportions, or ratio, dynamically at run-time for the best system loading. Given an application, the allocation process in DirectDSP first attempts to deploy host CPU and VSP MIPs on a distributed asymmetrical multiprocessing basis for the most optimal and balanced scenario and the tasks are loaded on the host CPU/MMX and VSP(s) with fine granularity. This load balancing happens dynamically when an application opens, and loads/unloads hardware resources for plug and play. The fine granularity of task loads allows the system to support more applications with less duplicated system overhead across multiple asymmetrical processors.

Now suppose the user opens more and more applications, putting more and more load on the VSP(s) to the point of overload. At this point, the allocation process in DirectDSP allocates the balance of the task granules to host emulation, in one process embodiment.

The detailed description now turns to a discussion of distribution of operations between DirectDSP and DirectDSP HAL, as to handling host emulation and resource management. See FIG. 25.

Under Windows 95 DirectDSP is suitably implemented as a DLL in Ring 3. If DirectDSP has to set up resources for the VSP, then DirectDSP goes through the DirectDSP HAL at Ring 0, thereby causing ring transitions. However, this ring transition is relatively infrequent and happens when launching a new task/sub-task (granule) for loading or re-balancing the system.

Under Windows 97 and Windows NT, DirectDSP is in the user mode and acts like an installable client. With Windows 97 (9x), the DirectDSP HAL is replaced by DirectDSP WDM in kernel mode at ring 0 and can access other kernel services. Host emulation is suitably in the kernel mode as clients to the DirectDSP WDM stack in addition to existing DirectDSP host emulation for more capability and flexibility assuming that floating point is available in the kernel mode for Windows 97 and Windows NT.

Since applications call through DirectX and DirectDSP to access the DirectDSP HAL for host emulation or application granules in a USP enabled PC, the DirectDSP HAL sees all granules and host emulation running in the system. On the other hand, host emulation by DirectX are not visible in this embodiment to DirectDSP and vice versa. For this reason, resource management allocation for the VSPs (VSP granules) and host emulation code is preferably (but not necessarily) done in the DirectDSP HAL or DirectDSP WDM.

Figure 24:
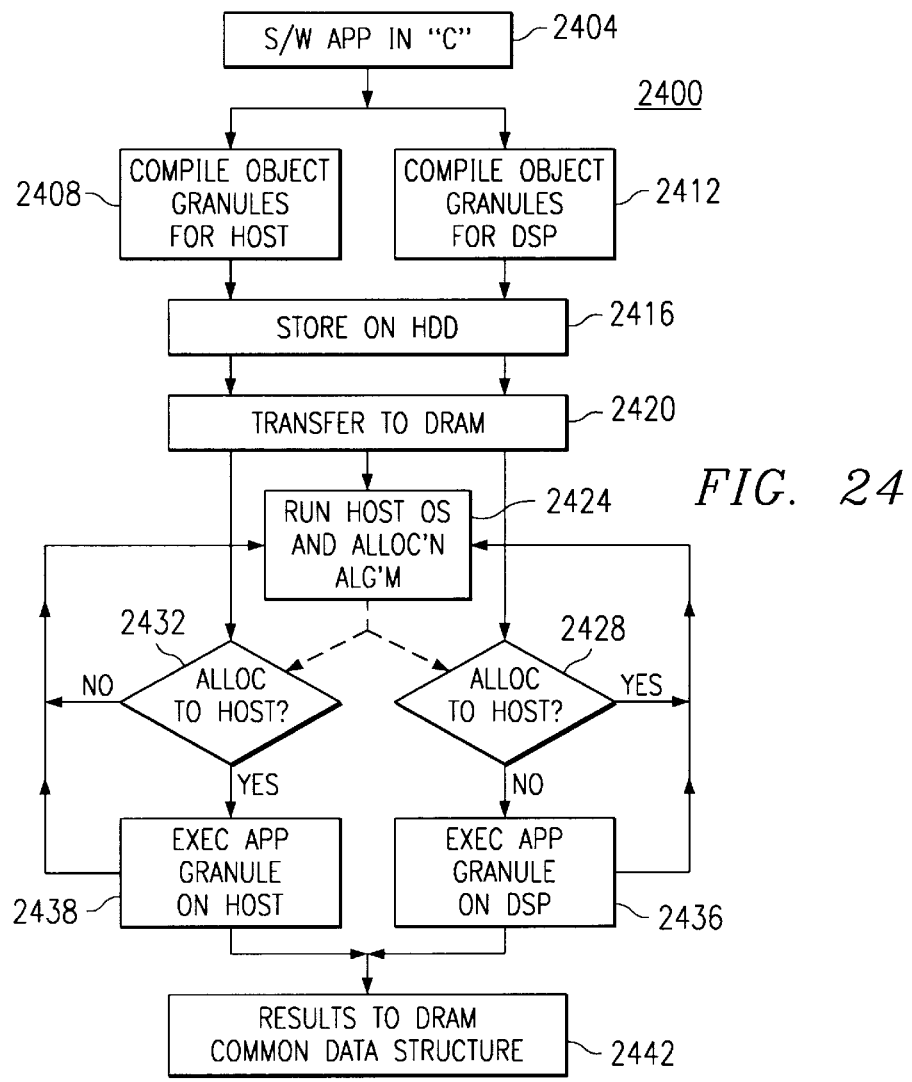
FIG. 24 is a process or method flow chart diagram of software product manufacture and use, including parallel compiles of granules, granule allocation process, selective execution of granules and DRAM common data structure.
Figure 24A:
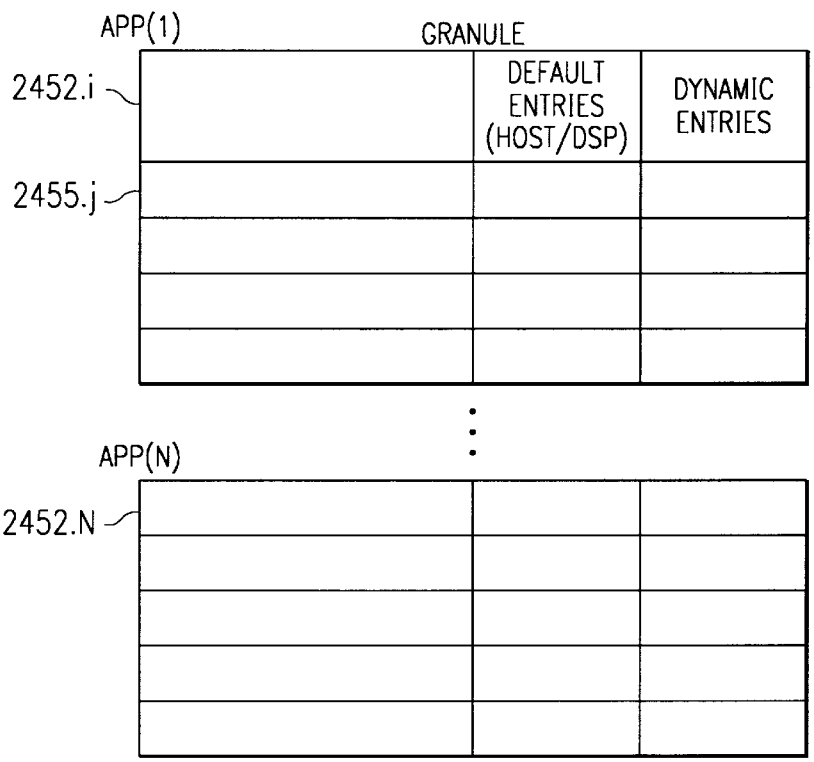
FIG. 24A is a library of tables for software application programs respectively, each table for a given program having entries for corresponding granules in the program, each granule entry including granule ID, a set of system impact descriptors for the granule, and an associated default host/DSP entry and dynamic host/DSP entry.
Figure 24B:
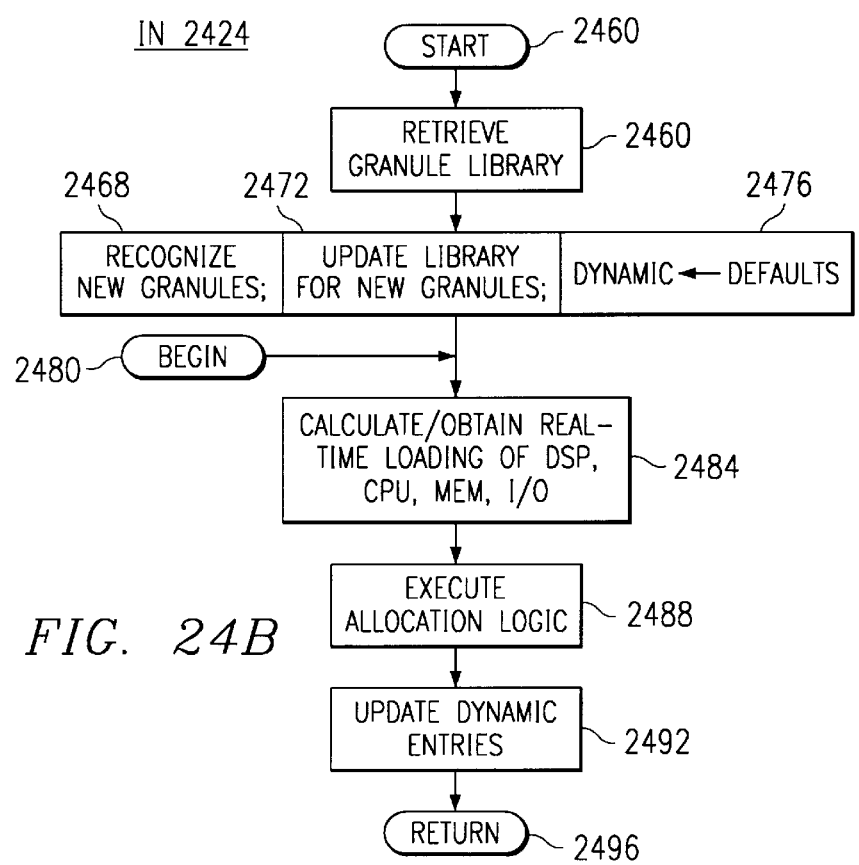
FIG. 24B is a process or method flow chart diagram of a portion of a DirectDSP embodiment using the library of FIG. 24A and allocation logic operations for performing resource management and dynamic load balancing for systems herein.

FIGS. 24A and 24B depict HAL Resource Management (allocation process)

For each application, check option look-up table of FIG. 24A for host and VSP granules and MIPs loading.

Depending on MIPs availability, dynamically set up the available load balancing option.

A first allocation process implementation loads next best option if insufficient VSP MIPs remain. Host emulation granules will replace VSP granules for graceful performance degradation.

An enhanced process implementation dynamically re-loads VSP and host granules to achieve the best load balancing option, and utilizes a handle scheme and synchronization semaphores.

Keeps track of number of tasks and sub-tasks opened i.e. VSP and host emulation granules.

Tracks VSP loading i.e MIPs availability (reported by VSP kernel). VSP MIPs loading for each load balancing option is suitably pre-determined and kept in option look-up table.

Estimate host loading on DirectX and DirectDSP host emulation granules. DirectX and DirectDSP host emulation MIPs are estimated for each load balancing option.

Graceful degradation of system performance replaces VSP granules with host emulation or throttles the VSP clock rate to regulate available VSP MIPs, as depicted in FIG. 124.

VSP Kernel Resource Tracking

Keeps track of number of granules running on VSP.

MIPs loading is pre-determined for each granule for best load balancing option

Keeps MIPs counter for VSP loading i.e. MIPs usage. Increment counter when more loaded and decrement when less loaded.

Figure 26:
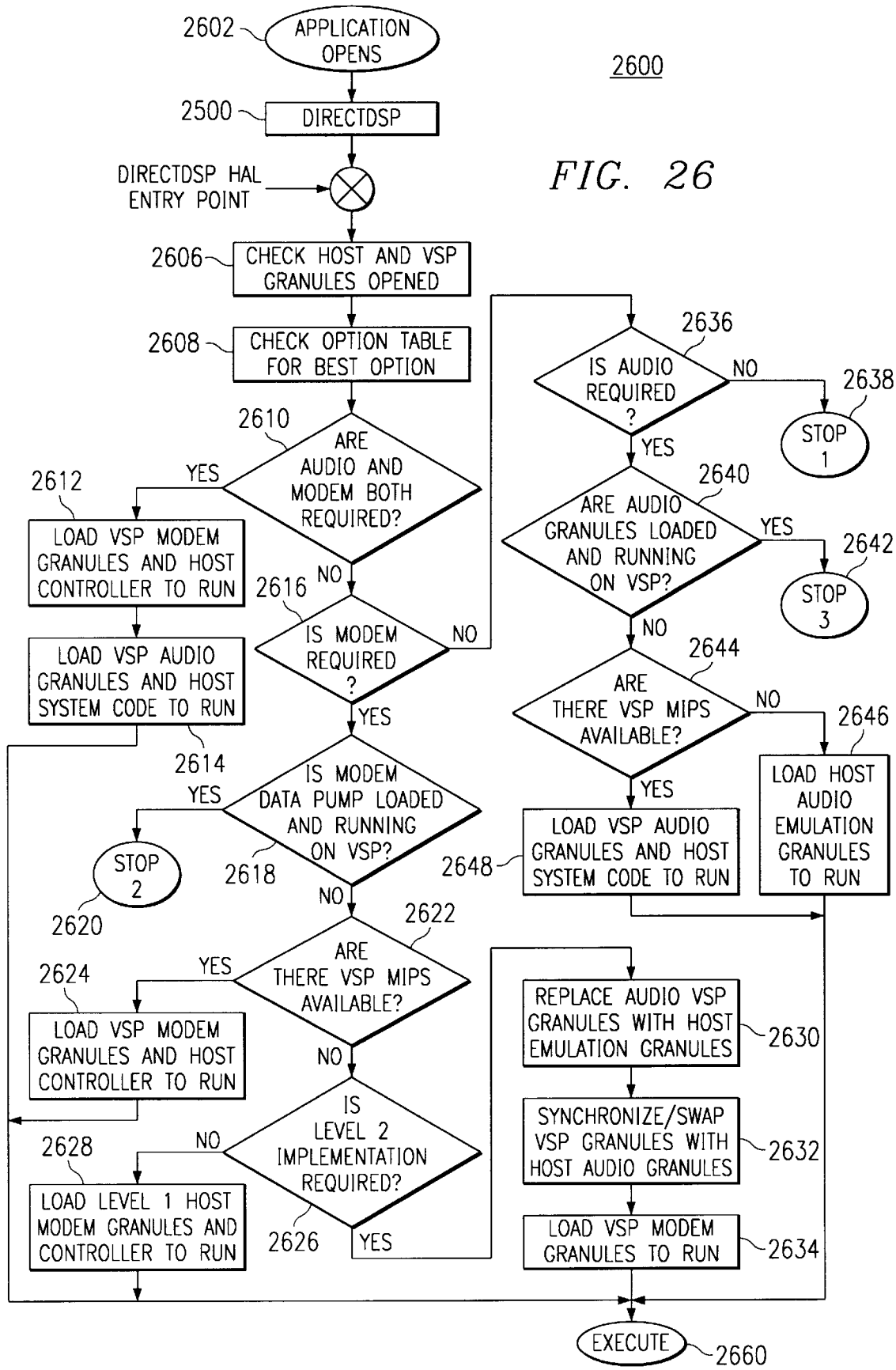
FIG. 26 is a process or method flow chart diagram of a portion of a DirectDSP embodiment improved for loading audio and modem applications.

FIG. 26 depicts an example of Balancing Audio/Comm Platform. Load balancing options depending on the task loading on the system. Every task consists of at least one of the following components:

Computational MIPs

Memory transactions

I/O transactions

Modem Allocation Table Default Entry Based On:

Modem Data Pump code allocated to VSP, rest of the granules (e.g. controller code, V.42, 42bis) allocated to host.

PCI data rate from VSP data pump for receive is 33.6 Kbps and for transmit, allocate host for sending 33.6 Kbps to VSP data pump over PCI.

Modem cannot be switched while a connection is already made. Step down in data rate as necessary by repeatedly requesting an incremental rate fall back.

Host-based soft modem i.e. Pumpless modem will take up approximately 50 MHz of a Pentium even at 14.4 Kbps modem data rate.

Pumpless I/F Hardware constantly preempts other host tasks even though modem is sending data via ISA I/O.

Recommendation: Allocate data pump code granules to VSP if using a WinModem configuration, and if the VSP is fully loaded with other tasks (e.g AC-3, 3D sound and H/W mixing) running concurrently, then allocate pumpless code granules for host-based soft modem (level 1). If no Win Modem, reallocate other audio task granules from VSP to host and allocate modem data pump code granules to the VSP (level 2).

Audio:

Type 1—Loading on the host is minimal and data rate across the PCI bus is the same for either host emulation or VSP. So when the host is doing WAV, S/W mixing or the VSP is doing H/W mixing, the difference is not that noticeable.

Type 2—For compressed data e.g. ADPCM, MPEG1, 2 and AC-3, the data bandwidth is compressed when shipped from the host across PCI to the VSP. VSP decompress as data after the host parses the audio and sends it over PCI.

Put DLS MIDI Downloadable Wavetable is in host memory but allocate Wavetable engine granules to VSP.

Recommendation: Default-allocate audio granules to VSP. When modem code is to be allocated, reallocate Type 1 audio to host and allocate modem code to VSP for best load balancing option (Level 2). Leave any compressed audio Type 2 granules allocated to the VSP to conserve bus bandwidth and allocate modem granules to run as pumpless modem on host (Level 1).

When the VSP is not fully loaded, the process of operation slows down the clock rate of the VSP until VSP is once again fully loaded under the slower new clock rate.

Advantageously, no spare MIPs go to waste and power consumption is reduced by running the VSP slower.

step1: Check VSP MIPs loading i.e. availability
step2: Check tasks open i.e. concurrency
step3: Check option look up table for available option
step4: Check if Level 1 or Level 2 implementation required
step5: Use host emulation granules to replace VSP granules for Level 1
step6: Re-load VSP granules if necessary for Level 2 implementation
step7: Use handles and semaphores for re-balancing option.

In FIG. 26, Various Stops are as Listed:
Stop 1:
Report Error condition back to the application since it is supposed to call a modem or audio function.
Stop 2:
If modem granule is already installed on VSP, then simply use VSP for the application and no further load balancing action is required. If another application is already using it, do not share a phone line with two modems (one with host emulation), but instead report back to the application that the modem is in use. In a configuration of two phone lines, start the second modem up with host emulation modem granule.
Stop 3:
If audio is already loaded and running on VSP, then simply use it for the application and no further load balancing action is required. In legacy support e.g. legacy wave driver support, report to the application that the audio hardware is already in use unless there are two sets of amplifiers and speakers or hardware mixing support. VSP supports both software and hardware mixing so that two or more applications can share the same set of speakers.

Hardware Acceleration For DirectX/WDM

In another implementation, DirectDSP offloads or unburdens the host and/or provides hardware acceleration to Windows DirectX as much as possible, depending on the task loading of the VSP. This case concerns MIPs re-allocation and/or distribution and not necessarily load balancing the system. Therefore, the dynamic loading balancing options described in previous flowcharts will not be used. Nonetheless, the capability of dynamic task loading is well illustrated and the concept of dynamic hardware (virtualized by the VSP) linking still applies.

FIG. 125 illustrates DirectDSP as an extension of Windows DirectX where a DirectDSP HAL replaces the DirectX HAL and supports both sets of APIs. Whether an application calls DirectX or DirectDSP, the DirectDSP HAL supports them both by utilizing the COM-based interface of DirectX, DirectDSP and DirectDSP HAL. DirectDSP HAL is suitably replaced by a DirectDSP WDM to support the new Windows Driver Model (WDM), and the VSP thereby becomes a WDM accelerator. VSP accelerates ActiveX which uses either DirectX or WDM. Indirectly, USP accelerates Windows OS and enhances the ultimate system throughput when processing real-time newmedia applications.

Advantages for the choice of COM-based S/W for DirectDSP include:

Supported by Microsoft for the PC and the Internet/Intranet.
Interoperability among application S/W written by various ISVs and vendors.
Versioning issues solved when ISVs upgrade their S/W since COM interfaces are immutable.
Language independence e.g. C/C++ or Java. DirectDSP further extends this capability to be binary independent between Host CPU/MMX or VSP.
Transparent remoting for client applications communicating with COM objects in the same, different or even a remote process running on another PC in a network such as Internet/Intranet.
Scalability across platforms (HPC→PC→Server) and various Windows OS's (CE→95→NT).

Figure 44:
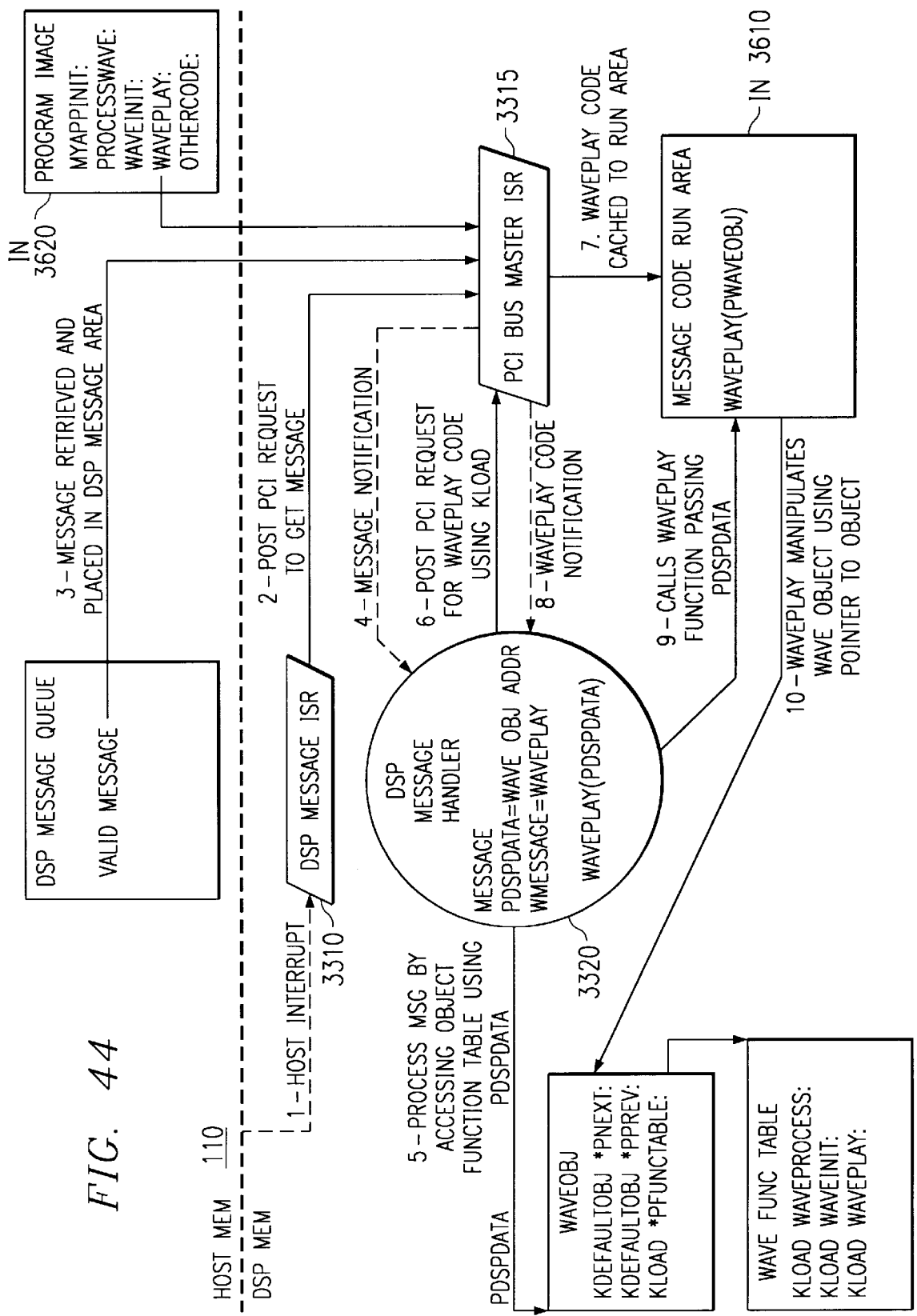
FIG. 44 is a flow chart diagram of an example of message processing, combined with a memory space diagram of host memory (at top) and DSP memory (at bottom) representing an example of handles, objects and data structures in the shared memory model of FIG. 36 utilized in FIG. 33 wave-sound and other embodiments of processes, devices and systems herein.

DirectDSP handles COM interface logic, reference counting, and software emulation, parameter validation, and interface methods as shown in FIG. 44 of incorporated U.S. patent Ser. No. 08/823,257. It also interfaces with the DirectDSP HAL or the DirectDSP WDM stack under WDM.

DirectDSP extends DirectX at the API level. The DirectDSP HAL, besides supporting DirectDSP, advantageously replaces HALs for other DirectX components, such as DirectSound HAL. The DirectDSP HAL accepts existing DirectX APIs. FIG. 25 shows the relationships between DirectDSP, the DirectDSP HAL or WDM, and the other DirectX system components.

Figure 91:
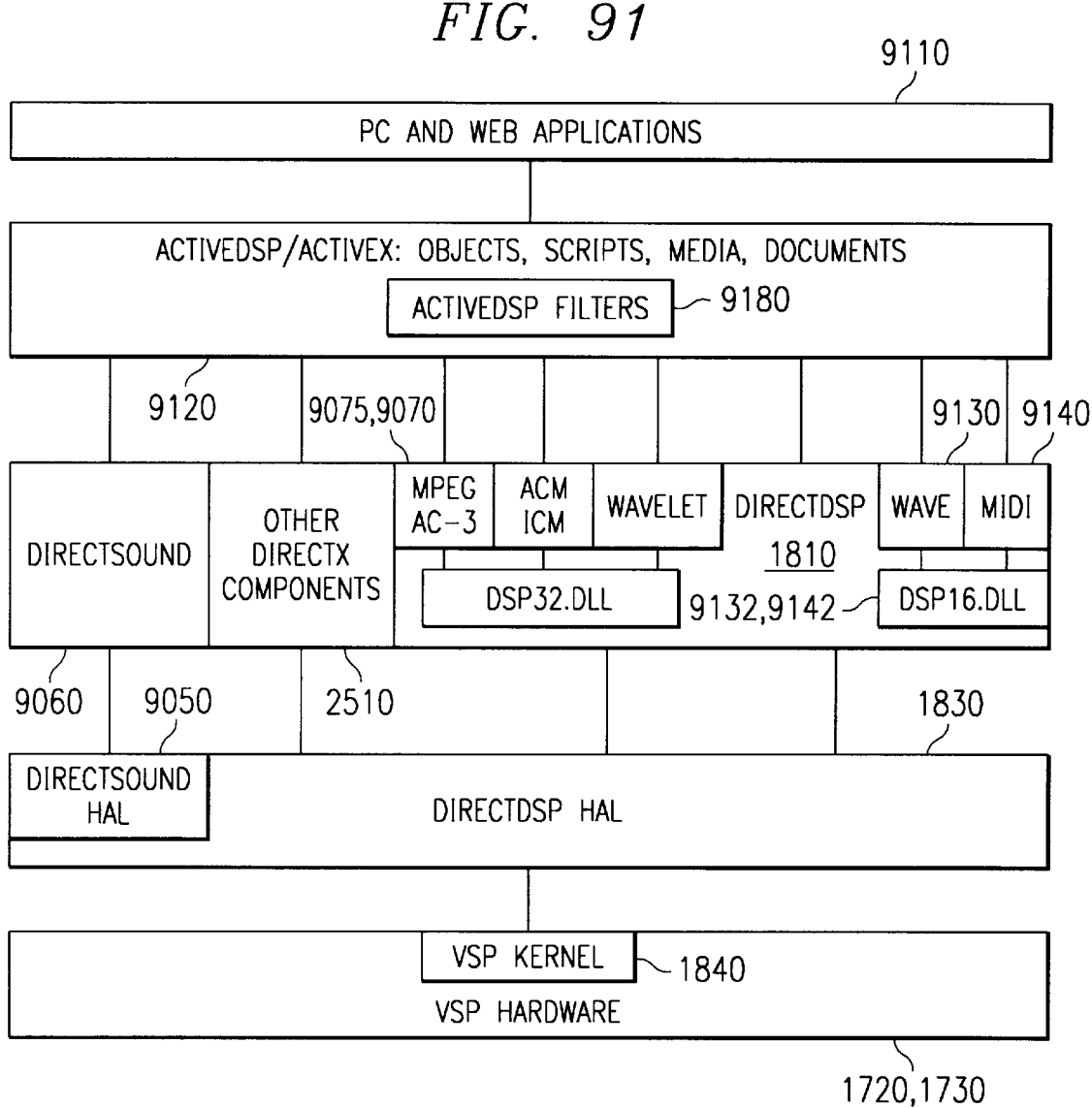

Rather than duplicating DirectX APIs, DirectDSP suitably uses existing DirectX APIs as well as its own extensions such as Wave, MIDI, ACM, ICM, MPEG, AC-3 and Wavelet for interfacing with MMsystem and WinMM. Windows applications can also talk directly to DirectDSP. To achieve this, DirectDSP provides two separate components: a 16-bit DSP16.DLL and a 32-bit DSP32.DLL as shown in FIG. 91.

The ActiveDSP layer has ActiveX filters (data converters in advanced software meaning of "filters") hardware-accelerated by VSP hardware. As an example, an ActiveDSP audio renderer filter accepts PCM, MPEG, or AC-3 audio streams, and passes the streams through DirectDSP/DirectDSP HAL to VSP hardware for decoding and playback. ActiveDSP, as a client of DirectDSP, supports Web-based Internet/Intranet newmedia applications.

When defining APIs for DirectDSP and the DirectDSP HAL, upper and lower edges of the device driver layer are distinguished. For example, the driver layer for MMsystem applications consists of the WAVE and MIDI component functions and the DSP16.DLL. The upper edge of this layer therefore conforms and corresponds to existing MMsystem APIs while the lower edge, by way of DSP16.DLL, is COM-based so that the WAVE and MIDI MMsystem drivers interface directly with the COM-based DirectDSP HAL. DSP16.DLL and the 16-bit component functions (e.g. WAVE) are 16-bit DirectDSP and the DSP32.DLL, and 32-bit component functions (e.g. MPEG) are regarded as 32-bit DirectDSP.

DSP16.DLL and DSP32.DLL interface a ring 3 client with the ring 0 DirectDSP HAL COM-based VxD. The ring 3 client can be a Windows application or a driver component like WAVE or MIDI which calls DSP16.DLL directly. DSP16.DLL and DSP32.DLL do not introduce any unnecessary delay or latency, since a ring 3 client interfaces to some ring 0 HAL anyhow. The following diagram FIG. 45 of incorporated U.S. patent application Ser. No. 08/823,257 shows how a ring 3 application or driver component communicates with the DirectDSP HAL through DSP16.DLL or DSP32.DLL.

When a client requests DirectDSP to create a DirectDSP object, client gives the object's GUID (Globally unique identifier) which DirectDSP compares with the GUIDs it supports. If a match is found, DirectDSP creates the object. DirectDSP then calls the object's QueryInterface with the GUID of the corresponding DirectDSP HAL object. QueryInterface in turn calls the DirectDSP HAL's IUnknown interface which creates the DirectDSP HAL object if a match is found between the GUID passed down and the GUIDs it supports. If no match is found or for some reason the DirectDSP HAL object is not created, the DirectDSP object is deleted and the NULL interface is returned to the client.

After the DirectDSP object and the corresponding DirectDSP HAL object are created, the ring 3 client which cannot call a function in a VxD directly, has the DirectDSP object's interface through which it can make function calls, and the DirectDSP object has the corresponding DirectDSP HAL object's interface through which it can make its function calls in turn. Regarding the interface between DirectDSP and the DirectDSP HAL, the DirectDSP HAL has 1) ISystem Interface having GetVersion and other system functions, 2) IUnknown Interface, where new objects are created and, 3) IObject Dispatch Interface called indirectly from address passed and function call is made. Hereinafter, a DirectDSP HAL object is called a "HAL object".

Integral to the USP architecture is the ability of a VSP to execute tasks whether they are host-based or VSP based. To achieve this, DirectDSP passes information for the VSP to execute tasks and functions of DirectDSP objects and HAL objects, and uses VSP objects for such purpose.

From host viewpoint, VSP objects are just some paged locked memory where information about corresponding HAL objects and tasks and client buffers are kept. A VSP object is created (i.e. memory allocated and page locked) when the corresponding HAL object is created, whereupon the VSP is called to perform the object related initialization. If the VSP fails to initialize the object, the VSP object and the HAL object are deleted and a NULL interface is returned to DirectDSP.

VSP Kernel

Figure 94:
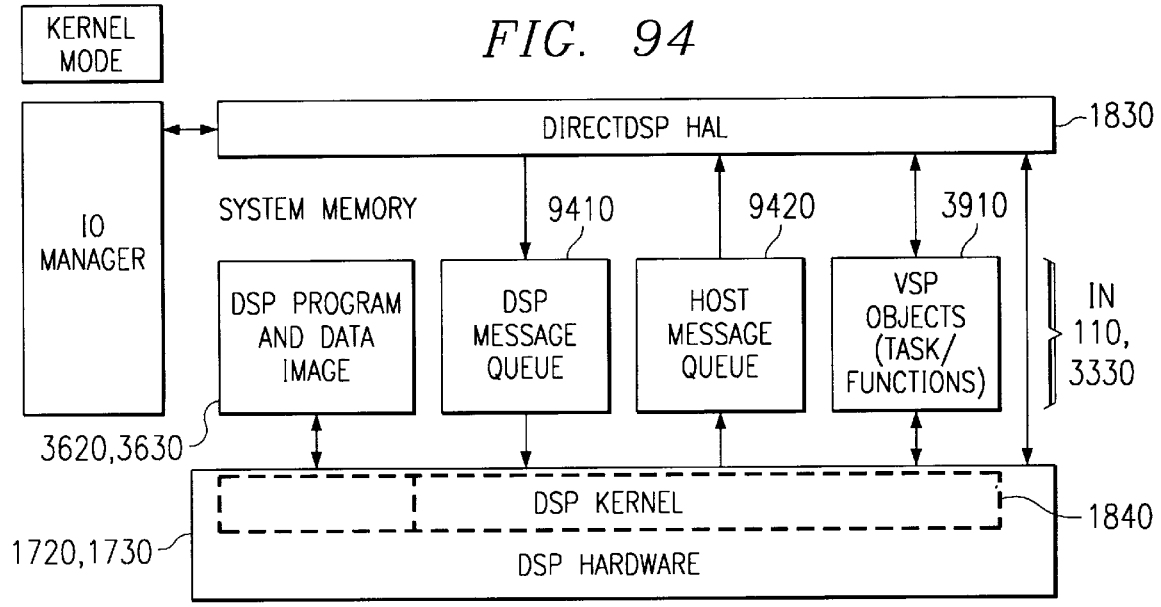

In order to start the VSP Kernel, the host executes DirectDSP HAL and allocates/locks some pages of host memory and loads the VSP Kernel program image into the memory. In FIG. 94, some pages of memory are also allocated & locked to serve as "VSP and Host Message Queues" between DirectDSP HAL and VSP Kernel. Host sends the physical address of the locked memory to VSP through some wrapper registers, and takes the VSP out of reset. After the DSP Kernel becomes active, the DirectDSP HAL communicates with the DSP Kernel by putting messages in the "VSP Message Queue" and/or signaling the DSP Kernel through a wrapper interrupt control register which in turn sets an interrupt bit on the DSP. Reciprocally, the VSP Kernel communicates with the DirectDSP HAL by putting messages in the "Host Message Queue" and/or generating PCI interrupts.

The VSP Kernel encompasses the tasking environment as well as I/O via the DSP PCI bus and Codecs. The DSP Kernel architecture is chosen so that the DSP Kernel I/O mechanisms work with any type of scheduler whether that be a multitasking, round robin or some other form of scheduler.

Figure 33:
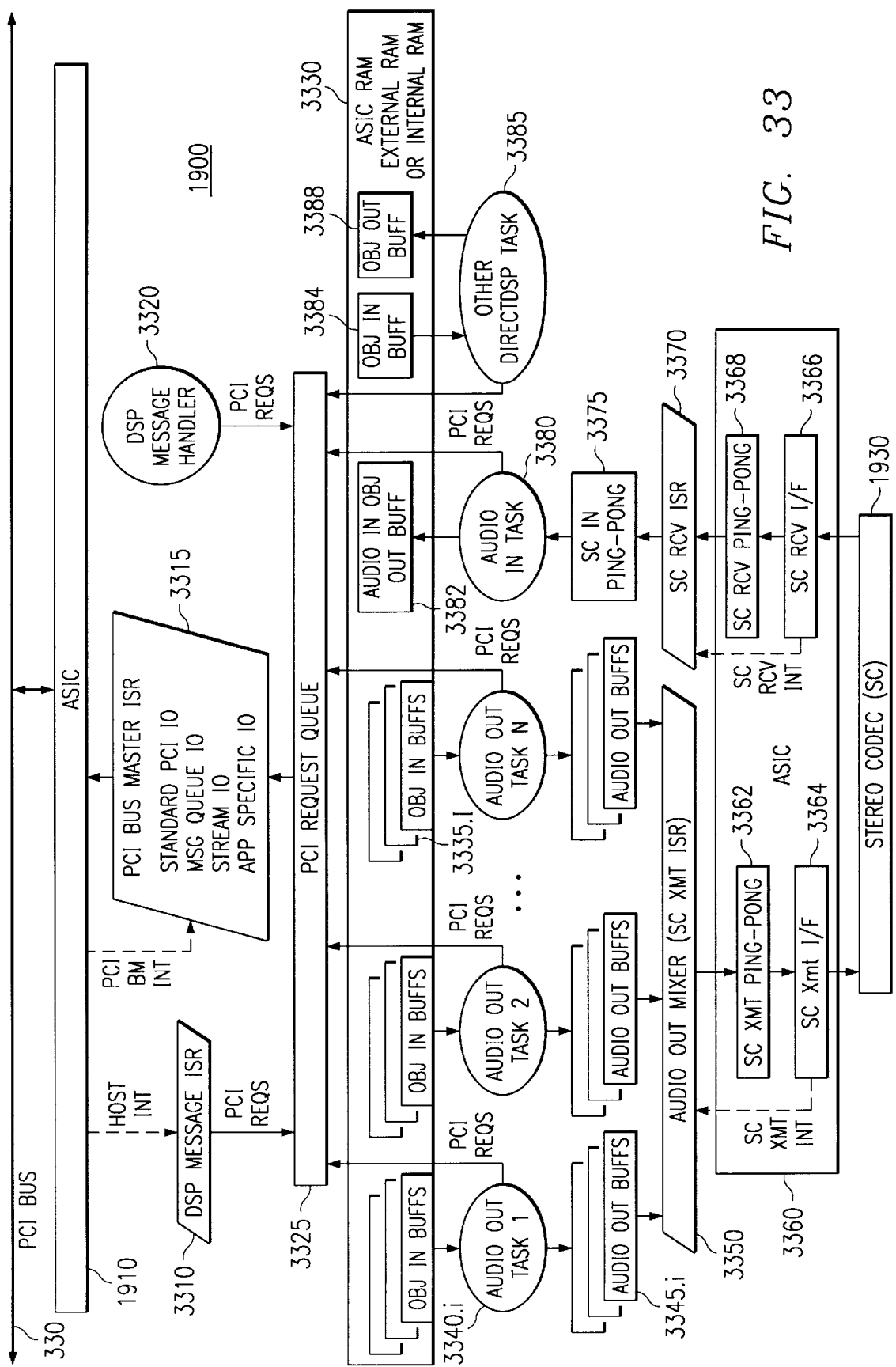
FIG. 33 is an electrical block diagram combined with a process or method flow chart diagram depicting VSP Kernel operations on audio applications.

FIG. 33 depicts the operation of the real-time DSP Kernel software in conjunction with the hardware. The diagram illustrates multiple audio out tasks, an audio in task, and a generic DirectDSP task running concurrently. The following items are represented in the diagram:

Wrapper ASIC Hardware

Tasks—ovals,

Functions—ovals,

Interrupt Service Routines (ISRs)—parallelograms suffers—rectangles.

The DSP message handler task is in the task list for the scheduler. Other tasks are inserted in the task list and removed from the task list as required.

It is desirable, although not necessary that interrupt service routines (ISRs) execute for short limited durations so that one ISR will not be required to preempt another ISR. ISRs preempt task execution at anytime except for critical code sections in which interrupts are disabled. These critical code sections are kept short in duration. ISRs save and restore any CPU registers used by the ISR.

The PCI bus master ISR and the PCI request queue provide system I/O functionality over the PCI bus. PCI I/O implies the transfer of data between any valid PCI address and ASIC RAM, external VSP RAM, or on chip RAM. PCI I/O, memory or configuration cycles can be performed over the PCI bus via the wrapper ASIC. Some PCI requests require VSP to copy from ASIC RAM to on chip RAM. A PCI request is posted in the PCI request queue to call for PCI I/O. If no other request is pending then the PCI bus master ISR is invoked immediately. If there are other requests pending then the request is placed in the queue according to its priority and eventually serviced by the PCI bus master ISR. When the PCI bus master ISR is invoked, it processes the next request in the queue. Each PCI request involves one or more PCI transactions. Where a single PCI transaction is required, the PCI bus master ISR commands the wrapper ASIC to perform the PCI transaction and return to the preempted code, see FIG. 34. This allows the currently executing task to continue execution while the PCI transaction is taking place. Also, other interrupts which occur can be serviced.

When the PCI transaction has completed, a PCI bus master interrupt is generated, which invokes the PCI bus master ISR. The ISR notifies the PCI request sender by setting a flag or semaphore designated in the PCI request, and at that point, the PCI request is complete. The ISR then begins processing the next PCI request in the queue. If the PCI request requires multiple PCI transactions, the PCI request remains pending beyond completion of the first PCI transaction. The PCI bus master ISR performs a different PCI transaction each time it is invoked until all PCI transactions for that PCI request have been completed (see FIG. 35). The PCI request queue and PCI bus master ISR mechanism allow the DSP to continue processing while PCI transactions are in progress. Advantageously, throughput is increased because there is no waiting for sometimes lengthy PCI transactions to complete. Several different types of PCI I/O are available including the following:

Standard PCI I/O

Message Queue I/O

Stream I/O

Application Specific I/O

Standard PCI I/O examples are PCI Read, PCI Write, Program Read and so forth. Message queue I/O involves processing of the DSP and host message queues. Stream I/O involves the processing of streams as described later herein. In stream processing, the DSP performs scatter-gather DMA operations. The PCI bus master ISR when processing a PCI request calls the required function via a pointer to a function in a PCI request packet. A task specifies the function to be called by inserting the desired function address into this function pointer. The method and architecture allow application specific I/O functions other than those supplied by the permit DSP kernel to be performed by the PCI bus master ISR as long as the functions conform to PCI bus master ISR coding requirements. In this way, an unlimited set of PCI I/O processing types are advantageously provided.

Figure 36:
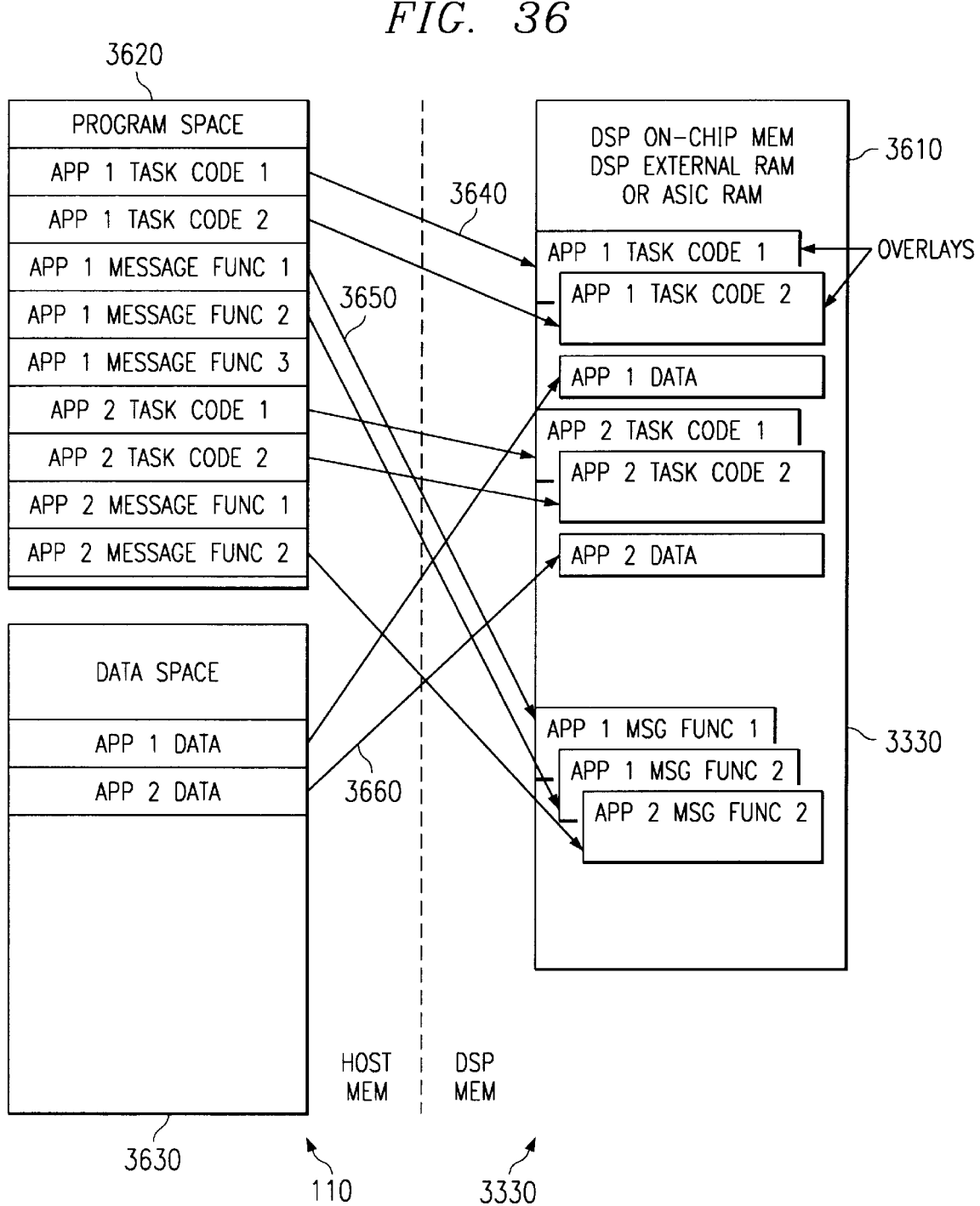
FIG. 36 is a memory space diagram of host memory program and data spaces (at left) and DSP on-chip and off-chip memories (at right) representing an example of a shared memory model utilized in embodiments of processes, devices and systems herein.

In FIG. 36, program and data caching are supported between host memory and DSP memory via the PCI Bus. Code and data caching between host memory and ASIC RAM/external SRAM does not require the kernel to perform any copying. The kernel does perform a copy function while caching to internal on-chip DSP memory. To reduce the required code space in VSP memory, each application pages code and data from host main memory during application execution by submitting a PCI Request to page the appropriate program or data. An example is a step of paging in code to initialize the application. Once the initialization is completed, this code is overwritten for some other purpose. Message processing code can be paged in as needed to handle the specific message, advantageously cutting down on extraneous, non-time-critical code in memory during the application. In some embodiments in which dynamic linking is not used, program and global data variables are resolved to a fixed run address, i.e., they are not placed just anywhere in memory. In other embodiments with dynamic linking, the fixed run address feature is relaxed. Either way, VSP applications which run concurrently out of the same memory are coordinated.

Dynamic VSP Code Linking

Reuse of VSP memory is performed by caching program and data from host memory to VSP memory. For most DSP based VSPs this is performed by creating static program/data overlays using the DSP linker. The functions and data which are part of these overlays are assigned a fixed run address. The overlays are designed to ensure that memory required for concurrent tasks/functions does not overlap. When code/data for one function is no longer needed, the memory is freed for use by another functions code/data.

In another embodiment VSP code/data is dynamically linked to allow more flexibility and reuse of VSP memory. Because code on the VSP is dynamically paged in and out of VSP memory, it is desirable to have the VSP code relocatable. The DirectDSP HAL dynamically links the VSP code at run-time vs link-time, when the DirectDSP function/multimedia application is invoked. To facilitate this, the DirectDSP HAL links the VSP code with other VSP components which are already running on the VSP. The DirectDSP HAL keeps track of available VSP memory resources and addresses of currently loaded functions. The DirectDSP HAL then allocates memory to the VSP code to be linked and performs the link operation. The host operates on a preprocessed VSP linker output specially formatted for easy processing on the host. Once linked, the VSP code is placed in page locked memory allocated by the DirectDSP HAL and pointed to by the VSP object for access by the VSP over the PCI bus. The linked code contains load, run, and size addresses necessary for the VSP to bus master the code to VSP memory when needed.

Stream I/O is the mechanism which transfers a stream of data between host memory and DSP memory as discussed here and later hereinbelow. The reader should carefully study the kernel-based streaming operations described here and then the host streaming operations as described in the material later herein to understand their coordination. During the initialization of a VSP object, the buffer type determines whether an In buffer or Out buffer or both is initialized. Structures for the buffer in conventional VSP memory along with data space for the buffer data are allocated at that time. The buffer data are located in ASIC RAM, or in external DSP RAM (off-chip memory), or internal DSP RAM (on-chip memory). The DSP kernel stream I/O supports ping-pong buffering for incoming and outgoing stream data. This is illustrated in FIG. 1 by the In and Out buffers. Initially when a stream is started, PCI requests are posted to fill the ping and pong buffers. Once the ping buffer is filled, the DSP task begins processing the ping buffer and, when the data is exhausted, makes a stream I/O PCI request to replenish the data. Then, if the pong buffer is valid, the task begins processing the pong buffer. The task alternates between ping and pong buffers until an end of data flag is encountered at which time the task completes the last valid buffers and ceases to process data. The stream I/O PCI request gives the task the ability to specify that the incoming stream data be placed anywhere in VSP memory on a dynamic basis, especially useful for fixed length type frame data. For example, assume one block of the stream data is header information placed in a header section of memory for the duration of a frame. The next block of the stream data might be frame data and is placed into the ping-pong buffer. In this way, the header data does not have to be copied from the ping-pong buffer to the header section of memory.

Also, stream I/O PCI requests provide the ability to skip portions of data in the stream without actually transferring the data over the PCI bus. Bit, byte, and word routines for retrieving and posting data to the In and Out buffers are provided by the kernel. Processing overhead is reduced by inserting such routines into application software also, for processing stream data. For example, if the data to be processed is 16-bit mono PCM samples, the task (application software) can process a frame of samples directly from the buffer without calling a word retrieval DSP kernel routine for each sample.

Stereo codec output processing in FIG. 33 uses a ping-pong buffer approach. Output processing is a two tiered approach with the first tier handled by the stereo codec transmit (SC Xmt) ping-pong buffer and the second tier handled by the audio out ping-pong buffers. The SC Xmt ping-pong buffer is the primary buffer and the audio out ping-pong buffers are regarded as secondary buffers. The audio out mixer mixes data from the audio out buffers into the SC Xmt buffer which is then played out to the stereo codec by the ASIC SC Xmt I/F (interface).

The stereo codec output is handled by an ASIC stereo codec transmit interface (SC Xmt I/F). The stereo codec transmit interface moves data from SC Xmt ping-pong buffer located in ASIC RAM to the playback DMA port of the stereo codec a sample at a time. Each time the interface empties either the SC Xmt ping or pong buffer, the DSP receives an SC Xmt interrupt which invokes the stereo codec transmit interrupt service routine (ISR) (SC Xmt ISR) also designated the audio out mixer. This interrupt service routine replenishes the data in the appropriate buffer in ASIC memory by mixing data from the Audio Out buffers into the SC Xmt ping or pong buffer. This mixing is performed an entire SC Xmt ping buffer size at a time. The interrupt service routine then signals the SC Xmt I/F that data is available by setting the appropriate buffer valid bit. The SC Xmt ping and pong buffers are completely filled each time they are replenished with data. For this reason, Audio Out ping and pong buffer sizes are greater than or equal to the SC Xmt ping or pong buffer size. Each Audio Out buffer can be a different size although Audio Out buffers associated with the same task are suitably the same size for convenient task frame execution.

For example, wave synthesis might require a 64 sample frame while AC-3 would require a 256 sample frame. Audio out ping and pong buffers correspond in size to each application frame size. For latency reasons, the SC Xmt buffer size might be only 16 samples. If this is the case, the audio out mixer executes four times before the wave synthesis task is notified of an empty audio out buffer. Because the size of the audio out buffers can be set by the task and is therefore variable, the audio out mixer keeps track of a pointer to valid data and, when the pointer is at the end of a buffer, switches to the next valid buffer, either the ping or pong. Once emptied, the audio out mixer sets a semaphore to notify the appropriate task that the buffer has been emptied. The task then executes to process another frame of data and fill the audio out ping or pong buffer.

Figure 42:
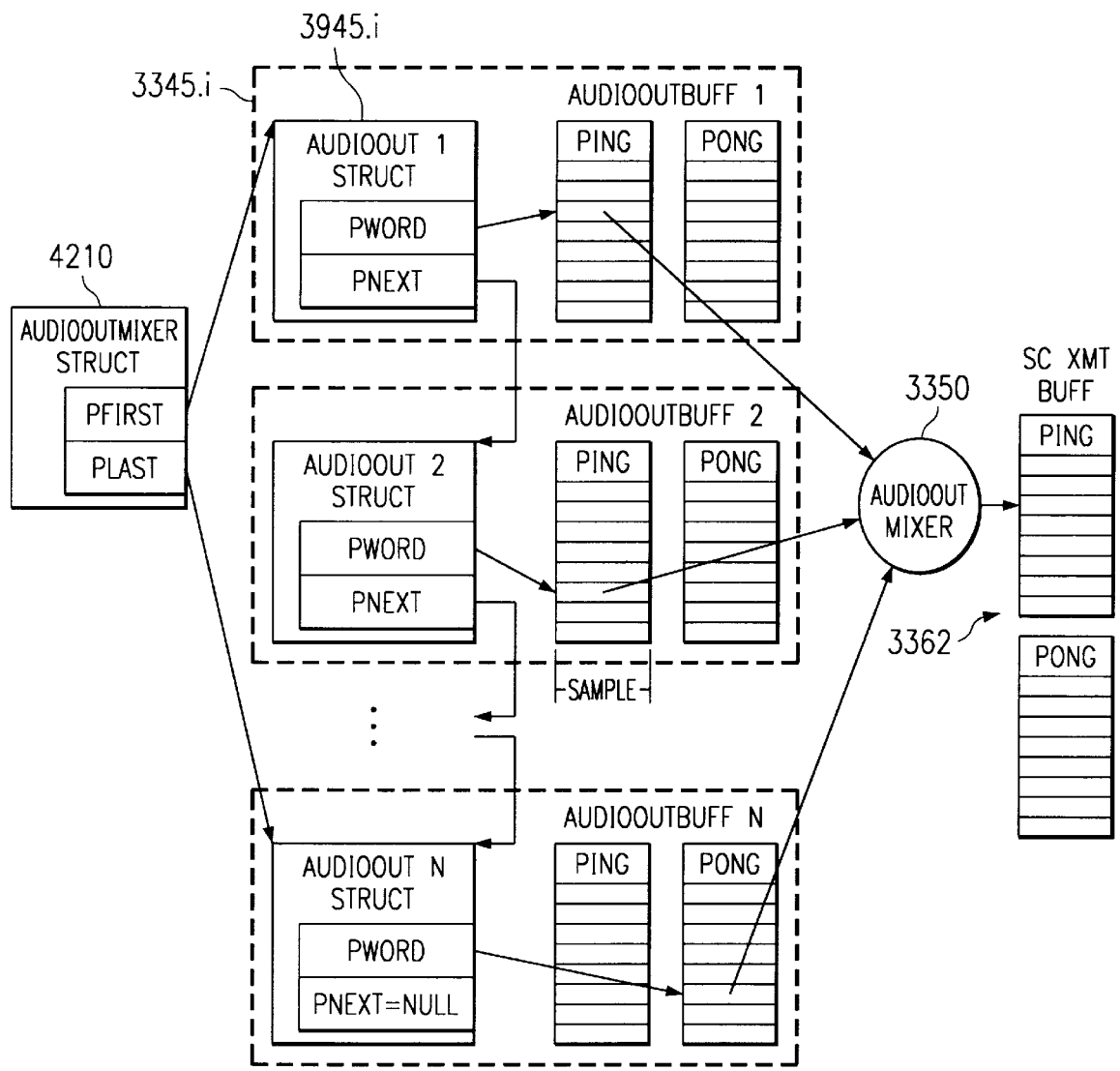
FIG. 42 is a more detailed process or method flow diagram depicting audio mixing and the audio output buffers in the lower part of FIG. 40.

In FIG. 42, a link-list of valid Audio Out buffers is kept for the audio out mixer to process. This list consists of pointers to each audio out buffer structure. The mixer processes this list to mix each audio out buffer into the SC Xmt buffer. If the mixer gets to the end of, say, a ping buffer, and the pong buffer is not valid, then the mixer removes the audio out buffer from the list to be processed. When the task finally gets around to updating the audio out buffer, it again places the audio out buffer into the audio out buffer list processed by the mixer. An audio out buffer will cease to be mixed into the SC Xmt buffer when it is removed from the audio out buffer list. This cuts down on the amount of overhead required in the audio out mixer.

Figure 37:
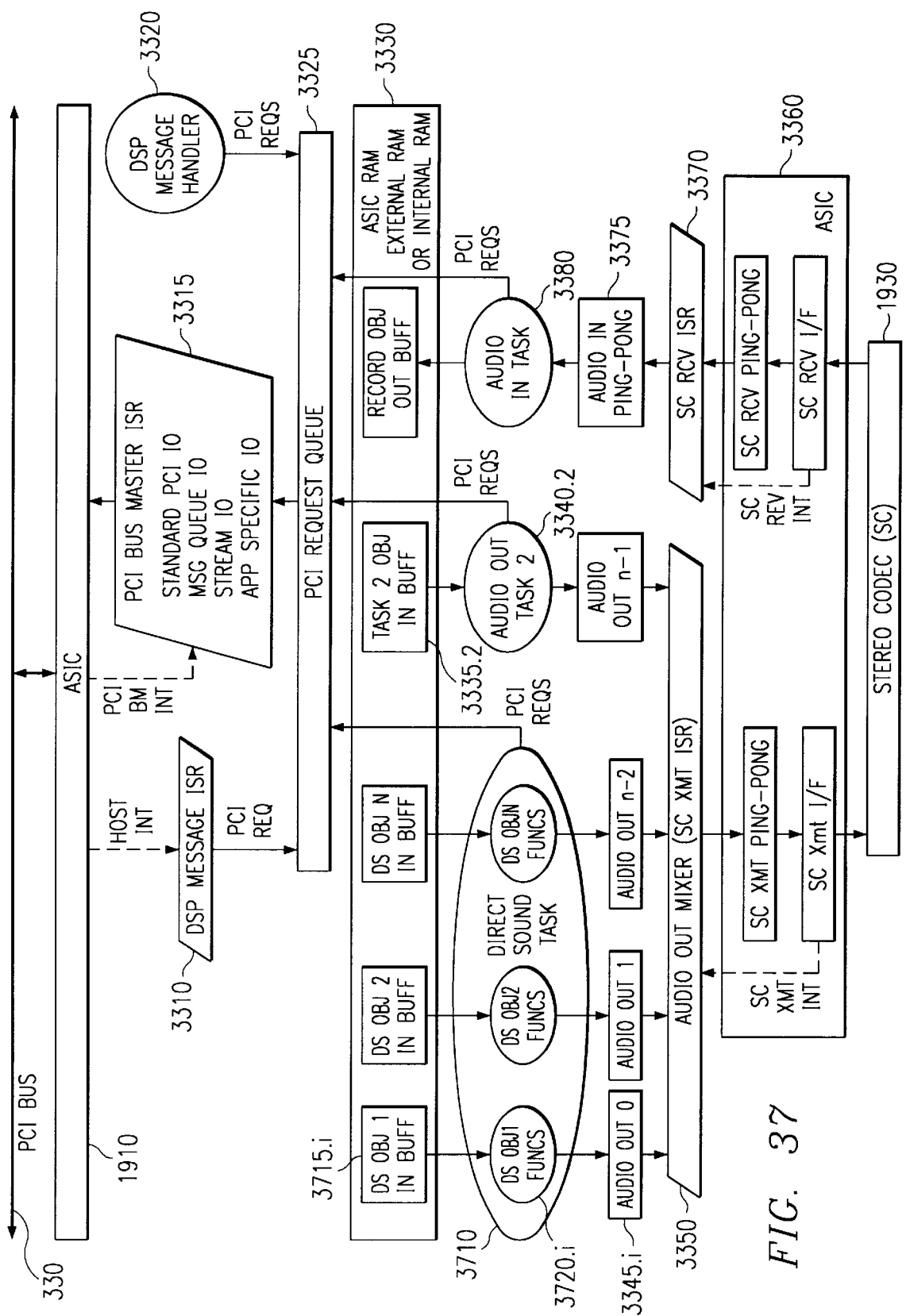
FIG. 37 is an electrical block diagram combined with a process or method flow chart diagram depicting VSP Kernel operations on audio applications, similar to FIG. 33 and showing a DirectSound task in more detail.

FIG. 37 shows a Direct Sound task running concurrently with another audio out task while also recording.

Figure 38:
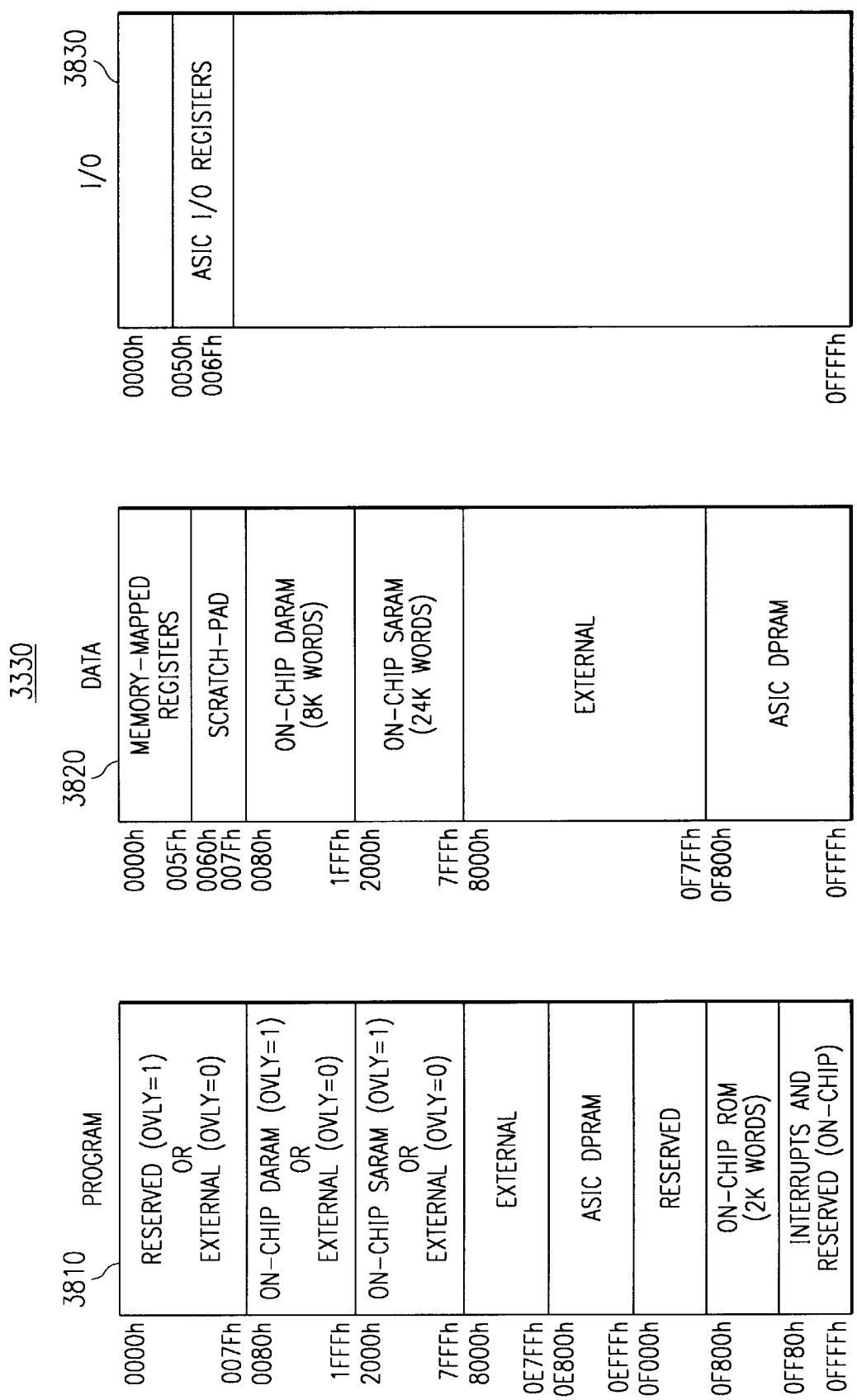
FIG. 38 is a DSP memory space diagram supplementing FIG. 36-right and showing DSP program, data and I/O spaces, including on-chip and off-chip memories and registers utilized in embodiments of processes, devices and systems herein.

The C54x kernel memory map is shown in FIG. 38. The kernel operates in a microcomputer mode so that the on-chip ROM is mapped into the upper 2K words of program space. The OVLY value is set to 1 so that on-chip memory maps Status and Control Registers
OVLY=1.
Copyright Texas Instruments Incorporated 1997 (unpublished)
//==PCI Request Functions==
kReqPCIRead(long dwPCISrcAddr, int *pDSPDst, unsigned int XferSize, kSEM *pSem, int Flags);
kReqPCIWrite(int *pDSPSrc, long dwPCIDstAddr, unsigned int XferSize, kSEM *pSem, int Flags);
kReqDSPProgRead(kLOAD *pDSPProgLoad, kSEM *psem, int Flags);
kReqDSPDataRead(kLOAD *pDSPDataLoad, kSEM *psem, int Flags);
kReqHostMsgSend(int *pMsg);
kReqDSPMsgRetrieve(int *pMsg)
kPCIRequestAdd(kPCI_REQUEST *pPCIRequest, int Flags);
[Note: kSEM is being used to define the semaphore structure until a multi-tasking KernCMpegAudio();

```
//
// The function that process callback
//
DWORD _stdcall ThreadFunction(LPVOID);
//
//IUnknown members
//
STDMETHODIMP QueryInterface (REFIID, void **);
STDMETHODIMP_(ULONG) AddRef( );
STDMETHODIMP_(ULONG) Release( );
//
// IDDspMpegAudio members
//
STDMETHODIMP_(HRESULT) Convert2Wave      (LPWAVEHDR, LPWAVEHDR);
STDMETHODIMP_(HRESULT) PrepareHeader     (LPWAVEHDR);
STDMETHODIMP_(HRESULT) Write             (LPWAVEHDR);
STDMETHODIMP_(HRESULT) SetFormat         (WORD, WORD, LPBYTE);
STDMETHODIMP_(HRESULT) Stop              (LPDWORD);
STDMETHODIMP_(HRESULT) UnprepareHeader   (LPWAVEHDR);
STDMETHODIMP_(HRESULT) Pause             ( );
STDMETHODIMP_(HRESULT) Restart           ( );
STDMETHODIMP_(HRESULT) GetPosition       (LPMMTIME);
};
``` into the lower 32K of program space. If external memory is available, it is shared by program and data. Kernel code is located in SARAM or external RAM if available. Kernel data is located in SARAM. DARAM is available for application data. Concurrently executing applications ensure that undesirable overlap does not occur. Both the stack and heap are located in the on-chip single access RAM (SARAM). The stack and heap sizes are modified in the linker control file (*.ctl) associated with the application.

The kernel is written so that applications written in C or assembly can be executed on the platform. Tasks follow the conventions stated in the C54x C Compiler User's Guide, 1995. Dynamic memory allocation via the C run-time routines is allowed for message functions.

XF—used for ASIC DMA control.
HM—reserved as 0, processor continues processing internally when a DMA transaction is occurring.
DP is not assumed.
SP points to last item pushed on stack.
The following registers are restored upon task exit: AR1, AR6, AR7, SP. This is per the C compiler function calling convention (See pg 4–15, C54x Compiler User's Guide, 1995).

FIG. 95 shows how the DirectDSP HAL data structures are used.

The IDsDriver interface supports DirectSound, a component of DirectX. This DirectSound component of DirectDSP HAL supports DirectSound APIs and replaces the DirectSound HAL that a hardware vendor would otherwise provide. The IDsDriver interface is thus the same as that in DirectSound HAL.

IDsDriver Interface

| Member |
|---|
| AddRef(. . .) |
| Close(. . .) |
| CreateSoundBuffer(. . .) |
| DuplicateSoundBuffer(. . .) |
| GetCaps(. . .) |
| GetDriverDesc(. . .) |
| Open(. . .) |
| QueryInterface(. . .) |
| Release(. . .) |

IDsDriverBuffer interface is the same as that in the DirectSound HAL.

IDsDriverBuffer Interface

| Member |
|---|
| AddRef(. . .) |
| GetPosition(. . .) |
| Lock(. . .) |
| Play(. . .) |
| QueryInterface(. . .) |
| Release(. . .) |
| SetFormat(. . .) |
| SetFrequency(. . .) |
| SetPosition(. . .) |
| SetVolumePan(. . .) |
| Stop(. . .) |
| Unlock(. . .) |

The IDDspWave interface supports MMSYSTEM and wave file playing. It is called by the WAVE driver and MIDI driver.

IDDspWave Interface

| Member |
|---|
| QueryInterface(. . .) |
| AddRef(. . .) |
| Release(. . .) |
| SetFormat(...) |
| SetVolume(...) |
| Resume(...) |
| Pause(...) |
| GetPosition(...) |
| Play(...) |
| Record(...) |
| Stop(...) |

IDDspWaveCreate
   HRESULT FAR PASCAL IDDspWaveCreate(REFIID riid, DWORD FAR * ppv, DWORD dwCallbac)
   riid: GUID of the object
   ppv: Pointer points to a buffer where the interface is expected to be returned
   dwcallback: Callback function.
   Return: Error code
IDDspWaveDestroy
   HRESULT FAR PASCAL IDDspWaveDestroy (IDDSPWAVE FAR * pWave)
   pWave: Pointer points to the object structure
   Return: Error code
QueryInterface
   HRESULT QueryInterface(REFIID riid, PPVOID ppv)
   riid: GUID of the object
   ppv: Pointer points to a buffer where the interface is expected to be returned
   Return: Error code
AddRef
   ULONG AddRef(IDDSPWAVE * pIDDspWave)
   pIDDspWave: Pointer points to the object structure
   Return: Error code
Release
   HRESULT Release(IDDSPWAVE * pIDDspWave)
   pIDDspWave: Pointer points to the object structure
   Return: Error code
SetFormat
   HRESULT SetFormat(IDDSPWAVE * pIDDspWave, WORD wParamSize, LPBYTE lpParam)
   pIDDspWave: Pointer points to the object structure
   wParamSize: Size of the parameter list
   lpParam: Pointer points to the parameter list
   Return: Error code
SetVolume
   HRESULT SetVolume(IDDSPWAVE * pIDDspWave, LPDWORD lpdwVolume)
   pIDDspWave: Pointer points to the object structure
   lpdwVolume: Pointer points to the volume value to be set
   Return: Error code
GetPosition
   HRESULT GetPosition(IDDSPWAVE * pIDDspWave, WORD wBufType, LPDWORD lpdwPosition)
   pIDDspWave: Pointer points to the object structure
   wBufType: IN, OUT or INOUT
   lpdwPosition: Pointer points to the buffer where position will be returned.
   Return: Error code
Pause
   HRESULT Pause(IDDSPWAVE * pIDDspWave, WORD wBufType)
   pIDDspWave: Pointer points to the object structure
   wBufType: Type of the buffer need to be paused(IN, OUT, or INOUT).
   Return: Error code
Resume
   HRESULT Resume(IDDSPWAVE * pIDDspWave, WORD wBufType)
   pIDDspWave: Pointer points to the object structure
   wBufType: Type of the buffer need to be paused(IN, OUT, or INOUT).
   Return: Error code
Play
   HRESULT Play(IDDSPWAVE * pIDDspWave, DWORD dwBufSize, LPBYTE lpBuffer)
   pIDDspWave: Pointer points to the object structure
   dwBufSize: Size of the data buffer
   lpBuffer: Pointer points to the data buffer
   Return: Error code
Record
   HRESULT Record(IDDSPWAVE * pIDDspWave, DWORD dwBufSize, LPBYTE lpBuffer)
   pIDDspWave: Pointer points to the object structure
   dwBufSize: Size of the data buffer
   lpBuffer: Pointer points to the data buffer
   Return: Error code
Stop
   HRESULT Stop(IDDSPWAVE * pIDDspWave, WORD wBufType)
   pIDDspWave: Pointer points to the object structure
   wBufType: Type of the buffer needs to be stopped
   Return: Error code
IDDspMpegAudio Interface Reference
   The IDDspMpegAudio interface supports partial MPEG audio decoding and playing. Currently the host does "Bit allocation decoding", "Scalefactor selection information decoding", "Scalefactor decoding" and "Requantization of subband samples", while DSP does "Synthesis subband filter decoding" & playing.
IDDspMpegAudio Interface

| Member |
|---|
| QueryInterface(...) |
| AddRef(...) |
| Release(...) |
| LockMemory(...) |
| UnlockMemory(...) |
| SetFormat(...) |
| Play(...) |
| Convert2Wave(...) |
| Stop(...) |

IDDspMpegAudioCreate
   HRESULT IDDspMpegAudioCreate(REFIID riid, PPVOID ppv)
   riid: GUID of the object
   ppv: Pointer points to a buffer where the interface is expected to be returned Return: Error code
QueryInterface
   HRESULT QueryInterface(REFIID riid, PPVOID ppv)
   riid: GUID of the object
   ppv: Pointer points to a buffer where the interface is expected to be returned
   Return: Error code
AddRef
   HRESULT AddRef(IDDSPMPEGAUDIO * pIDDspMAudio)
   pIDDspMAudio: Pointer points to the object structure
   Return: Error code
Release
   HRESULT Release(IDDSPMPEGAUDIO * pIDDspMAudio)
   pIDDspMAudio: Pointer points to the object structure
   Return: Error code
LockMemory
   HRESULT LockMemory(IDDSPMPEGAUDIO * pIDDspMAudio, DWORD dwBufSize, LPBYTE pBuffer, DWORD * pReturnedLinearAddr, DWORD Flag)
   pIDDspMAudio: Pointer points to the object structure
   dwBufSize: Size of the memory block to be locked
   pBuffer: Pointer points to the memory block to be locked
   pReturnedLinearAddr: An address returned from locking (could be used later to unlock the memory)
   Flag: 0 means just lock the memory, otherwise indicates how the page list should be built
   Return: Error code
UnlockMemory
   HRESULT UnlockMemory(IDDSPMPEGAUDIO * pIDDspMAudio, DWORD dwBufSize, LPBYTE pBuffer)
   pIDDspMAudio: Pointer points to the object structure
   dwBufSize: Size of the memory block to be unlocked
   pBuffer: Pointer points to the memory block to be unlocked(must use the pointer returned from LockMemory)
   Return: Error code
SetFormat
   HRESULT SetFormat(IDDSPMPEGAUDIO * pIDDspMAudio, WORD wtype, WORD wParamSize, LPBYTE pParam)
   pIDDspMAudio: Pointer points to the object structure
   wType: Type information(e.g. playing, converting)
   wParamSize: Size of the parameter list
   pParam: Pointer points to the parameter list
   Return: Error code
Play
   HRESULT Play(IDDSPMPEGAUDIO * pIDDspMAudio, DWORD dwSize, LPBYTE pBuffer, LPOVERLAPPED lpOverLapped)
   pIDDspMAudio: Pointer points to the object structure
   dwSize: Size of the buffer
   pBuffer: Pointer points to the buffer
   lpOverLapped: If NULL then the client is not ready to be signaled.
   Return: Error code
Convert2Wave
   HRESULT Convert2Wave(IDDSPMPEGAUDIO * pIDDspMAudio, DWORD dwSrcSize, LPBYTE pSrcBuffer, DWORD dwDstSize, LPBYTE pDstBuffer, LPOVERLAPPED lpOverLapped)
   pIDDspMAudio: Pointer points to the object structure
   dwSrcSize: Size of the source buffer
   pSrcBuffer: Pointer points to the source buffer
   dwDstSize: Size of the destination buffer
   pDstBuffer: Pointer points to the destination buffer
   lpOverLapped: If NULL then the client is not ready to be signaled.
   Return: Error code
Stop
   HRESULT Stop(IDDSPMPEGAUDIO * pIDDspMAudio, LPDWORD lpdwPosition)
   pIDDspMAudio: Pointer points to the object structure
   lpdwposition: Pointer points to the buffer where stopped position is to be returned
   Return: Error code
IDDspMpegAudioDestroy
   HRESULT IDDspMpegAudioDestroy(IDDSPMPEGAUDIO * pIDDspMAudio)
   pIDDspMAudio: Pointer points to the object structure
   Return: Error code
IDDspACM Interface Reference
   The IDDspACM supports Windows ACM driver.
IDDspACM Interface

| Member |
| --- |
| QueryInterface(...) |
| AddRef(...) |
| Release(...) |
| LockMemory(...) |
| UnlockMemory(...) |
| SetFormat(...) |
| Convert(...) |

IDDspAcmCreate
   HRESULT IDDspAcmCreate(REFIID riid, PPVOID ppv)
   riid: GUID of the object
   ppv: Pointer points to a buffer where the interface is expected to be returned
   Return: Error code
QueryInterface
   HRESULT QueryInterface(REFIID riid, PPVOID ppv)
   riid: GUID of the object
   ppv: Pointer points to a buffer where the interface is expected to be returned
   Return: Error code
AddRef
   HRESULT AddRef(IDDSPACM * pIDDspAcm)
   pIDDspAcm: Pointer points to the object structure
   Return: Error code
Release
   HRESULT Release(IDDSPACM * pIDDspAcm)
   pIDDspAcm: Pointer points to the object structure
   Return: Error code
LockMemory
   HRESULT LockMemory(IDDSPACM * pIDDspAcm, DWORD dwBufSize, LPBYTE pBuffer, DWORD * pReturnedLinearAddr, DWORD Flag)
   pIDDspAcm: Pointer points to the object structure
   dwBufSize: Size of the memory block to be locked
   pBuffer: Pointer points to the memory block to be locked
   pReturnedLinearAddr: An address returned from locking (could be used later to unlock the memory)
   Flag: 0 means just lock the memory, otherwise indicates how the page list should be built
   Return: Error code
UnlockMemory
   HRESULT UnlockMemory(IDDSPACM * pIDDspAcm, DWORD dwBufSize, LPBYTE pBuffer)
   pIDDspAcm: Pointer points to the object structure
   dwBufSize: Size of the memory block to be unlocked
   pBuffer: Pointer points to the memory block to be unlocked(must use the pointer returned from LockMemory)
   Return: Error code SetFormat
   HRESULT SetFormat(IDDSPACM * pIDDspAcm, WORD wType, WORD wParamSize, LPBYTE pParam)
      pIDDspMAudio: Pointer points to the object structure
      wType: Type information(e.g. playing, converting)
      wParamSize: Size of the parameter list
      pParam: Pointer points to the parameter list
      Return: Error code
Convert
   HRESULT Convert(IDDSPACM * pIDDspAcm, DWORD dwSrcSize, LPBYTE pSrcBuffer, DWORD dwDstSize, LPBYTE pDstBuffer, LPOVERLAPPED lpOverLapped)
      pIDDspAcm: Pointer points to the object structure
      dwSrcSize: Size of the source buffer
      pSrcBuffer: Pointer points to the source buffer
      dwDstSize: Size of the destination buffer
      pDstBuffer: Pointer points to the destination buffer
      lpOverLapped: If NULL then the client is not ready to be signaled.
      Return: Error code
IDDspAcmDestroy
   HRESULT IDDspAcmDestroy(IDDSPACM * pIDDspAcm)
      pIDDspAcm: Pointer points to the object structure
      Return: Error code
Using the Win32 Driver Model (WDM)

Under the Win32 Driver Model (WDM), the DirectDSP HAL is the bottom layer of the WDM driver stack and is called from kernel mode "Mini Drivers". The DirectDSP HAL is also renamed as the "VSP Hardware Driver" to be consistent with the WDM terminology and not to be confused with the Windows NT HAL concept. The interface between Ring 3 and Ring 0 is implemented via "class drivers". Kernel mode clients are defined as any kernel mode components in the WDM driver stack to be accelerated by VSP hardware. For example, a kernel mode driver is an ActiveX filter doing data streaming. A kernel mode client talks to VSP Hardware Driver (a.k.a. the DirectDSP HAL) directly or acts as a client of the VSP Class Driver.

FIG. 96 illustrates how various system components fit together. The "System bus class driver" and "PCI bus class driver" are not shown. Also not shown are the ACM, ICM, MPEG, AC-3 and Wavelet components of DirectDSP as they are implied in the DirectDSP block. These 32-bit component functions of DirectDSP have their own Class Drivers and the corresponding Mini Drivers in the way the 16-bit WAVE and MIDI functions do. The DirectMusic block is a DirectX version of the MIDI function.

Figure 97:
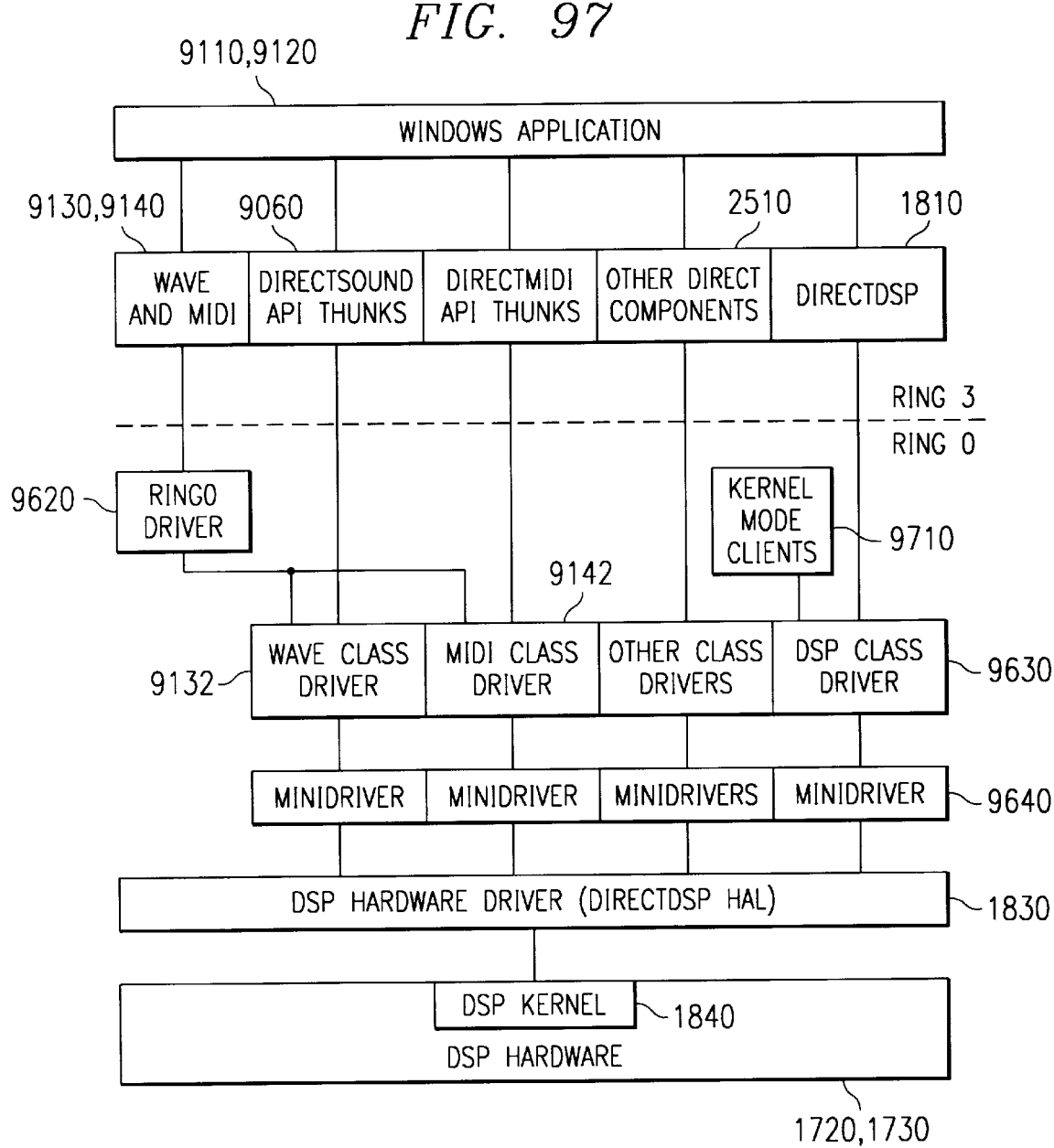
Figure 98:
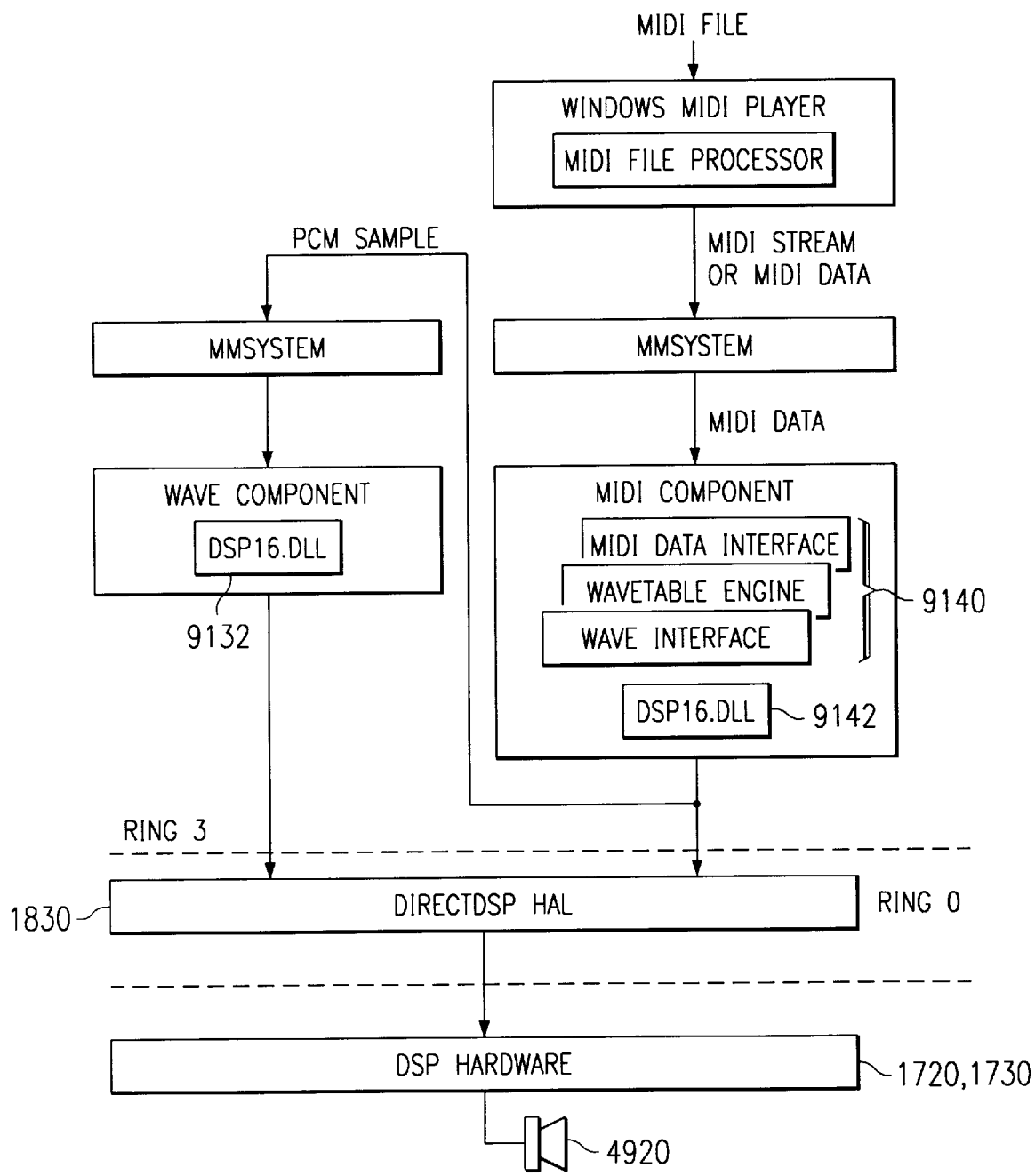
Figure 99:
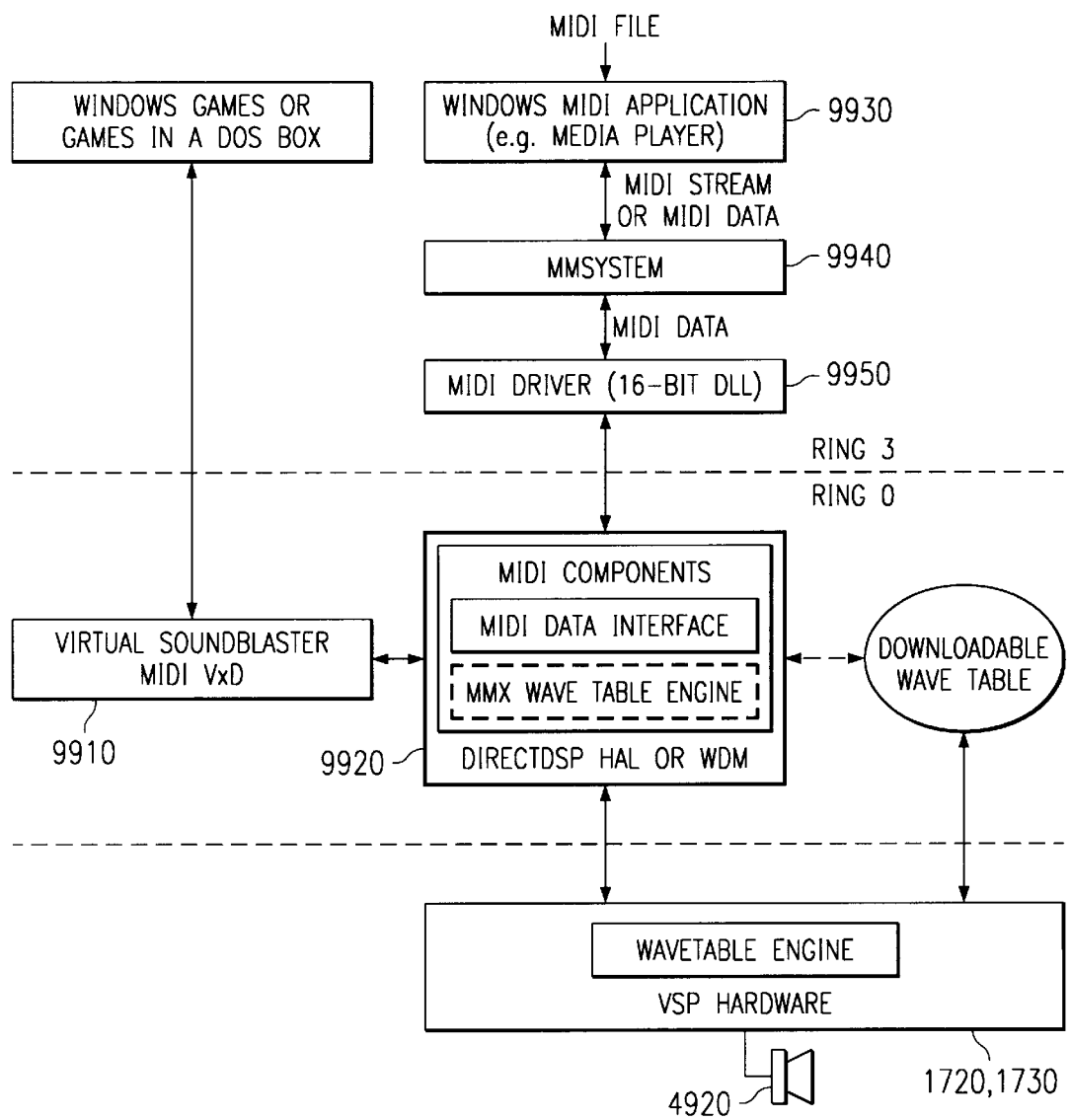

An alternative implementation of the above software architecture is shown in FIG. 97. The VSP kernel mode clients now talks to the VSP class driver and mini driver instead of directly to the VSP hardware driver (a.k.a. DirectDSP HAL).

Figure 100:
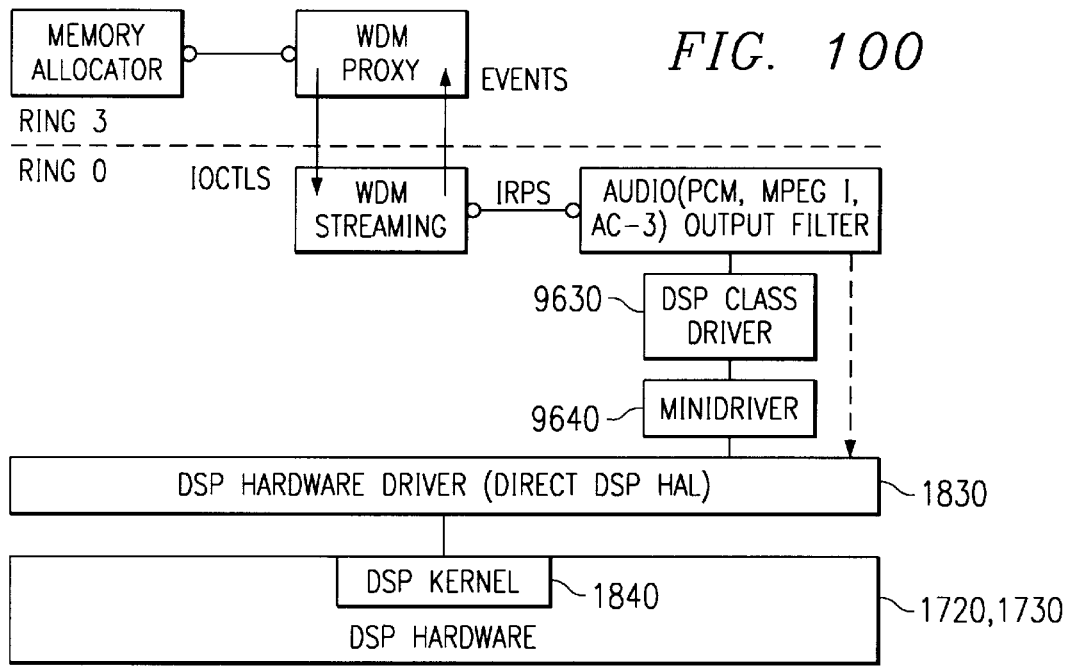
Figure 101:
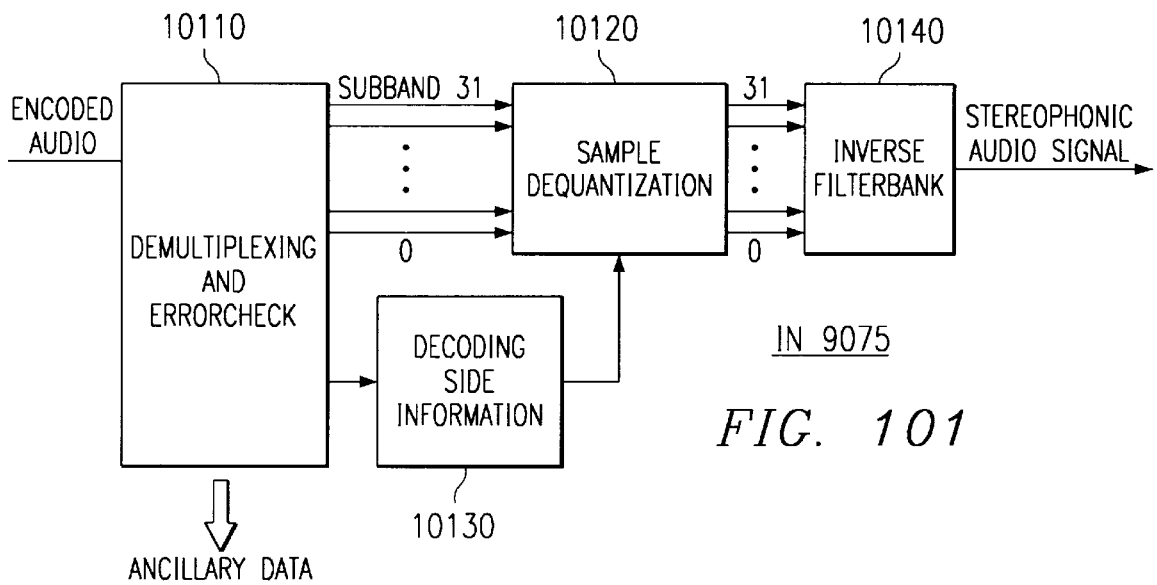
Figure 102:
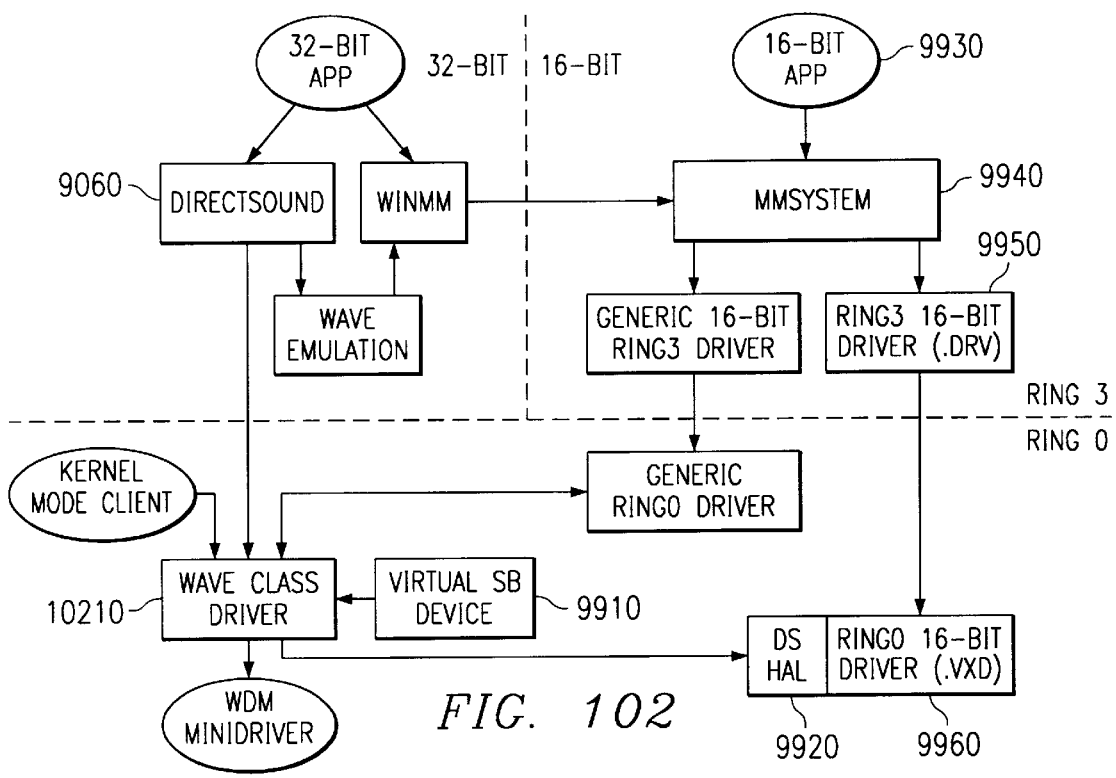

FIG. 100 shows an ActiveDSP or ActiveX audio output filter as a kernel mode client. In FIG. 100, the audio output filter is a direct client of VSP hardware driver 1830 as shown by right-hand dotted line. Alternatively, the audio output filter is a client of VSP class driver 9630. The audio output filter accepts PCM, MPEG, or AC-3 audio format and sends the stream via minidriver 9640 through the VSP hardware driver 1830 to the VSP for decoding and playback.

USP SmartHub & USB

Some VSP hardware embodiments advantageously comprise a "smart" USB hub.

Figure 86:
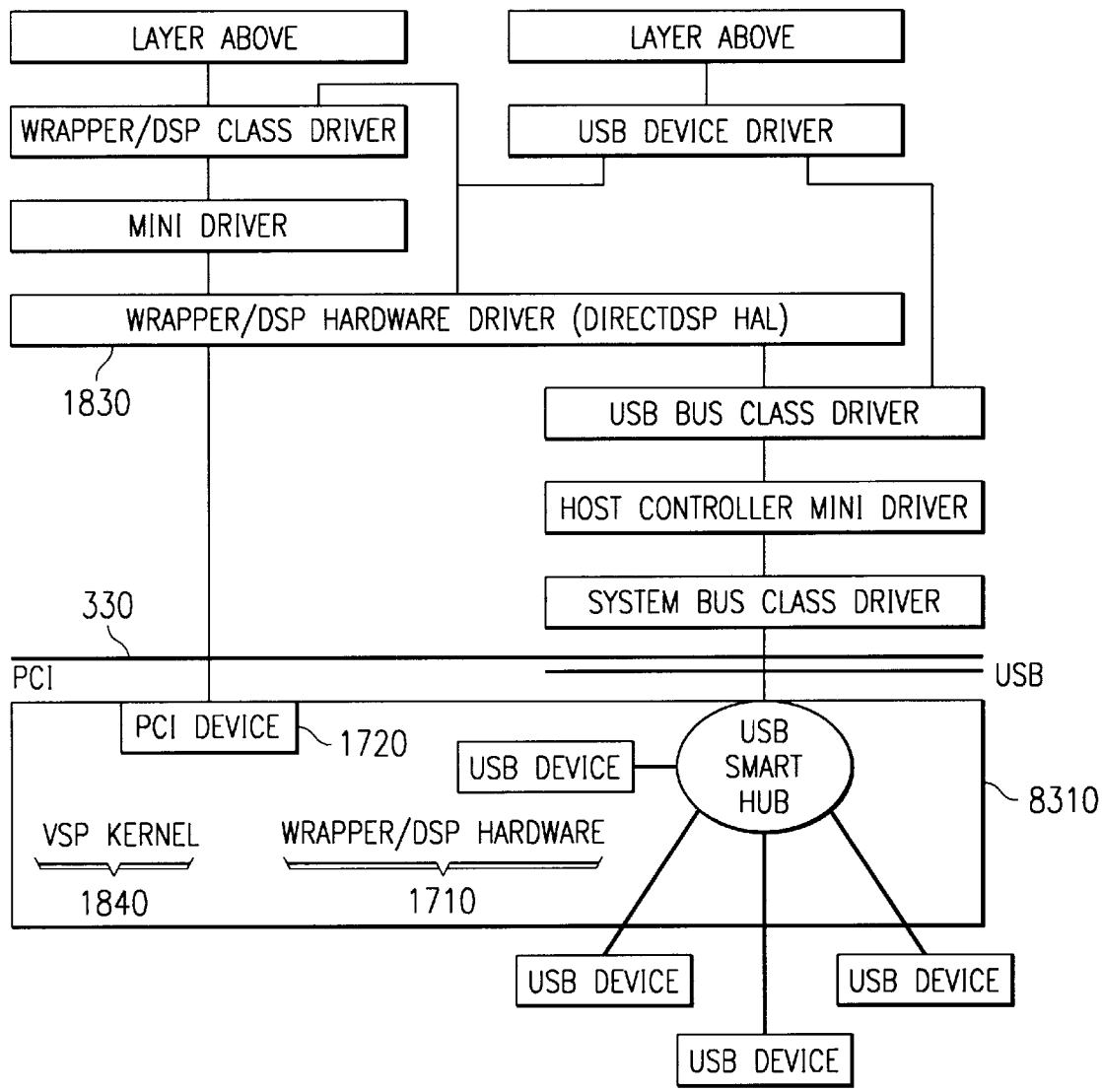
FIG. 86 is a process diagram or method-of-operation diagram showing interrelated improved processes in a USB serial bus-based system improved with unified signal processing.

First embodiment: In FIG. 86, the VSP acts both as a PCI device and a USB hub. A USB device attached to the Smarthub requests functions provided by the VSP hardware by the host hub driver for the USB device making function calls through the VSP class driver or directly to the VSP hardware driver. For example, a USB device which only contains a DAA becomes a modem by calling a data pump on the VSP hardware. Alternatively, the hub driver is implemented as an embedded function of the VSP hardware driver.

Second embodiment: In FIG. 86 the VSP hardware becomes a USB Smarthub with an embedded function USB device with rectangle 8310. The VSP hardware comprises a USB hub with a USB device already attached to one of its ports.

Third embodiment: In FIG. 86, the first and second embodiment are combined such that the VSP hardware acts as a PCI device 1720, a USB device embedded as in second embodiment, and also a USB Smarthub.

DirectDSP for the Windows Digital Audio Support Architecture

Windows digital audio support architecture has three base components, namely, audio class driver, cross-application kernel-mode mixer (KMIXER), and sample-rate-converter (SRC). Assume DirectSound does mixing and DSAUD converts DirectSound primary buffer information into audio streams. The VSP then processes DirectSound hardware mixing and MIDI mixing and conveys audio to loudspeaker (dotted line in FIG. 87). An audio rendering device is provided in the VSP hardware. Alternatively, in FIG. 87, the output from kernel mode mixer is sent to the VSP through the audio class driver to the VSP hardware driver for final mixing and rendering. The audio rendering device is on the USB bus (FIG. 87 switch in lower position), but connected to the USB Smarthub as part of the VSP hardware. Kernel mode mixer output passes to the VSP hardware on the PCI bus for final mixing and the final audio stream passes to the audio device through a hardwired connection to the USB Smarthub in the VSP hardware. In a third alternative (FIG. 87 switch in upper position), VSP mixed audio goes back out PCI bus, then onto USB, then to a USB smart hub, and then to loudspeaker(s). In other embodiments, VSP hardware does even more of the processing, as well as DirectSound mixing and MIDI.

ActiveX is both an architecture for control and processing of streams of multimedia data and a software service that uses this architecture to support end-user multimedia applications for the PC and the Web i.e. Internet/Intranet. The ActiveX architecture controls streams of time-stamped multimedia data and processes them using modular components called filters connected in a configuration called a filter graph as shown in FIG. 92, as well as FIG. 40 of incorporated U.S. patent application Ser. No. 08/823,257.

The ActiveX filter graph manager controls the data structure of the filter graph and the way data moves through the filter graph. The filter graph manager provides a set of component object model (COM) interfaces for communication between a filter graph and its application. A filter graph has three different types of filters: source filters, transform filters, and rendering filters. A source filter is used to load data from some source; a transform filter processes and passes data; and a rendering filter renders data to a hardware device or other locations. Filters are connected through input/output "pins", which negotiate media type and memory buffers during the connection. ("Pins" in this process sense are not to be confused with terminal pins of a chip hardware.)

ActiveDSP is a set of VSP accelerated filters managed by filter graph manager of ActiveX. ActiveDSP to provides multimedia services to PC and Web applications which do not interface directly to DirectDSP/DirectX. ActiveDSP filter graph has a transform filter block divided into sub-transform filters, which split audio/video data, decode the media data, convert data format, and synthesize audio/video data. Likewise, the renderer filter block includes an audio renderer filter and video renderer filter. The clock provides a time reference for all the other ActiveDSP blocks, used in quality control, media data synchronizing and positioning. While the source filter normally takes data from the hard disk, it can also accepts data from other locations, for example, video script downloaded from a Web site.

Figure 93:
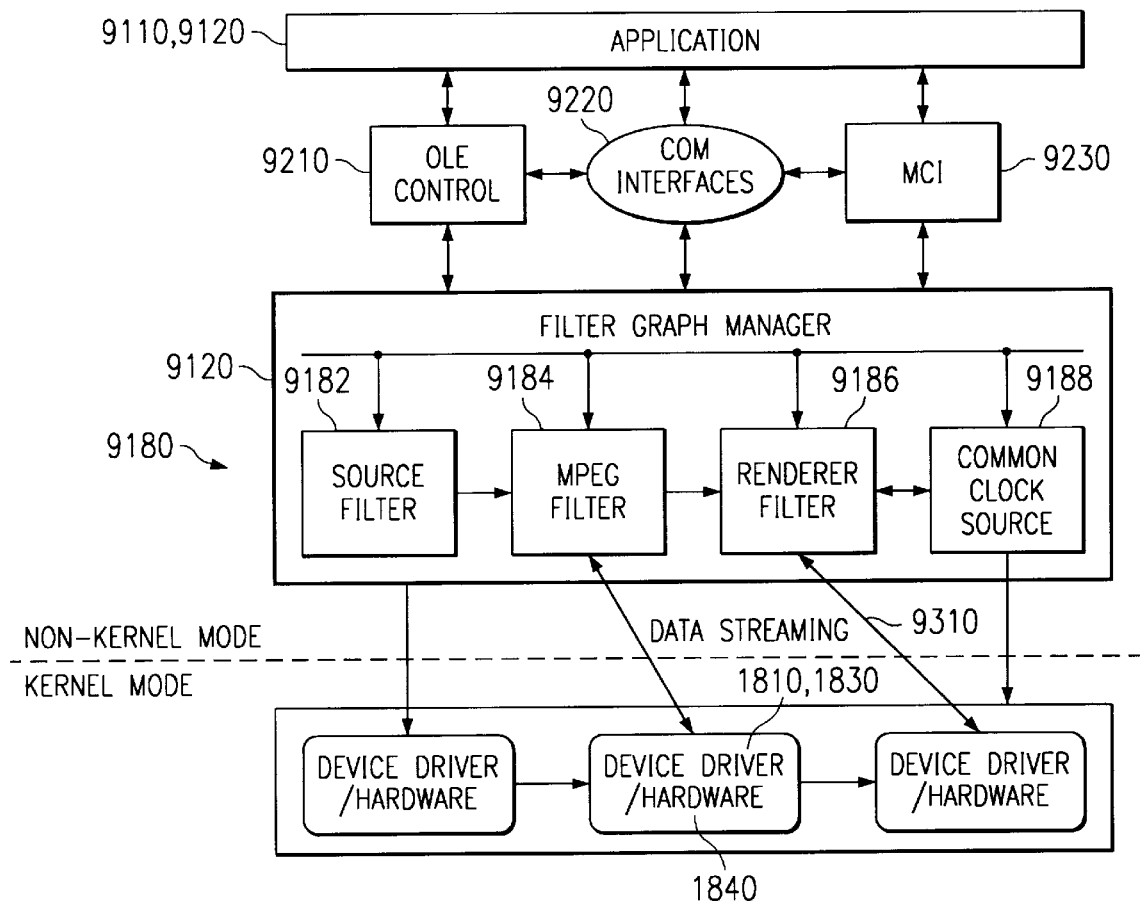

FIG. 93 shows an MPEG audio streaming architecture. The application controls the flow of the data stream by calling IMediaControl interface provided by the filter graph manager. The streaming starts at the source filter which inputs data from a source, e.g., an MPEG file or from some remote server. The audio data stream goes through the MPEG filter and the audio renderer filter which provides the final output to the audio output device. The MPEG filter and the audio renderer filter each call DirectDSP which interfaces to the DirectDSP HAL. The HAL in turn passes the data to the VSP hardware for processing.

Use base classes provided in Microsoft's ActiveMovie SDK to construct ActiveDSP filters and input/output pins. The member functions and other class members are added or overridden, if necessary, with an improved implementation by using services provided by DirectDSP. As an overview, the class structure of each filter and pin object, and other data structures used in those classes are listed next.

Copyright 1996, 1997 Texas Instruments Incorporated (unpublished)

Source Filter

```
CLASS CsourceFilter:  public CSource              //base class
                    , public CPersistStream
                    , public ISpecifyPropertyPages
{
public:
    static CUnknown *CreateInstance(LPUNKNOWN lpUnk, HRESULT *phr);
    ~CSourceFilter();
    DECLARE_IUNKNOWN;
    STDMETHODIMP NonDelegatingQueryInterface (REFIID riid, void **ppv);
    // --- ISpecifyPropertyPages ---
    // return our property pages
    STDMETHODIMP GetPages (CAUUID * pPages);
    // setup helper
    LPAMOVIESETUP_FILTER GetSetupData ();
    // --- IPersistStream Interface
    STDMETHODIMP GetClassID(CLSID *pClsid);
    CAudioObject    *m_MidiSeq;              // the class reading audio data
    HWND            m_hWndPropertyPage;      // hWnd of the PropertyPage
private:
    // it is only allowed to to create these objects with CreateInstance
CSourceFilter (LPUNKNOWN lpunk, HRESULT *phr);
    // When the format changes, reconnect . . .
    void CMIDISourceFilter::ReconnectWithNewFormat(void);
};
Source Output Pin
    CLASS CAudioStream:    public CsourceStream       //base class
{
public:
    CAudioStream (HRESULT *phr, CMIDISourceFilter *pParent, LPCWSTR pPinName);
    ~CAuidoStream ();
    BOOL ReadyToStop (void) {return FALSE;}
    // stuff an audio buffer with the current format HRESULT FillBuffer (IMediaSample *pms);
    // ask for buffers of the size appropriate to the agreed media type.
    HRESULT DecideBufferSize (IMemAllocator *pIMemAlloc, ALLOCATOR_PROPERTIES *pProperties);
    // verify we can handle this format HRESULT CheckMediaType (const CMediaType
*pMediaType);
    // set the agreed media type
    HRESULT GetMediaType (CMediaType *pmt);
    // resets the stream time to zero.
    HRESULT OnThreadCreate (void);
    HRESULT OnThreadDestroy (void);
    HRESULT OnThreadStartPlay (void);
    HRESULT Active (void);
    HRESULT Inactive (void);
private:
    // Access to this state information should be serialized with the
    // filters critical section (m_pFilter->pStateLock())
    CCritSec    m_cSharedState;     // use this to lock access to
                                    // m_rtSampleTime and m_AudioObj
                                    // which are shared with the worker
                                    // thread.
    CRefTime    m_rtSampleTime;     // The time to be stamped on each
                                    // sample.
    CAudioObject *m_AudioObj;       // the current midi object
    BOOL        m_fReset;           // Flag indicating the re-start
};
```

-continued

```
Transform Filter
    CLASS CAuidoTransformFilter:     public CTransformFilter,        // base class
                                     public ISpecifyPropertyPages    // needed for a
                                                                     // property page
{
public:
    //
    // --- Com stuff ---
    //
    static CUnknown *CreateInstance (LPUNKNOWN, HRESULT *);
    STDMETHODIMP NonDelegatingQueryInterface (REFIID riid, void ** ppv);
    DECLARE_IUNKNOWN;
    //
    // --- CTransform overrides ---
    //
    HRESULT Receive (IMediaSample *pSample);
    HRESULT CheckInputType (const CMediaType* mtIn);
    HRESULT CheckTransform (const CMediaType* mtIn, const CMediaType* mtOut);
    HRESULT DecideBufferSize (IMemAllocator * pAllocator, ALLOCATOR_PROPERTIES *
pProperties);
    HRESULT StartStreaming ();
    HRESULT StopStreaming ();
    HRESULT SetMediaType (PIN_Direction direction, const CMediaType *pmt);
    HRESULT GetMediaType (int iPosition, CMediaType *pMediaType);
    HRESULT EndOfStream (void);
    HRESULT EndFlush (void);
    CAudioTransformFilter (TCHAR *pName, LPUNKNOWN pUnk, HRESULT *pHr);
    ~CAudioTransformFilter ();
    // setup
    LPAMOVIESETUP_FILTER GetSetupData ();
private:
    // Serialize access to the output pin
    long            m_FrameSize;        // Frame input size (bytes)
    long            m_FrameSizeOutput;  // Frame output size (bytes)
    LPBYTE          m_lpStart;
    LPBYTE          m_lpCurr;
    LPBYTE          m_lpEnd;
    BOOL            m_bPayloadOnly;
    enum            {MAX_FRAMES_PER_OUTPUT_SAMPLE = 4};
    enum            {AUDIO_BUFF_SIZE = (1024 * 8) };
    DWORD           m_dwCtrl;
    AudioCtrl       m_AudioControl;
    CAudioDecoder   *m_pAudioDecoder; // class actually does decoding
    CRefTime        m_TimePerFrame;
    CRefTime        m_TimeAtLastSyncPoint;
    CRefTime        m_TimeSinceLastSyncPoint;
    int             m_FreqDiv;
    int             m_PrefChan;
    int             m_Quality;
    int             m_QuarterInt;
    int             m_WordSize;
    BYTE            m_Buffer [AUDIO_BUFF_SIZE];
    void            ProcessDiscontiuity (IMediaSample *pSample);
    void            ProcessSyncPoint (IMediaSample *pSample, BYTE *pSrc);
    HRESULT         DeliverSample (IMediaSample *pOutSample, CRefTime &TimeDecoded, int iSampleSize);
    void            ResetAudioDecoder ();
    BOOL            LookForSyncWord ();
    int             Padding ();
    void            GetNextPacketChunk (LPBYTE &lpPacket, long &LenLeftInBuffer, long
&LenLeftInPacket);
    CRefTime                m_tStop;
    MPEG1WAVEFORMAT         m_Format;
public:
    LPMEG1WAVEFORMAT get_format () {return &m_Format;}
};
// data structure holds audio control information.
struct AudioCtrl
{
    //
    // Output Frame Buffer
    //
    DWORD       dwOutBuffUsed;
    DWORD       dwOutBuffSize;
    DWORD       dwMpegError;
    LPBYTE      pOutBuffer;
    //
    // Frame decoder control
    //
    DWORD           dwCtrl;
```

-continued

```
    //
    // Input buffer fields
    //
    DWORD       dwNumFrames;
    LPBYTE      pCmprRead;
    LPBYTE      pCmprWrite;
};
Transform Input Pin
    CLASS CAudioTransInputPin:    public CTransformInputPin    //base class
{
public:
    CAudioTransInputPin (TCHAR *pName, CAudioTransformFilter *pFilter, HRESULT *phr,
LPCWSTR pPinName);
    ~CAudioTransInputPin ();
    HRESULT CheckMediaType (const CMediaType *pMediaType);
    HRESULT DecideAllocator (IMemInputPin *pPin, IMemAllocator **ppAlloc);
private:
    CAudioTransformFilter *pTransFilter;
};
Transform Output Pin
    CLASS C_AXDSP_TransOutputPin:    public CTransformOutputPin    //base class
{
public:
    C_AXDSP_TransOutputPin (TCHAR *pName, C_AXDSP_TransformFilter *pFilter, HRESULT *phr,
LPCWSTR pPinName, int PinNumber);
    ~C_AXDSP_TransOutputPin ();
    STDMETHODIMP NonDelegatingQueryInterface (REFIID riid, void **ppv);
    STDMETHODIMP EnumMediaType (IEnumMediaTypes **ppEMediaType);
    HRESULT CheckMediaType (const CMediaType *pMediaType);
    HRESULT SetMediaType (const CMediaType *pMediaType);
    HRESULT GetMediaType (int iPosition, CMediaType *pMediaType);
    HRESULT BreakConnect ();
    HRESULT CheckConnect (IPin *pPin);
    HRESULT CompleteConnect (IPin *pPin);
    HRESULT DecideAllocator (IMemInputPin *pMemIPin, IMemAllocator **ppMA);
    HRESULT DecideBufferSize (IMemAllocator *pMemAlloc, ALLOCATOR_PROPERTIES *pProperty);
    HRESULT Deliver (IMediaSample *pMD);
    HRESULT DeliverEndOfStream ();
    HRESULT DeliverBeginFlush ();
    HRESULT DeliverEndFlush ();
    STDMETHODIMP Notify (IFilter *pFilter, Quality q);
private:
    C_AXDSP_TransformFilter    *m_pTransFilter;
    CPosPassThru               *m_pPosition;
    //other data members --- TODO
};
Audio Rendering Filter
    CLASS CAudioRenderer:    public CBaseRenderer        //base class
                     ,    public ISpecifyPropertyPages
{
public:
    //
    // Constructor and destructor
    //
    static CUnknown *CreateInstance (LPUNKNOWN, HRESULT *);
    CAudioRenderer (TCHAR *pName,LPUNKNOWN pUnk,HRESULT *phr);
    ~CAudioRenderer ();
    //
    // Implement the ISpecifyPropertyPages interface
    //
    DECLARE_IUNKNOWN
    STDMETHODIMP NonDelegatingQueryInterface (REFIID, void **);
    STDMETHODIMP GetPages (CAUUID *pPages);
    // setup helper
    LPAMOVIESETUP_FILTER GetSetupData ();
    CBasePin *GetPin (int n);
    // Override these from the filter and renderer classes
    HRESULT Active ();
    HRESULT BreakConnect ();
    HRESULT CompleteConnect (IPin *pReceivePin);
    HRESULT SetMediaType (const CMediaType *pmt);
    HRESULT CheckMediaType (const CMediaType *pmtIn);
    HRESULT DoRenderSample (IMediaSample *pMediaSample);
    void PrepareRender ();
    HRESULT OnStartStreaming ();
    HRESULT OnStopStreaming ();
    HRESULT OpenAudioDevice ();
    HRESULT CloseAudioDevice ();
public
```

-continued

```
    CAudioMemAllocator    m_AudioAllocator;   //Our allocator
    CAudioTrnasInputPin   m_InputPin;         //IPin based interfaces
    CMediaType            m_mtIn;             //Source connection media type
    CAudioCtrl            m_AudioCtrl;        //
    CAudioReferenceClock  m_MidiClock;        //Audio clock
    HWND                  m_hwnd;             //Control window handle
    HANDLE                m_devhandle;        //Audio device handle
};
// Memory allocator
    CLASS CAudioMemAllocator:    public CBaseAllocator
{
    CBaseFilter    *m_pFilter;       // Delegate reference counts to
    CMediaType     *m_pMediaType;    // Pointer to the current format
    LPBYTE         m_pBuffer;        // combined memory for all buffers
protected:
    STDMETHODIMP    SetProperties (ALLOCATOR_PROPERTIES* pRequest, ALLOCATOR_PROPERTIES* pActual);
    //
    // Call ReallyFree to free memory
    //
    void Free (void);
    // called from the destructor (and from Alloc if changing size/count) to
    // actually free up the memory void ReallyFree (void);
    // overriden to allocate the memory when commit called HRESULT Alloc (void);
public:
    CAudioMemAllocator (CBaseFilter *pFilter, TCHAR *pName, HRESULT *phr);
    ~CAudioMemAllocator ();
    STDMETHODIMP_(ULONG) NonDelegatingAddRef ();
    STDMETHODIMP_(ULONG) NonDelagatingRelease ();
    void NotifyMediaType (CMediaType *pMediaType);
    void CloseAudioDevice ();
};
// Our reference clock
    CLASS CAudioReferenceClock:  public Cunknown
                              ,  public IReferenceClock
                              ,  public CAMSchedule
                              ,  public CCritSec
{
public:
    CAudioReferenceClock (TCHAR *pName, LPUNKNOWN pUnk, HRESULT *phr, CBaseRenderer *pRenderer);
    ~CAudioReferenceClock ();
    STDMETHODIMP NonDelegatingQueryInterface (REFIID riid, void ** ppv);
    DECLARE_IUNKNOWN
    /* IReferenceClock methods */
    // Derived classes implement GetPrivateTime (). This GetTime
    // calls GetPrivateTime and then checks so that time does not go backwards. // A
return code of S_FALSE implies that the internal clock has gone backwards
    // and GetTime time has halted until internal time has caught up.
        STDMETHODIMP GetTime (REFERENCE_TIME *pTime);
    // When this is called, it sets m_rtLastGotTime to the time it returns.
    /* Provide standard mechanisms for scheduling events */
    /* Ask for an async notification that a time has elapsed */
        STDMETHODIMP AdviseTime   (REFERENCE_TIME baseTime, // base reference time
                                   REFERENCE_TIME streamTime, // stream offset time
                                   HEVENT hEvent,        // advise via this event
                                   DWORD *pdwAdviseCookie // where your cookie goes
);
    /* Ask for an asynchronous periodic notification that a time has elapsed */
    STDMETHODIMP AdvisePeriodic (
    REFERENCE_TIME StartTime,       // starting at this time
    REFERENCE_TIME PeriodTime,      // time between notifications
    HSEMAPHORE hSemaphore,          // advise via a semaphore
    DWORD *pdwAdviseCookie          // where your cookie goes
);
    /* Cancel a request for notification(s) - if the notification was a one
     * shot timer then this function doesn't need to be called as the advise is
     * automatically cancelled, however it does no harm to explicitly cancel a
     * one-shot advise. Clients call Unadvise to clear a
     * Periodic advise setting.
     */
    STDMETHODIMP Unadvise (DWORD dwAdviseCookie);
    /* Methods for the benefit of derived classes or outer objects */
    // Overrides CAMSchedules version in order to trigger the thread if needed
    DWORD AddAdvisePacket ( const REFERENCE_TIME & time1, const REFERENCE_TIME & time2,
HANDLE h, BOOL periodic );
    // GetPrivateTime () is the REAL clock. GetTime is just a cover for it.
    // Derived classes will probably override this method but not GetTime ()
    // itself.
```

-continued

```
        // The important point about GetPrivateTime () is it's allowed to go backwards.
        // Our GetTime () will keep returning the LastGotTime until GetPrivateTime ()
        // catches up.
        virtual REFERENCE_TIME GetPrivateTime ();
        /* Provide a method for correcting drift */
        STDMETHODIMP SetTimeDelta ( const REFERENCE_TIME& TimeDelta );
        STDMETHODIMP_(ULONG) NonDelegatingAddRef ();
        STDMETHODIMP_(ULONG) NonDelegatingRelease ();
        void NotifyMediaType (CMediaType *pMediaType);
        void SetAudioDeviceHandle (HANDLE);
        DWORD GetTime (DWORD dwTicks);
        DWORD GetTicks (DWORD msTime);
protected:
        REFERENCE_TIME    m_rtPrivateTime;      // Current best estimate of time
        REFERENCE_TIME    m_rtLastGotTime;      // Last time returned by GetTime
        REFERENCE_TIME    m_rtNextAdvise;       // Time of next advise
        UINT              m_TimerResolution;
        DWORD             m_PrevSamples;        // Previous ticks returned from midi
        DWORD             m_PrevSysTime;        // Previous system time reference
        DWORD             m_PrevAudioTime;      // Previous audio time reference
        CBaseRenderer     *m_AudioRenderer;     // pointer to the renderer
        MMTIME            m_mmt;
        DWORD             m_TimeFormatFlag;
        DWORD             m_SamplesPerSec;
// Thread stuff
public:
        void TriggerThread ()    // Wakes thread up. Need to do this if
                                 // { m_Event.Set (); } time to next advise
private:
        BOOL          m_bAbort;       // Flag used for thread shutdown
        CAMEvent      m_Event;        // Signal when its time to check advises
        HANDLE        m_hThread;      // Thread handle
        HRESULT AdviseThread ();      // Method in which the advise thread runs
        static DWORD _stdcall AdviseThreadFunction (LPVOID);    // Function is used to
                                                                // get there
};
// Audio Control Window
        class CAudioCtrl : public CBaseControlWindow, public CBasicAudio
{
protected:
        CBaseRenderer    *m_pRenderer;     // Owning sample renderer object
        SIZE             m_Size;
public:
        CAudioCtrl    (TCHAR *pName,           // Object description
                       LPUNKNOWN pUnk,          // Normal COM ownership
                       HRESULT *phr,            // OLE failure code
                       CCritSec *pInterfaceLock,  // Main critical section
                       CAudioRenderer *pRenderer);  // Delegates locking to
        ~CAudioCtrl ();
        STDMETHODIMP   NonDelegatingQueryInterface (REFIID ridd, void **ppv);
        HRESULT        InitWindowRegion (TCHAR *pStringName);
        HFONT          CreateVideoFont ();
        RECT           GetDefaultRect ();
        void           GetVideoFormat (VIDEOINFO *pVideoInfo);
        // Pure virtual methods for the IBasicVideo interface
        LPTSTR GetClassWindowStyles    (DWORD *pClassStyles,
                                        DWORD *pWindowStyles,
                                        DWORD *pWindowStylesEx);
        //
        // Method that gets all the window messages
        //
        LRESULT OnReceiveMessage    (HWND hwnd,              // Window handle
                                     UINT uMsg,              // Message ID
                                     WPARAM wParam,          // First parameter
                                     LPARAM lParam);         // Other parameter
        // Implement IBasicAudio Interface
        STDMETHODIMP put_Volume (long lVolume);
        STDMETHODIMP get_Volume (long *plVolume);
        STDMETHODIMP put_Balance (long lBalance);
        STDMETHODIMP get_Balance (long *plBalance);
};
Audio Rendering Input Pin
        CLASS CAudioRendererInputPin:    public CBaseInputPin    //base class
{
        CAudioRenderer   *m_pRenderer;        // The renderer that owns us
        CCritSec         *m_pInterfaceLock;   // Main filter critical section
public:
        //
        // Constructor
```

-continued

```
//
CAudioRendererInputPin (
    TCHAR *pObjectName,         // Object string description
    CAudioRenderer *pRenderer,  // Used to delegate locking
    CCritSec *pInterfaceLock,   // Main critical section
    HRESULT *phr,               // OLE failure return code
    LPCWSTR pPinName);          // This pins identification
//
// Manage our allocator
//
STDMETHODIMP GetAllocator (IMemAllocator **ppAllocator);
STDMETHODIMP NotifyAllocator (IMemAllocator *pAllocator, BOOL bReadOnly);
};
```

NT Driver Model Review

Windows NT Kernel-Mode Driver Architecture

Windows NT has applications and user-mode drivers lie atop subsystems in the user mode. Through the I/O System Services in the kernel mode, subsystems obtain services from kernel-mode drivers. Kernel-mode drivers are part of the Windows NT executive, the underlying micro kernel-based operating system that supports protected subsystems. All NT drivers have a set of system-defined standard driver routines with some driver-specific internal routines.

Three basic types of kernel-mode drivers are listed next:

Device Drivers directly control the physical devices. Example: parallel port driver.

Intermediate drivers use the services provided by the device drivers. Example: class driver for a specific device type provides device-generic services and directs device-specific requests to device driver.

File system drivers respond to the underlying lower-level drivers. Example: NTFS driver (Windows NT File System driver)

A first driver layout has I/O system services above a class driver and that class driver established above a port driver. Hardware is below port driver. The port driver provides hardware-specific support, while the class driver handles generic requests to the device class and directs hardware-specific requests to the port driver coupled thereupon to hardware. This generic layout is also employed in WDM for the class driver and the miniport driver. An example of this layout is NT video drivers. NT sound drivers follow a second layout, which stands as a single layer above hardware and below I/O system services.

An I/O Manager accepts I/O requests from user-mode applications, routes them to appropriate kernel-mode drivers in the form of IRPs (I/O request packets), monitors IRPs until they are completed, and returns the status to the original requester. Through IRPs, the I/O manager also coordinates the communications between kernel-mode drivers and between the drivers and other Windows NT kernel-mode components such as memory manager and the kernel.

To communicate with the I/O Manager, NT drivers handle basic requests—opening a device object, reading data from the device and writing data to the device, and unloading the driver. Moreover, to be compatible with other drivers in the layered driver chain, NT drivers provide the same set of driver routines as other drivers for the same type of device.

An IRP is sent first to the driver's dispatch routine DDDispatchReadWrite for a given major function code (IRP_MJ_XXX). Every driver routine that processes IRPs calls IoGetCurrentIrpStackLocation to determine what action to take and what parameters to use.

The IRP requests a data transfer operation. After verifying the parameters for the read/write request, the Dispatch routine calls IoMarkIrpPending to indicate that the IRP is not yet completed, and IoStartPacket to queue or pass the IRP on to the driver's StartIo routine for further processing. If the driver is currently busy processing another IRP on the device, IoStartPacket inserts the IRP into the device queue associated with the device object. If the driver is not busy and the device queue is empty, its StartIo routine DDStartIO is called immediately by executing an input IRP to call DDStartIO.

Assuming the StartIo routine finds that the transfer can be done by a single DMA operation, the StartIo routine calls IoAllocateAdapterChannel with the entry point of the driver's AdapterControl routine and the IRP. When the system DMA controller is available, an IRP next calls the Adapter-Control routine DDAdapterControl to set up the transfer operation. The AdapterControl routine calls IoMapTransfer with a pointer to the buffer, described in the MDL at Irp→MdlAddress, to set up the system DMA controller. Then, the driver programs its device for the DMA operation and returns. When the device interrupts to indicate its transfer operation is complete, the driver's ISR DDInterruptService stops the device from generating interrupts and calls IoRequestDpc which executes another IRP to queue the driver's DpcForIsr routine DDDpcForIsr to complete as much of the transfer operation as possible at a lower hardware priority (IRQL).

When the DpcForIsr routine has done its processing for the transfer, it calls IoStartNextPacket promptly so the driver's StartIo routine is called with the next IRP in the device queue. The DpcForIsr also sets the just completed IRP's I/O status block and then calls IoCompleteRequest with the IRP.

In the above diagram, the driver uses system DMA. For NT device drivers, the set of standard routines varies according to the nature and the design of the device. For example, a driver may set up its device object for direct or buffered I/O. For more information on standard driver routines and details on how the I/O manager handles an I/O request, see the kernel-mode driver Design Guide on Windows NT 4.0 DDK.

DirectDSP Architecture on Windows NT

On Windows95, requests are directed to the VSP kernel through DirectDSP HAL. Following Windows NT kernel-mode driver model, DirectDSP HAL is integrated into the DirectDSP sound system driver.

In FIG. 94, DirectDSP objects utilized by the VSP kernel to carry out its tasks are managed by the kernel-mode driver. The DirectDSP device driver sets up communication with the VSP kernel as follows: allocates/locks memory pages from system memory pool and loads the VSP program image; allocates/locks memory pages from system memory pool and sets up the VSP message queue and the host message queue; allocates memory for the double buffer used for transferring data between the host and the VSP kernel; and creates/initializes other VSP objects. The DirectDSP device driver also cleans up all the system memory it allocates and objects it creates when its Unload routine is called.

Upon loading of DirectDSP device driver, the driver sets up the VSP kernel through registers in the wrapper as discussed elsewhere herein. When the VSP kernel begins executing, the driver communicates with the DSP kernel by putting messages into the VSP message queue; meanwhile, the VSP kernel communicates with the driver by putting messages into the Host message queue and generating interrupts.

The DirectDSP device driver has the following routines:

| Routine Name | Description |
| --- | --- |
| SoundCardInstanceInit | Called by DriverEntry. Performs initializations: allocates system memory, find PCI device, creates device objects, and calls SoundInitHardwareConfig to initialize hardware configuration. |
| SoundExcludeRoutine | Performs mutual exclusion for devices. |
| SoundShutDown | Called when the system is shutting down. |
| SoundInitHardwareConfig | Initialize IO ports, Interrupt lines, and DMA common buffers, and reports the used resources. |
| SoundGetCommonBuffers | Called when initializing DMA. Gets an adapter object, and creates the common buffer. |
| SoundWavecreate/ DspSetupHw | Called on IRP_MJ_CREATE. Loads DSP program, creates DSP objects, and initializes the source and destination page lists. |
| SoundWaveData | Called on IRP_MJ_READ/WRITE. Calls IoMarkIrpPending and SoundStartWaveDevice. |
| SoundStartWaveDevice | Places the IRP to the queue; Processes data if the device is playing; Sets the wave format, and calls SoundSynchTimer and SoundStartDMA. |
| SoundStartDMA | DDStartIo routine. Allocates DMA adapter channel; sets up the timer; and programs the DMA registers for the transfer, SoundMapDMA. |
| SoundProgramDMA | DDAdapterControl routine. |
| SoundStopDMA | Cancels the timer; terminates DMA; resets events; and calls DspFreeRemainBuffer. |
| SoundWaveCleanup | Called on IRP_MJ_CLOSE. Cleans up the driver's space. |
| SoundISR | ISR routine. Acknowledges incoming interrupts; and calls DspMessageHandler to process messages in the host message queue. |
| DspDpc | Dpc for ISR. Calls SoundWaveDeferred. |
| SoundWaveDeferred | Calls SoundInDeferred/SoundOutDeferred, and synchronizes the execution. |
| SoundSynchTimer | Handles the timer. |
| SoundTestDeviceDeferred | The timer's Dpc. |
| DspStartDMA | The hardware DMA setup routine. Creates hardware buffers and sends DSP message to play the data. |
| DspStopDMA | Hardware DMA stop routine. Sends DSP message to stop and releases hardware buffers. |

Data Structures

STRUCTURE GLOBAL_DEVICE_INFO: Driver Global Data Structure Shared By Each Device Object

| Attribute Name | Data Type | Description |
| --- | --- | --- |
| Key | ULONG | |
| Next | GLOBAL_DEVICE_INFO * | |
| BusType | INTERFACE_TYPE | |
| BusNumber | ULONG | |
| InterruptVector | ULONG | |
| InterruptRequestLevel | KIRQL | |
| ShutdownRegistered | BOOLEAN | |

-continued

| Attribute Name | Data Type | Description |
| --- | --- | --- |
| WaveMutex | KMUTEX | Dispatcher object controlling access to the device object |
| MidiMutex | KMUTEX | If MIDI is defined |
| MemType | ULONG | |
| DeviceObject[] | PDEVICE_OBJECT | |
| DeviceInUse | UCHAR | |
| MidiInUse | UCHAR | If MIDI is defined |
| WaveInfo | WAVE_INFO | |
| HwContext | DSPHWCONTEXT | Hardware data |
| Synth | GLOBAL_SYNTH_INFO | Synth global data |
| MixerInfo | MIXER_INFO | |
| LocalMixerData | LOCAL_MIXER_DATA | |
| RegistryPathName | PWSTR | Registry path |

STRUCTURE SOUND_CONFIG_DATA: Sound Card Configuration Data

| Attribute Name | Data Type | Description |
| --- | --- | --- |
| Port | ULONG | |
| InterruptNumber | ULONG | |
| MixerSettings[] | MIXER_CONTROL_DATA_ITEM | |
| MixerSettingsFound | BOOLEAN | |

STRUCTURE DHBUFTABLE: VSP Hardware Buffer Table

| Attribute Name | Data Type | Description |
| --- | --- | --- |
| PMdl | PMDL | |
| DwBufferPhys | DWORD | Physical address of buffer |
| DwBufferLinear | DWORD | Linear address of buffer |
| DwBufferLength | DWORD | Length in bytes of buffer |

STRUCTURE MESSAGEQUEUE: VSP Mesage Queue

| Attribute Name | Data Type | Description |
| --- | --- | --- |
| PMQ | WORD * | Linear address of the pipe |
| PMQHead | WORD * | Head pointer in the pipe |
| pMQTail | WORD * | Tail pointer in the pipe |
| MQSize | DWORD | Message queue size |

STRUCTURE PACKET: For Packet-Based DMA Transfer

| Attribute Name | Data Type | Description |
| --- | --- | --- |
| dwPacketLength | DWORD | |
| Next | PACKET * | Point to the next packet |

STRUCTURE TASKBUFFER: VSP Task Buffer

| Attribute Name | Data Type | Description |
|---|---|---|
| wNumQueuedPacket | WORD | |
| wBufferType | WORD | Source or destination buffer |
| wBufferStarted | WORD | 1 if DSP started working on this buffer |
| wNextHalf | WORD | |
| dwCurPacketLength | DWORD | |
| dwQuePacketLength | DWORD | |

STRUCTURE DSPHWCONTEXT: VSP Hardware Context

| Attribute Name | Data Type | Description |
|---|---|---|
| DspBuffer[5] | DHBUFTABLE | |
| wIOAddressCODEC | WORD | |
| PortBase | PUCHAR | |
| wIRQ | WORD | |
| DspMQueue | MESSAGEQUEUE | |
| HostMQueue | MESSAGEQUEUE | |
| pObject | DHOBJECT * | |
| CODECMutex | KMUTEX | |
| wDspInit | WORD | |
| bIntFired | BYTE | |
| pDSPData | WORD | |
| wDSInitialized | WORD | |

STRUCTURE DHOBJECT: VSP Hardware Object

| Attribute Name | Data Type | Description |
|---|---|---|
| ReferenceCount | DWORD | |
| wObjectID | WORD | |
| TaskBuffer[2] | TASKBUFFER | |
| piDSPContext | PVOID | |
| dwiDSPContextPhysAddr | DWORD | |
| bSignalFlag | volatile BYTE | |
| bObjectType | BYTE | |
| pMdl | PMDL | |

STRUCTURE SOUND_DMA_BUFFER

| Attribute Name | Data Type | Description |
|---|---|---|
| AdapterObject[2] | PADAPTER_OBJECT | We may use 2 channels |
| BufferSize | ULONG | |
| VirtualAddress | PVOID | |

| Attribute Name | Data Type | Description |
|---|---|---|
| LogicalAddress | PHYSICAL_ADDRESS | |
| Mdl | PMDL | |

STRUCTURE SOUND_DOUBLE_BUFFER

| Attribute Name | Data Type | Description |
|---|---|---|
| NextHalf | enum {LowerHalf = 0, UpperHalf} | |
| BufferSize | ULONG | |
| BufferPosition | PUCHAR | |
| StartOfData | ULONG | Start of valid data |
| nBytes | ULONG | Number of bytes in buffer |
| bytesFinished | ULONG | |
| Pad | UCHAR | Padding byte to use |

STRUCTURE SOUND_BUFFER_QUEUE: Control Processing of Device Queue

| Attribute Name | Data Type | Description |
|---|---|---|
| QueueHead | LIST_ENTRY | Head of the queue if Irps for writing to / reading from device. Entries are cancellable Irps. |
| BytesProcessed | ULONG | Bytes put into or copied from buffers |
| UserBufferSize | ULONG | |
| UserBufferPosition | ULONG | |
| UserBuffer | PUCHAR | Buffer corresponding to next user |
| pIrp | PIRP | Pointer to the current request |
| ProgressQueue | LIST_ENTRY | Wave output buffers in progress. Entries on this queue are not cancellable. |

STRUCTURE LOWPRIORITYMODEINFO

| Attribute Name | Data Type | Description |
|---|---|---|
| BufferQueue | SOUND_BUFFER_QUEUE | |
| SamplesPerSec | ULONG | |
| BitsPerSample | UCHAR | |
| Channels | UCHAR | |
| WaveFormat | PWAVEFORMATEX | |
| State | ULONG | |

STRUCTURE WAVE_INFO

| Attribute Name | Data Type | Description |
|---|---|---|
| Key | ULONG | |
| DeviceObject | PDEVICE_OBJECT | Current real device |
| DMABuf | SOUND_DMA_BUFFER | |
| DoubleBuffer | SOUND_DOUBLE_BUFFER | |
| BufferQueue | SOUND_BUFFER_QUEUE | |
| SamplesPerSec | ULONG | |
| BitsPerSample | UCHAR | |
| Channels | UCHAR | |
| FormatChanged | BOOLEAN | |
| WaveFormat | PWAVEFORMATEX | |
| LowPrioritySaved | BOOLEAN | |

-continued

| Attribute Name | Data Type | Description |
|---|---|---|
| LowPriorityHandle | PFILE_OBJECT | |
| LowPriorityDevice | PLOCAL_DEVICE_INFO | |
| LowPriorityModeSave | LOWPRIORITYMODEINFO | |
| MRB[2] | PVOID | Info about adapter for DMA |
| DmaSetupEvent | KEVENT | Event to wait for Dma channel to be allocated |
| DpcEvent | KEVENT | Dpc routine sets this event when it has finished. |
| TimerDpcEvent | KEVENT | |
| DeviceSpinLock | KSPIN_LOCK | Spin lock for synchmonizing with Dpc routine |
| LockHeld | BOOLEAN | Get spin locks right (if DBG is defined) |
| Interrupt | PKINTERRUPT | |
| Direction | BOOLEAN | TRUE = out, FALSE = in |
| InterruptHalf | UCHAR | Used with SoundReprogramOnInterruptDMA as next half to use. |
| DMABusy | volatile BOOLEAN | Set if DMA in progress<br>Dpc routine can turn it off so make it volatile |
| DpcQueued | volatile BOOLEAN | Set by Isr, cleared by Dpc routine and tested by SoundStopDMA |
| Overrun | ULONG | Interrupts overran Dpcs<br>Managed at DEVICE level |
| HwContext | PVOID | Context for hardware interface routines |
| WaveStopWorkItem | WORK_QUEUE_ITEM | |
| WaveReallyComplete | KEVENT | |
| QueryFormat | PSOUND_QUERY_FORMAT ROUTINE | Format query and set routine |
| HwSetupDMA | PWAVE_INTERFACE ROUTINE | Outside Spin lock |
| HwStopDMA | PWAVE_INTERFACE ROUTINE | Outside spin lock |
| HwSetWaveFormat | PWAVE_INTERFACE ROUTINE | Set the format to use |
| TimerDpc | KDPC | |
| DeviceCheckTimer | KTIMER | |
| GotWaveDpc | BOOLEAN | This flag is set if the device is up |
| DeviceBad | BOOLEAN | |
| TimerActive | BOOLEAN | Need to synch timer routine |
| FailureCount | UCHAR | If we fail 30 times in a row give up |

Definitions and Macros

| | |
|---|---|
| DMAEnter(pWave) | { KIRQL OldIrq1;<br>ASSERT ((pWave)->LockHeld == FALSE);<br>KeAcquireSpinLock(&(pWave)->DeviceSpinLock, &OldIrq1);} |
| DMALeave(pWave) | {ASSERT((pWave)->LockHeld == TRUE);<br>KeReleaseSpinLock(&(pWave)->DeviceSpinLock, OldIrq1);} |
| INPORT(pHw, port) | READ_PORT_USHORT((PUSHORT) (((pHw)->PortBase) + (port))) |
| OUTPORT(pHw, port, data) | WRITE_PORT_USHORT((PUSHORT) (((pHw)->PortBase) + (port)), (WORD) (data)) |
| INTERRUPT_MODE | LevelSensitive |
| IRQ_SHARABLE | FALSE |
| NUMBER_OF_DSP_PORTS | 0x20 |

Functions
Microsoft-Defined Functions

| | | |
|---|---|---|
| VOID | HwEnter | (PDSPHWCONTEXT pHw) |
| BOOLEAN | HwInitialize | (PWAVE_INFO WaveInfo, PDSPHWCONTEXT pHw) |
| VOID | HwLeave | (PDSPHWCONTEXT pHw) |
| VOID | SoundClearDoubleBuffer | (IN OUT PWAVE_INFO WaveInfo) |
| BOOLEAN | SoundFillInputBuffers | (PWAVE_INFO_WaveInfo, ULONG BufferPosition) |
| VOID | SoundFreeCommonBuffer | (IN OUT PSOUND_DMA_BUFFER SoundAutoData) |
| VOID | SoundFreeWaveOutputBuffers | (PLIST_ENTRY Queue, ULONG BytesProcessed) |
| NTSTATUS | SoundGetCommonBuffer | (IN PDEVICE_DESCRIPTION DeviceDescription, IN OUT PSOUND_DMA_BUFFER SoundAutoData) |

-continued

| | | |
|---|---|---|
| VOID | SoundGetNextBuffer | (PSOUND_BUFFER_QUEUE BufferQueue) |
| NTSTATUS | SoundGetSynthConfig | (IN OUT PGLOBAL_DEVICE_INFO pGDI) |
| VOID | SoundInitializeBufferQ | (PSOUND_BUFFER_QUEUE BufferQueue) |
| VOID | SoundInitializeDoubleBuffer | (IN OUT PWAVE_INFO WaveInfo) |
| NTSTATUS | SoundInitHardwareConfig | (IN OUT PGLOBAL_DEVICE_INFO pGDI, IN OUT PULONG Port, IN OUT PULONG InterruptNumber) |
| VOID | SoundInitializeWaveInfo | (PWAVE_INFO WaveInfo, PSOUND_QUERY_FORMAT_ROUTINE QueryFormat, PVOID HwContext) |
| BOOLEAN | SoundISR | (IN PKINTERRUPT pInterrupt, IN PVOID Context) |
| VOID | SoundLoadDMABuffer | (PSOUND_BUFFER_QUEUE BufferQueue, PSOUND_DOUBLE_BUFFER DoubleBuffer, ULONG BufferPosition) |
| VOID | SoundQueueWaveComplete | (PWAVE_INFO WaveInfo) |
| NSTATUS | SoundReadConfiguration | (IN PWSTR ValueName, IN ULONG ValueType, IN PVOID ValueData, IN ULONG ValueLength, IN PVOID Context, IN PVOID EntryContext) |
| VOID | SoundResetOutput | (IN OUT PSOUND_BUFFER_QUEUE BufferQueue) |
| NTSTATUS | SoundSaveConfig | (IN PWSTR DeviceKey, IN ULONG Port, IN ULONG Interrupt) |
| NTSTATUS | SoundSetWaveInputState | (IN OUT PLOCAL_DEVICE_INFO pLDI, IN ULONG State, IN PFILE_OBJECT FileObject) |
| NTSTATUS | SoundSetWaveOutputState | (PLOCAL_DEVICE_INFO pLDI, ULONG State, PIRP pIrp) |
| BOOLEAN | SoundSignalDpcEnd | (PVOID Context) |
| VOID | SoundStartWaveRecord | (IN OUT PLOCAL_DEVICE_INFO pLDI) |
| VOID | SoundStopWaveRecord | (IN OUT PLOCAL_DEVICE_INFO pLDI) |
| NTSTATUS | SoundSynthPortValid | (IN OUT PGLOBAL_DEVICE_INFO pGDI) |
| VOID | SoundSynchTimer | (IN PWAVE_INFO WaveInfo) |
| VOID | SoundTestDeviceDeferred | (IN PKDPC Dpc, IN PVOID Context, IN PVOID Param1, IN PVOID Param2) |
| BOOLEAN | SoundTestInterruptAndDMA | (IN PGLOBAL_DEVICE_INFO pGDI) |
| INT | SoundTestWaveDevice | (IN PDEVICE_OBJECT pDO) |
| NTSTATUS | SoundWaveCleanup | (IN OUT PLOCAL_DEVICE_INFO pLDI, IN PFILE_OBJECT FileObject) |
| VOID | SoundWaveCreate | (IN OUT PLOCAL_DEVICE_INFO pLDI, IN PIRP pIrp, IN PIO_STACK_LOCATION pIrpStack) |
| VOID | SoundWorkerStopWave | (PVOID Context) |
| IO_ALLOCATION_ACTION | SoundProgramDMA | (IN PDEVICE_OBJECT pDO, IN PIRP pIrp, IN PVOID pMRB, IN PVOID Context) |
| VOID | SoundStartDMA | (IN PWAVE_INFO WaveInfo) |
| VOID | SoundStopDMA | (IN PWAVE_INFO WaveInfo, IN BOOLEAN Pause) |
| VOID | SoundTerminateDMA | (IN PWAVE_INFO WaveInfo, IN BOOLEAN Pause) |
| VOID | SoundFreeLowPriority | (PWAVE_INFO WaveInfo) |
| NTSTATUS | SoundIoctlSetLowPriority | (IN OUT PLOCAL_DEVICE_INFO pLDI, IN PFILE_OBJECT FileObject) |
| NTSTATUS | SoundRestoreLowPriority | (IN OUT PLOCAL_DEVICE_INFO pLDI) |
| VOID | SoundSaveLowPriority | (IN OUT PLOCAL_DEVICE_INFO pLDI) |
| BOOLEAN | MixSetADCHardware | (PGLOBAL_DEVICE_INFO pGDI, ULONG ControlId) |
| BOOLEAN | MixSetMasterVolume | (PGLOBAL_DEVICE_INFO pGDI, ULONG ControlId) |
| BOOLEAN | MixSetMute | (PGLOBAL_DEVICE_INFO pGDI, ULONG ControlId) |
| BOOLEAN | MixSetVolume | (PGLOBAL_DEVICE_INFO pGDI, ULONG ControlId) |

DirectDSP-Specific Functions

| | | |
|---|---|---|
| NTSTATUS | DspAllocateProgramSpace | (PDSPHWCONTEXT pHwContext) |
| NTSTATUS | DspBootProgram | (PDSPHWCONTEXT pHwContext, WORD data) |
| NTSTATUS | DspFreeProgramSpace | (PDSPHWCONTEXT pHwContext) |
| NTSTATUS | DspLoadProgram | (PDSPHWCONTEXT pHwContext, PUNICODE_STRING fileName) |
| NTSTATUS | DspCloseFile | (HANDLE NtFileHandle) |
| NTSTATUS | DspOpenFile | (PUNICODE_STRING filename, HANDLE *pNtFileHandle) |
| NTSTATUS | DspReadFile | (PVOID pBuf, PLARGE_INTEGER FilePos, ULONG dwLength, HANDLE NtFileHandle) |
| NTSTATUS | DspCreateHwBuffer | (PGLOBAL_DEVICE_INFO pGDI, DHOBJECT *pObject, IN PWAVE_INFO WaveInfo) |
| NTSTATUS | DspCreateObject | (PGLOBAL_DEVICEINFO pDGI, OUT DHOBJECT ** ppObject) |
| VOID | DspDpc | (PKDPC pDpc, PDEVICE_OBJECT pDeviceObject, PIRP pIrp, PVOID Context) |
| VOID | DspFreeRemainBuffer | (IN OUT PWAVE_INFO WaveInfo) |
| ULONG | DspGetPosition | (IN PWAVE_INFO WaveInfo) |
| NTSTATUS | DspInitialize | (PGLOBAL_DEVICE_INFO pGDI, DHOBJECT *pObject) |

-continued

| | | |
|---|---|---|
| VOID | DspLoadDMABuffer | (IN OUT PWAVE_INFO WaveInfo) |
| NTSTATUS | DspRelease | (PGLOBAL_DEVICE_INFO pGDI, DHOBJECT *pObject) |
| NTSTATUS | DspReleaseHwBuffer | (PGLOBAL_DEVICE_INFO pGDI, DHOBJECT *pObject) |
| NTSTATUS | DspReleaseObject | (PGLOBAL_DEVICE_INFO pGDI, IN DHOBJECT *pObject) |
| NTSTATUS | DspSetupHw | (IN PWAVE_INFO WaveInfo) |
| NTSTATUS | DspMapDMA | (IN PWAVE_INFO WaveInfo) |
| BOOLEAN | DspStartDMA | (IN PWAVE_INFO WaveInfo) |
| BOOLEAN | DspStopDMA | (IN PWAVE_INFO WaveInfo) |
| NTSTATUS | FindPCIDevice | (IN USHORT VendorID, IN USHORT DeviceID, OUT PULONG BusNumber, OUT PCI_COMMON_CONFIG * PciData, IN ULONG dwBufLength) |
| VOID | SendDspMessage | (PGLOBAL_DEVICE_INFO pGDI) |

NetMeeting/NetConferencing Using Active DSP/ActiveX

Figure 2:
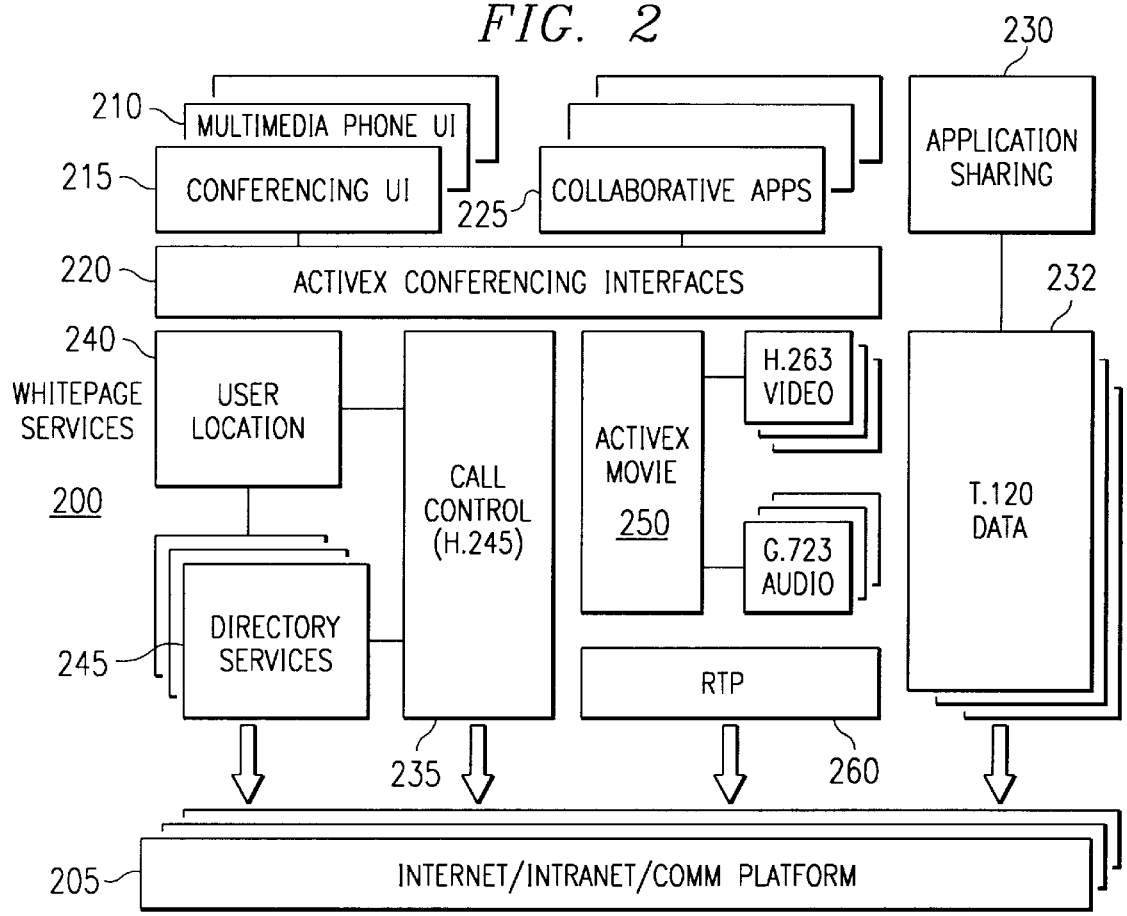
FIG. 2 is a process diagram or method-of-operation diagram showing interrelated improved processes in a network videoconferencing and full-featured system of FIG. 1.

In FIG. 2, the boxes Active X Conferencing Interfaces, Active X Movie, H. 263 Video, G.723 Audio, and Internet/Intranet Comm Platform are implemented with ActiveDSP Filters which calls Direct DSP for services. When WDM is available, ActiveDSP and DirectDSP further provide data steaming for all the ActiveDSP filters and renderers.

Associated with the ASIC wrapper circuitry is a DSP which adds substantial computing power to the system, especially because the DSP is already architected for modem, voice, audio, and imaging/video processing. The VSP is the wrapper/DSP combination and the ASIC wrapper is known as the VSP wrapper ASIC. By making the VSP a PCI super bus master, the VSP can page code and data from host main memory over the PCI bus as it is needed thus reducing the amount of external VSP SRAM and cost. Overall system cost is further reduced by replacing fixed functionality hardware with the VSP which is capable of performing multiple multimedia tasks, i.e. the VSP virtualizes fixed function hardware.

The improved system implements, via the PCI bus, the following applications: Modem, DirectSound/Direct3Dsound, FM Synthesis, Wavetable Synthesis, Dolby Digital/MPEG-2 decode on 2 speakers (surround virtually placed). The hardware provides power management, joystick I/F, MIDI port.

Figure 52:
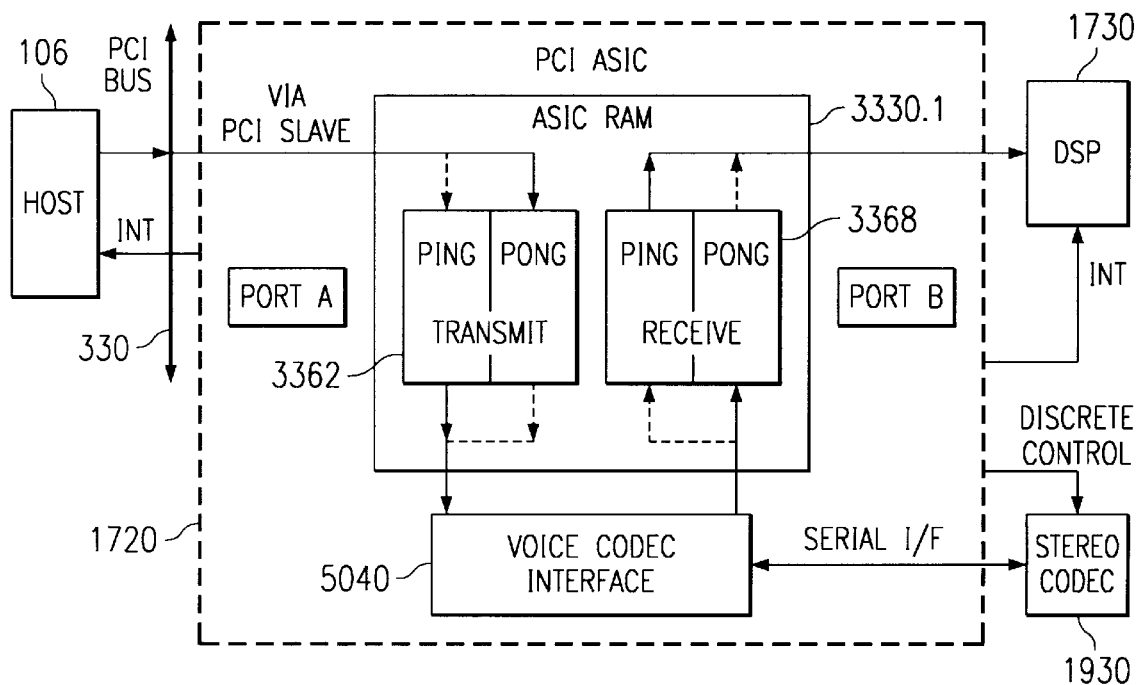
FIG. 52 is a simplified electrical block diagram emphasizing a dual port memory DPRAM operated in part as a ping-pong buffer in the wrapper ASIC with a wrapper voice codec interface in a system embodiment such as in FIG. 50.

A system architecture embodiment is depicted in FIG. 52 of incorporated U.S. patent application Ser. No. 08/823,257, now U.S. Pat. No. 5,987,590. The DirectDSP HAL provides low-level services for Windows 95 and Windows 3.11 multimedia applications and DOS applications running under windows. The DirectDSP HAL is dynamically loadable advantageously reducing demand for host memory resources. The DirectDSP HAL receives requests from either 16-bit or 32-bit windows and DOS applications and handles the requests via the appropriate DLL or VxD. The requests to the DirectDSP HAL are processed to determine if the required VSP throughput (MIPS) is available. Once established the DirectDSP HAL creates a VSP object and sends the VSP the appropriate messages to begin processing the VSP object. Because the VSP is a PCI bus master, the VSP kernel can cache VSP task program and data from host main memory. The DirectDSP HAL locks down host main memory and formats VSP program and data to occupy the memory. Depending on the task, application audio and modem data are transferred between host main memory and VSP hardware by the VSP or alternatively the data are transferred by the host via slave PCI transactions. If the VSP transfers the data, then host throughput is enhanced for other multimedia tasks.

The DirectDSP HAL is 32-bit code residing at ring 0, the code having a combination of C and assembly language for time critical functionality. The DirectDSP HAL conforms to Microsoft Windows conventions. Calls to the virtual machine manager (VMM) are made by the DirectDSP HAL to establish real-Lime priorities. The first call to the DirectDSP HAL causes the DirectDSP HAL to be loaded which in turn initializes the VSP hardware by allocating host memory resources for VSP program and data, filling these areas with each VSP load module (VSP code and data), configuring the VSP hardware, and boatloading the VSP. Next the VSP initializes the VSP kernel by retrieving code and data from host main memory. The DirectDSP HAL also locks down audio/modem application data in host main memory for bus master access by the VSP. Memory buffers of data are passed to the DirectDSP HAL for processing by the VSP. The DirectDSP HAL locks down the memory pages used by these buffers so that the Windows OS will not relocate the pages to disk. Once locked down the DirectDSP HAL acquires the physical memory addresses of the pages and stores them in memory for the VSP to use in accessing the data via the PCI bus. The DirectDSP HAL also passes data between the host and the VSP hardware via slave PCI accesses. The DirectDSP HAL communicates with the VSP via either data structures located in host main memory or in the VSP wrapper ASIC RAM. Interrupts from the VSP to host occur via the PCI Bus. Interrupts from the host to the VSP are generated by writing the appropriate register in the wrapper ASIC.

In FIG. 50, one system embodiment has a TMS320BC52 or TMS320C548 TI DSP external VSP SRAM 3330.2, the wrapper PCI ASIC 1720, modem codec 4528, voice codec 5086, and stereo codec 1930. External SRAM 3330.2 couples to the VSP wrapper, and address decode is performed by the wrapper ASIC.

A PCI block 5010 contains PCI configuration registers 5012 initialized by the BIOS. The host 106 uses PCI I/O registers 5014 for control purposes. Wrapper ASIC DPRAM 3330.1 caches VSP code/data and buffers audio and modem data. The ASIC RAM is dual ported for simultaneous access by the DSP 1730, PCI bus 330, and codecs, among other components. The ASIC RAM 3330.1 has four banks of 8-bit memory for 32-bit wide PCI bus accesses. DSP accesses are 16-bits because of the DSP 16-bit data bus width. The 16-bit DSP accesses are multiplexed to read the high word or low word of the ASIC RAM depending on the LSB of the VSP address. The byte channeling function translates data going into Port A into 16-bit aligned format for fast VSP data processing via Port B.

A DMA state machine 5030 transfers program and data between host memory, ASIC DPRAM, and DSP external SRAM. The DMA frees up the VSP from transferring to external VSP memory large amounts of data or code.

A voice codec (e.g., TCM320A056) converts speech data for telephone answering TAD/TAM and speech applications. The wrapper ASIC voice codec I/F 5040 transfers 32-bit data between the ASIC RAM and the voice codec. The AC56 has a serial interface; and the voice codec I/F has a serial/parallel and parallel converter in the receive and transmit directions respectively which are simultaneously operative. The voice codec is controlled by either the host or the VSP.

The modem codec is controlled by either the host or the VSP through the wrapper ASIC or can alternatively be coupled to the VSP via the serial port on the VSP. When coupled via the wrapper ASIC, the modem codec uses a similar ASIC state machine to that of the voice codec.

The stereo codec processes PCM samples for output to loud speakers and input from a line input, microphone input, CD input, and mono input. The stereo codec is controlled by either the host or the VSP. Analog summation of the voice codec is performed internal to the stereo codec.

Exemplary SRAM sizes are 64k, 32k or 0k words depending on the multimedia applications, comprised of 8-bit or 16-bit×32k SRAMS to provide address decode options below. The entire block of 64k is addressable via program or data accesses.

The ASIC DPRAM is in both the program and data space of the VSP. The actual addresses in each space are different to keep from blocking an entire address range of the VSP external RAM. VSP code ensures that simultaneous accesses of the same address from Port A and Port B does not occur, using a Ping-Pong buffer approach for data buffers shared by the VSP and other components on Port A. The DMA also avoids simultaneous accesses.

PCI Bus Master

The PCI bus master block offers single cycle and burst transfers via memory space, as well as I/O space; the transfers include all types of PCI transfers. With the byte channeling hardware of FIGS. 53 and 54, the PCI bus master transfers data (1 byte up to the size of ASIC RAM) from any byte addressable host memory location to any byte memory location in the ASIC RAM, starting and stopping data on any byte boundary.

The following control registers/bits are suitably provided for VSP control of the PCI bus master block.

| Control Parameter | Description |
| --- | --- |
| Program Address | A 32-bit address which the DSP can write corresponding to the DSP program space in host memory. |
| PCI Address | A second 32-bit address which the DSP can write for accesses to any PCI memory location. |
| ASIC RAM Address | ASIC RAM address to being transaction. This value may be in either bytes or words depending on the byte/word control parameter. |
| PCI Address Offset | Offset from the program or PCI addresses to begin the PCI transaction. This value may be in either bytes or words depending on the byte/word control parameter. |
| Xfer Count | This value represents either the number of bytes or words to transfer depending on the byte/word control parameter. |
| Start Xfer | Bit allowing the DSP to begin the transfer (must automatically reset). |
| Byte/word Control | Bit which determines whether the Offset, Xfer count, and ASIC RAM address specify bytes or words. |

-continued

| Control Parameter | Description |
| --- | --- |
| Address Selection | Determines which address pointer to use, either program address or PCI address. |
| Xfer Direction | Bit which selects if a write or read is to be performed. |
| Memory Write Type | Selects type of PCI write to perform, either write or write and invalidate. |
| Byte Pad Enable | Bit which indicates that every other byte of data transferred from the PCI bus shall be padded with 0s. |

The PCI bus master 5016 in FIG. 50 uses the PCI address or the program address, the ASIC RAM address, the PCI address offset, and the Xfer count to determine how to byte lane channel the data in or out of the ASIC RAM, set PCI byte enables for PCI write, and set write enables for the ASIC RAM. All bits of the program and PCI addresses are valid so that the VSP can request transfers via any PCI address in the entire virtual address space accessible by the host, while keeping the PCI address offset parameter set to 0000h. The PCI bus master notifies the VSP via an interrupt that the transaction is complete.

FIG. 54A, B, C contain examples of data transfers from host memory to ASIC RAM involving byte alignment and byte padding. FIG. 54A depicts an 8 byte read from host memory. Three PCI data phases are used, due to the byte alignment in the host memory. The first data phase causes bytes 0, 1, and 2 to be written to the ASIC RAM. The byte lane channeling reorganizes the bytes to be placed in ASIC RAM. Note that the least significant byte of the first data phase does not get stored in the ASIC RAM. The illustrated byte which contains an "H" in this data phase does not overwrite valid data in the ASIC RAM denoted with a "D". The second data phase causes bytes 3, 4, 5, and 6 to be written to memory. The ASIC RAM has four 8-bit RAMS, allowing different address locations to be selected for each RAM. In writing bytes 3, 4, 5, and 6 into memory, byte 3 has lower address than 4, 5, and 6 when the memory is strobed. The last phase transfers byte 7 only. When this byte 7 is written to the ASIC RAN, only 1 of the RAM strobes is active so that valid data denoted by a "D" does not get overwritten.

FIG. 54B depicts a 9 byte transfer. Note that the first byte transferred may originate on any byte boundary in host memory and can be stored to any byte in ASIC RAN. Bytes in ASIC RAM which contain valid data denoted by "D" are not overwritten.

FIG. 54O shows bytes being padded with 0s in the LS byte of the word. Advantageously, the VSP sign-extends data when desired for instance. Even data which does not require sign extension can be easily manipulated in padded format with a single instruction.

The DMA with the PCI bus master transfers data 16-bit words between the PCI bus and external VSP SRAM. The DMA function operates on words since data is already formatted for the VSP by the PCI bus master.

The DMA 5030 transfers data when the DSP requests it to by writing to the DMA control registers in block 5020 in the wrapper ASIO 1720. If the DMA has the DSP 1730 on hold to access external SRAM memory, the DSP would undesirably wait. In one embodiment, a DSP XF line controls the DMA to avoid the wait. The DMA, seeing the XF signal active, transfers data between ASTO RAM and external memory. When the DSP routine is nearing completion of the code in on-chip RAM, the DSP clears the XF signal, pausing the DMA. The DSP DMA does not resume transferring data until the DSP again sets the XF signal.

The granularity and delay values contained in the DMA control register are used to throttle the DMA so that the DSP can get access to the external bus occasionally even when the XF signal is active. The granularity value determines how many words will be transferred before the DMA releases the DSP external bus. The delay value indicates the number of clocks the DMA will wait before the next set of words is transferred. This mechanism prevents the DSP from being completely locked out during a DMA transfer without having to manipulate the XF signal.

FIG. 50 illustrates the connection between the PCI bus master and the DMA. The VSP configures the PCI bus master and DMA registers for the transfer. In a host memory to VSP memory transfer, the PCI bus master 5016 begins transferring data to ASIC RAM while the DMA waits for data to become available. The PCI bus master uses the byte lane channeling to align the data for the VSP. Once data is available and the XF signal from the DSP 1730 is set, the DMA will begin transferring the data to external memory 3330.2. The DMA puts the DSP external bus on hold to perform this function. By setting the hold mode to 0, the VSP resumes running out of on-chip RAM during the DMA transfer.

The PCI ASIC supports single cycle slave PCI accesses to ASIC RAM, and burstable PCI slave accesses to and from ASIC RAM. The PCT I/O registers are also accessible via the PCI slave interface.

The voice codec, stereo codec, and modem codec interfaces couple to the ASIC RAM port A via arbitrated access.

Turning to the voice codec control, when linear mode is selected in bit 0 of the Voice Codec Volume Control Register 0x14, the least significant 3 bits of every data item sent to the voice codec are the voice codec volume bits. Advantageously, the VSP is freed from adding these bits to every data item sent to the voice codec. The voice codec volume bits 6:4 are also in register 0x14.

A MIDI interface is suitably provided, including a UART (universal asynchronous receiver transmitter). The MIDI interface register(s) is in the PCI I/O space, part of the PCI I/O register set.

The joystick interface provides for two joysticks. The joystick register(s) is in the PCI I/O space, part of the PCI I/O register set.

Hardware Example
Nomenclature

| | |
|---|---|
| ADPCM | Adaptive Pulse Code Modulation |
| ASIC | Application Specific Integrated Circuit |
| CODEC | Code and Decoder Module |
| DPRAM | Dual Port RAM |
| DSP | Digital Signal Processor |
| PCI | Peripheral Component Interconnect |
| PCM | Pulse Code Modulation |
| POST | Power On Self Test |
| VXD | Virtual Device Driver |

The wrapper ASIC interfaces to both the C5x and C54x families of DSPs, and provides a DSP interface to asynchronous SRAMs. A register bit enables CEz. Combinational logic within the ASIC generates the WEz and RDz signals to the SRAM.

PCI Bus Mastering and byte channeling circuitry aligns data to byte boundaries on either read or write.

The C5x boatloads from data loaded into the DPRAM. When the VxD initializes the system, data is loaded into the DPRAM by the PCI host via slave data transfers. Then the C5x is taken out of reset. The C5x then reads global data location FFFFh. This address FFFFh maps to DPRAM. The data at this location tells the C5x what type of bootload to perform and an address space from which to start loading. The bootload program then loads the C5x initialization code from the DPRAM and starts executing the downloaded code. The DPRAM address pointers are initialized to facilitate the bootload sequence.

The C54x boatloads similar to the C5x, except that the C54x reads from I/O space FFFFh to determine what kind of boot should be performed (since the C54x has no global memory).

The PCI block does bursts to slave addresses. Such bursts are enabled by a bit in the Misc Ctl Reg of the PCI configuration space.

The PCI block augments the C5x to perform any PCI command, including memory reads and writes as well as I/O reads and writes.

A PCI diagnostic counter allows the C5x to monitor the amount of time a certain command takes to complete, thereby determining which type of read command is more efficient, for example.

Configuration values for the Min_Gnt and Max_Latency as well as the subsystem ID and subsystem vendor ID and type of DSP are stored in a EEPROM. These hardcoded values can thus be changed for different board configurations or system functional requirements. The EEPROM has a 3 wire interface and is read after hardware reset. The EEPROM is readable and programmable via the PCI bus after the initial read at reset. The timing for these additional reads or writes is based on the host software reading or writing to a register in PCI space.

The registers available to the host are accessible via either I/O or memory space.

The ASIC DPRAM is accessible via a 4K range of memory addresses.

Several processes can store and access data from the PCI side of the DPRAM. These accesses are controlled by a memory arbiter. The memory arbiter signals the PCI block indicating that another device is waiting for access to the bus, and efficiently using the "internal bus" without diminishing the performance of PCI transactions.

The DPRAM is configurably partitioned into six different areas in this embodiment: DMA buffer, voice codec Xmit buffer, voice codec receiver buffer, stereo codec Xmit buffer, stereo codec receive buffer, and general usage RAM. These partitions are controlled by the DSP. The host sees, but does not change the partitioning.

A DMA state machine transfers data between the external SRAM and the ASIC DPRAM without using C5x mips (processing power). The DMA cooperates with the C5x and supports SRAMs as slow as −35 rating with a CLKOUT1 of 40 MHz and as fast as −10 with a CLKOUT1 of 50 MHz.

The DMA state machine interfaces the PCI block to transfer data directly between the SRAM and host main memory (using the DMA partition as a buffer).

The C5x performs 0-WS (zero wait state) reads from the ASIC DPRAM after a single HW generated WS on the first read. Successive (linear addressed) reads will also be 0-WS. An out-of-order address will cause another 1-WS read (followed by 0-WS reads if the subsequent addresses are linear).

A full duplex serial interface moves data between the PCI side of the DPRAM and a voice codec at a sampling rate of 8 KHz controlled by either the host or DSP.

A CS4231 stereo codec interface is implemented as a state machine that autonomously handles the traffic to and from the codec. The host or DSP will be responsible for supplying and retrieving codec in/out data from the DPRAM. The state machine handles the CDRQ and PDRQ interrupts from the codec. The IRQ interrupt from the codec couples to the DSP.

A joystick interface design is provided.

Figure 51:
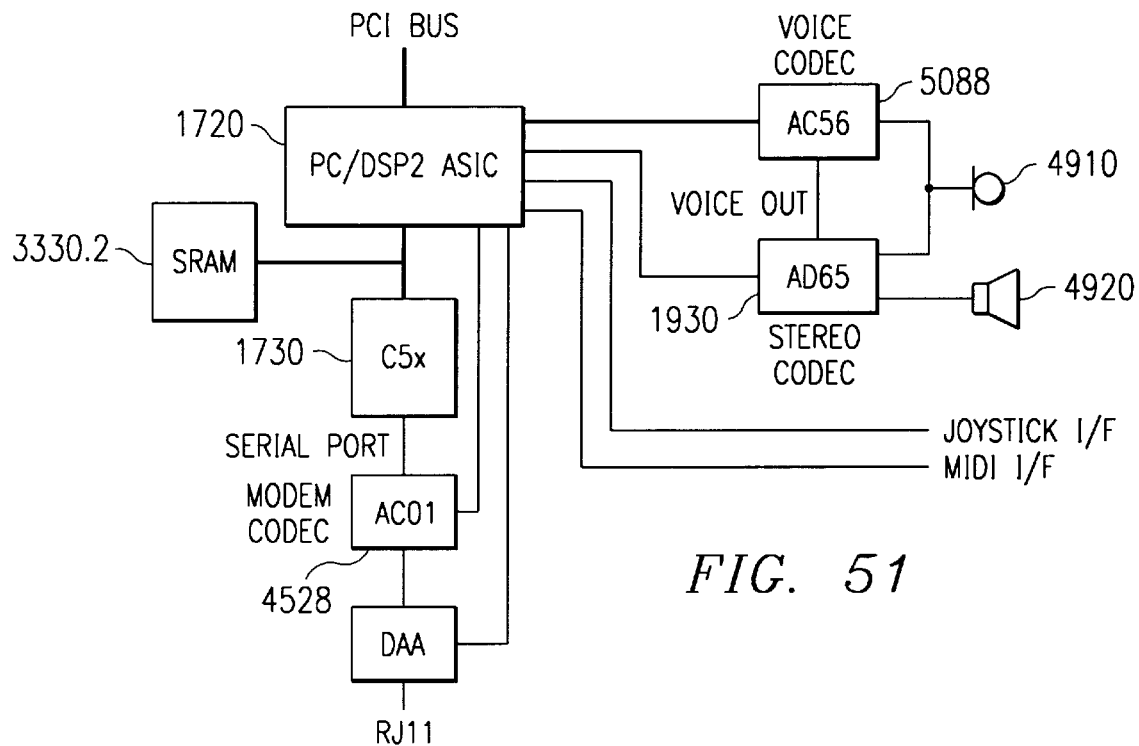
FIG. 51 is an electrical block diagram overview of the system of FIG. 50 such as a DSVD system.

An embodiment system board design of FIG. 51 supports three codecs (including a modem codec, voice codec, and a stereo codec), a C5x, external SRAM, and a PCI bus I/F.

This architecture is clocked to achieve 0 wait state reads from 12 ns SRAMs on the boards. 64K words of SRAM are suitably provided.

Figure 51A:
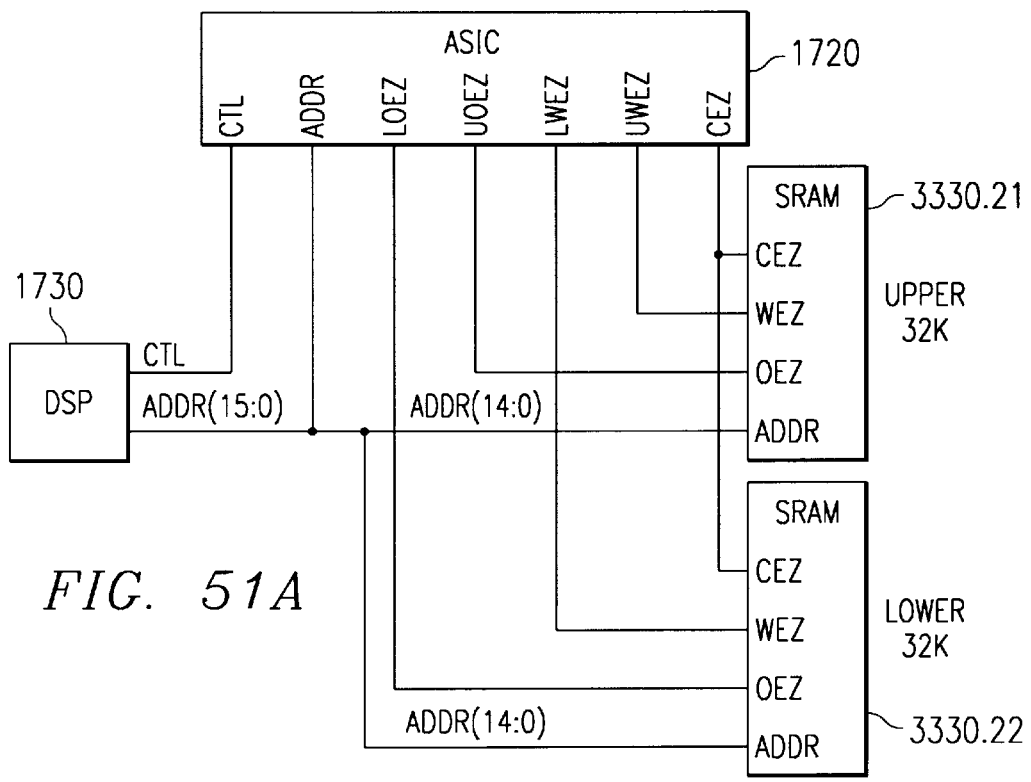
FIG. 51A is an electrical block diagram showing address and control lines interconnecting the wrapper ASIC, a DSP and two SRAM chips in a system embodiment such as in FIG. 50.
Figure 51B:
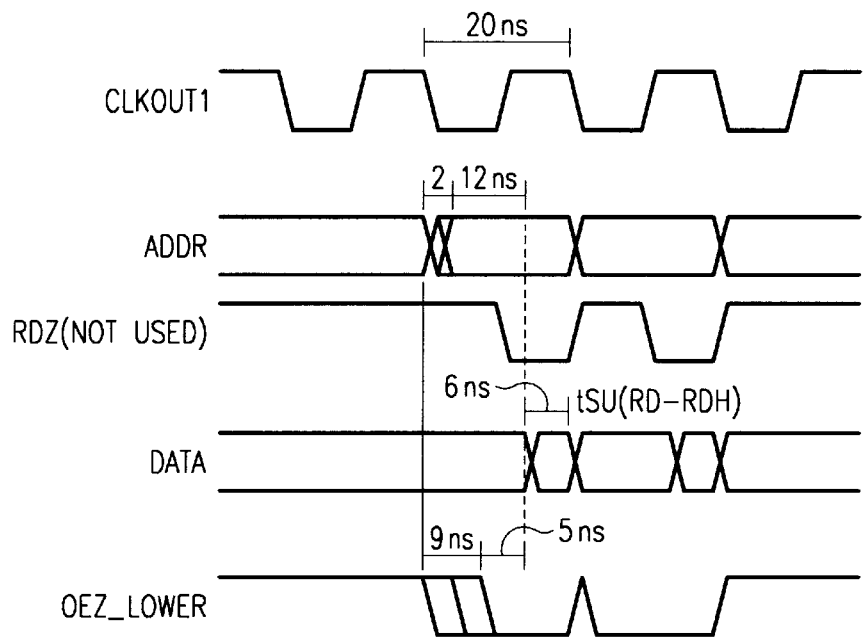
FIG. 51B is a waveform diagram of DSP clock, address, data, and output enable control signaling in a system embodiment such as in FIG. 50.

TI C5x and C54x DSP's, have a unified memory architecture (64K on-board SRAM accessible via either program space or data space). In FIG. 51A, ASIC 1720 drives control signals such as chip enable for the SRAMs 3330.21 and 3330.22. Advantageously, with the ASIC driving the SRAM control signals, the DPRAM can exist in the same memory space as the SRAM. The ASIC simply need not turn on the SRAM signals if the address being accessed is currently pointed to ASIC DPRAM. FIG. 51B shows a SRAM read timing example.

BIO Signal Feedback

The C5x has low latency access to the status of two events: the DMA complete signal and the PCI Master complete signal, which are both available as interrupts. To avoid the latency caused by interrupts, the C5x selects one of these signals to be present on the BIO input pin. The DMA complete bit signals the C5x that it can safely attempt an off-chip operation without waiting for access to the external bus. The PCI master signal allows the C5x to continue processing data until the PCI block is free to transfer more data. These signals are muxed by the ASIC under C5x control.

In FIG. 50, ASIC advantageously does PCI bus mastering, PCI bus slave bursts, byte channeling, stereo codec state machine, voice codec state machine, and C5x SRAM DMA state machine operations.

The ASIC is divided up into two synchronous clocking areas. The dual port RAM is the bridge between the PCI clock synchronous and DSP clock synchronous circuitry. Limited transfers of data occur between the areas via shared registers, also.

PCI synchronous logic includes the PCI block, the byte channeling and dual port RAM I/F (port A), the joystick I/F(optional), and the MIDI I/F. PCI synchronous circuits couple the voice codec and stereo codec interfaces to the DPRAM. The configuration registers, the PCI I/O addresses, and PCI Memory addresses are PCI synchronous.

The DSP synchronous circuitry includes the DMA state machine, the dual port RAM I/F (port B), and the DSP registers.

The PCI block selectively uses the PCI "Memory Read Line" or "Memory Read Multiple" commands. The "Memory Read Line" is used on a burst.

The PCI block supports slave burst transactions, advantageously interfacing any chipset that bursts to slaves.

The configuration registers of FIG. 54D suitably conform to an applicable PCI specification. Register customization is provided in the vendor ID field, the device ID field, the class code, and the base addresses. The base addresses are important in this embodiment because they locate key information registers used in coordinating the host and the DSP.

Base address 0 requests 32 I/O addresses for access to the registers found in a "PCI Host Accessible Registers" area of FIG. 54I. Base address 1 mirrors these I/O addresses in memory space. The memory space is non-prefetchable in this embodiment.

Base address 2 requests 4K bytes of non-prefetchable address space corresponding to addresses of dual port memory.

PCI registers include a status and command register 0x08 dword tabulated here. Two upper status bytes therein are only reset (not set) by host. 2 lower command bytes include I/O space, memory space and bus master bits set by BIOS software.

A PCI miscellaneous control register 0x40 is tabulated next. The software reset bit 31 in miscellaneous control register 0x40 resets the entire ASIC with the exception of the base address registers and the EEPROM values (Subsystem ID, Subsystem Vendor ID, Max Latency, and Min Grant) in the configuration space. PCI bus mastering is turned off, but the EEPROM is not reread. The software reset bit is static and does not reset itself to 0 if it is set to 1. The PCI host sets the bit to 1 to reset the ASIC, then resets the bit to 0 to take it out of reset.

FIG. 54I depicts the PCI host accessible registers, which are accessible both in IO space and memory space. An asterisk (*)indicates a register which has write capability shared and controlled by PCI blocked and DSP.

The PCI interrupt mask register 0X00 allows the host to prevent the interrupts in the interrupt register from propagating through the system and causing an interrupt to the host. A value of '0' indicates that the interrupt shall be masked, the same as the C5x interrupt mask register works. The order of mask bits in the register is the same as the description of the interrupt register in the next section.

The PCI interrupt register 0x04 collects the system interrupts for the host.

| Bit | Remarks |
| --- | --- |
| 6 | Voice Codec Recv full |
| 5 | Voice Codec Xmit empty |
| 4 | Stereo codec IRQ |
| 3 | Stereo codec Recv full |
| 2 | Stereo codec Xmit empty |
| 1 | C5x Generated |

The interrupts are held and driven onto INTA (active low). When the host writes a '0' to any bit in the register, no toggle happens, but a host write '1' to any bit in the register does toggle (write a 1 to a 0 and the result is 1, write a 1 to a 1 and the result is 0). An interrupt signaled from a subsystem remains in the interrupt register even if the subsystem stops applying the interrupt before it is serviced.

Figure 54:
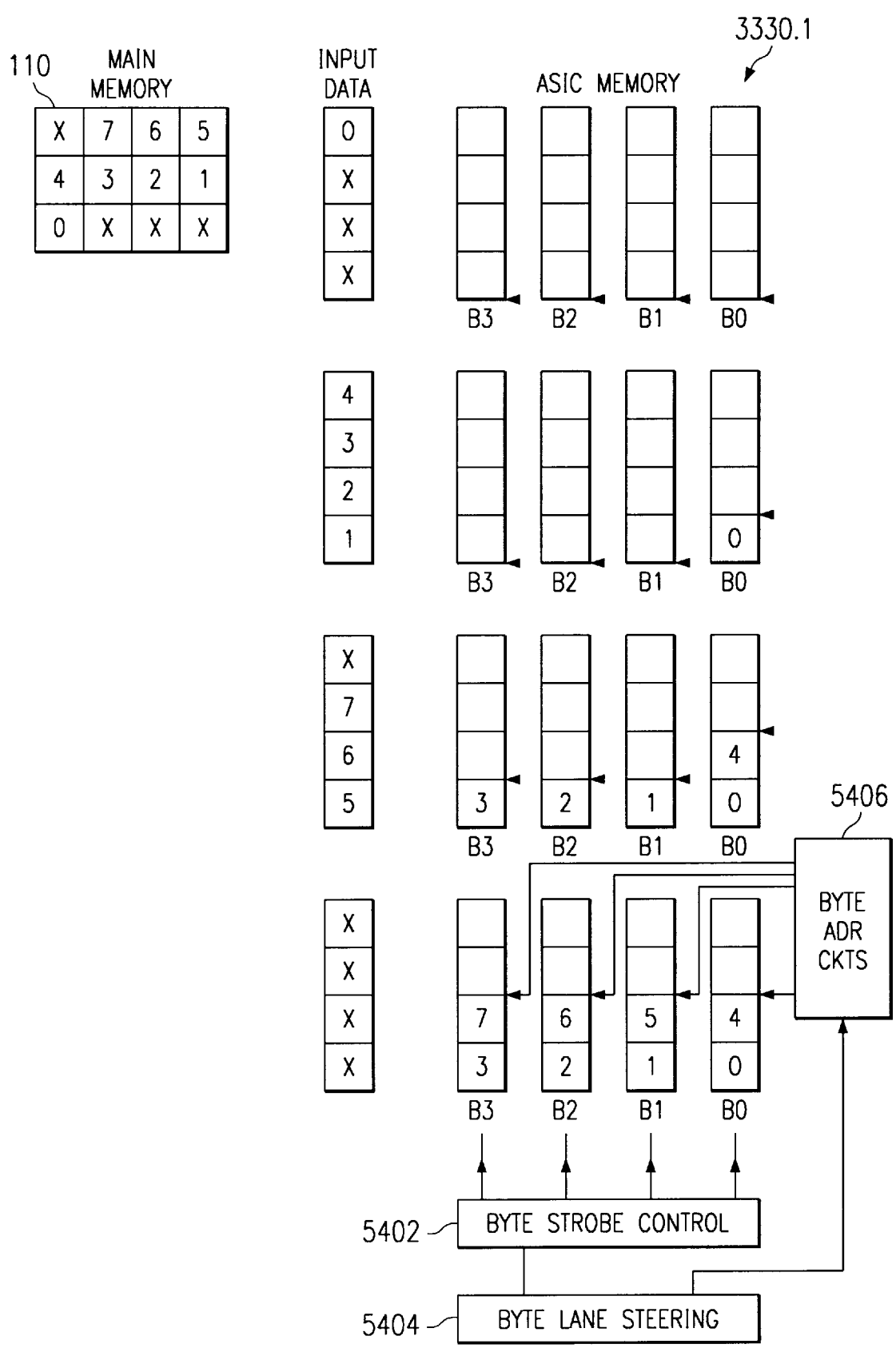
FIG. 54 is an electrical block diagram of wrapper ASIC DPRAM split into four byte-parts and used to describe a process or method of byte steering, operating address counters, and operating byte strobes in the wrapper ASIC for stream I/O between a host CPU and host memory operating on 32-bit nonaligned data and a DSP operating on 16-bit word-aligned data.
Figure 54F:
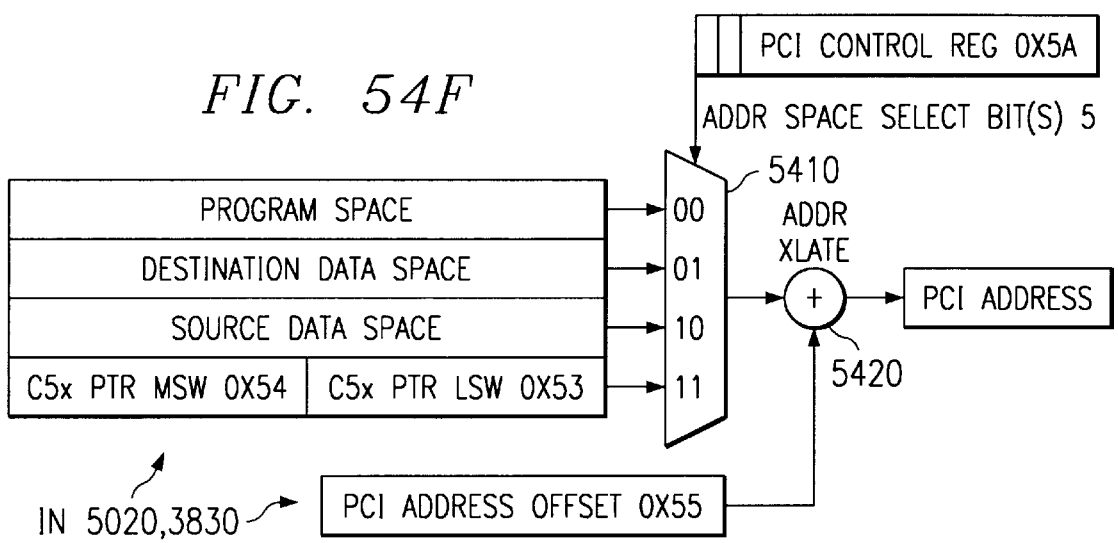
FIG. 54F is an electrical block diagram of an address translation circuit and its method of operation in the wrapper ASIC to translate DSP 16-bit word-oriented addresses from the various DSP address spaces of FIGS. 38 to a PCI address, wherein the selected DSP address (can be shifted left by one place to multiply by 2 if 0x57 bit 8 calls for word transfer) is then added to an address offset, whereupon a cache line (16 bytes from host main memory having the resultant PCI address as lowest address) is transferred to the location defined by the DSP address in the particular one of the various DSP address spaces.
Figure 54G:
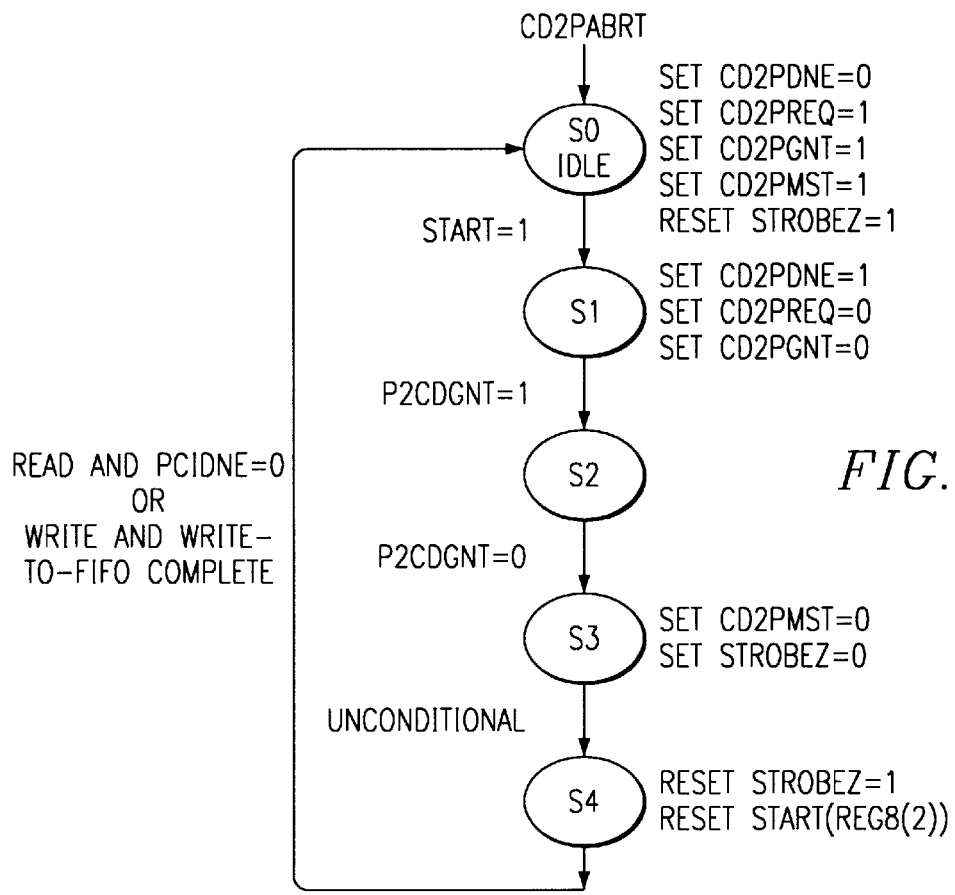
FIG. 54G is a state transition diagram for a PCI transaction state machine for coupling a TI TMS320C52 DSP for FIFO reads and writes from/to PCI bus according to a read sequence and/or write sequence detailed in incorporated U.S. patent application Ser. No. 08/823,257, now U.S. Pat. No. 5,987,590.
Figure 54H:
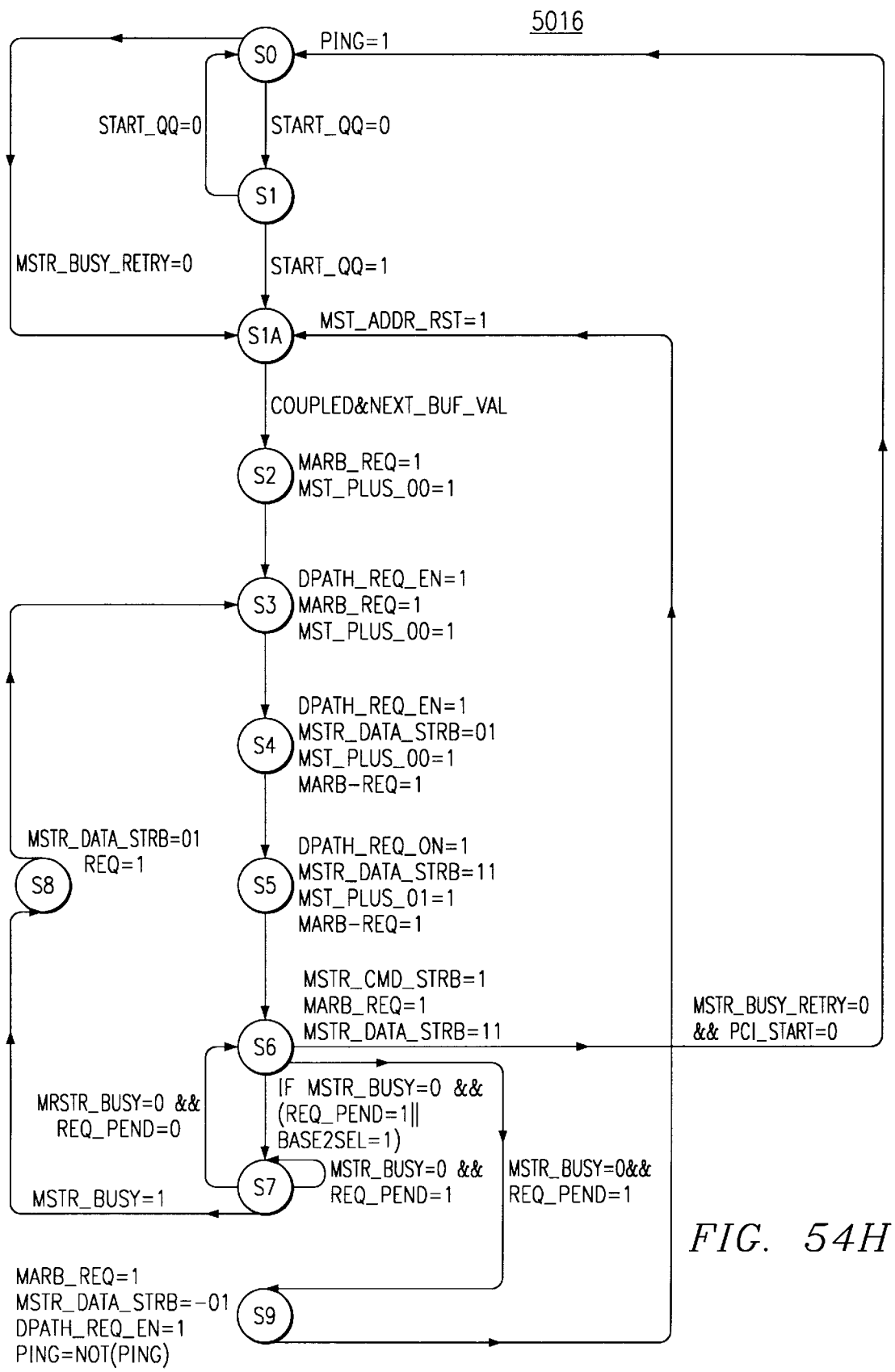
FIG. 54H is a state transition diagram for a PCI transaction state machine for wrapper ASIC of VSP.
Figure 54J:
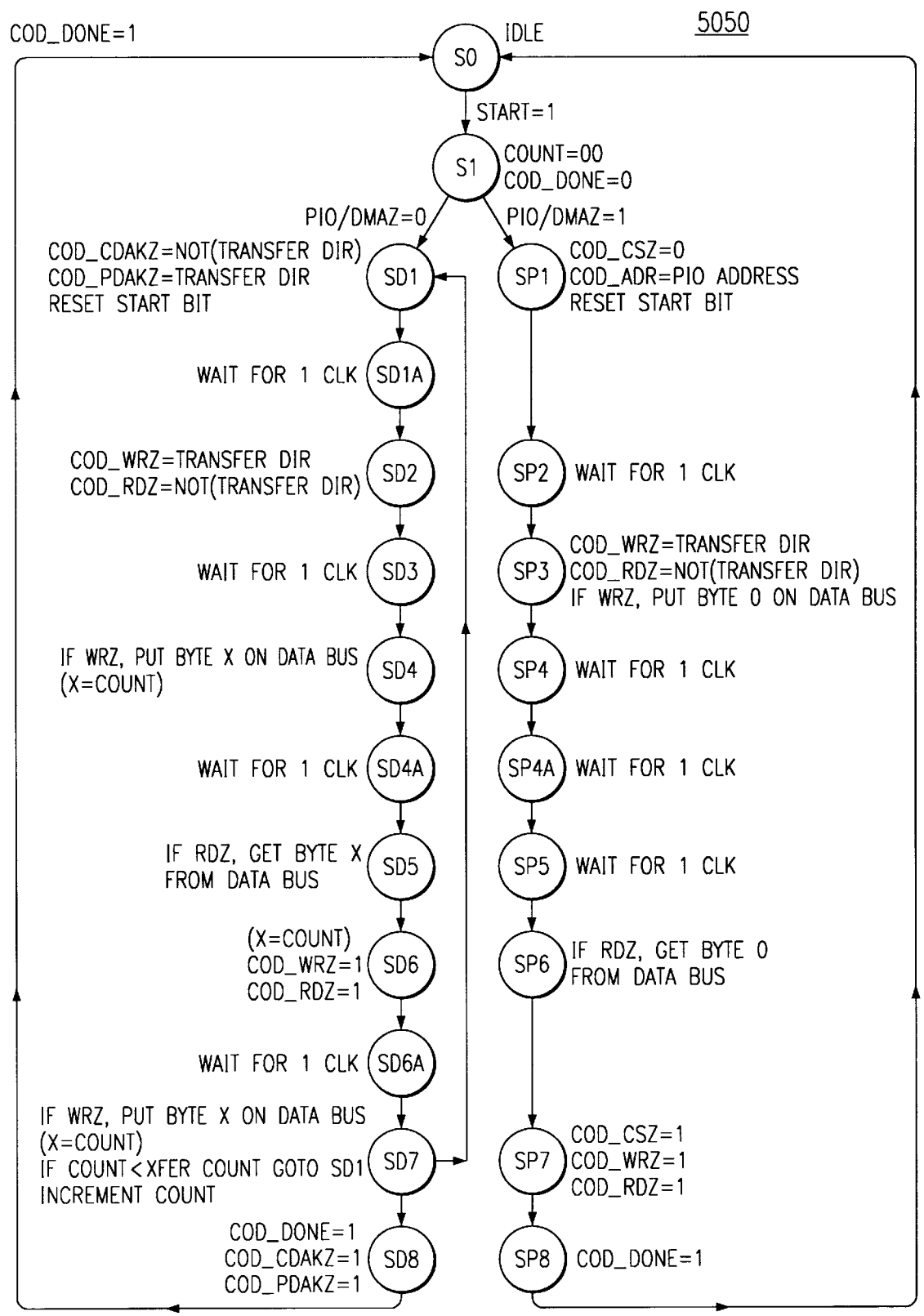
FIG. 54J is a state transition diagram of a process or method of operation of a stereo audio codec state machine in the wrapper ASIC of FIG. 50.
Figure 54K:
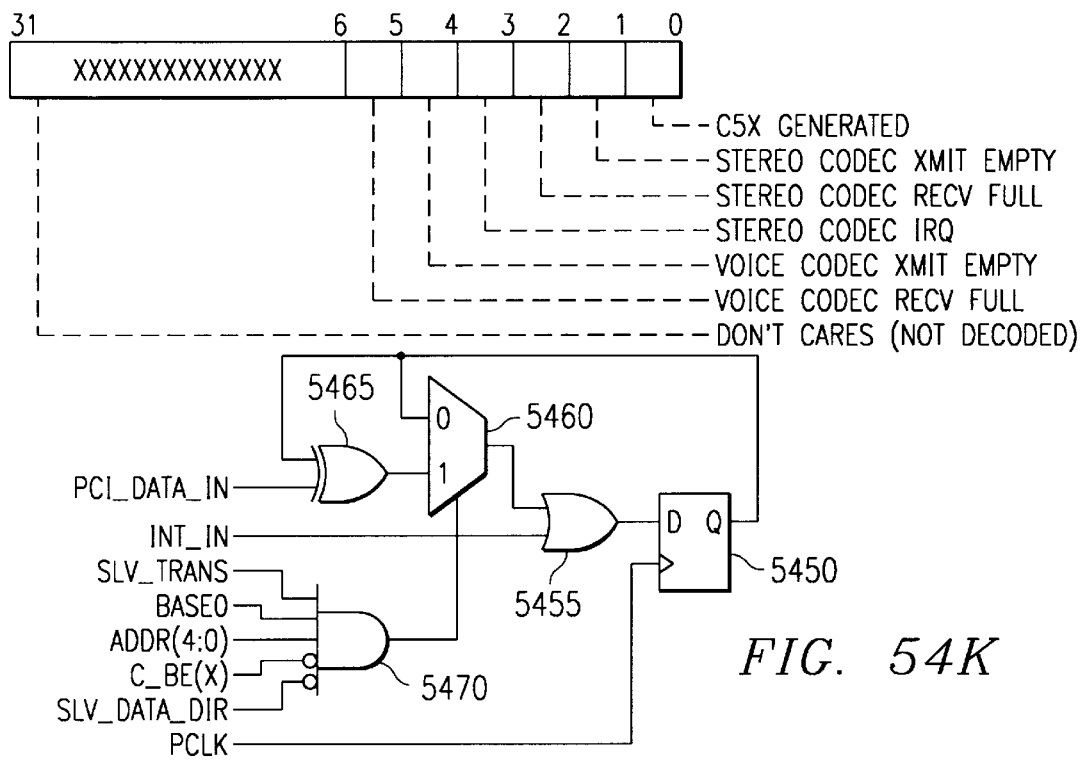
FIG. 54K is an electrical schematic diagram of a D-latch representing any bit of PCI interrupt register 0x04 illustrated thereabove, and associated control circuitry to controllably OR a given interrupt with the one/zero in the D-latch.

The interrupt register has the interrupt OR'd into the data before the FF (flip-flop) and after the feedback mux as shown in FIG. 54K.

A 32 bit host memory space pointer 0x08 is initialized by the host and points to a location in system memory that the DSP can access. In this embodiment, the memory space allocated by the host is not less than 4K bytes, so this register implements the bits (31:12).

A DSP control register (0x0C) is used by host to reset, send command interrupts, and non-maskable interrupts to the DSP. All of the bits are active high and all bits are reset to a 0.

| Bit | Remarks |
| --- | --- |
| 2 | Host to C5x NMI |
| 1 | Host to C5x Command Interrupt |
| 0 | 1 entry means C5x is running |
|   | 0 entry means C5x in reset |

The DSP control register 0x0C command interrupt (bit 1) and NMI bits (2)are self-clearing. When the host writes a 1 to one of these bits, the 1 stays in the register until an interrupt is generated (using the CLKOUT1 of the C5x to generate a 5 clock wide interrupt). Once the interrupt has been propagated through the C5x clock, the PCI register bit is asynchronously reset.

DSP clock control register (0x0D) gives the host the ability to control the power dissipation and the PCI input clock of the DSP in embodiments wherein the DSP is clocked by the PCI clock. Otherwise, the PCLK stop, PCLK stop state, and PCLK divide-by-two bits will have no effect. See next table. In the table, DWORD bit positions are given first, then (=), and then equivalent bit positions in the register byte.

| Bit | Remarks |
| --- | --- |
| 15=7 | Don't Care |
| 14:12=6:4 | CLKMD 1..3 (PLL ctl for C54x) |
| 11=3 | Power Down |
| 10=2 | PCLK_OUT stop |
| 9=1 | PCLK_OUT stop state |
| 8=0 | PCLK_OUT divide by 2 |

Some PCs are using spread spectrum PCI clocks to lower EMI (electromagnetic Interference). This might have an adverse effect on the PLL in some DSPs. If the PC does use spread spectrum technology, use a standalone oscillator to drive the DSP or provide a PLL that can follow the PCI clock.

By executing IDLE2 instruction and stopping the clock input to the C5x, the power consumption can be dropped to the micro-amp range. The PCLK_OUT stop bit acts to fix the clock at the PCLK_OUT state. The Power Down bit asserts the HOLDz signal of the C5x to allow the C5x to remain active and functional, but decrease power consumption by powering down its IO ring. This signal is muxed with the existing functional uses of HOLDz). With the C54x the CLKMD bits allow the PLL options to be controlled by the host. Different applications can thus reset the C54x, change the PLL option (allow the PLL to resync), take the C54x out of reset, and then run at a different rate. These features advantageously confer power savings when non-high-speed tasks are being run.

PCI/DSP shared register control register 0x0E confers host control of write access to the shared registers. The shared registers are read from either the host or the DSP. Only the source specified by this register at a given time has the ability to write the register, and any writes by the non-validated source will be ignored. The bits in this register represent functions representable by more than one register. A 1 in a bit means that the PCI host has write capability, a 0 means that the DSP has write capability. The reset state for the bits is 0000 (DSP control).

| Bit | Register |
| --- | --- |
| 20=4 | Stereo Codec PIO |
| 19=3 | Stereo Codec Receive |
| 18=2 | Stereo Code Transmit |
| 17=1 | Voice Codec Receive |
| 16=0 | Voice Codec Transmit |

The joystick register 0X10 provides joystick information input to the host corresponding to user manipulations. Bits 7:0 are BB2, BB1, BA2, BA1, CBY, CBX, CAY, CAX.

A MIDI register 0x12 is available for MIDI status information.

PCI voice codec volume control register (0x14)enables host to control the mode and volume of the voice codec. If the linear mode bit is set then the codec is in companded mode. If it is not set the codec is in linear mode. This bit will reset to a 1 (companded mode). Respective bits for earphone mute and microphone mute act to mute the associated functions when set. These bits will reset to a 1 (muted). A power down bit turns off the codec when set. This bit will be reset to a 1 (powered down). Three volume control bits are sent in the serial data stream on every transfer to the codec. These bits are set in the register for easy host access, and can be reset to 000 (max volume).

An I2C bit can be set by the host if the subsystem ID indicates that the voice codec is using an I2C serial interface instead of the default DSP serial type interface. The pins for both serial ports will be shared.

The PCI voice codec register 0x16 is shared by the PCI host and the DSP. Both agents write and read the same registers. The access to this register is controlled by a bit in the PCI PCI/C5x shared register control register 0x0E. If the bit is set, then the PCI host can write the register 0X0E. If the bit is not set, then the DSP can write to the register. Host and DSP simultaneous writes to the register are not supported in this embodiment. When the bits in this register are reset to 0, register bits become toggle bits. This means that a write of 0 to a bit does not change the value. A write of 1 to a bit will toggle the contents of the register. The "valid" bits of the register are settable and resettable by the voice codec state machine. The pulse generator shown in FIG. 55 allows this to happen. Shared register bits that are not externally controlled do not have the pulse generation block. The transmit and receive sections can be write enabled separately so the host could be transmitting while the DSP is receiving (or vice-versa). The error bits are read only, errors are dynamic, and reflect the current state of the state machine and as such do not need to be cleared. When the error condition has gone away, the error bit is cleared.

| Receive Bit | Remarks | Transmit Bit |
| --- | --- | --- |
| 27=11 | Error | 19=3 |
| 26=10 | Pong valid | 18=2 |
| 25=9 | Ping Valid | 17=1 |
| 24=8 | Enable | 16=0 |

Figure 55:
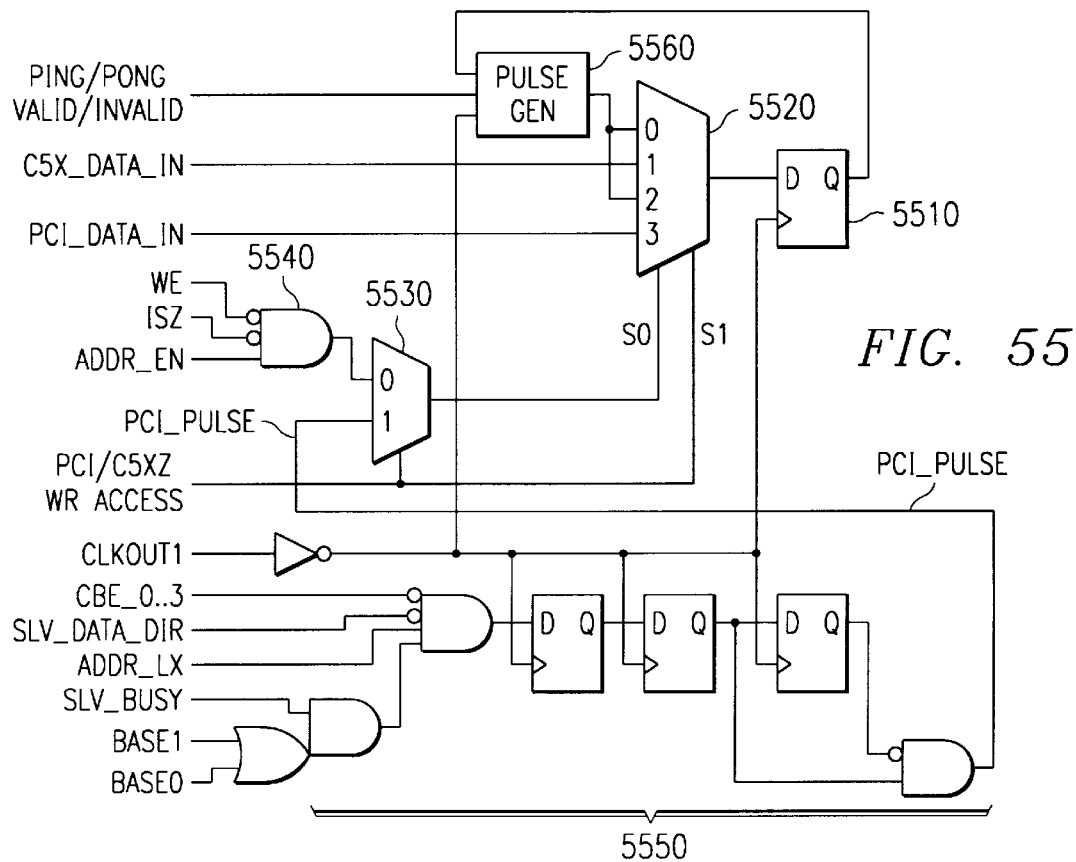
FIG. 55 is an electrical schematic diagram of a D-latch (upper right) representing any bit which is shared between DSP and the host as in PCI voice codec register 0x16, and associated control circuitry and methods of operation.
Figure 55A:
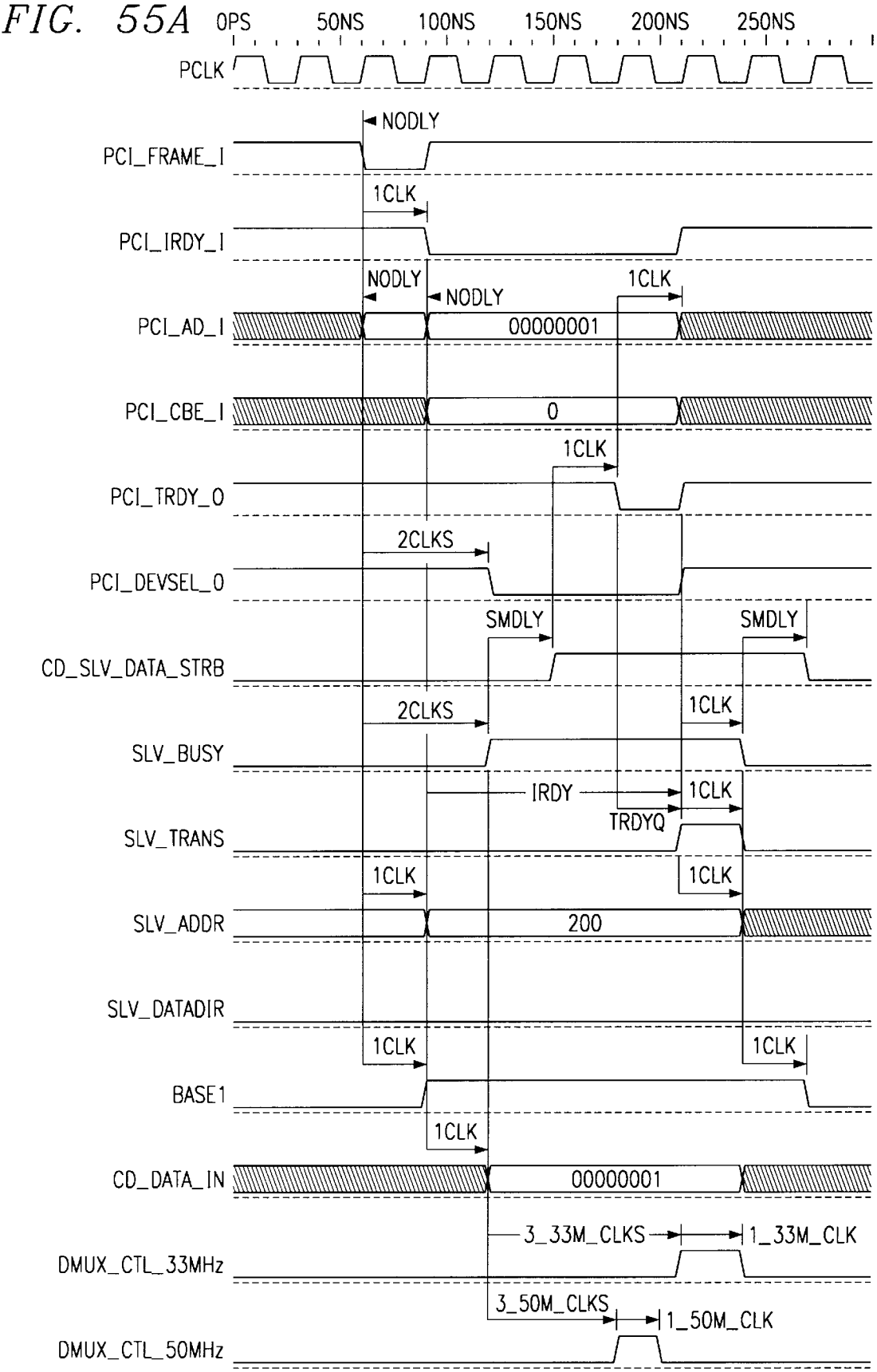
FIG. 55A is a timing or waveform diagram of a process or method of operation of each shared register bit in the wrapper ASIC of FIG. 50.

The logic of FIG. 55 assumes that the DSP CLOCKOUT1 is at least as fast as the PCI bus clock rate, if host access to the shared registers will occur. The timing of a PCI bus slave transaction and the pulses created to enable clocking data into a C5x synchronous register are shown in FIG. 55A. The logic for each bit of the shared register and the timing diagram of a write transaction are shown in FIGS. 55 and 55A.

PCI stereo codec register 0x18 is shared by the PCI host and the DSP. All the bits in this register are reset to 0. This table is the same as the table for register 0x16 above, except that only bits 11:8 and 3:0 are included. The transmit and receive sections are write enabled separately so the host can transmit while the DsP is receiving (or vice-versa). This register has the same clock constraint as the above voice codec register. The error bits are read only. Errors are dynamic and reflect the current state of the state machine and as such do not need to be cleared. When the error condition has gone away, the error bit will be cleared.

An 8-bit register PCI stereo codec PIO data register 0x1C is used for PIO transfers to and from the stereo codec. For a write, the 8-bit data to be written are placed in this register prior to starting the transaction. The data are then transferred to the codec. For a read, the 8-bit data resulting from the read transaction are stored in this register.

PCI stereo codec automatic indirect PIO address register (0x1D) holds an 8-bit address used for automatic indirect PIO transfers to and from the stereo codec. An automatic indirect PIO access is done when the codec indirect bit in register 0x1E (described in next paragraph) is set and a PIO transaction is started. During the state machine operation this address is written as data to the PIO direct address 00. The subsequent PIO access to PIO direct address 01 either reads from or writes (depending on what is performed) to the indirect address specified by the data previously written to address 00 from this register.

PCI stereo codec PIO control register (0x1E) is defined by the following table.

| Bit | Remarks |
|---|---|
| 21:20=5:4 | PIO address |
| 19=3 | Transfer direction (read=1, write =0) |
| 18=2 | Codec Indirect |
| 17=1 | Codec Start |
| 16=0 | Codec Done |

Buffer size and address registers (0x20–0x30). See definitions of these under ASIC DPRAM partitions (0x60–0x69) description later hereinbelow. The address and buffer size in these registers is in terms of host byte addresses for the ASIC DPRAM and the number of bytes in each buffer. The values start out as C5x 16 bit words, but are converted in hardware to byte addresses and byte buffer sizes. The ping and pong buffers are set up as contiguous memory spaces purposely. Since the ping is always assumed to be the first buffer used, a counter can be set up with the ping buffer address. Once the ping buffer has been read or written, the address counter can continue to count. This new count value will roll right into the pong buffer space without having to reload the counter. The address counter is suitably the maximum size to point to any location in memory. The buffer address is held in bits 10:0 and the buffer size in bits 9:0 of their respective registers.

EEPROM control register (0x34) is used to determine the status of the EEPROM state machine, then give the host the ability to read and write the EEPROM using reads and writes to generate the timing for the individual EEPROM SCL and SDA signals. The EEPROM state machine starts to read the EEPROM after the PCI reset signal becomes deasserted. During this time all configuration accesses are retried. The EEPROM state machine assumes that a read was in progress when the reset was activated, to allow recovery from a state where the PCI reset signal was toggled before the EEPROM read could be completed.

| Bit | Remarks |
|---|---|
| 9 | SM Error |
| 8 | SM Done |
| 4 | Mode: 1=read mode, 0=write mode |
| 2 | SDA In |
| 1 | SDA Out |
| 0 | SCL |

When the SM Done bit is set, the host can write to or read from the EEPROM under software control. The SCL bit is the clock to the EEPROM (after the state machine has read the configuration data). The SDA out is the data out from the host to the EEPROM. Since the SDA signal is open-drain, when the EEPROM is sending an acknowledge signal (during the 9th bit of a read) the SDA out signal is set to a 1. The SDA in is the value present on the input pin from the EEPROM. The read mode bit drives the WCL bit of the EEPROM. If this bit is reset to a 1, the EEPROM cannot be written.

An SM done bit indicates that the state machine has completed its read of configuration data. The SM error bit indicates that the state machine did not successfully complete the EEPROM read, and the default values are in place for the configuration data. The 2 types of possible errors are:

1. EEPROM not responding with an ACK (EEPROM not present or EEPROM damaged).
2. Checksum error (EEPROM not programmed or EEPROM damaged).

PCI interrupts are generated from either the DSP, the stereo codec, or from the voice codec. The host has the ability to mask any of the interrupts. The host masks the interrupts from the codecs if the DSP is in control of that particular resource. Interrupts that are collected by the interrupt register (0x04) can either be a pulse or a level. The interrupt register collects an edge triggered event. Then when the host clears the interrupt bit, another interrupt will not be generated until the level has been turned off, then turned back on again.

When a codec generates an interrupt, the host clears the interrupt by writing to the interrupt register (0x04) to clear the interrupt, and then servicing the condition that caused the interrupt (which deactivates the interrupt signal). The voice codec operates the same way. When the DSP generates an interrupt, the host clears the interrupt by writing to the interrupt register. This write generates a signal to clear the bit that the DSP set in its own register set.

In FIG. 53, the data path between the PCI block and the dual port RAM is controlled by data register control logic. A PCI master state machine controls the PCI bus master functions including DPRAM address generation, PCI block control signals, and the input mux that feeds the data path into the PCI block.

Data out register control logic in block 5340 controls a 4 input mux 5312 to an output data flip-flop 5316 and controls the data path during PCI slave reads from memory and I/O, and PCI master writes. During master writes, the first Dword of data is prefetched from the DPRAM and stored on the feedback output flip-flop 5314. The enable of the feedback path flip-flop 5314 holds the data during other accesses on the same pipe. To indicate to the PCI block 5010 that two dwords are ready to transfer, the address of the next dword is presented and the data supplied on the output of the DPRAM. Two mux 5312 control signals S0, S1 and four data inputs they select to the data path mux 5312 follow:

S1=(base0 or base1 or base2) and (not mstr_busy)
S0=base2
Data Input selected by (S1, S0)
00=Master Memory
01=Master Last Data Out
10=Slave Registers
11=Slave Memory (no byte channeling)

Figure 56:
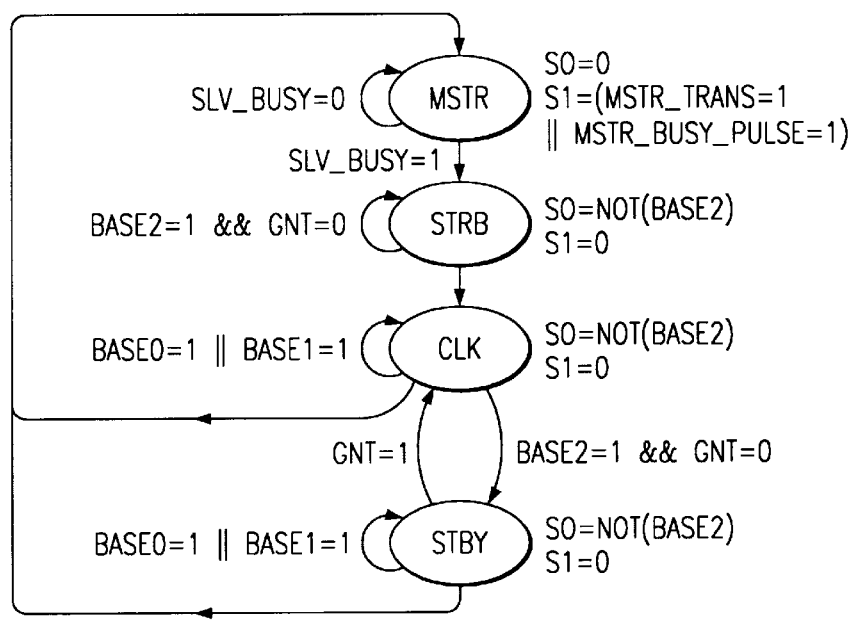
FIG. 56 is a state transition diagram of a process or method of operation of a state machine in the wrapper ASIC of FIG. 50.

In the above S1, S0 logic, the mstr_busy and basex signals come from PCI master block 5016. A slave-specialized state machine alternative for providing (S1, S0) is shown in FIG. 56.

In FIG. 54H, the PCI interface control state machine (SM) controls the major signals to the PCI block, the DPRAM address to the memory arbiter, the PCI side of the DMA transfers, and control how long the PCI transfers tie up the internal DPRAM so other local DPRAM port A devices do not get starved of data.

Memory arbitration according to a fixed priority system is performed on the non-DSP side of the DPRAM. The elements competing for the bus are:

PCI Bus Master
PCI Slave
Voice Codec SM
Stereo Codec SM

The stereo codec is first priority since it operates at up to a 44.1 KHz sample rate, higher than the voice codec at second priority. Voice codec has data rate of 8 KHz, and ample buffers. The slave part of the PCI block has third priority because of the great need to avoid tying up the PCI bus, even though the slave is slower than the master. The PCI bus functions share fourth priority. Although PCI bandwidth is important to conserve, the PCI bus puts lots of data in place very quickly.

Memory arbitration utilizes a memory arbiter module interface, interfacing the above listed elements, to port-A of the dual-port RAM (DPRAM) memory. The interface allows read and write access to the DPRAM. The interface uses the same clockspeed as the DPRAM clock. The memory arbiter interface services the interfaces to the DPRAM and each specific competing element.

The memory arbiter-to-DPRAM interface has a data bus, address bus, and control lines to signal between the arbiter and DPRAM. Control lines are: data output enable, port-enables, and write-enables.

The memory arbiter-to-competing element interface has a seven signal interfacing logic. The memory arbiter interfaces to the memory-granted element via a data bus, data_enable and an acknowledge signal. Address generation for memory is provided in each said competing element interfacing to the memory. The memory arbiter transparently provides this address for read and write accesses to dpram. A data bus transfers data read from dpram, and a data_enable qualifies this data. An acknowledge signal from the memory arbiter responds to a request generated from a given competing element when the arbiter permits it to access the DPRAM.

Electrically the memory arbiter couples to the dpram data bus, address bus, wza, eza, and gza lines. The data bus is 32-bits and the address bus is 9-bits from memory arbiter-to-DPRAM.

The element accessing the dpram provides a data bus, address bus, request, and read/write signal as input to the memory arbiter. For consistency all modules interfacing to the dpram provide the same 9-bit address bus.
Data [31:0] Data.
Data bus from memory granted element to memory arbiter then passed on to DPRAM.
Addr [9:0]
DPRAM address. Address bus from memory granted element transparently passed onto DPRAM.
Request memory access request. Active high signal driven by competing element to request a memory access.
R/W_Read/Write. Active high for read and active low for write from/to dpram driven by competing element.
Ack. Active high signal from memory arbiter to element which requested access to memory, signifying request is granted.
Data_out [31:0] Data
Data bus from dpram to competing element.
Enable. Active high. Signal signifying valid data on data bus to competing element.

Figure 57:
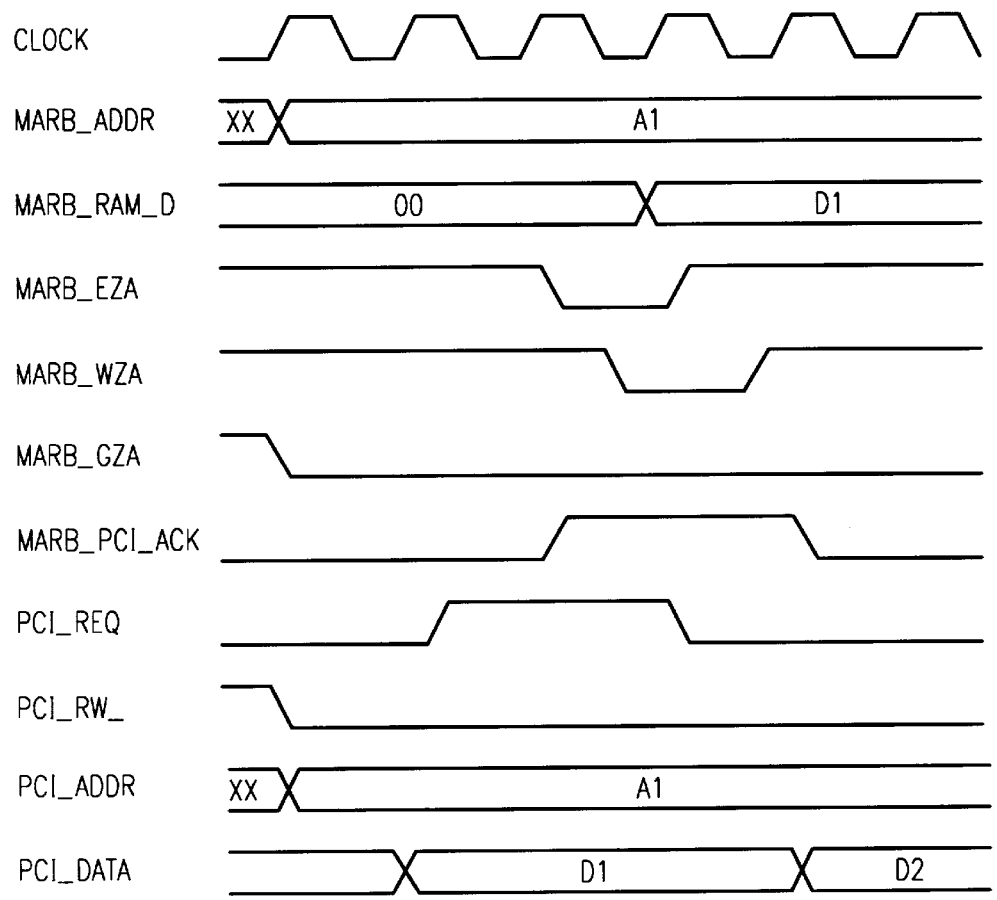
FIG. 57 is a timing or waveform diagram of a process or method of operation of the memory arbitration MARB in the wrapper ASIC of FIG. 50.

FIG. 57 depicts the timing interface requirements for read and write cycles.

Turning to byte channeling in FIGS. 54, 54A, 54B, 54C, hardware based byte channeling of incoming and outgoing data orders bytes onto word aligned boundaries without using DSP MIPS. This feature is advantageous because the host stores data as bytes. The DSP needs the data aligned as words. The host cannot guarantee that the data it stores will be aligned to the double words that are sent over the PCI bus or even aligned as words.

The byte channeling logic is enabled when no slave accesses are currently in process (i.e., slv_busy=0). The byte channeling block utilize a shift factor based on:

1) Address in main memory to start transferring from (C5x register value)

2) Address in ASIC RAM to put data in (C5x register value).

From the main memory address and the PCI transfer DPRAM address, the shift factor is determined by the following table. The two control bits show how much shifting needs to be done.

| Control | Enable | | | | Action |
|---------|----|----|----|----|--------|
| 00 | b3 | b2 | b1 | b0 | No Shift |
| 01 | | b2 | b1 | b0 | Shift right 1 |
| 10 | | | b1 | b0 | Shift right 2 |
| 11 | | | | b0 | Shift right 3 |

Since the PCI block ignores these 2 LS bits anyway, the first and last transactions on the PCI bus ignore the bytes that are not needed (on a read) and set the appropriate C_BE byte enable bits on a write). The PCI block handles a write that needs to have a different byte alignment. A single DWORD write with selected byte enables set is followed by a burst with all byte enables set.

In FIG. 54, the I/F to the DPRAM includes a counter for each "byte column" in the memory. These counters act as the pointers into memory. By incrementing these counters when the memory is enabled, only the desired bytes are put into the DPRAM, and they are correctly positioned by the shifter.

To support serial I/F and DMA, the circuitry routes an "end of buffer" (buffer empty) interrupt to either the host or the DSP since both the host and the DSP can put data into buffers for the I/O devices. Then the host or DSP can refill the buffer.

In FIG. 52, the voice codec interface moves data between the ASIC DPRAM and the voice codec via a ping-pong transmit buffer and a ping-pong receive buffer. The interface resides on ASIC RAM port A, is arbitrated for access to the port, and allows simultaneous receive and transmit. The AC36 or AC56 voice codec is a serial device, and the voice codec interface suitably provides a serial-to-parallel converter for receive, and a parallel-to-serial converter for transmit. The AC56 16-bit wide data is retrieved on word boundaries from the ASIC RAM. Discretes from the ASIC to the voice codec control the linear select, earphone mute, mic mute, and power down functions of the voice codec.

The voice codec is driven by the C5x on the same serial bus as a modem AC01 codec in a slave mode, since the Frame Sync signals on the AC01 are active low, and the Frame Sync signal on the AC56 is active high. The B side of the DPRAM is treated like a FIFO by the state machine that handles the codec. The data for the codec is a simple 16 bit stream, double buffered so that 32 bits (2 words) of data are sent while a second Dword is waiting. When the first Dword has been transmitted, the Dword in waiting drops into the transmit register and the state machine gets another Dword from the DPRAM. If the voice codec is sampled at 8 KHz, then fetching one Dword after two 16 bit samples entails the state machine fetching data from DPRAM once every 250 uSec.

High-level operation of the voice codec interface is depicted in the following state diagram of FIG. 52A.

The serial interface to the AC56 can have an CLK of 2.048 Mhz and a sample frequency of 8 KHz. The modem codec and the voice codec advantageously share clocks. A 28.8k modem uses 7200, 8000, or 9600 Hz sample frequencies. The voice codec uses 8000 Hz. With this voice codec a ratio of 256:1 is maintained between the MCLK frequency and the frame synchronization (FS) frequency. The master clock MCLK frequency for the voice codec can be generated either by a 2.048 MHz oscillator or by the DSP CLKOUT1 divided down within the ASIC.

Voice codec management responds to a power down signal and the power dissipation of the AC56 will drop to about 1.25 mW. If only a single channel is needed (i.e., send or receive) the unneeded Frame Sync transmit FSX or frame sync receive FSR can be held low for at least five frames. This will (after a few mSec) turn off the unused channel. The power dissipation of the AC56 will be about 10 mW in this mode, compared to fully powered up mode power dissipation of 20 mW. If a channel that is in standby mode is needed, it will be active again a few mSec after the Frame Sync is started up again.

The FSR and FSX signals are generated by dividing the ASIC CLK_AC signal input by 256, resulting in a voice codec frame of 125 microseconds. The CLK_AC and FSR and FSX signals are used by a state machine in the ASIC that serializes and send/recv data over the data transmit DX and data receive DR signals. The 16 bit data (assuming the linear non-companded mode) is transmitted on the rising edge of each MCLK pulse after the rising edge of FSX at the ASIC. The data is received on each of the 16 CLK pulse falling edges following the rising edge of FSR at the ASIC. Power-down mode is achieved by holding PDN pin low, and keeping FSR and FSX low. The standby modes work as follows:

PDN pin high along with FSR and FSX low achieves devices standby. PDN pin high along with FSR low and FSX pulsing achieves receive channel in standby.

PDN pin high along with FSX low and FSR pulsing achieves transmit channel in standby.

Voice codec discrete control bits are discussed next.

A DCLKR signal is connected to VCC to indicate a fixed-timing-mode is being used. The linear select signal, when low, selects linear coding/decoding, when high selects companded coding/decoding. In linear mode, the voice codec pads the LSB nibble of the sent data word with volume control settings contained in the voice codec volume control register.

Figure 74:
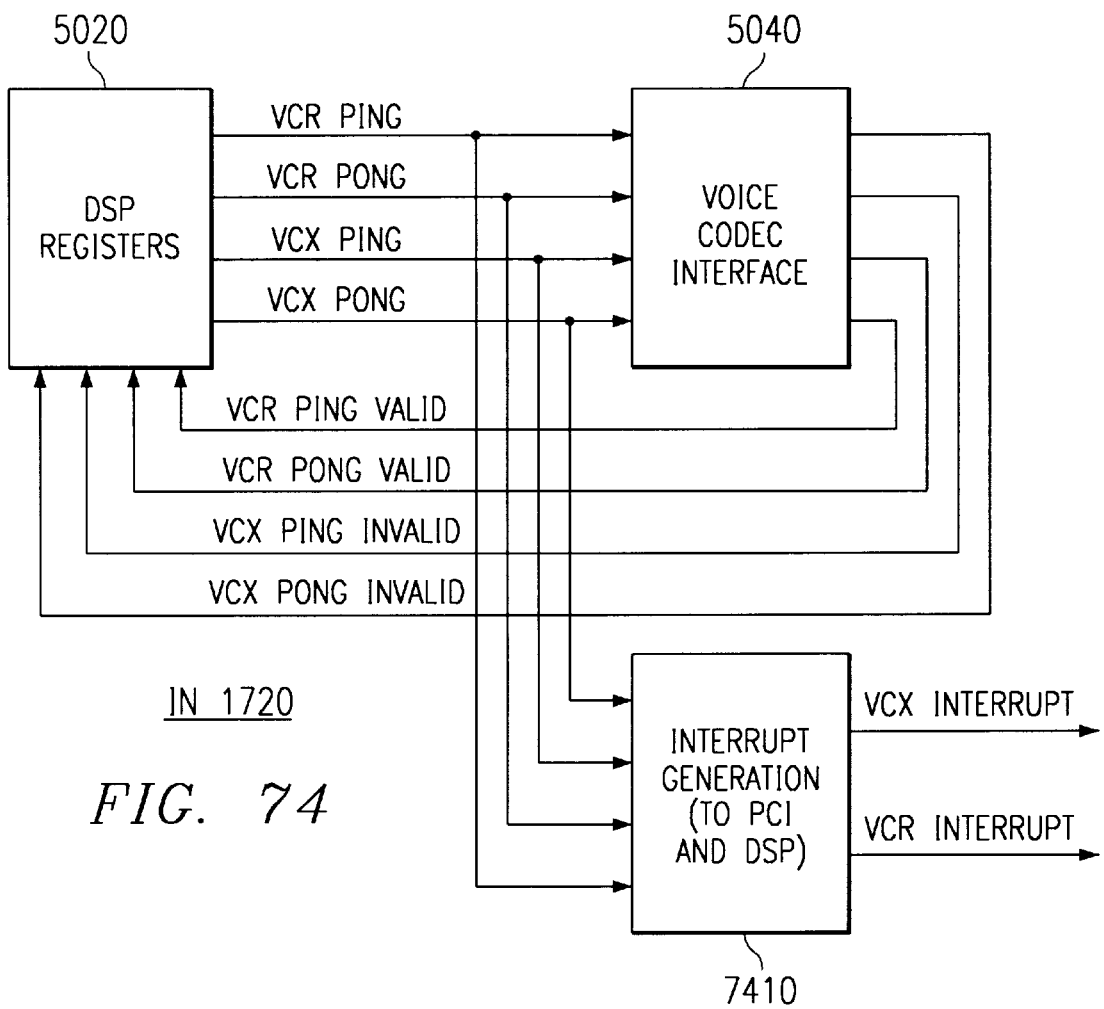
FIG. 74 is an electrical block diagram showing how DSP registers, voice codec state machine, and interrupt generation logic have transmit/receive ping/pong lines connected in wrapper ASIC shared registers 0x16, 0x18, 0x5C, 0x5D.
Figure 76:
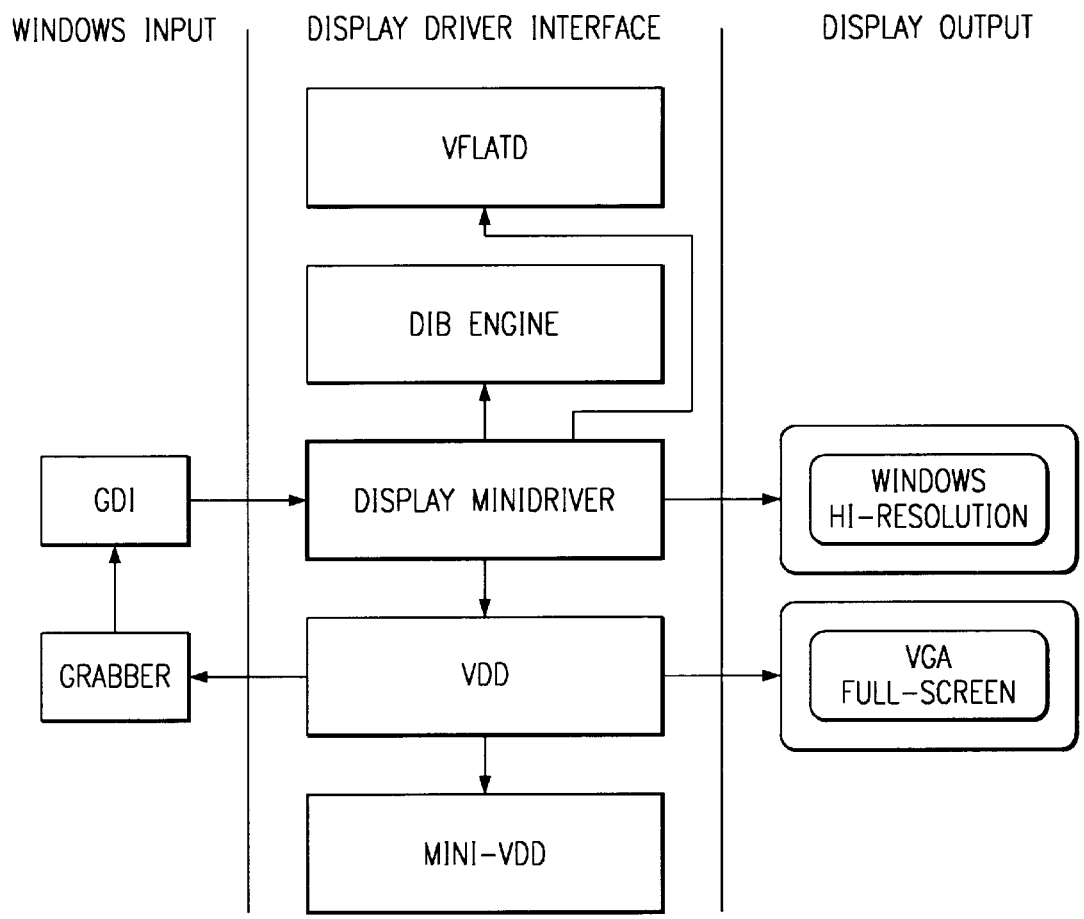
FIG. 76 is a process diagram or method-of-operation diagram showing interrelated processes in a Windows95 display driver interface for unified signal processing improvements herein.
Figure 77:
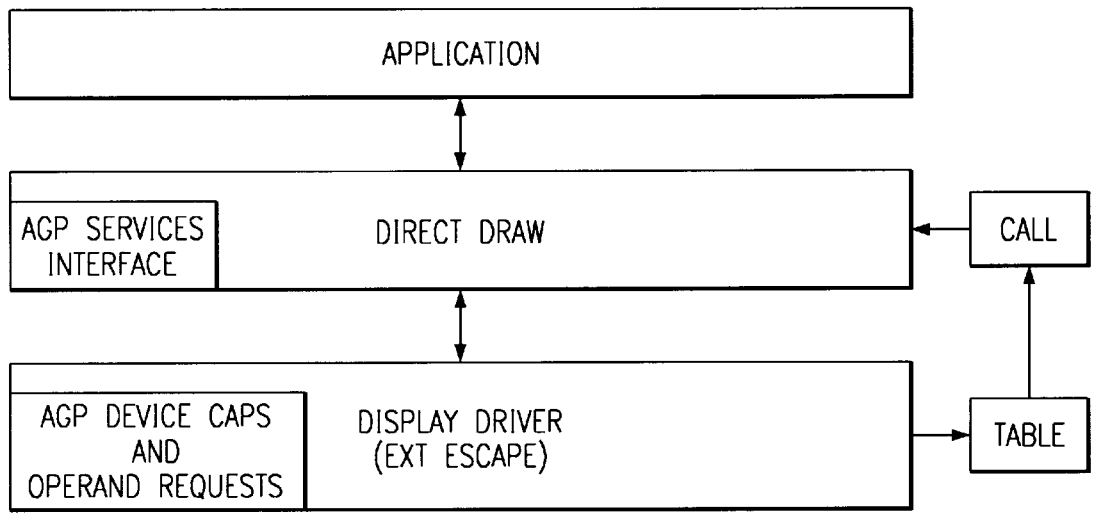
FIG. 77 is a process diagram or method-of-operation diagram showing interrelated advanced graphics port (AGP) processes for unified signal processing improvements herein.

The voice codec state machine is controlled by bits in the C5x DSP I/O registers, including three bits for the transmit function and three bits for the receive function. FIG. 74 shows how the C5x registers, interrupt generation logic, and voice codec state machine fit together.

The following high-level functional description describes the operation for the transmit and receive operation of the voice codec.

Transmit operation: The following events shall occur when transmitting data to the voice codec:

1. DSP or host fills transmit ping buffer and transmit Pong buffer.

2. DSP or host sets transmit ping buffer data valid bit.

3. DSP or host enables the transmit port and makes appropriate other discrete selections.

4. Voice codec interface transmits ping buffer data to voice codec.

5. Voice codec interface clears transmit ping buffer data valid bit (by setting its xmit_ping_invalid bit).

6. Voice codec interface waits for ping buffer data valid bit to go inactive, then clears its own xmit_ping_invalid bit.

7. The voice codec interrupt is set on the basis of the change on the ping buffer data valid bit.

8. Voice codec interface checks transmit Pong buffer data valid bit, if set, begins transmitting Pong buffer data to voice codec.

9. DSP or host responds to voice codec interrupt and fills transmit ping buffer with data.

10. DSP or host sets transmit ping buffer data valid bit.

11. Voice codec interface clears transmit pong buffer data valid bit (by setting its xmit_pong invalid bit).

12. Voice codec interface waits for pong buffer data valid bit to go inactive, then clears its own xmit_pong_invalid bit.

13. The voice codec interrupt is set on the basis of the change on the pong buffer data valid bit.

14. Voice codec interface checks transmit ping buffer data valid bit and begins processing transmit ping buffer.

15. process continues.

If the voice codec interface encounters a data valid bit which is not set, then the last data sent to the voice codec is continuously sent until the data valid bit is set or the interface is disabled. The voice codec state machine also generates an error signal (level) to indicate that this error condition is present. The error signal is turned off once the error condition goes away.

If there is not enough data left for the Host or DSP to completely fill a buffer, the Host or DSP repeats the last valid data value until the buffer is full.

Receive Operation

1. DSP sets ping data buffer address and size and then sets the receive enable bit.

2. Voice codec interface fills ping data buffer, once buffer is full, the voice codec interface sets the ping valid bit.

3. Voice codec interface then waits for ping data buffer bit to be valid before removing its ping valid bit.

4. DSP or host responds to the ping valid bit and reads entire ping buffer data then clears ping valid bit.

5. DSP or host sets the receive enable bit, if not set, for the voice codec to continue with a receive of the pong data.

6. Voice codec interface fills pong data buffer, once buffer is full, the voice codec interface sets the pong valid bit.

7. Voice codec interface then waits for pong data buffer bit to be valid before removing its pong valid bit.

8. DSP or host responds to the pong valid bit and reads entire pong buffer data then clears pong valid bit.

9. process continues.

The receive case is similar to the transmit case except that the voice codec state machine is filling the DPRAM and the Host or DSP is emptying the DPRAM. The role of marking the ping and pong valid bits is also reversed. In the case where both the ping and pong valid bits are set and the voice codec state machine is ready to write new data to the DPRAM (it is not able to since no buffer is available), the state machine drops the new data and asserts an error signal (level) to indicate the presence of an error condition. When the condition ceases to exist, the error signal is removed and the latest data is put in the DPRAM again.

Figure 49:
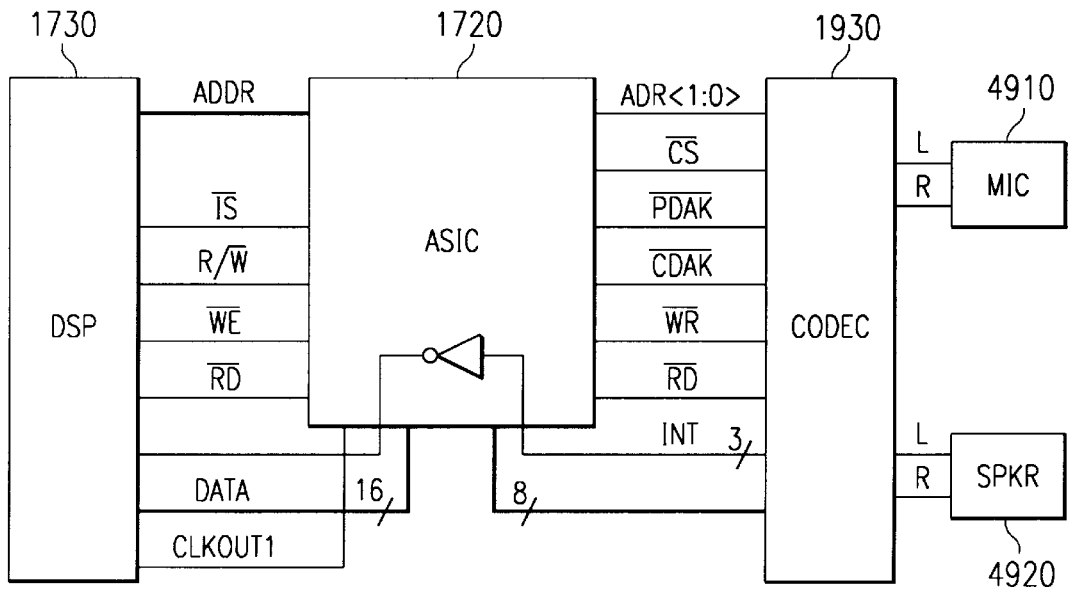
FIG. 49 is an electrical block diagram of interconnections between a wrapper ASIC, a DSP and a stereo codec in a system embodiment.

In FIG. 49, an example of a stereo codec is a commercially available Crystal CS4231. The PCI side of the DPRAM is treated like a FIFO by the state machine that handles the codec. The time base of the state machine is preferably the constant PCI clock rate but can be the DSP clock, although the DSP clock may vary depending on the performance requirements of other functions unrelated to the stereo codec. The codec state machine is preferably one-shot encoded to reduce the gates needed to implement the features.

The stereo codec interface supports different bus cycle protocols, DMA transfers and programmed I/O (PIO). For transferring data between the ASIC and the stereo codec device, the interface uses DMA mode. Programmed I/O (PIO) mode is used for control register accesses. The operation and control of the stereo codec interface and device is achieved by reading and/or writing to several I/O registers. The registers, description given below, are the PIO control, auto PIO address/data, and the control register. In general, these registers set the mode of operation for the stereo codec. PIO mode high-level description of control and operation is listed next.

PIO Mode Without Auto Indirect (Read/Write)

1. DSP or host writes to the PIO address/data register, where an address is presented for a PIO read or write cycle and for a PIO write cycle data is also presented to this register.

2. DSP or host makes appropriate control and operation selections and writes to the PIO control register were the codec_start bit is set.

3. Stereo codec interface transmits data from the PIO address/data register for a write cycle and for a read cycle the interface writes to the PIO address/data register.

4. Stereo codec sets scodec_done which in turn causes an interrupt to the DSP or host.

5. DSP or host responds to voice codec interrupt and continues with the same procedure for another PIO operation.

PIO Mode With Auto Indirect (Read)

1. DSP or host writes to the PIO address/data register where an address is presented for a PIO indirect read cycle.

2. DSP or host makes appropriate control and operation selections and writes to the PIO control register where the codec_start bit is set to enable the stereo codec interface.

3. Stereo codec interface transmits data in two cycles due to indirect PIO mode of operation. First cycle to the stereo codec device is a write to the index address register at the location (00) contained in the PIO address/data register. Data from the PIO address/data register is written to the IXA register which will effectively selects an indexed address register in the stereo codec device. Second cycle to the stereo codec device is read from the stereo codec indexed data register at the location (01) contained in the PIO address/data register. The data read from the stereo codec is written to the PIO address/data register by the stereo codec interface.

4. Stereo codec sets scodec_done which in turn causes an interrupt to the DSP or host.

5. DSP or host responds to stereo codec interrupt and continues with the same procedure for another indirect PIO read operation.

PIO Mode With Auto Indirect (Write)

1. DSP or host writes to the PIO address/data register where an address is presented for a PIO indirect write cycle.

2. DSP or host makes appropriate control and operation selections and writes to the PIO control register were the codec_start bit is set to enable the stereo codec interface.

3. Stereo codec interface transmits data in two cycles due to indirect PIO mode of operation. First cycle to the stereo codec device is write to the index address register at the location (00) contained in the PIO address/data register. Data from the PIO address/data register is written to the IXA register which will effectively select an indexed address register in the stereo codec device. Second cycle to the stereo codec device is a write from the PIO address/data register to the stereo codec's indexed data register. The data written to the stereo codec is written to the PIO address/data register by the stereo codec interface.

4. Stereo codec sets scodec_done which in turn causes an interrupt to the DSP or host.

5. DSP or host responds to stereo codec interrupt and continues with the same procedure for another indirect PIO write operation.

Turning to the EEPROM I/F and state machine, the EEPROM is used to read configuration information after hardware reset. The bytes in the EEPROM that are not used for configuration data are available for other uses. Some uses include: the last mode the card was in (modem, stereo codec, voice codec), or the values of the DPRAM addresses and buffer sizes. The configuration data start at a write-protected section address 0xC0. The host can read and write to the EEPROM, but the C5x DSP does not have access to this data.

In PCI, reset signal PCIRST is low for at least one mSec after power good. This is the maximum time specified by the Xicor X24C02 EEPROM for the time to reliably read data from the EEPROM. A dedicated state machine in FIG. 54L reads the configuration data and a checksum byte after the reset signal is removed. During this EEPROM read, any PCI slave cycles are retried (CD_SLV_STOP_XFER asserted). After the state machine completes the read of the configuration data, the state machine reads a checksum byte. If the checksum is not correct, the registers that supply the data to the PCI macro are reset to their default values (to prevent an unprogrammed EEPROM from putting meaningless bits in the configuration registers). When the state machine has completed, the control of the EEPROM interface signals passes to host IO register bits. In this way, the host reads and write the EEPROM under host software control. The host can re-read the configuration data, any other data, or write to any location within the EEPROM.

The EEPROM state machine outputs 48 bits of data broken up into the following fields:

| Subsystem ID | 16 bits | |
|---|---|---|
| Subsystem Vendor ID | 16 bits | |
| Max Latency | 8 bits | |
| Min Grant | 8 bits | default is 0x00 |

The state machine uses these values in case of an error in reading data from the EEPROM. For example, if the EEPROM is not present on the board, these values are used in the configuration of the board.

A nine stage PCI clock divider is used to generate a 66 KHZ EEPROM clock SCL. This EE_CLK is used to perform the configuration reads. After a configuration read, the SCL output is muxed to the PCI register that holds the static SCL value. The EEPROM interface design supports a serial interface and software protocol allowing operation on a simple two wire bus, per datasheet of the commercially available Xicor X24C02. A EEPROM transaction consists of a START condition, followed by data, followed by an ACKNOWLEDGE condition. A START condition is defined as the SDA signal being driven from high to low while SCL is high. Data values may only change while SCL is low. The ACKNOWLEDGE condition is a logic 0 being returned as the 9th bit of data from the agent receiving data. Another condition, the STOP condition, is defined as a low to high transition on SDA while SCL is high. This STOP places the EEPROM in a standby power mode after a read sequence.

After power up, the EEPROM state machine sends 9 clocks to the EEPROM by putting a value of 1 on SDA-out. This allows the EEPROM to finish any read operation that was in progress when the reset signal was applied. If the EEPROM does not receive an ACK from the master, the EEPROM stops transmitting data. This data stop is followed by a STOP condition from the state machine before the configuration data is read.

To begin reading the configuration data, the state machine sends the control word (0xA0) with the R/W bit set to 0 followed by the word address (0xC0). If the EEPROM does not respond with the ACK bit after the slave address (*ACK), the state machine sets the error bit and terminates. Default values are used in the configuration registers.

If the ACK bit is sent, then the state machine performs another "start" and sends another control word with the R/W bit set to "1" for a read and continues reading the 6 bytes (plus the checksum byte) starting at address 0xC0. After each byte is received it is stored in a register and presented to the PCI block (since they are read-only values). Byte 7 is the checksum byte and is used for error detection. The checksum is computed from a cyclic redundancy code checker circuit. Mathematically, the following procedure generates a checksum byte from bytes 1–6 read from the EEPROM device. The following polynomials are used to specify the checksum value.

$$G(x) = X^8 + X^2 + x + 1$$

$$C(x) = X^6 + X^4 + X^2 + 1$$

Where:
G(x) is the generating polynomial, and
C(x) is the coset polynomial.

The check sum value corresponding to a six bytes read are obtained by the following procedures: The 47 bits of bytes1–6 are considered to be the coefficients of a polynomial M(x) of degree 47 (bit 8 of byte 1 corresponds to the $X^{47}$ term and bit 1 of byte 6 corresponds to the $X^0$ term). M(x) is be multiplied by 8 and divided (modulo 2) by G(x). C(x) is added modulo 2 (exclusive OR) to the remainder of this division producing a polynomial R(x) of degree <8.

The coefficients of R(x) are considered to be an 8-bit sequence. This 8-bit sequence is the checksum. The 8 bits of the checksum are such that the coefficient of $X^7$ is bit 8 and the coefficient of $X^0$ term is bit 1. The checksum should have a non-zero seed value. The seed value(i.e. coset) is 0x55. If the checksum fails, the registers are reset to their default value.

Figure 54L:
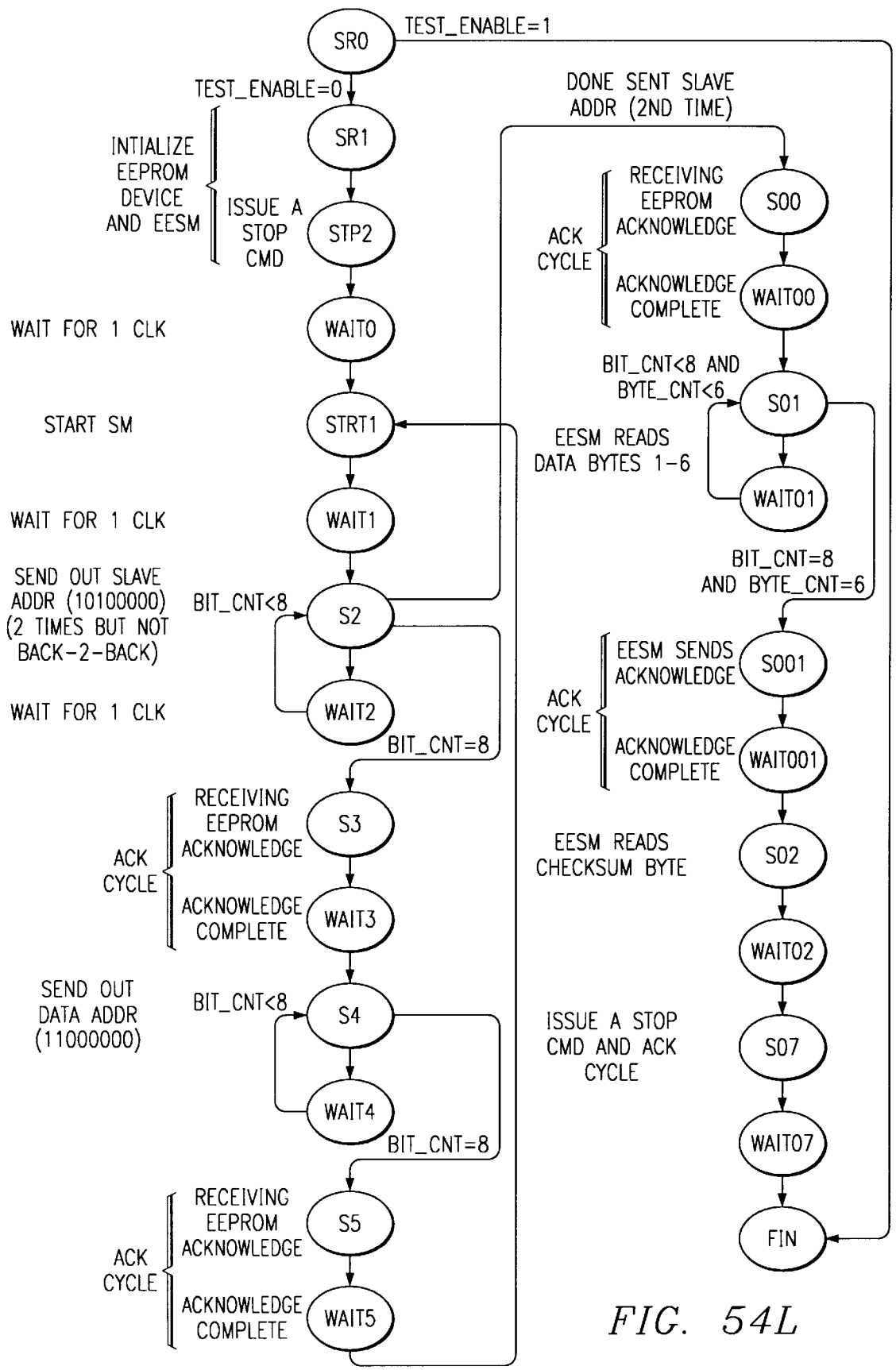
FIG. 54L is a state transition diagram of a process or method of operation of a EEPROM state machine in the wrapper ASIC of FIG. 50.
Figure 54M:
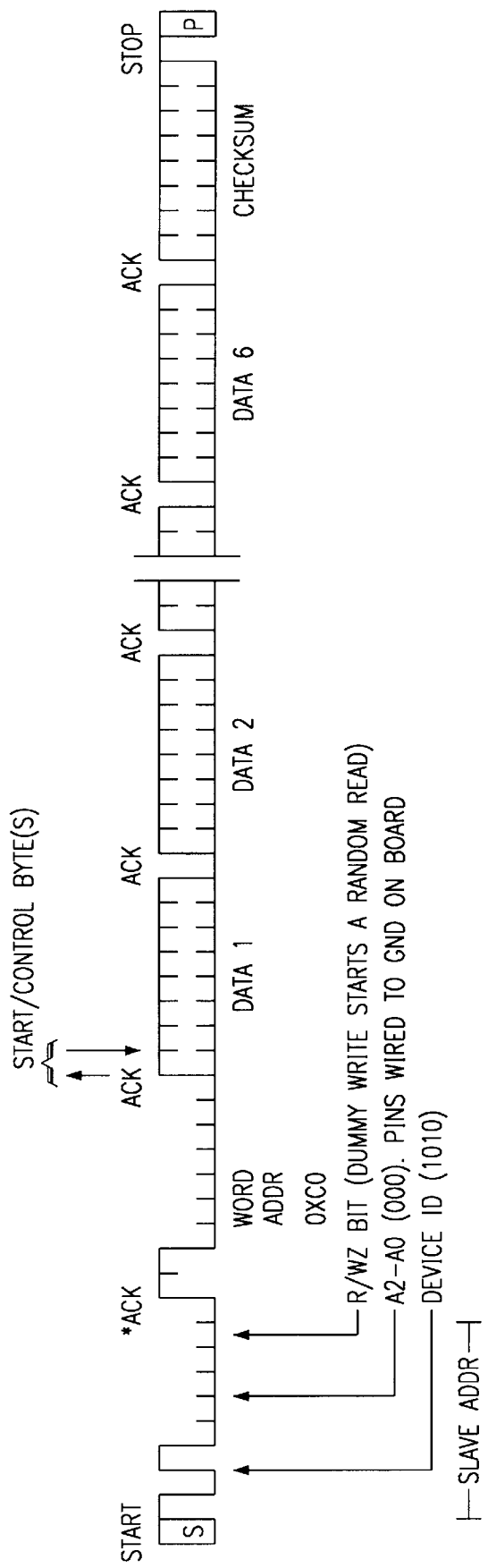
FIG. 54M is a timing diagram of a process or method of operation of the EEPROM state machine EESM in the wrapper ASIC of FIG. 50.

FIG. 54M shows the timing diagram of the state machine of FIG. 54L.

Figure 73:
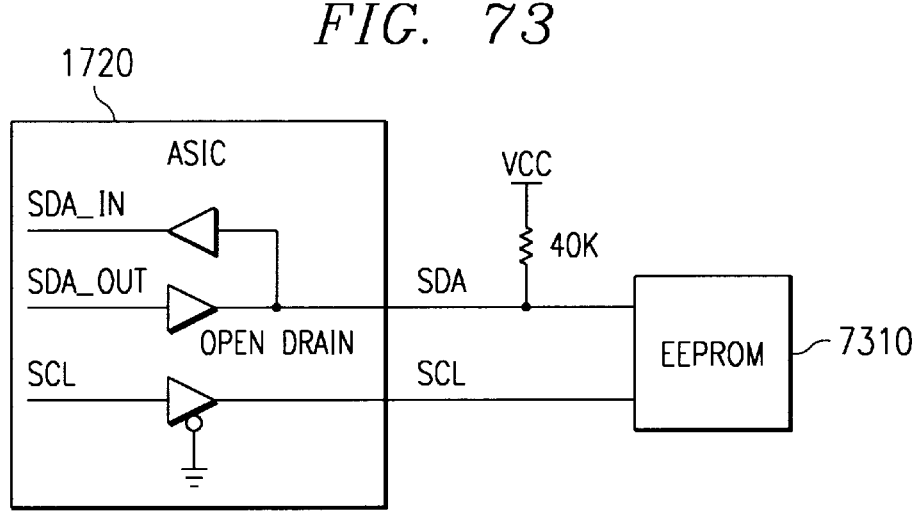
FIG. 73 is an electrical schematic diagram showing the SDA, SDL pin interface of wrapper ASIC to EEPROM.

Electrically the EEPROM state machine design interfaces to the EEPROM via the ASIC on the board per FIG. 73.
EEPROM I/F Signals
The signals going into and out of the EEPROM block are:

| | |
|---|---|
| PCLK_i | : in PCI clock |
| PCI_RST_i | : in PCI HW reset signal (active low) |
| PCI_scl | : in PCI Register SCL (clock) |

-continued

| | |
|---|---|
| PCI_wcz | : in PCI Register WCz (Write enable (active low)) |
| PCI_sda_in | : out PCI Register SDA (data input bit) |
| PCI_sda_out | : in PCI Register SDA (data output bit) |
| EESM_done | : out Status bit. 0=working 1=done |
| EESM_err | : out Error bit. 0=No Error yet 1=Error detected |
| SCL | : out SCL (clock) to EEPROM |
| SDA_out | : out SDA (data) to EEPROM |
| SDA_in | : in SDA (data) from EEPROM |
| WCL | : out SDA (data) to EEPROM |
| sub_vend | : out(16) Sub System Vendor ID to config block |
| sub_sys_ID | : out(16) Sub System ID to config block |
| min_gnt | : out(8) Minimum Grant to config block |
| max_lat | : out(8) Maximum Latency to config block |

The C5x DSP has access to 32 synchronous registers. These registers are up to 16 bits wide depending on their application. The registers are tabulated later hereinbelow and explained in detail in the subsequent paragraphs. The DSP has exclusive random access to one side of the DPRAM in this embodiment, with fast read access via buffered data. The DSP does not need to act like a FIFO and completely empty the memory between PCI block operations. The DSP can intercept incoming slave data bound for the voice or stereo codecs, manipulate the data, and put it back in a memory buffer for either playback through a codec or for recording to main memory.

FIG. 72 shows a zero-wait-state wrapper interface to DSP. The ASIC RAM is a clocked RAM, and interfacing for 0-wait-states with an asynchronous DSP is accomplished as follows. The first access to the DPRAM is one wait-state. If the subsequent reads are from linear addresses, the address is predicted and the data is valid in time to perform a 0-wait-state read. The first read wait-state is inserted using the READY signal on the C5x. The C54x does not sample the READY signal until it has already seen 2 software wait-states so the C54x uses software wait-states to access the DPRAM.

Figure 71:
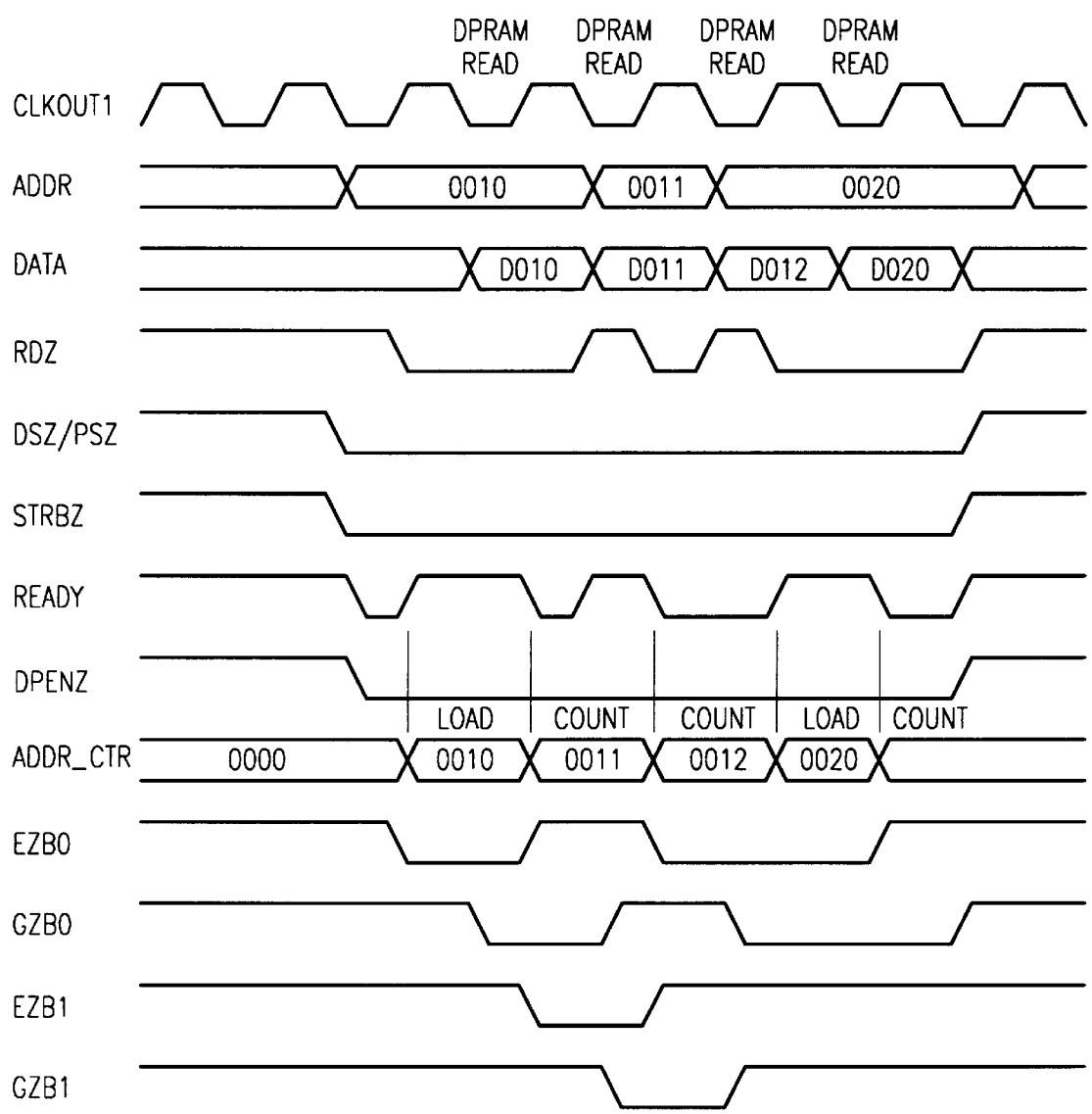
FIG. 71 is a waveform diagram illustrating a method of operating the DSP and circuitry of FIGS. 72-1 and 72-2 to interface a DSP to the wrapper ASIC DPRAM.

In FIG. 71, the timing for interfacing the C5x to the ASIC DPRAM is shown.

Figure 69:
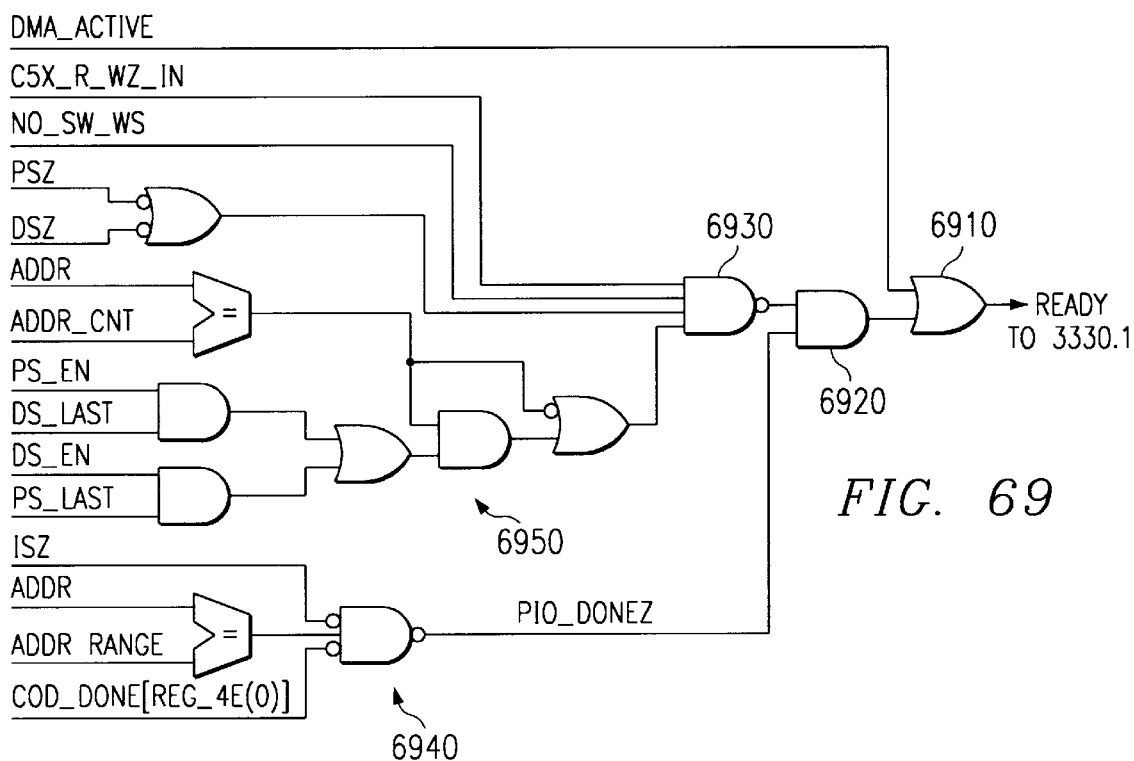
FIG. 69 is an electrical schematic diagram of a circuitry and method embodiment for producing a READY signal for wrapper ASIC DPRAM read operations.

Turning to READY signal generation in FIG. 69, the READY signal for DPRAM reads is generated by looking at the program and data strobes, the read control and no_sw_ws bit, the currently driven address and the address on the internal counter, and whether the last access was to the same space. Wait states for IO reads from stereo codec PIO registers also utilize wait states to hold off the C5x DSP. (The host can also poll DONE instead of holding it off. The C54x DSP differs from the C5X in that C54X does not allow HW wait-states until at least 2 SW wait-states have been used. The C54X accordingly uses 1 SW wait-state to read the DPRAM)

Turning to DSP bootload, the C5x is loaded at boot time in the 16-bit parallel EPROM mode. The bootload process starts with a C5x read from Global RAM at address FFFF. The data presented determines which type of bootload will be performed. The data format for the Global RAM read is: 15:8=Don't Care. 7:2 is SRC. "10" in bits 1:0 establishes 16-bit Parallel EPROM Mode.

Figure 67:
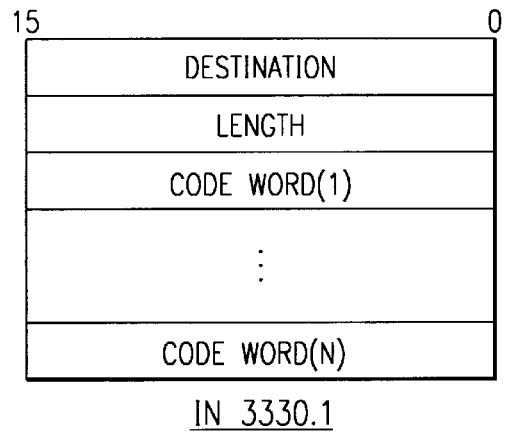
FIG. 67 is a diagram of wrapper ASIC DPRAM memory space for DSP bootload purposes, the memory space pointed to by an SRC address of FIG. 70.

After this initial read, the C5x reads from the address specified by the value SRC. The C5x destination address and length of data to load are the first parameters. FIG. 67 shows the memory configuration that the C5x expects at the address pointed to by SRC. This data is stored in the DPRAM by the host PC before taking the C5x out of reset if the C5x is to run initially out of on-chip memory. If the C5x will initially run out of the ASIC DPRAM, the bootload process can be shortened significantly. The host preloads the C5x code into the DPRAM, then puts the bootload value in address 0x7FF (C5x addr). Then the SRC address points to where the host has already put data. The minimum value of bootload length (0x0000) is used. The C5x reads data and writes the same data back to the same location on bootup, then starts executing C5x code stored in the ASIC DPRAM. Since the SRC address is 6 bits, this leaves 10 bits of address that may vary for the bootloading. The ASIC DPRAM illustratively has 11 bits of address, yielding two possible locations in the DPRAM from which the C5x may load boot data. The value of SRC, for example, is "111110" which Board SRAM Enables are two signals Upper Bank Chip Select (UB_CSZ) and the Lower Bank Chip Select (LB_CSZ).

Figure 66:
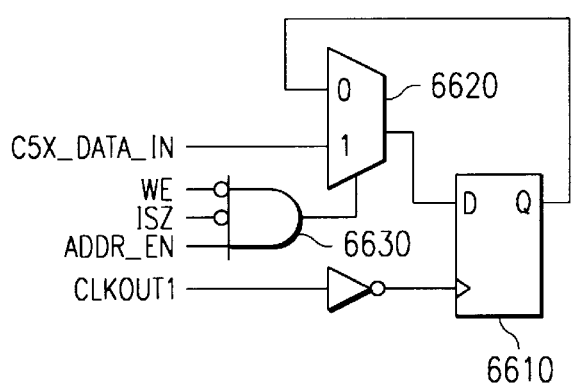
FIG. 66 is an electrical schematic diagram of a D-latch representing any bit of DSP I/O Registers 0x50, 0x52–0x6F (FIG. 38) in the wrapper ASIC, and associated control circuitry to supply DSP Data In to put a one/zero in the D-latch.

The C5x DSP I/O registers are synchronous to the CLK-OUT1 signal from the C5x DSP. FIG. 66 shows the logic for each bit of an interface with flip-flops and feedback muxes to hold data that is resistant to signal ringing.

The C5x I/O map for the implemented registers is shown in the following table.

C5x I/O Space Accessible Registers

| Address | # of Bits | Register Function | R/W | Name |
|---|---|---|---|---|
| 0x50 | 8 | DSP Interrupt Mask Register | R/W | |
| 0x51 | 8 | DSP Interrupt Register | R/W | |
| 0x52 | 12 | PCI Xfr DPRAM Addr | R/W | dpram_addr |
| 0x53 | 16 | C5x Generated PCI Addr LSW | R/W | host_addr |
| 0X54 | 16 | C5x Generated PCI ADDR MSW | R/W | |
| 0x55 | 16 | PCI Macro Address Offset Register | R/W | addr_offset |
| 0x56 | 16 | PCI Macro # of Words/Bytes Register | R/W | num_word_byte |
| 0x57 | 16 | PCI Macro Control Register | R/W | |
| 0x58 | 16 | DMA SRAM Addr | R/W | sram_addr |
| 0x59 | 16 | DMA Word Count | R/W | word_cnt |
| 0x5A | 14 | DMA Control/DMA Granularity/Delay | R/W | dma_gran/dma_dly |
| 0x5B | | Reserved (returns "0" when read) | R | |
| 0x5C | 6 | *Voice Codec Control Register | R/W | |
| 0x5D | 6 | *Stereo Codec Control Register | R/W | |
| 0x5E | 10 | DPRAM DS Pointer DPRAM PS Pointer | R/W | dpram_ds/dpram_ps |
| 0x5F | | Reserved for (C54x) Bootland | R | |
| 0x60 | 11 | DMA Ping Address | R/W | dma_adr |
| 0x61 | 10 | DMA Buffer Size | R/W | dma_buf |
| 0x62 | 11 | Voice Codec Xmit Ping Address | R/W | vcx_adr |
| 0x63 | 10 | Voice Codec Xmit Buffer Size | R/W | vcx_buf |
| 0x64 | 11 | Voice Codec Recv Ping Address | R/W | vcr_adr |
| 0X65 | 10 | Voice Codec Recv Buffer Size | R/W | vcr_buf |
| 0x66 | 11 | Stereo Codec Xmit Ping Address | R/W | scx_adr |
| 0x67 | 10 | Stereo Codec Xmit Buffer Size | R/W | scx_buf |
| 0x68 | 11 | Stereo Codec Recv Ping Address | R/W | scr_adr |
| 0x69 | 10 | Stereo Codec Recv buffer Size | R/W | scr_buf |
| 0x6A | 2 | PCI Slave Retry All SRAM CE register | R/W | |
| 0x6B | 16 | PCI Diagnostic Center | R | |
| 0x6C | 1 | PCI Int | R/W | |
| 0x6D | 4 | C54xI/F SRAM Spd BIO Mux No-SW-WS | R/W | |
| 0x6E | 6 | *Stereo Codec PIO Control | R/W | |
| 0x6F | 16 | *Auto PIO Addr *Auto PIO Data | R/W | |

Figure 68:
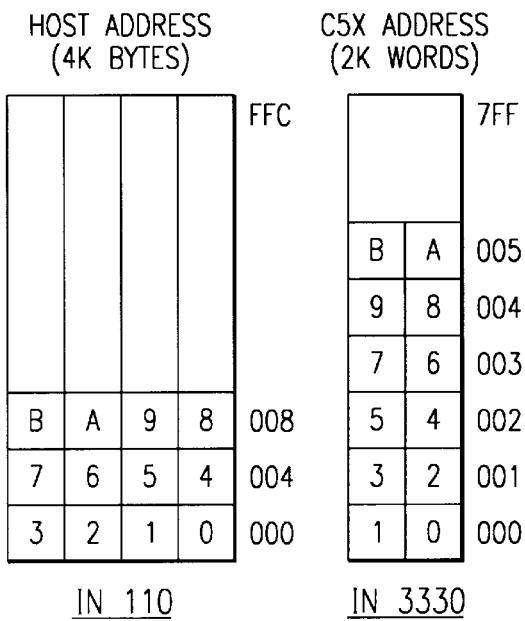
FIG. 68 is an address space comparison diagram showing host data in host address space, and corresponding data in DSP address space in a method embodiment.

*Write capability shared and controlled by PCI.

corresponds to DPRAM address 0xF800, the default address for Data Space (see C5x Register 0x5E). The address the Host writes to the DPRAM differs from the address the C5x uses to access the DPRAM. The SRC value given to the C5x is divided by two and the 11 least significant bits are used. FIG. 68 shows how addresses correspond between the Host and the C5x.

Figure 68A:
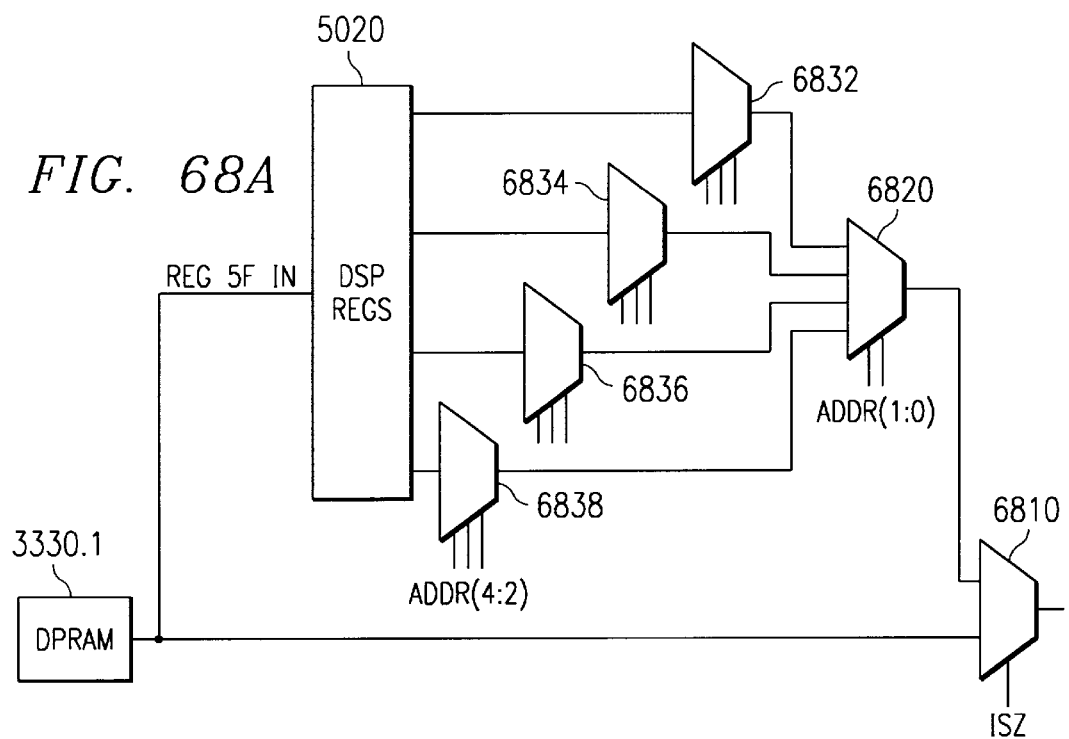
FIG. 68A is an electrical block diagram of circuitry and method for DSP read of wrapper ASIC DPRAM via I/O space for C54x bootload, for instance.

The bootload process for the C54x resembles the process for the C5x with one exception. The C54x makes its initial read at address FFFFh from IO space (since the C54x does not have global memory). To accommodate both processors, the data stored in the DPRAM at the highest address is routed through the IO register output muxes, because the IO strobe signal controls the final mux stage of the data to the DSP. FIG. 68A illustrates this process.

The ISz signal is used to decrease the delay involved in reading the DPRAM. The IO register output muxes directly use the 5 lsb's of the address to mux out the DSP data, which involves using address 0x5F for the C54x bootload data path.

The C5x DSP interrupt mask register (0x50) masks the interrupt bits going to the C5x. A value of "0" indicates that the interrupt is masked, corresponding to the way interrupts are masked in the C5x. The order of mask bits in register 0x50 corresponds to order of bits in DSP interrupt register (0x51) described next.

The DSP interrupt register 0x51 lower 8 bits collect the system interrupts for the DSP. The interrupts are held and driven to a single DSP interrupt input. Writing a "0" to any bit in the register causes no interrupt. Writing a "1" to any bit in the register toggles the bit (write a 1 to a 0 and the result is 1, write a 1 to a 1 and the result is 0), mimicking the C5x on chip interrupt register. All of the signals in this register are synchronized to the C5x CLKOUT1 clock domain. The PCI bus master interrupt bit becomes set when the PCI block signal MSTR_BUSY_RETRY transitions from a 1 to a 0 signifying that a PCI master transaction is currently in process. The C5x DMA bit is set by the DMA_DONE signal (DMA has completed.) The stereo codec Xmit interrupt is generated when either the Xmit ping or Xmit pong valid bits transition from a logic 1 to a logic 0. The stereo codec Recv interrupt is generated when either the Recv ping or Recv pong valid bits transition from a logic 0 to a logic 1. The voice codec interrupts are generated the same way. The "host generated" C5x interrupt is set when the corresponding bit in the PCI register space is set. The stereo codec IRQ interrupt echoes the IRQ signal from the codec. Once an interrupt is signaled from a subsystem, it remains in the interrupt register even if the subsystem stops applying the interrupt before it is serviced. The subsystem applies the interrupt for two CLKOUT1 periods to insure that the interrupt can be captured during a 1 wait-state write to the interrupt register. Interrupt inputs to the interrupt register are suitably pulse type. Level type outputs are suitably converted to pulses by the peripherals or within the register logic block.

Figure 65:
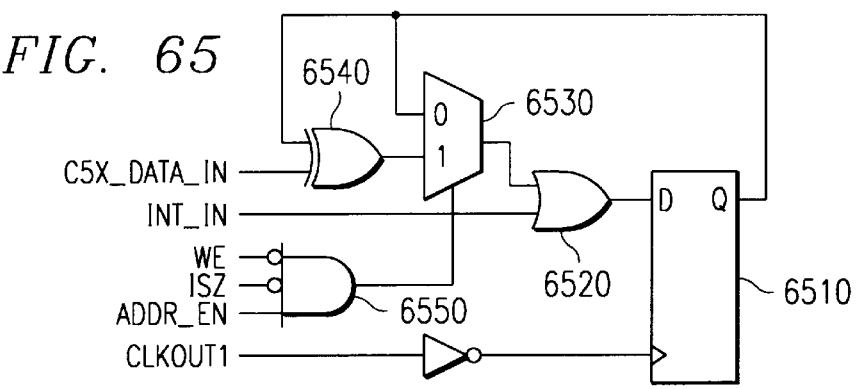
FIG. 65 is an electrical schematic diagram of a D-latch representing any bit of DSP Interrupt Register 0x51 illustrated in FIG. 64, and associated control circuitry to controllably OR a given interrupt with the one/zero in the D-latch.

The interrupt register has the interrupt OR'd into the data before the flip-flop and after the feedback mux as shown in FIG. 65.

DSP Interrupt INT3 is activated by PCI bus master and C5x DMA interrupt bits of register 0x51. INT4 is activated by host generated C5x and stereo codec IRQ bits. INT1 is activated by the bits stereo codec Xmit and Recv and INT2 is activated by bits voice codec Xmit and Recv.

Register 0x52 PCI transfer DPRAM address holds a 12 bit address where the PCI block puts data or gets data during a PCI transaction. The address is either a C5x word address or a byte address depending on the value of bit 8 of PCI macro control register. As a word address, this address is the starting C5x address of the PCI buffer (i.e., writing to 0xF900 with data (if PS en is set to 0xF800) will mean that the DPRAM Addr should be 0x100). As a byte address, this address corresponds to the DPRAM address that the Host will use to get data. For example, if data is written into 0xF900, then this value should be 0x200. Although this mode allows data buffers to start on non-word (byte) boundaries, the data can start at the most significant byte of the word at 0xF900 and the DPRAM sddress is then 0x201.

The C5x generated PCI address LSW register (0x53) holds the least significant word of the host address that is used for a PCI transaction (bits 15 to 12). All bits are implemented to allow software the flexibility to generate addresses.

The C5x generated PCI address MSW (0x54) holds the most significant word of the host address that will be used for a PCI transaction (bits 31 to 16).

PCI macro address offset register (0x55) {words or bytes} allows data to be sent and received from host main memory within a 4k byte data area. The address is expressed as either a C5x word address or as a byte address depending on the value of bit 8 of PCI macro control register. The 16 bits in this offset register are added to either the PCI generated host memory address or the C5x generated PCI address to create the address given to the PCI block. This register 0x54 is easy for the C5x to increment as it goes through its host memory accesses.

PCI macro number of words/bytes register (0x56) {words or bytes} controls the number of bytes (or words— programmed by bit 8 of PCI macro control register (0x57) that are sent or received during a PCI bus transaction.

The PCI macro control register (0x57) supplies essential information to start, stop, and control the PCI bus interface block. A start bit (0) is set to cause PCI block to initiate a PCI transaction. If a DMA coupled bit (12) is set, the start of the PCI transaction is delayed until the DMA buffer is filled or emptied, depending on whether it is a read or write PCI transaction. The start bit (0) remains set until the PCI transaction completes, at which time it is reset. A stop bit (3), when set, cancels the current PCI transaction in the PCI block. This stop bit (3) will also remain set until the PCI macro indicates that the transaction has been ended. This stop bit (3) can be used for either reads or writes. On writes, stop bit (3) stops PCI block transmitting of data and causes the PCI bus to be released. On reads, stop bit (3) causes data to continue to be read, but not put in memory, until it can stop. The abort bit input to the PCI macro will not be used.

Four command bits (7:4) in (0x57) register are used to generate the PCI command. The LSB of the command is maintained until the PCI transaction is complete.

The transfer bit (8) indicates whether the value in reg 0x56 should be interpreted by the PCI macro as the number of words to transfer or the number of bytes to transfer.

An address bit (11) indicates whether the C5x or Host generated PCI addresses should be used in the next transaction.

DMA coupled bit (12) (when set) causes the PCI block to work with the DMA state machine to transfer data to or from host main memory or (when reset) directly to the onboard SRAM without DSP intervention. The DMA Coupled bit (12) is maintained until the PCI transaction is complete.

A diagnostic counter enable bit (15) in register 0x57 serves to reset and enable the counter. If this bit is a 0, the counter is reset. If it is a 1, the counter will count on every PCI clock where the PCI block has asserted MSTR_ BUSY_RETRY. To reset the counter after it has been read, this bit (15) is written with a 0, then written with a 1 to enable it again.

DMA SRAM address register (0x58) holds the SRAM address for either the DMA source or DMA destination.

DMA word count register (0x59) holds the number of words that will be transferred in a DMA transaction.

DMA control, granularity, and delay time values register (0x5A) allows DMA transactions to be configured, started, and aborted. A START bit (0) is level-sensitive. When set, start bit (0) stays set until the DMA is complete. If an ABORT bit (3) is set after the start of a DMA, the DMA is terminated and the START bit (0) is reset. A data space/ program space bit (6) tells the DMA state machine which signal to assert for reads and writes to the SRAM where bit 6 is zero for data and one for program. A 2-bit granularity value in bits (5:4) is used to determine how many words will be written while the DMA has control of the DSP bus. More specifically, the granularity value indicates how many right shifts the DMA ping buffer size value will undergo. This shifted value is used to break up a ping buffer into multiple transfers. Between transfers, the DMA state machine waits for the number of clocks specified in 8-bit delay value bits (15:8) to allow the C5x to get on the external bus in between DMA bursts.

Voice codec control register (0x5C) is shared between the C5x and the PCI host, and is readable by both agents. The PCI host determines which agent has write control over the register by setting a bit in the PCI/C5x shared register control register. The logic and timing diagrams for a PCI write access are shown in the voice codec register section under PCI I/O registers. The error bits are read only.

Stereo codec control register 0x5D is shared between the PCI host and C5x like the voice codec register. The logic and timing diagrams for a PCI write access are shown in the stereo codec register section under PCI I/O registers.

Registers 0x5C and 0x5D have similar bit architectures. In both registers, four transmit bits (3:0) respectively hold Error, Pong Valid, Ping Valid, and Enable for transmit. Similarly, in both registers four receive bits (12:8) respectively hold Error, Pong Valid, Ping Valid and Enable for receive.

DPRAM DS/PS address pointer register 0x5E allows the C5x to program which section of memory corresponds to the ASIC DPRAM. These bits are be compared to the upper address bits of the C5x address for reads and writes to the DPRAM.

Care is suitably exercised by the skilled worker to implement these registers to prevent data bus conflict between the DSP and the on board SRAMS.

An address 0x5F (I/O port for C54x I/O Boot Address FFFFh) does not actually contain a register. The address is advantageously used to fool the C54x into thinking it is reading its boot vector (I/O FFFFh) from I/O space when it is actually going to be reading from the ASIC DPRAM. This address is reserved to make muxing easy during the C54x read.

ASIC DPRAM partition registers (0x60–0x69) are reset to the default value shown in the following table. This default allows the ASIC to be powered up and then without C5x intervention, the Host can begin using the Voice or Stereo codec.

| | | |
|---|---|---|
| C5x Default Space & Bootload Space | 0x000 0x100 | |
| MIDI Ping & Pong Buffer ------------------------------ | 0x100 0x120 | (MIDI, DMA buffers overlayed in memory) |
| DMA Ping Buffer | 0x100–0x180 | |
| DMA Pong Buffer | 0x180 0x200 | |
| VCX Ping Buffer | 0x200 0x280 | |
| VCX Pong Buffer | 0x280 0x300 | |
| VCR Ping Buffer | 0x300 0x380 | |
| VCR Pong Buffer | 0x380 0x400 | |
| SCX Ping Buffer | 0x400 0x500 | |
| SCX Pong Buffer | 0x500 0x600 | |
| SCR Ping Buffer | 0x600 0x700 | |
| SCR Pong Buffer | 0x700 0x7FF | |

The buffer addresses and locations show an example in which the buffer size for the voice codec buffers is 128 words each. VCX=voice codec transmit. VCR=voice codec receive. The stereo codec has 256 words, for example, (100h) for each ping or pong buffer. The DMA buffer shares memory space with an optional MIDI buffer starting at address 0x100. The DMA buffer size is 128 words for each ping and pong buffer, while the MIDI buffer size is 16 words per buffer. Without DSP intervention, the DMA will not be used, so the DMA buffer and the MIDI buffer do not conflict. The host can perform the voice codec or stereo codec functions without booting the DSP because these default buffer sizes are provided.

An interrupt to the host is generated every time a ping or pong buffer is emptied (or filled) by a codec. The stereo codec (if running 16 bit stereo at 44.1 KHz) generates an interrupt every 2.9 ms. (# of words in buffer)/((# of words per sample)×(sample rate)). By the same calculation, the voice codec generates an interrupt every 16 ms. for half duplex data. The rate of interrupts falls with decreasing sample rates or increasing size of ASIC DPRAM.

The address words implement 11 bits (2K words of space) with 10 bits to define buffer size for one ping buffer and a same size pong buffer.

SRAM CE register (0x6A) is used to control the static chip enable to all the onboard SRAMs in tandem. This signal is active high to the DSP, so if the bit is set, the SRAM is enabled. Bit 0 of register 0x6A enables the SRAM, and Bit 8 one signifies all PCI slave access retried. Writing one to a bit toggles it.

A 16 bit PCI Diagnostic Counter 0x6B counts the number of PCI clocks to complete a PCI master transaction, to advantageously determine the most efficient instructions. For example, a test can run both memory read and memory read multiple and use counter 0x6B to measure the clocks needed for each type of instruction to complete. The counter is enabled by the PCI block signal MSTR_BUSY_RETRY, and reset by a zero in the diagnostic counter enable bit of register 0x57.

In PCI interrupt register 0x6C, PCI interrupt bit (0) is set by the DSP whereupon this bit propagates to the PCI interrupt register and sets the DSP generated interrupt bit there, as a PCI synchronous value. Once that PCI interrupt register has the interrupt, it sends a signal to set bit 8 of this register 0x6C which is synchronized to DSP CLKOUT1. When bit 8 is set, bit 0 is reset in register 0x6C in order to prevent an inadvertent repeat interrupt from being generated on the PCI bus. The PCI interrupt register 0x6C is cleared when the host writes to and clears the appropriate PCI-synchronous interrupt register bit.

In SRAM speed/no software wait states register 0x6D, a No_sw_ws bit (0) tells the ASIC that the DSP is not inserting wait states in data or program accesses. If the C5x is not inserting SW wait-states, the ASIC will generate hardware wait-states on DPRAM reads but not I/O accesses. I/O writes in C5x I/O I/F are only 1 cycle (which is 0 or 1 wait state). I/O writes in C54x I/O I/F mode are two cycles (2 wait states). A BIO mux bit (4) determines which bit of the DSP Interrupt Register (reg 0x51) gets driven out of the BIO pin to the C5x. If this bit is 0, then bit 0 of reg 0x51 (PCI bus Master) is driven out on BIO. If the bit is a 1, then bit 1 of reg 0x51 (C5x DMA) is driven.

An SRAM speed bit (8) in register 0x6D controls the DMA state machine for slow SRAMs (bit 8=one) or fast SRAMs (bit 8=zero).

A C54x I/F bit (12) allows the C54x processor to access asynchronous SRAM by driving the WRz and RDz signals to the SRAM during memory accesses not directed to ASIC DPRAM. Bit 12 also directs the ASIC I/F to require two wait states for I/O writes, due to a difference between the C5x and C54x I/O timing.

Stereo codec PIO control register (0x6E) START bit (1) is level-sensitive. When a DONE bit transitions from a 0 to a 1, the START bit (1) is reset. Further bits are 2—codec indirect, 3—transfer direction, 5:4—PIO address.

Stereo codec auto PIO address/data (0x6F) has an upper byte 8-bit address used for indirect PIO transfers to and from the stereo codec. Writing this address as data to the PIO address 00 initiates an indirect PIO access. A subsequent PIO access to PIO address 01 either reads or writes to the indirect address specified by the data previously written to address 00. A lower byte of this register 0x6F stores PIO data for transfers to and from the Stereo Codec. For write, the 8-bit data is previously placed in this lower byte, whereupon the data goes to the codec. 8-bit data resulting from a read transaction is driven by the codec state machine. This read value differs from the value written into the lower byte of register 0x6F. To verify a write has completed to this register, a PIO read from the codec follows, advantageously simplifying logic to synchronize the data and control signals between the host, DSP, and codec state machine. Wait states are generated when PIO reads are done before the transaction completes.

Figure 62:
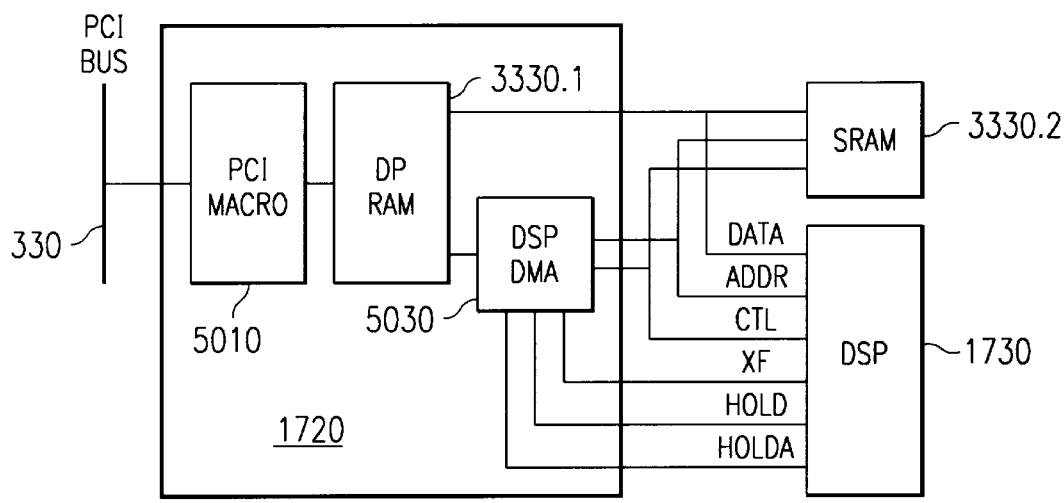
FIG. 62 is an electrical block diagram of circuit blocks and control lines in the wrapper ASIC of FIG. 50 coupling to DSP and SRAM.

Turning to the subject of direct memory access (DMA) in FIG. 62, DMA functions move data between ASIC DPRAM and external SRAM. In this embodiment, DMA does not transfer data from the ASIC DPRAM into the DSP to avoid conflict with concurrent DSP instruction execution.

In another embodiment, the circuit implements cooperative bus sharing where the DSP grants DMA machine access to the DSP bus by asserting an XF flag. If the XF signal is deasserted, the DMA transaction suspends at the completion of the current burst. The DMA transfers continue once the XF signal has been reasserted. The DMA state machine is configured by the DSP to define destination space in external SRAM. The DSP sets values for granularity and delay interval. The granularity bits determine the size of the DMA bursts to make efficient use of time. Delay interval bits allow the DSP time to make external accesses between DMA bursts. A ping pong buffer approach passes data during DMA transactions.

The DMA state machine, synchronous to DSP clock and responsive to register 0x6D, takes data out of the ASIC DPRAM and writes it into external SRAM or reads it from the SRAM into ASIC DPRAM. A commercially available device such as Cypress CY7cl99 is selected for external SRAM.

Figure 60:
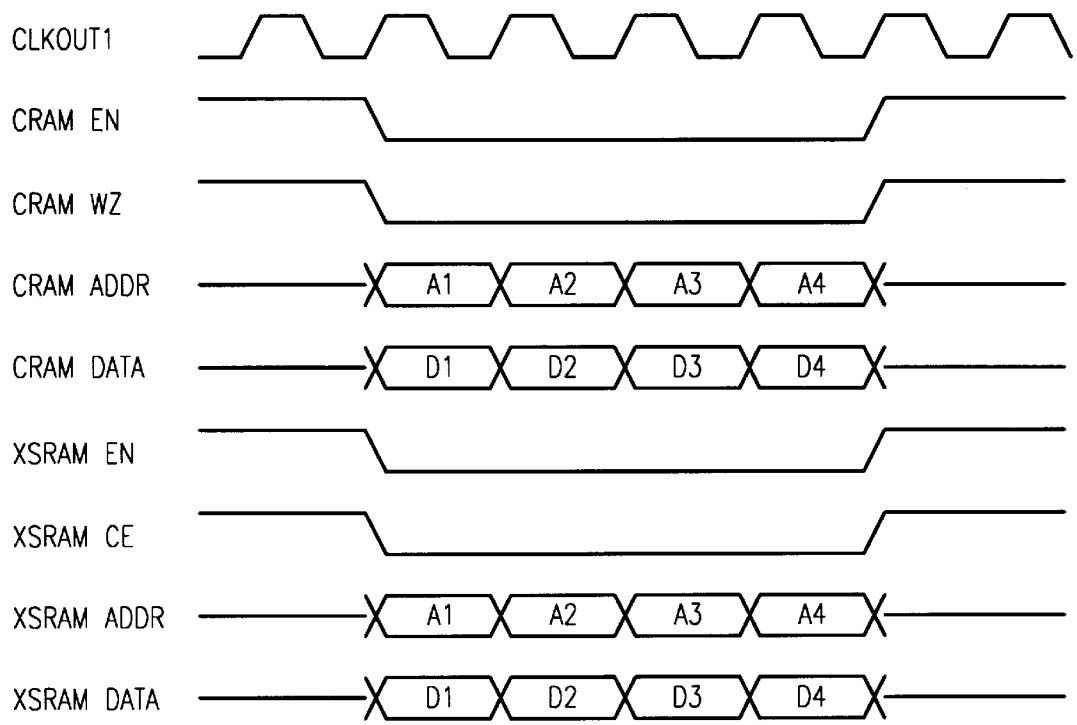
FIG. 60 is a waveform diagram illustrating timing and method for read to local off-DSP SRAM external to wrapper ASIC in FIG. 62.
Figure 63:
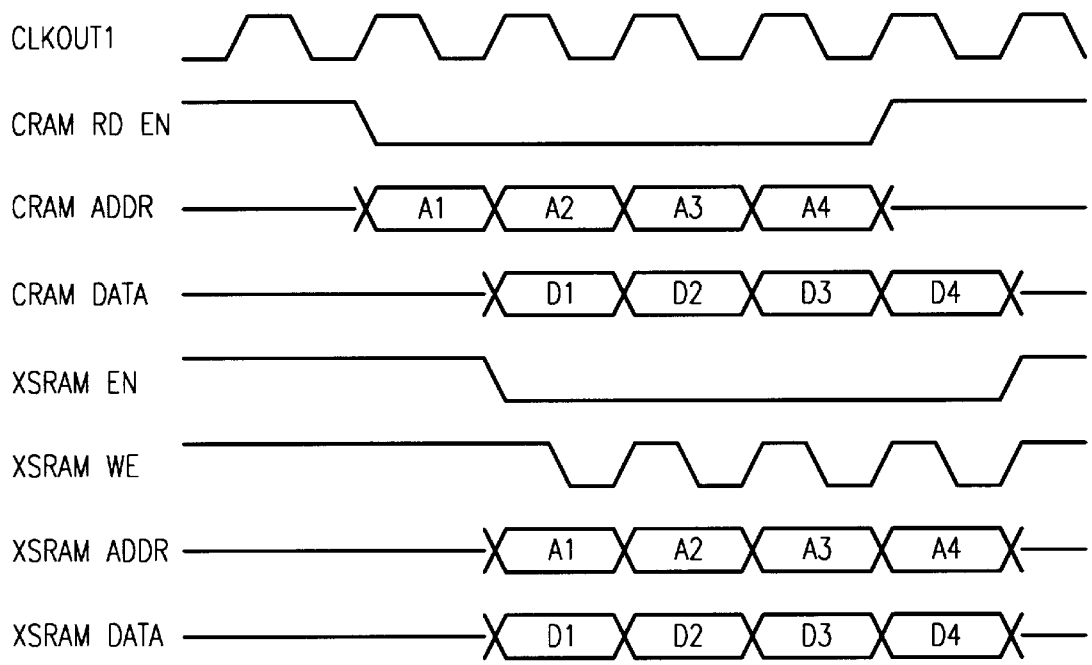
FIG. 63 is a waveform diagram illustrating timing and method for write to local off-DSP SRAM external to wrapper ASIC in FIG. 62.

FIGS. 63 and 60, respectively, show the logical timing for a write to or read from SRAM.

Figure 58:
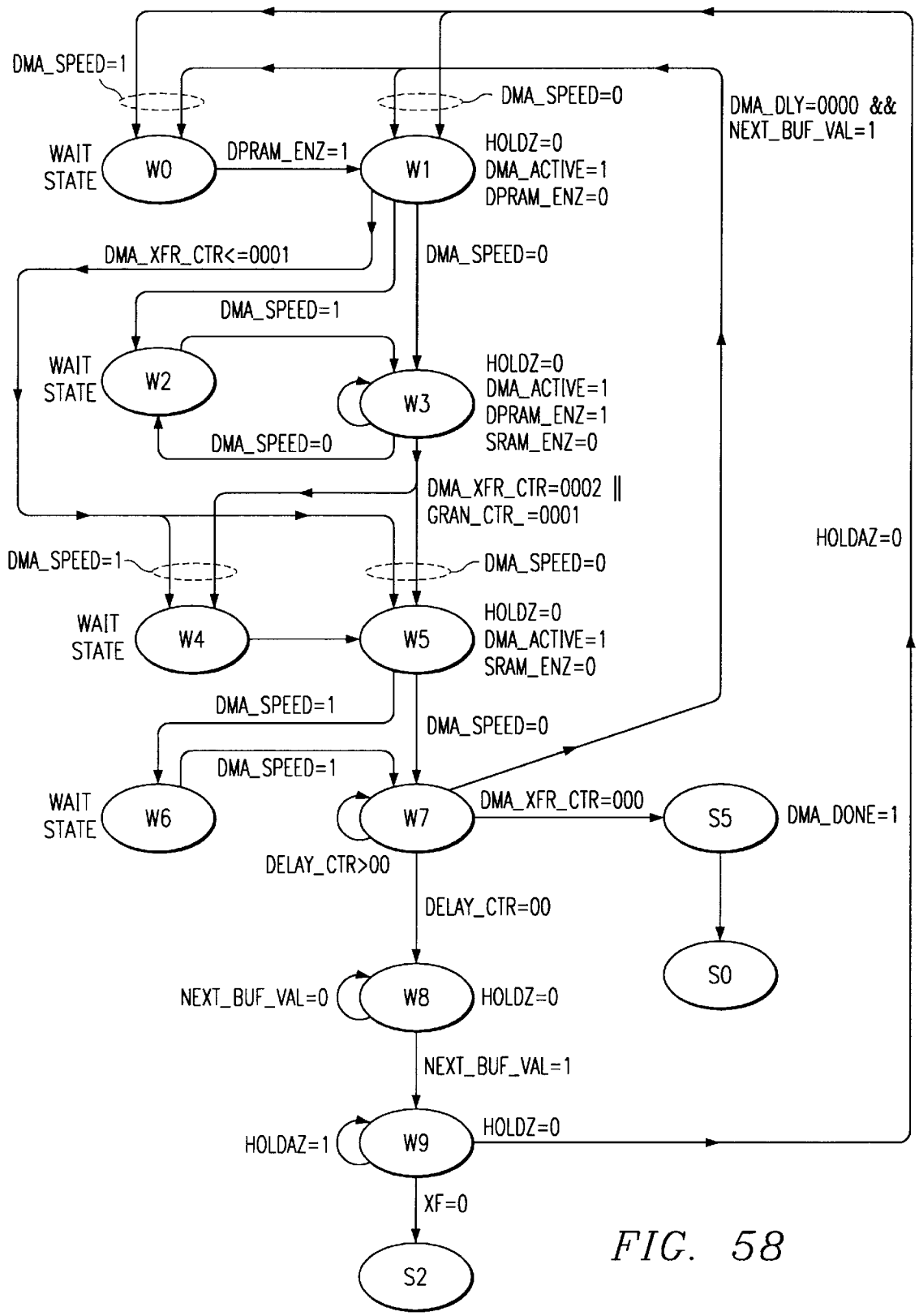
FIG. 58 is a state transition diagram of a DMA Write portion of DSP DMA SM state machine hardware and its process shown in FIGS. 61, 58 and 59 for the wrapper ASIC of FIG. 50.
Figure 59:
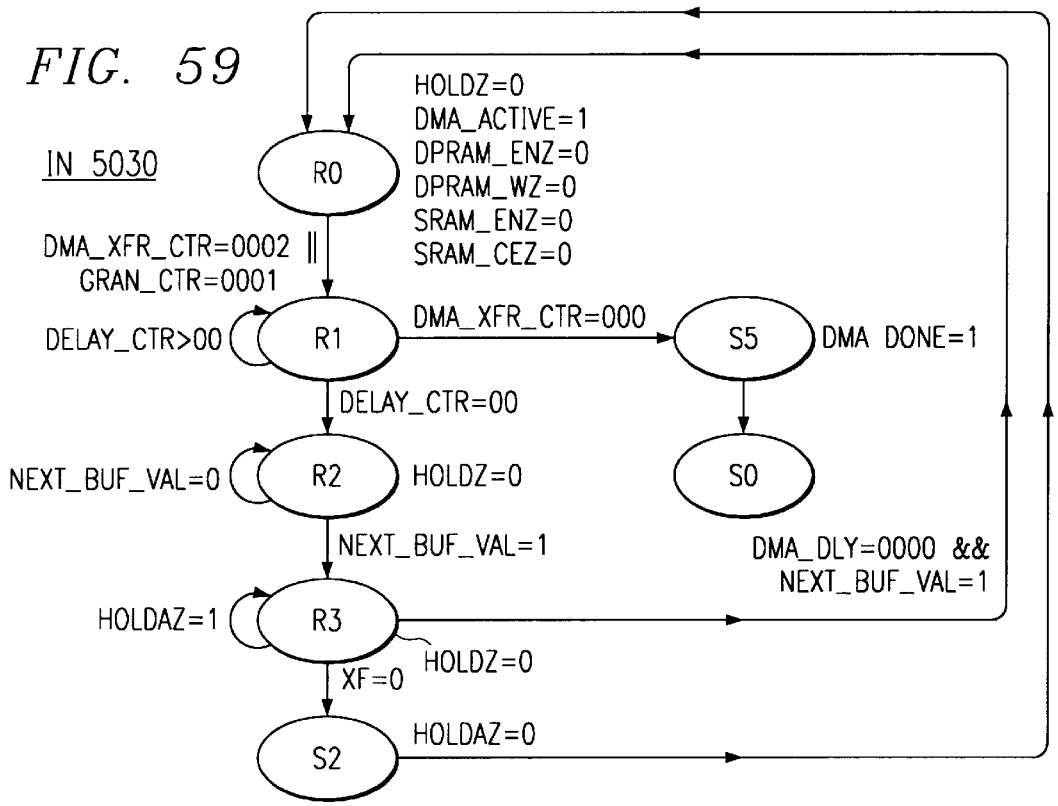
FIG. 59 is a state transition diagram of a DMA Read portion of DSP DMA SM state machine hardware and its process shown in FIGS. 61, 58 and 59 for the wrapper ASIC of FIG. 50.
Figure 61:
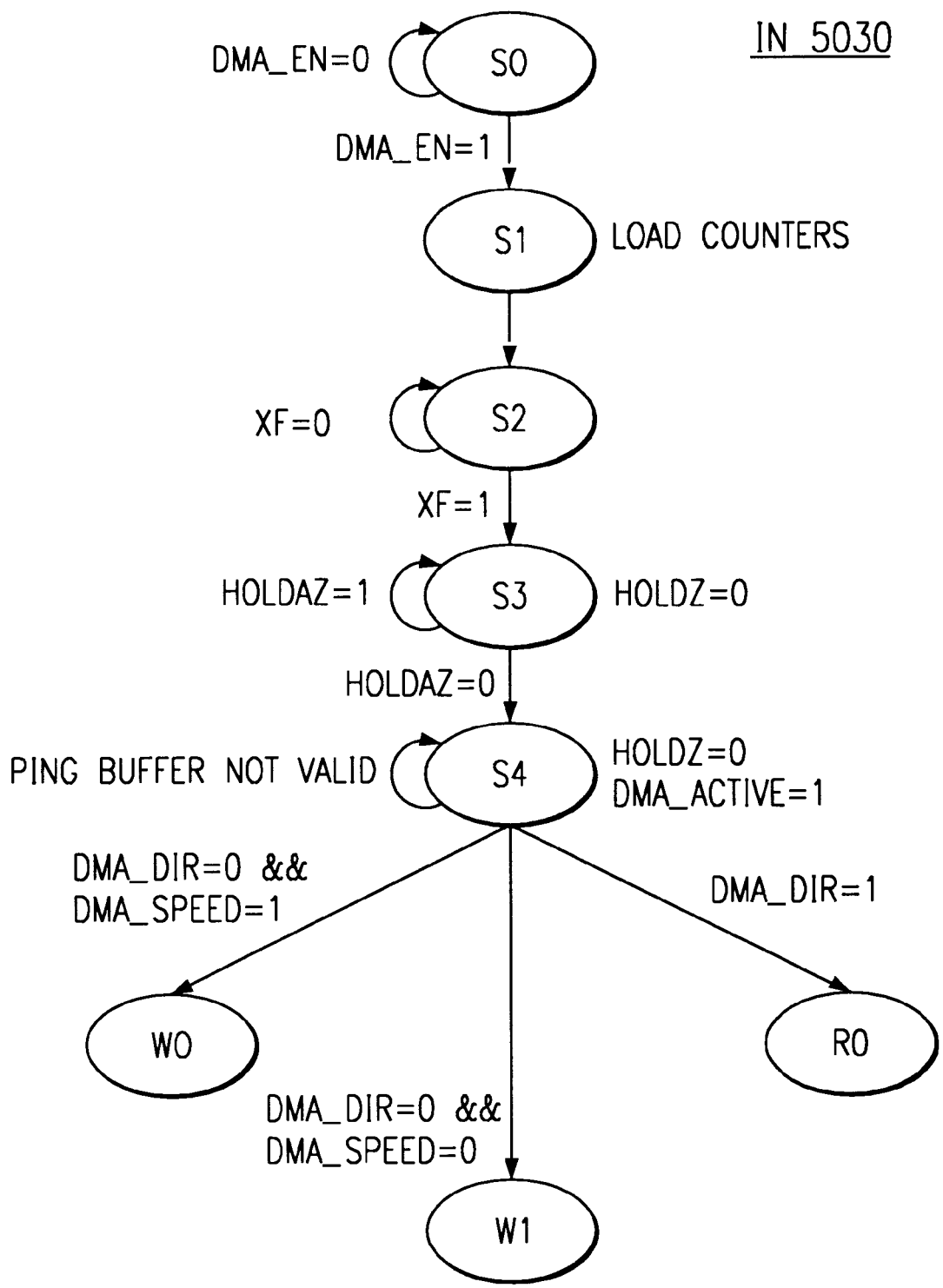
FIG. 61 is a state transition diagram of an entry portion of a DSP DMA SM state machine hardware and its process shown in FIGS. 61, 58 and 59 for the wrapper ASIC of FIG. 50.

FIGS. 61, 58, 59 depict a DMA state machine by its state transition diagram. Note that identically-named states (ovals) are regarded as interconnected between the diagrams. The DSP links a DMA transaction with a PCI transaction, to advantageously allow the DSP to transfer data or code directly from host main memory to on board SRAM (or vice-versa). The DSP sets up the PCI block with the address and number of words/bytes to transfer, and also sets up the DMA state machine. To read from main memory, first start the PCI block so that data is available to the DMA state machine when DMA is ready to transfer data to SRAM. To write main memory, start the DMA state machine first so data is ready for the PCI block to send over PCI bus. The PCI block and DMA state machines communicate validity of data via the ping and pong valid bits, set by the appropriate receiver or sender. The state machines wait for data, if not immediately available. A minimum 6 word DMA buffer size facilitates coordination. The PCI control state machine selects which address gets passed to the memory arbiter by looking at the DMA coupled bit. If that bit is not set, then the DPRAM address is supplied. If it is set, the DMA buffer address is supplied. As data comes in or goes out, the state machine controls the PCI block and the ping and pong buffer control bits.

The skilled worker should take care to 1) avoid deadlock wherein the PCI block is given a write command and the DMA SM is told to transfer between DPRAM and SRAM and 2) avoid stopping (stop bits) an individual DMA or PCI transfer during a coupled operation.

FIGS. 75A and 75B illustrate an ASIC pinout. The following tables further discribe the pinout.

| SIGNAL | TYPE | DESCRIPTION |
| --- | --- | --- |
| DSP Interface | | |
| C5XRST | O | Reset to DSP reset input. Active low. |
| CLKMD(1-3) | O | PLL control signal to DSP CLKMD inputs. |
| CLKOUT1 | I | Clock input from DSP output CLKOUT1. |

-continued

| SIGNAL | TYPE | DESCRIPTION |
| --- | --- | --- |
| C5XHOLDZ | O | HOLD to DSP. Active low. |
| C5XHOLDAZ | I | HOLDA from DSP. Active low. |
| STRBZ | I | C5xSTRB/C54xMSTRB. Active low. |
| IOSTRBZ | I | C5xSTRB/C54xISTRB. Active low. |
| ISZ | I | IO space active. Active low. |
| PSZ | I | Program space active. Active low. |
| DSZ | I | Data space active. Active low. |
| BRZ | I | Global Data space active. Active low. |
| R_WZ | I | Read/Write(not). Active low. |
| ADDR(15-0) | IO | DSP address bus. |
| DATA(15-0) | IO | DSP data bus. |
| READY | O | Ready signal to DSP. Active high. |
| XF | I | External Flag from DSP. Active high. |
| BIOZ | O | Input to DSP. Active low. |
| INT (4-1) | O | Interrupts to DSP. Active Low |
| INT ABORT | O | Non-maskable interrupt to DSP. Active low. |
| PCLK_OUT | O | PCLK output. Alternate source to DSP CLKIN. |
| Miscellaneous | | |
| MIDI_IN | I | MIDI input. Unused. |
| MIDI_OUT | O | MIDI output. Unused. |
| TEST | I | Test mode. Active high. |
| Voice Codec Interface | | |
| VC_MCLK | O | Codec master clock |
| VC_VCLK | O | Codec serial shift clock |
| VC_FSX | O | Transmit Frame Sync. Active high. |
| VC_FSR | O | Receive Frame Sync. Active high. |
| VC_DIN | O | Codec data out. Connects to Code DIN. |
| VC_DOUT | I | Codec data in. Connects to Codec DOUT. |
| VC_LINEAR | O | Codec linear mode = 1. companded mode = 0 |
| VC_PDN | O | Codec power down mode. Active low |
| VC-EMUTE | O | Codec earphone mute. Active low |
| VC_MMUTE | O | Codec microphone mute. Active low. |
| SRAM Interface | | |
| SRAM_CEZ | O | SRAM chip anable. Active low. |
| SRAM_UWEZ | O | SRAM upper bank write enable. Active low. |
| SRAM_LWEZ | O | SRAM lower bank write enable. Active low. |
| EEPROM Interface | | |
| SCL | O | EEPROM shift clock |
| SDA | OD | EEPROM data |
| WCZ | O | EEPROM write enable. Active low. |
| Joystick Interface | | |
| JOYCAL | IOZ | Joystick calibration |
| CAX | IOZ | Control port A X axis. |
| CAY | IOZ | Control port A Y axis. |
| CBX | IOZ | Control port B X axis. |
| CBY | IOZ | Control port B Y axis. |
| BA1 | I | Button 1 port A. |
| BA2 | I | Button 2 port A. |
| BB1 | I | Button 1 port B. |
| BB2 | I | Button 2 port B. |

PC/DSP Integration Program

| SIGNAL | TYPE | DESCRIPTION |
| --- | --- | --- |
| PCI Bus Interface | | |
| PCIRST | I | PCI reset pin. Active low. |
| GNT | IOZ | PCI grant pin. Active low. |
| IDSEL | I | PCI ID select pin. Active low. |
| INTA | OD | PCA A interrupt pin. Active low. |
| ADB(31-0) | IOZ | PCI address/data bus. |
| CBE(3-0) | IOZ | PCI command/byte enable bus. (BE Active low). |

-continued

| SIGNAL | TYPE | DESCRIPTION |
|---|---|---|
| REQ | IOZ | PCI request pin. Active low. |
| FRAME | IOZ | PCI frame pin. Active low. |
| IRDY | IOZ | PCI initiator ready pin. Active low. |
| TRDY | IOZ | PCI target ready pin. Active low. |
| DEVSEL | IOZ | PCI device select pin. Active low. |
| STOP | IOZ | PCI stop pin. Active low. |
| SERR | OD | PCI system error pin. Active low. |
| PERR | IOZ | PCI parity error pin. Active low. |
| PAR | IOZ | PCI parity pin. Active high. |
| VCCP | I | IO buffer supply pin Vio. (either 3V or 5v depending on the PCI system) |
| Stereo Codec Interface | | |
| COD_CSZ | O | Codec chip select. Active low. |
| COD_RDZ | O | Codec read. Active low. |
| COD_PDACKZ | O | Play data Acknowledge. Active low. |
| COD_WRZ | O | Codec write. Active low. |
| COD_ADR(1-0) | O | Codec PIO address. |
| COD_CDAKZ | O | Capture data acknowledge. Active low. |
| COD_DT(7-0) | IOZ | Codec data. |
| IRQ | I | Codec Interrupt request. Active high. |
| CDRQ | I | Capture data request. Active high. |
| PDRQ | I | Play data request. Active high. |

A USP (Unified Signal Processing) based modem roadmap runs from V.34/V.34 bis to xDSL and cable modem technology. Regulatory homologation for the so-called "Pumpless" modem and interfacing to legacy ISA modem chipsets for Windows are also discussed. Emerging new media applications and the underlying communication and remote access platforms are considered. Next are introduced some architecture embodiments for Multi-Mode Modems.

The present embodiments enhance games and various platforms (HPC, PC, NetPC). A PC/NetPC communication platform is improved for Windows based Internet/Intranet applications such as 3D Web Browser, WWW NetConferencing and other multimedia and RAS applications supported on the Microsoft's NetMeeting™ Conferencing platform. NetMeeting™ supports various international conferencing standards and provides multimedia conferencing with remote access and wide-area transport media over the Internet/Intranet.

FIG. 2 depicts the WWW NetConferencing environment which includes the Internet/Intranet with networking components such as WAN/LAN, ISDN and modem links, and also includes audio, video and other multimedia functions. Comm platform is the USP Multi-Mode Modem in FIG. 2.

With the improvements disclosed herein, audio, video, voice and data personal communication and collaboration become as easy as dialing the phone, and industry standard communication protocols integrate with Windows OS and WWW/UI/Explorer/Browsers for Internet.

The improvements make possible new systems: ADSL, cable modems for permanent internet connections, more specialized PCs/Net PCs for home and small office home office use; unification of fax, voice mail, email, scheduling; unification of audio, video, voice and data for new media apps; multicasting for multiple users at multiple sites e.g. Internet games; and the "ambient Internet" opens extended family and community.

As the modem function goes to faster speeds as well as ADSL/xDSL and cable modems, the host CPU becomes overloaded. The MIPs of a dedicated media processor may be too costly and still insufficient.

In FIG. 19, a baseline embodiment provides VSP wrapper ASIC having high-performance I/O functions including an audio stereo codec, a voice codec for DSVD and a modem codec interface logic. The VSP wrapper ASIC works with host-signal processing using host MIPs for a pumpless modem and audio augmentation for the volume or low-end PC configuration providing host-based modem and audio features. Codecs are suitably integrated onto the wrapper chip in some embodiments.

A midrange embodiment has a VSP wrapper with a DSP core on same chip, or a chipset with the VSP wrapper and an external DSP chip as shown in FIG. 19. The external DSP chip is socketed as an upgrade option for the baseline embodiment. A wrapper/DSP on same chip is suitably made pin-compatible or drop-in compatible with the pin-out of the VSP Wrapper ASIC in an overdrive option. Motherboard vendors reuse the same design for all PCs and populate their boards with either type of chip.

Figure 20:
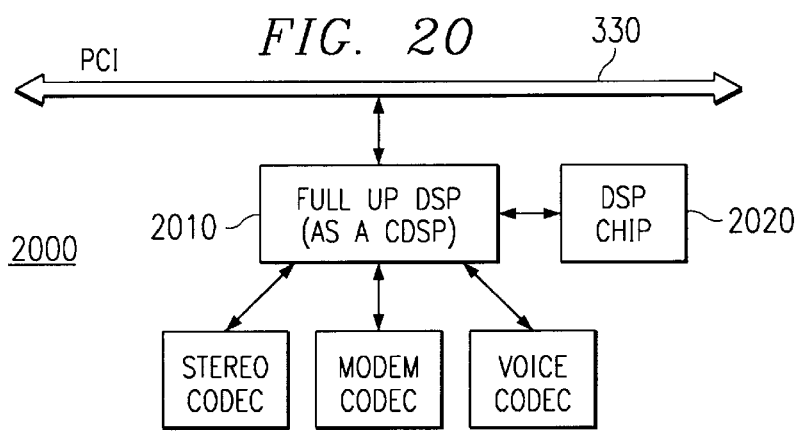
FIG. 20 is an electrical block diagram of an upgraded VSP system in another embodiment of an improved computer system for stereo, telecom, and voice.

In a high end embodiment, a system has a VSP wrapper/DSP single chip in a first socket and a second DSP plugged into a second DSP socket as shown in FIG. 20. The second external DSP chip provides more hardware acceleration and concurrency for high-performance PC platforms.

USP AC97 Modem/Audio Controller

In FIG. 48, VSP advantageously performs all AC97 audio and modem controller functions. AC Link logic is suitably added, say when the AC97 audio/modem codec is standardized. The VSP becomes a single chip modem/audio controller interfaced to the AC97 codec via the AC Link.

Apart from the existing V.34/V.34 bis modem standard, the VSP is programmed 56 Kbps x2 modem for Internet applications. xDSL mode is implemented on the same VSP as part of the USP Multi-Mode Modem. The xDSL modem is a generic ADSL modem with bit rate starting at 384 Kbps (MDSL: Mid-band xDSL). The xDSL modem goes up to 2–10 Mbps rate with a more powerful VSP or by reusing some of the host CPU/MMX MIPs via USP.

Figure 45:
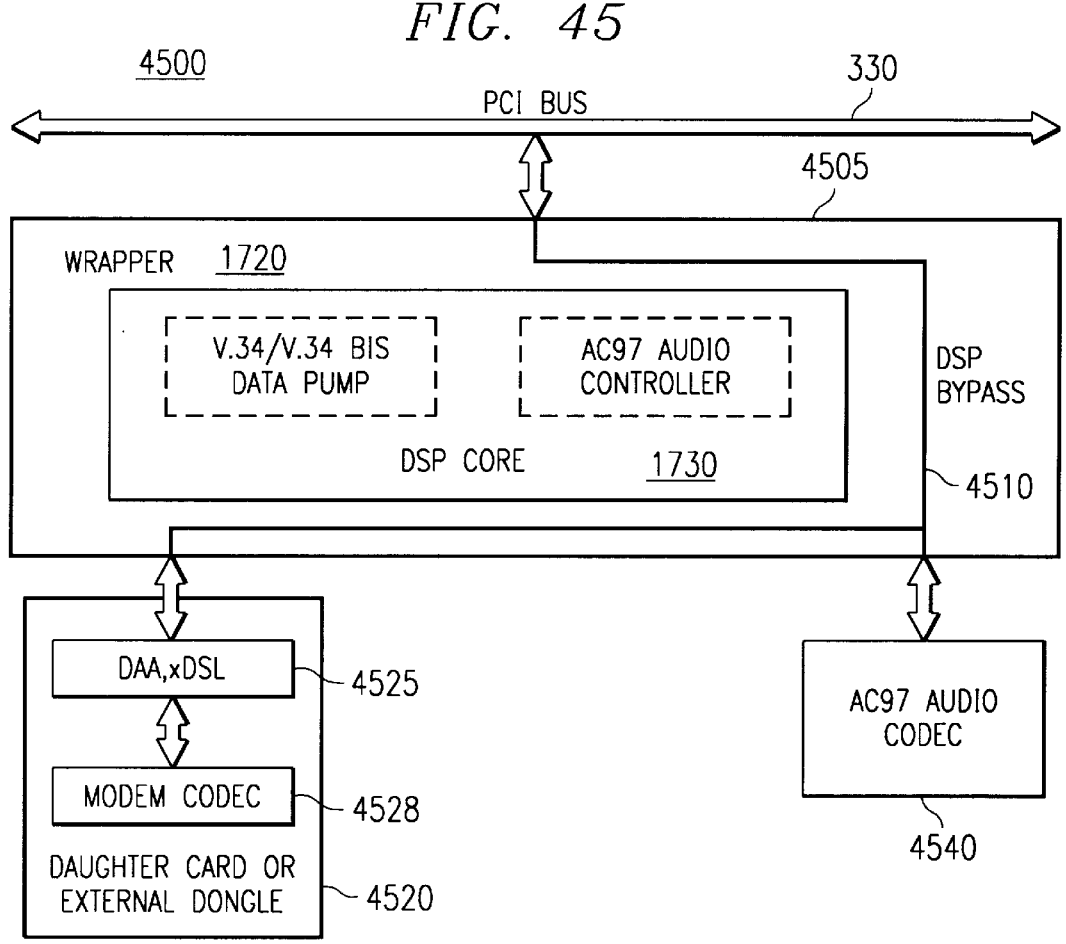
FIG. 45 is an electrical block diagram of a VSP (wrapper/DSP) embodiment having DSP bypass, and coupled for both modem and audio in a system embodiment operated according to a method embodiment.

FIG. 45 shows the AC97 audio codec separate from the modem codec and the modem codec along with the DAA function sits on a daughter card or an external dongle. A daughter card has a DAA and modem codec for V.34/V.34 bis and 56 Kbps modes. Other daughter cards suitably support the DAA and modem codecs for various xDSL options for bit rates ranging from ISDN rate all the way to 12 Mbps.

Figure 87:
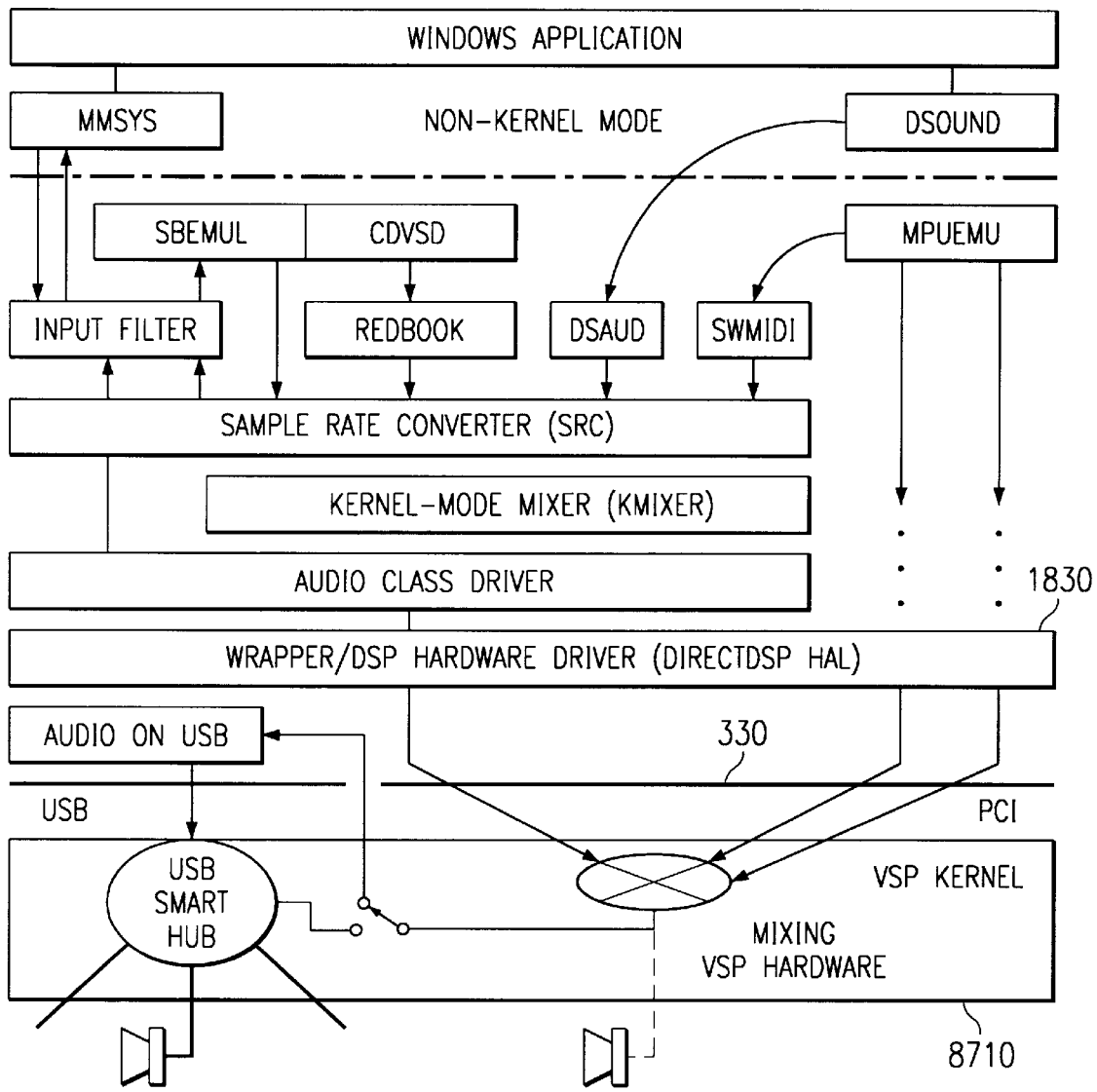
FIG. 87 is a process diagram or method-of-operation diagram showing interrelated improved processes in a WDM accelerator with digital audio and embedded VSP serial bus hub with unified signal processing herein.

With AC97 and future Windows S/W platforms, FIGS. 87 and 105 show Microsoft WDM supports audio and modem functions respectively for low latency data streaming. The DirectDSP HAL acts as DirectDSP WDM hardware drivers 10550 to support low latency data streaming for PCI, IEEE 1394, USB and other buses.

FIG. 105 shows the WDM communication architecture with the xDSL modem plugged into the NDIS/WAN network architecture while V.34/V.34 bis/56 Kbps(x2) modems under Unimodem architecture. WDM Comm Class Driver supports other legacy comm functions. DirectDSP is a client of DirectDSP WDM which also includes a DSP Class Driver on its stack as shown in FIGS. 105 and 100.

In FIGS. 107 and 110, a "Pumpless Modem" uses the host CPU and an I/O ASIC to perform the modem function. The entire modem function including the modem data pump runs on the host CPU/MMX using host MIPs via the wrapper ASIC as a bus (PCI or ISA) I/F ASIC which interfaces with the external codecs (MAFE) and Modem DAA. Both PCM-CIA and PC-card products are supported through their respective sockets. In the case of USP, the I/O function is provided by the VSP Wrapper ASIC which interfaces with the various codecs as described in the previous section.

Figure 3:
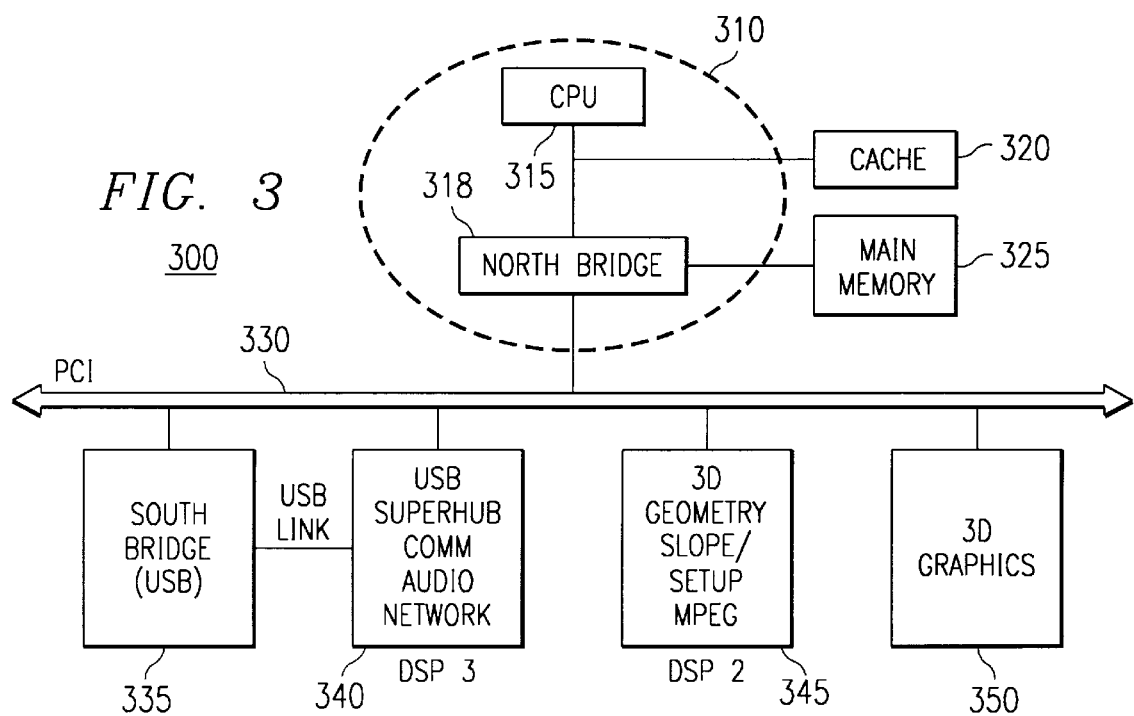
FIG. 3 is an electrical block diagram showing an improved computer system embodiment for telecom, audio, networking, and 3D graphics.

FIG. 3 of incorporated U.S. patent application Ser. No. 08/823,257 shows the VSP wrapper ASIC for the USP pumpless modem with optional logic for VSP acceleration. In the absence of the external DSP or internal core with a cDSP implementation, this VSP wrapper ASIC interfaces directly to the modem, voice and stereo codecs via block 316 using C5x, C54x or other DSP(s). Either FIFO hardware or DPRAM FIFO data structure suffice in various embodiments.

With the DSP or cDSP included, the modem codec of FIG. 111 is suitably interfaced to the serial port of the DSP and modem data pump runs on the VSP. The USP architecture and its dynamic hardware linking capability caches the appropriate modem code for the negotiated bit rate into the VSP for execution when a successful rate negotiation occurs. Memory usage is advantageously reduced since only the relevant code for the chosen bit rate is used. Other modems normally have the DSP code for all the modem standards (V.22 to V.34/V.34 bis, 56 Kbps (x2), xDSL) resident in local DSP memory prior to rate negotiation.

In FIG. 115, USP xDSL modem software architecture is more suited to a WAN configuration and the xDSL adapter card will act just like a NIC so that the DirectDSP WDM driver is actually an NDIS WAN MiniPort Driver.

Other embodiments interface an ISA chipset to the PCI bus but have I/O port and IRQ issues; a multi-function adapter card with modem and audio capabilities (MPEG video permitted); single host driver for PCI multi-function adapter that schedules the modem function/hardware; and support Microsoft/Intel Internet Terminal applications (PC/NetPC/WebTV/HPC).

To interface to an existing ISA WinModem chipset, the VSP wrapper provides ISA bus I/F to the WinModem ISA ASIC as shown in FIG. 103. PCI can carry the same I/O port address that the ISA WinModem uses. However, the ISA IRQ may not be retained for the PCI I/F. Windows Plug and Play allocates PCI IRQ for the modem which affects the design in the WinModem VxD/Driver. However, the WinModem VxD can make calls to the VSP Wrapper modem I/O port instead of the ISA bus I/O port (assuming the same I/O port address is used). Also, for better scheduling of the WinModem hardware, the WinModem VxD is modified to integrate it into the multi-function USP host driver. A single USP PCI modem/audio driver schedules, controls and routes data back and forth the host and the VSP/WinModem chipset across the PCI bus. In essence, the WinModem is now a slave on the PCI bus rather than the ISA bus that it was originally designed for. The USP PCI modem/audio driver sets up the multi-function PCI configuration registers for master (C54x) and Slaves (C5x and codecs).

In FIG. 103, the C54x is responsible for 3D/AC-3/MPEG and legacy audio/video for Internet Terminal applications whereas the C5x is dedicated to the modem function. When the WinModem is not in use, the C5x VSP can be reused for other media processing task with the C54x VSP.

In addition, if the netlist of the WinModem ISA ASIC is available, then the ISA Plug and Play logic can be saved since PCI is already Plug and Play. It will also be possible to integrate the WinModem ISA ASIC with the C52 core as a cDSP to lower the chip count. In this case, we will need only a low performance C52 (probably 33MIPs) for running the V.34/V.34 bis/x2 data pump only. Note that if a single C52 cannot handle the x2 protocol, x2 can be offloaded to the C54x with V.34 bis/V.34 only running on the C52. Alternatively, the WinModem ASIC can be absorbed into the VSP wrapper ASIC as a single chip. On the other hand, if a pumpless modem code is available to run the data pump in the host, the WinModem chipset will not be required leaving the C54x for audio/video augmentation.

In summary, the USP multi-mode modem can be deployed in a number of ways. Scenarios range from Pumpless V.34/V.34 bis to interfacing with an existing modem chipset as a gradual phase-in of the USP multi-mode modem technology.

Modem embodiments include: interface to USR WinModem chipset with x2 capability running either on the C5x or C54x; cost-reduced WinModem chipset, host-based pumpless modem to cost reduce the legacy modem (V.34/34 bis) function; drop WinModem ASIC and replace with pumpless solution or reuse C5x for more concurrency; AC97 audio/modem controller, audio and video (MPEG) Internet Terminal; handheld personal computer and wireless internet terminal/smart phone with USP; and distributed VSPs for the connected handheld personal computer and smart phone volume market.

Flashware

The intrinsic value of flash memory is utilized in the following embodiments. Flash has a limited erase lifespan and slow write time. "Flashware" herein means flash based applications software and device drivers. Flashware has firmware in main memory for homologation or user robustness purposes. Moreover, Flashware in conjunction with host-based processing and VSP constitutes a new class of virtual hardware devices. Flashware overcomes the problem of homologation for software based modems running on the host processor ("pumpless" modems).

With a improvement in the PC operating system such as Windows, flash memory is incorporated in the PC main memory with better granularity than the current DRAM generation can afford.

Flashware is implemented as 4 Meg SIMMs plugged into socket-slots in parallel with an additional to main memory 110. Also, or alternatively, flash can be put on a PC Card as flashware card. The user thereby has the fine granularity of the flash memory density combined with 16 Meg or more DRAM coarse granularity. The skilled worker adapts the flash memory if and as needed, to have an interface electrically compatible to the DRAM bus in whih the flash memory is coupled.

Advantageously, the flash memory impersonates regular DRAM like synchronous DRAM (SDRAM), SYNCLINK or SLDRAM, and RAMBUS or RDRAM so that they are literally dropin compatible.

Power Management

With flashware, the entire PC/NetPC is powered down with only the VSP in standby mode. The VSP is triggered by an external interrupt derived from the tip and ring signals of the phone line DAA. In this way, the entire PC/NetPC saves power when the host CPU/MMX is not needed for processing any applications and still can be powered up by external events through the VSP.

Part of the initialization Windows code is stored in flash memory as flashware. Advantageously, the PC/NetPC easily achieves INSTANT ON or ON NOW objectives without a re-boot. Also, the PC/NetPC does not keep the Windows code in RAM, avoiding standby DRAM refresh power consumption. This embodiment does not just load the Windows operating system wholesale into flash memory. Instead, the improved method loads part of the operating system into flash to be resident therein at initialization of the system, and load part of Windows so it is resident in some other storage such as hard disk storage and then in DRAM on bootup. Thus, with power off the operating system is distributed between and thus shares at least two media of storage: the flash memory and disk storage. With power up, the operating system is distributed between and thus shares at least three media of storage: the flash memory, disk storage, and volatile memory such as main memory DRAM.

Statically loaded elements of the operating system are better candidates for flash storage because dynamically loaded DLL elements are subject to a linking process. The critical elements in both Windows95 and Win97 boot sequences are the same, and these boot-related elements are stored in flash in process, circuit and system embodiments herein. Thus, DLLs are not stored in flash. Non-DLL elements of the OS involved in initialization are stored in flash. Non-DLL elements of the OS not involved in initialization are suitably stored in either flash or elsewhere.

Application (e.g. modem) firmware in flash memory module solves the modem homologation problem for international PTT (post, telephone, telegraph).

System-critical initialization modules to be stored in flash are easily identified because they are logged in the bootlog of the operating system boot sequence.

Advantageously, the host memory is a mix of DRAM and flash (e.g. 4Meg flash and the rest DRAM, say 12M DRAM or more).

The process further advantageously uses flash memory to store the entire user environment prior to power down, including devices used. In this way, on subsequent power up, the flash instantly provides a complete recovery of the user environment.

Homologation

With the prevailing host-based signal processing for peripheral multimedia and communication devices such as modems and audio/video devices, comes the problem of homologation (government regulatory approval) and user robustness (i.e. not so easily corrupted by user code).

One big problem with modem homologation is that the modem functionality is forbidden to change (as result of user or other application accidentally writing into the modem code area) during its operation in a telecom network that the modem is hooked up to. This implies a big problem for host-based (or NSP) modem where the entire modem is software based running out of host main memory.

With the modem code installed as a host device driver in flash-based main memory, the modem functionality will not change during its operation. The OS (operating system) makes this even more robust by partitioning the PC main memory as locked down OS segments and applications. Device drivers are made read only write when the user wants to upgrade the PC much like the user upgrading the BIOS code with each new release. This way, the flash memory is not written frequently in contrast to DRAM main memory.

With USP there is a VSP wrapper which acts as the I/O processor for the host to talk to its peripheral modem, voice and audio codecs in a typical telephony or communication application. The flashware modem code is treated as the firmware in a DSP based modem as far as homologation goes. To upgrade the computer, a commercially available TI TMS320C54 DSP is plugged into an upgrade socket on the motherboard/daughter card or even a PCI or PC card. No other hardware component besides that DSP chip is needed, similar to a CPU upgrade scenario, only that the DSP is a lot cheaper than the CPU but provides extra MIPS to a system that has the VSP wrapper and Direct DSP software.

For medium or high-end PCs, add a pin-compatible cDSP (configurable DSP having ASIC and core on same chip) into the VSP wrapper socket. The DSP upgrade socket is then instead reused to plug in a daughter card with more local DSP resources such as ROM or flash tables etc. (more expansion flash memory).

With USP and flashware, the PC is advantageously totally instant-on for the Microsoft ON NOW initiative. The PC is further powered down for advanced power saving purposes, very important when the OS reboots from flash with all device drivers still intact or installed. Plug and play is made instantaneous. The user no longer unplugs devices since they are in main memory as virtual hardware. Power down mode is now made possible with the flashware embodiment.

Figure 22:
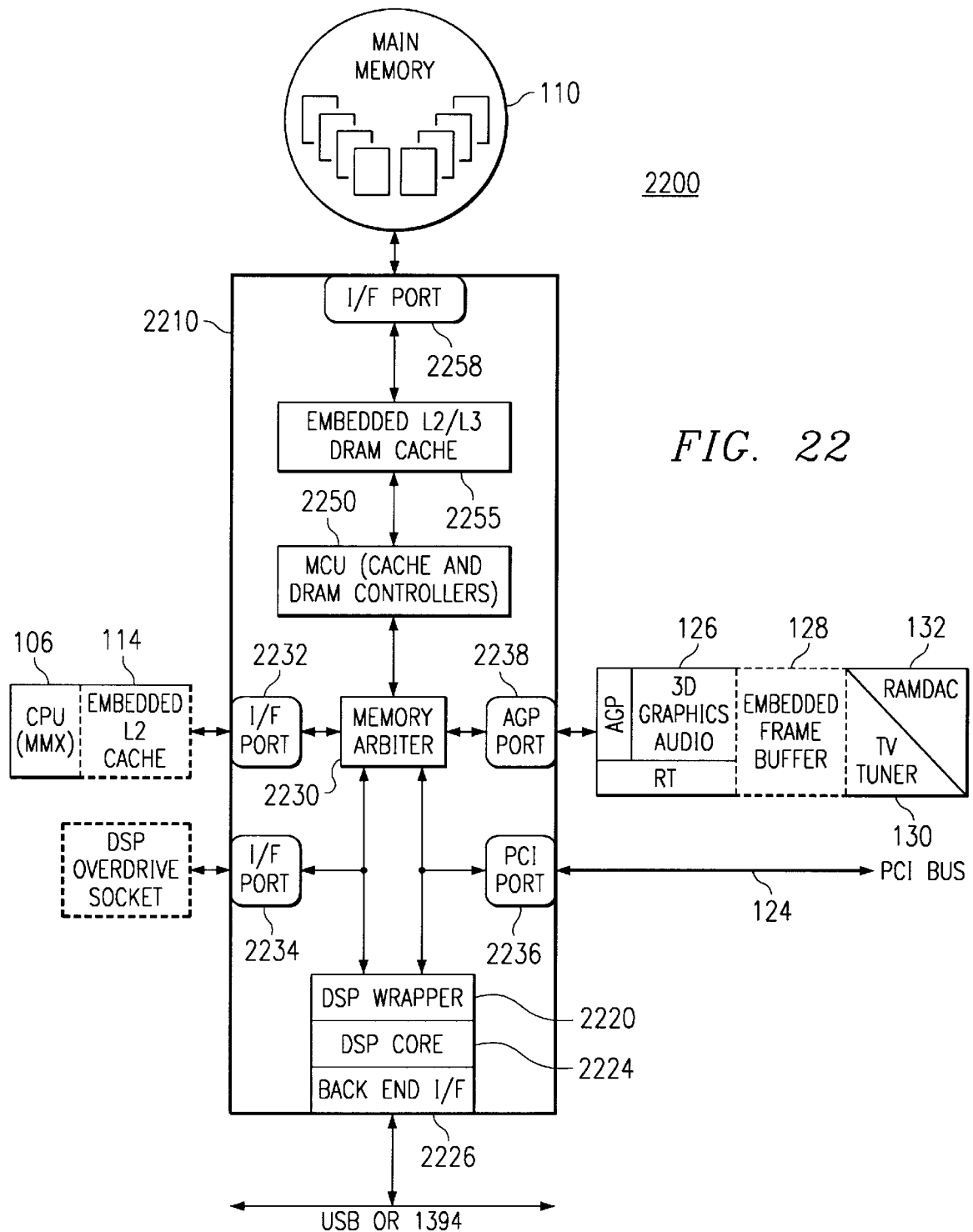
FIG. 22 is a block diagram and layout diagram of an improved DSP (digital signal processor) integrated circuit north bridge embodiment having a wrapper-and-DSP-core (called VSP herein) and a serial bus backend interface on-chip, the improved integrated circuit connected to ports and busses for some system embodiments herein.

The improvements of USP and wrapper/DSP are suitably provided in still further system such as the following:

Hand-Held PC
- Windows CE operating system
- "Pocketable" clamshell form factor
- QWERTY keyboard
- 480×240×2 bit-per-pixel LCD touch screen with stylus
- 4+ MB upgradable ROM
- 2+ MB expandable RAM
- IrDA-standard infrared, serial port, PCMCIA type II slot, wave sound, LED notification
- Hitachi SH-3 and MIPS R4000 series microprocessors
- Docking cradle for synchronization
- Win32 API subset including TCP/IP stack, PPP protocol, WinSock 2.0, RAS, DCC, TAPI Network Computer
- Pentium(R) processor
- 16 MB DRAM
- Internal hard disk
- Keyboard connection
- Pointing device connection
- VGA-compatible display adapter 640×480, 8 bpp
- Ethernet, token ring, 28.8 Kbps modem, ISDN, T1 or ATM
- Plug/Play Buses and drivers
- Windows Device drivers
- Audio capability
- Audible noise quieter than 35 dBA
- Lockable PC case Some Web TV Features Include:
- 33.6+ Kbps, V.34 bis modem
- 100+ MHz, 64 bit, RISC Processor
- Graphics Processor
- 44.1 KHz, 16-bit stereo for CD-quality audio
- WebTV browser compatible with HTTP and MIME
- HTML 3.0 websites
- Auto-Update for WebTV browser
- MIDI embedded audio files
- Video Output
- Stereo Audio L/R Outputs
- S-Video Output
- Telephone Line (RJ-11)
- Keyboard Input
- (standard PS/2 wired PC keyboard)
- WebTV Port (96-pin connector)
- ISO Smart Card Slot
- Internet Commander remote control
- RF Adaptor
- Wireless Keyboard FIGS. 22, 126 and 127 illustrate improved north bridge embodiments. The North Bridge (or CPU Complex with NB Integration) shown in FIG. 22 has five ports (CPU, AGP, PCI, VSP and Memory I/F). Each port has its own data read/write buffering. The CPU and VSP ports are further connected to multiple CPUs and VSPs (or DSPs) in additional embodiments. The memory arbiter arbitrates among the CPU, AGP, PCI and VSP ports for memory access. A crossbar switch in the arbiter block couples or muxes paths under control of arbiter circuitry.

VSP port, PCI port, CPU port and AGP port are multiplexed into the memory arbiter with a crossbar switch or a data bus multiplexer. The VSP interfaces via the VSP wrapper as a PCI master to the PCI port and is enumerated by Windows or BIOS PCI enumerator code. The VSP core (or DSP core) has a VSP port to connect to an external VSP (or DSP) via a private bus or datapath which is also connected to the crossbar switch/Mux.

The internal private bus or data path for the VSP is implemented in various listed alternatives, among others:

New VSP bus defined for multimedia applications

VSP parallel (data/address/control) bus for many VSP cores

DMA bus/channels for the VSP(s)

HPI (host port interface) bus for the VSP(s)

Serial Port bus for the VSP(s)

Host to PCI bridge logic, AGP read/write transaction queues, and AGP PCI-to-PCI bridge logic mediate data transfers herein. An L2/L3 embedded DRAM cache (speed optimized) advances the system. The MCU suitably also controls an external L2 cache.

FIG. 22 also shows VSP wrapper and VSP core combined with a backend I/F to the IEEE 1394 or USB serial bus. External VSP(s) in a VSP overdrive socket are connected to the on-chip (North Bridge) VSP via the backend I/F through the IEEE 1394 or USB serial bus, in a further embodiment.

FIG. 126 illustrates the external VSP overdrive socket replaced by a private VSP bus connected to the VSP port. The internal private bus or data path for the VSP is now brought off-chip as an external VSP bus for connection to multiple VSP's. The external VSP(s) on the external VSP bus are alternatively coupled to the on-chip (North Bridge) VSP via the backend I/F through the IEEE 1394 or USB serial bus.

One embodiment omits the PCI/PCI I/F in FIG. 126. The internal host-to-PCI bridge and the VSP arbiter are as shown in FIG. 126. The VSP can be connected to the host-to-PCI bridge and to the PCI port via a PCI/PCI interface as a PCI Master/multiple slaves via the VSP wrapper.

Without PCI/PCI bridge, the on-chip VSP is accessible both by the host CPU and other masters on the external PCI bus. Windows or BIOS PCI enumerator code enumerates VSP too. The VSP core is connected to the VSP arbiter via an internal private bus which is also brought off-chip as an external VSP bus for connection to multiple VSPs. The VSP arbiter memory-arbitrates for multiple VSPs. If only the on-chip VSP is present, it connects directly to the memory arbiter and the VSP arbiter suitably is omitted. A VSP backend I/F block and external IEEE 1394 or USB serial bus are also suitably provided in the FIG. 126 embodiment.

Now consider the FIG. 126 embodiment wherein PCI/PCI bridge does connect the on-chip VSP to the host-to-PCI bridge or PCI port. The PCI-to-PCI bridge can be a partial or full implementation, that at least keeps the on-chip VSP from being arbitrated with other PCI agents for access via the PCI bus. The PCI/PCI bridge couples only to internal VSP. The external (in one embodiment) VSPs are not coupled via PCI/PCI bridge to the PCI bus and are not affected by PCI traffic. The host and other PCI masters do not access them directly over PCI. The VSP arbiter is suitably provided for memory arbitration for multiple VSPs. A VSP backend I/F block and the external IEEE 1394 or USB serial bus are also suitably provided.

FIG. 126 shows the VSP bus connected to the VSP PCI-to-PCI bridge. This means that the host CPU and other PCI masters can access all the VSP's on the VSP bus and not just the on-chip VSP. The VSPs access the system or main memory unimpeded by PCI traffic.

The VSP arbiter has data path units with data buffering for pipelined read/write operations. Caching implemented as paging under the USP architecture is further suitably provided.

Alternatively, each external VSP is implemented with the VSP wrapper for PCI access and a small paging cache for read/write operations.

FIG. 127 shows data paths in a VSP-improved north bridge embodiment as tabulated below:

Data Paths 2, 3 and 4

Host CPU to Targets on VSP, PCI or AGP Ports

Host CPU accesses VSP target(s) via VSP PCI-PCI bridge

Host CPU accesses AGP target(s) via the AGP PCI-PCI bridge

Host CPU commands converted to PCI read or write commands (I/O, memory and Configuration Spaces)

Like AGP, VSP bus protocol can support PCI transactions as well as it own direct memory access operations.

Data Path I

Host CPU to Memory

Processor PCI memory commands.

Data Paths 5, 7 and 9

Bus Masters to System Memory

PCI, PCI (AGP) and VSP (PCI) masters to system or main memory with PCI memory commands Data Paths 8 and 11

AGP Master & VSP to System Memory

Like AGP, VSP can directly access system memory on a pipelined basis. VSP via the VSP arbiter to the memory arbiter.

Data Paths 6 and 10

Bus Masters to Targets on other bus (via PCI-PCI bridges tied to the Host-PCI bridge)

Between PCI, and VSP and AGP via PCI memory write commands

In an alternative version of FIG. 127, VSP port is changed to an I/O port for connection to analog I/O peripherals such as audio and modem codecs instead of VSP overdrive. Host CPU, the VSP and other PCI masters can access these codecs which can also be integrated into one chip for host-based signal processing, e.g. soft modem and audio. The I/O port can be parallel or serial. For example, it can be serial for standard serial audio and modem codecs. This serial port can adopt the AC-link serial interface protocol for AC97 codec(s), integrated as one chip or otherwise.

Further Detailed Description

In FIG. 1, improved integrated circuits and computer system embodiments for desktop and mobile computers, television sets, set-top boxes and appliances improved with asymmetrical multiprocessors. In FIG. 1 a consumer computer architecture is suitably implemented as a desktop, deskside, portable, notebook, subnotebook, mobile, docking station or other type of computer. In other forms, the architecture is suitably implemented in a sealed box like a video game box or set-top box, in a VCR, in a television set enclosure, in an office machine like a VCR, fax machine, PBX (private branch exchange), printer, photocopier, or in a household appliance such as an entertainment audio deck, flat-panel wall fixture, a box internal to the house carpentry behind walls, above ceiling, or beneath floor, or in a kitchen or laundry appliance or otherwise.

The computing system 100 suitably has an enclosure 104 with power supply and various connections such as the following: IEEE 1394 serial bus connection for camera, VCR, hard disk drive HDD, and digital video disk DVD. An IEEE 1394-compatible device bay is also provided so that devices are advantageously inserted and withdrawn by user without opening enclosure.

For convenience and economy, several connectors are physically mounted and electrically connected to the computing system internals, and are physically accessible through an aperture in the enclosure. A USB compatible device bay and USB connectors and couplings to keyboard connector KBD, a mouse connector MS, a display connector for VGA or super-VGA cable or LCD or digital light product (micromirror display), a PRINTER port, a GAME port, a local area network LAN connector, and one or more RJ-11 telephone jacks, ISDN, xDSL or cable modem ports. A multimedia connector and a teleconferencing camera connector are accessible at the rear of the right bay. A coaxial cable connector is suitable for coupling to NTSC, PAL or SECAM television TV display. A document scanner also is connected via SCSI or serial bus to the system 100.

RF (radio frequency) and/or IR (infrared) emitter/detector provide wireless connectivity to each RF and/or IR peripheral employed by user.

An IR infrared interface connects to another serial port of the system 100 and has an emitter/detector assembly with an emitter LED (light-emitting diode) and photodetector diode.

Loudspeaker connectors or terminals for mono, stereo, quadraphonic, 3D or other audio are suitably provided.

An input(s) accommodates at least one microphone, musical instrument or other sound source.

Integrated card controller support a portable peripheral bus such as PCMCIA (Personal Computer Memory Card International Association) or Cardbus.

A video input circuit receives video data from a video camera, video recorder, or camera-recorder (CAMERA) and supplies this data to system 100 for processing. A LAN (Local Area Network) circuit using TMS380 LAN and/or ThunderLAN(™) technology from Texas Instruments provides two-way communication between system 100 and other computers having LAN circuits. Token ring, Ethernet, WAN and other advanced networks are accommodated.

A version of system 100 has an enclosure 104 with a printed wiring board and one or more add-in cards holding components chosen, configured and combined for advantageous desk top computer or portable (e.g. notebook) application. A host CPU 106 with multimedia extensions MMX is coupled to an embedded L2 cache 114 and additionally coupled to a DRAM main memory 110 via an improved north bridge chip 108. A main PCI bus 124 interconnects MPU 106 via north bridge 108 with a south bridge 134, and an improved USP smart hub 136 (see FIGS. 82, 83, 85–89).

Flash ROM is coupled to system 100 and is host CPU accessible for instant-on boot-up as described herein.

A display controller chip 126 with embedded frame buffer 128 is externally connected to a CRT or LCD display via a RAM with DAC (digital to analog converter) or alternatively without RAM/DAC to a display using digital micromirror devices or digital light products DLP from Texas Instruments Incorporated.

A TV tuner has an antenna connector and/or cable connector and provides a television receiver front-end at the disposal of computer system 100. Video and audio decode circuits provide televison-originated video and audio to enter computing system 100. Video and audio generated (or received, processed and returned) by the rest of system 100, including graphics chip 126, are conveyed for display on flat-panel, monitor, or TV devices as the user desires.

A virtual modem embodiment is suitably connected to PCI bus and connects to the telephone network either by direct connection by a rear jack on enclosure 104, or by a wireless interface incorporated in the system 100. The modem is also suitably implemented by using a a DAA interface insertable into a cardbus or PCMCIA socket. In another embodiment, the DAA can be connected to the USB bus or device bay as a dangle.

Bus 124 (330 in later FIGS.) in some embodiments is a PCI (Peripheral Component Interconnect) bus which is described in a published PCI Specification 2. from PCISIG (PCI Special Interest Group) and its follow-on specs.

Different embodiments partition system functionality into respective single-chip solutions which can have the same type of package as the MPU 106, such as plastic package.

Various circuit regions or blocks are fabricated on each integrated circuit substrate by a CMOS (complementary metal oxide semiconductor) process on silicon at 0.5, 0.35, 0.25, 0.18, 0.12 and/or decanono or other processes. Other processes such as BiCMOS (bipolar CMOS), gallium arsenide and polymer IC processes can also be used.

North bridge 108 has a bus bridge circuit and a DRAM memory controller (MCU). A PCI Bus bridge advantageously acts, for example, as a bus master when there is a Host 106 initiated transfer between the CPU and bus 124, and as a target for transfers initiated from an agent on bus 124.

The MCU in bridge 108 supplies DRAM addresses and DRAM control signals to main memory 110 and further interfaces with an embedded L2/L3 cache DRAM 112. Power management circuitry is suitably provided to throttle each chip or processor in the system 100 as may be useful to keep system power consumption within satisfactory bounds. The MCU suitably includes two-level posted DRAM write buffers, an integrated four-level DRAM refresh queue, and provides for programmable write-protection regions.

DRAM memory controller MCU supports up to 256 megabytes or more of DRAM memory with up to four or more 32-bit banks without external buffering. For example, DRAMS of 256K, 512K, 1M, 2M, 4M, 8M, and 16M asymmetric and symmetric DRAMS and up to 64M and higher DRAMS are readily supported. Shadowed RAM is supported. Additionally, the memory interface buffers are programmed to operate at different operating voltages such as 3.3 or 5.0 volts for different types of DRAMS. The DRAM memory controller is programmable to support different access times. Various refresh modes are programmably supported, such as slow, self, suspend, and CAS-before-RAS refresh.

The bus bridges in chip 108 act as an integrated interface which is made compliant with whatever suitable specification is desired of each bus such as PCI, AGP (advanced graphics port), IEEE 1394 serial bus or USB (universal serial bus). A bidirectional hardware accelerator port XP is also provided.

One, some or all of the chips in FIG. 1 is suitably improved with VSP hardware embodiments and USP unified signal processing software product and method embodiments to produce system embodiments as described extensively here and elsewhere herein. Some systems are AMP asymmetrical multiprocessing, and others are SMP symmetrical multiprocessing. "Newmedia" sometimes used herein refers to applications like NetMeeting, ActiveX conferencing, H.323/4 and the like. TAD or TAM means telephone answering devoce or machine. "Thunking" refers to interfacing two very different pieces of software. "Thunking up/down" can be a 16/32 thunk or down 32/16 thunk. A "thunk" is an interface of that type. Homologation is a process by which a company such as an original equipment manufacturer OEM seeks regulatory approval for a product in each country of use. A homologated piece of equipment must not affect the rest of a system or phone network. Corporate applications often call for LAN client, and SOHO small office/home office may emphasize xDSL digital subscriber line applications and interface. The improved systems are also contemplated for appliances and home features such as a power-usage sentry, cellular phone, and many others as noted above.

DSPs MIPS often are more powerful than host MIPS because DSP may have multiply/accumulate, fast-multiply, circular addressing, bit-reversed addressing, and many other DSP functions either not implemented on host or much more clock-efficient than host.

In FIG. 2, interrelated improved processes 200 in a network videoconferencing and full-featured system 100 of FIG. 1 include multimedia phone user interface 210, and conferencing user interface 215, coupled to ActiveX conferencing interfaces 220. Collaborative application programs 225 are coupled to Interfaces 220. Further in the process architecture 200 is application sharing 230 and T.120 data 232 supplied to an Internet/Intranet/Comm platform 205. The latter platform 205 is more fully described in connection with DirectX, and an embodiment called herein DirectDSP, DirectDSP HAL, VSP Kernel and VSP hardware improving not only the processes 200 but also further platform 205 processes such as those shown for comm and networking in FIGS. 104–110 and FIGS. 112–118.

Further processes of system 200 include H.245 call control process 235 coupled to telephone book pages services such as user location 240 and directory services 245. ActiveX Movie process 250 is supported by H.263 video (POTS videoconferencing) and G.723 Audio. A real-time protocol RTP process 260 couples to platform 205.

The following FIGS. 3–6 focus on some subsystem embodiments improved with DirectDSP, DirectDSP HAL, VSP hardware as elsewhere described. Also in connection with FIGS. 3–13 and FIGS. 83–85, among other drawings, are described various improved integrated circuit embodiments, and these embodiments are each suitably operated according a process such as that depicted in FIG. 27 and as elsewhere described. The reader is invited to carefully study the legends on each integrated circuit rectangle to appreciate the new combinations and system partitioning they represent.

Figure 11:
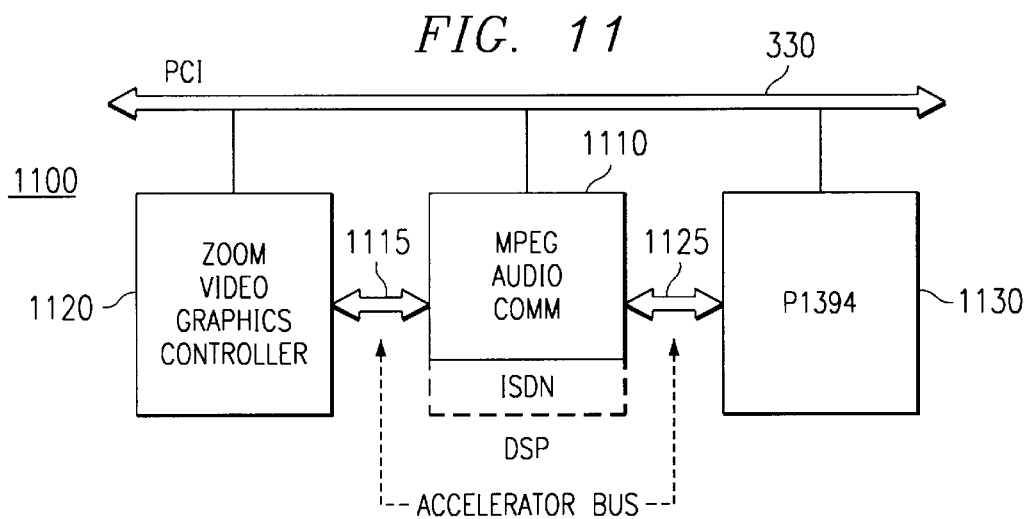
FIG. 11 is an electrical block diagram of integrated circuits and buses in another embodiment of an improved computer system for telecom, audio, networking, and graphics.

In FIG. 3, an improved computer system embodiment for telecom, audio, networking, and 3D graphics has CPU 315 and improved north bridge 318 integrated into a single chip 310. North bridge 318 is coupled to main memory 325, and with CPU 315, also to a cache 320. A north bridge includes PCI bus bridge and memory controller circuitry such as found in an Intel north bridge or is improved as shown and described, for instance, in connection with incorporated patent application TI-18329 FIG. 11 depicting a chip 103 with description in many figures and text therein. North bridge 318 has improved circuits therein such as shown in FIGS. 22, 126 and 127 and has a host CPU either integrated thereon or provided as a separate chip. PCI bus 330 corresponds to PCI bus 124 of FIG. 1.

A south bridge chip 335 is improved with a USB interface. The south bridge chip includes such as found in an Intel south bridge or is improved as shown and described, for instance, in connection with incorporated U.S. Pat. No. 5,754,837 FIG. 11 depicting a PPU 110 with description in many figures and text therein. A USB serial link couples chip 335 to a VSP-improved integrated circuit 340 of FIG. 17 incorporating the DSP 1730 and wrapper 1720 circuitry of FIG. 50 as well as a USB backend interface on a single chip.

Further embodiments integrate one, some or all of the other circuits of FIG. 50 such as more RAM, modem (telco) codec, voice codec and stereo codec on the same chip 340, with advantageously reduced pinout. Combined CMOS and analog process technology incorporate the numerous logic and analog circuits onto one chip in the further embodiments just mentioned.

Chip 340 includes PCI master/slave with USB hub circuitry coupling to PCI bus 330. Chip 340 provides advantageous DSP MIPS outlying in the system from CPU 315 which run under the main operating system (e.g. Windows) and do tasks allocable either to CPU or chip 340 for greater system balance and user-perceptible improvements. Chip 340 provides a USB superhub by virtue of embedded comm (communications such as modem), audio, and networking functionalities with some or all of these applications advantageously virtualized.

Further in FIG. 3, a VSP-improved integrated circuit 345 of FIG. 17 incorporating the DSP 1730 and wrapper 1720 circuitry of FIG. 50 runs VSP kernel software according to USP shared memory model. Chip 345 also includes PCI master/slave coupling to PCI bus 330. Chip 345 has its memory size and pinout tailored for 3D geometry slope/setup, and MPEG compression/decompression algorithms. Advantageously, CPU 315 is relieved of burden of much of these calculations, and freed from much time-consuming MMX context switching latency.

A further chip 350 is similar in description to chip 345 except that chip 350 is dedicated to 3D graphics algorithms.

Figure 4:
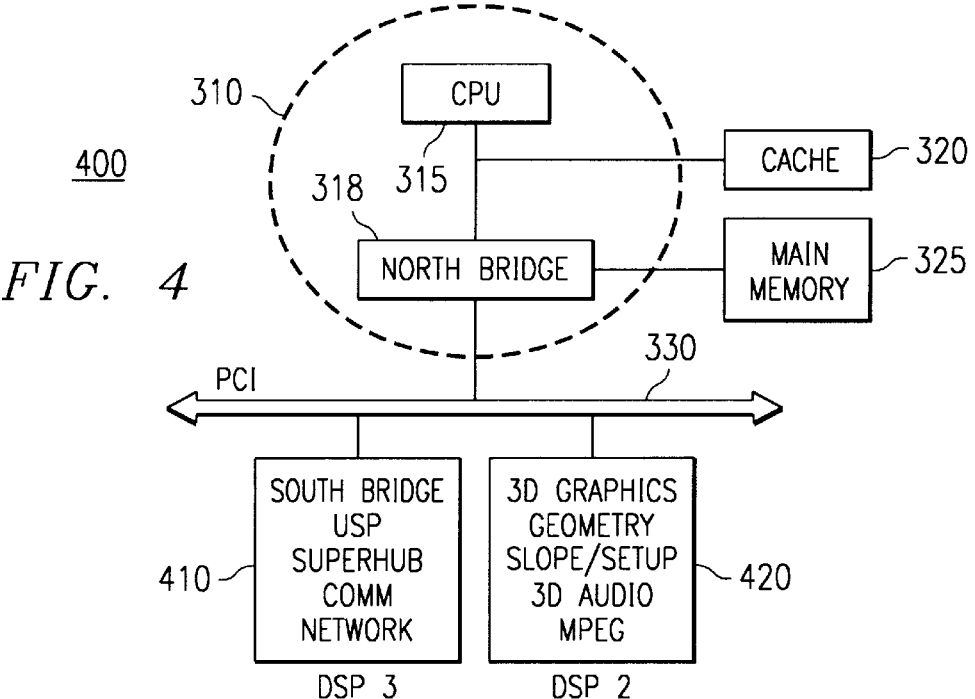
FIG. 4 is an electrical block diagram of another embodiment of an improved computer system for telecom, audio, networking, and 3D graphics.

In FIG. 4, another embodiment 400 of an improved computer system for telecom, audio, networking, and 3D graphics is similar to the system of FIG. 3 north of PCI bus 330. In FIG. 4, however, a new chip 410 combines FIG. 3 chips 335 and 340 into one. The resulting chip 410 has a VSP-improved integrated circuit 345 of FIG. 17 incorporating the DSP 1730 and wrapper 1720 circuitry of FIG. 50 and runs VSP Kernel software according to USP shared memory model. Chip 410 also includes PCI master/slave coupling to PCI bus 330. Chip 410 virtualizes USB hub, comm and networking and none, some or all of the south bridge functions, having chip 410 memory size and pinout tailored for the applications allocated to it.

Another new chip 420 combines the audio functions and audio related pinout of chip 340 of FIG. 3 together with the architecture of chip 345 to make chip 420. In this way, audio, 3D audio, MPEG audio, MPEG video, 3D graphics, geometry, slope and setup are virtualized and combined into a single powerful chip 420. Mixed signal (logic and analog) embodiments of this chip 420 are also contemplated.

Figure 5:
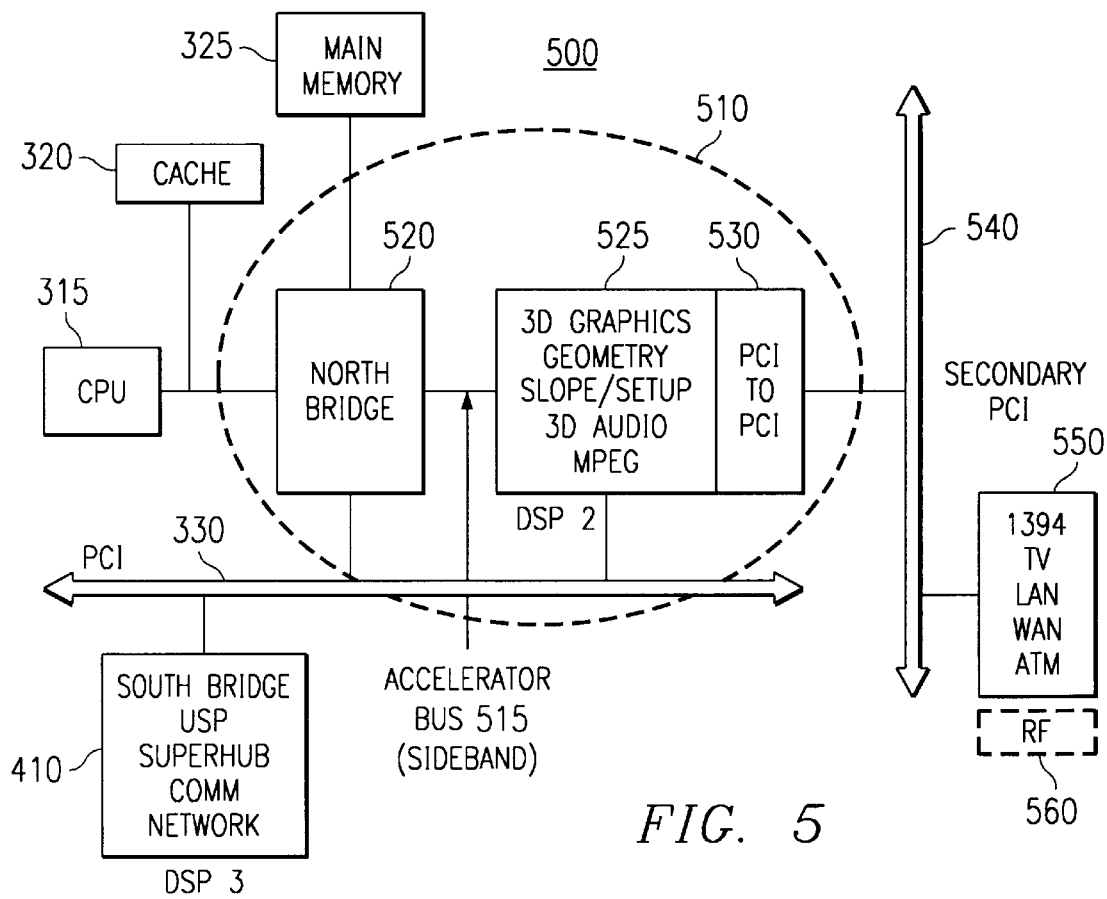
FIG. 5 is an electrical block diagram of another embodiment of an improved computer system for telecom, audio, networking, and 3D graphics.

In FIG. 5, another embodiment 500 of an improved computer system has an additional improved chip 510 as well as improved chip 410 coupled to PCI bus 330. Chip 510 has integrated on a single chip a north bridge 520 coupled by an accelerator bus 515 to a VSP core 525. VSP core 525 has a VSP-improved integrated circuitry incorporating the DSP 1730 and wrapper 1720 circuitry of FIG. 50 and runs VSP kernel software according to USP shared memory model. Chip 345 also includes PCI master/slave coupling to PCI bus 330. Additionally, a PCI/PCI bridge 530 couples between VSP core 525 and interfaces to a secondary PCI bus 540. A chip or chips 550 couple to PCI bus 540 and provide IEEE 1394 serial bus, TV, LAN (local area networking), WAN (wide area networking) and ATM (asynchronous transfer mode, broadband ISDN integrated services digital network) and RF interface 560.

Chip 510 has its memory size and pinout tailored for 3D graphics and geometry slope/setup, MPEG compression/decompression algorithms, and/or 3D audio. Advantageously, CPU 315 is relieved of burden of much of these calculations, and freed from much time-consuming MMX context switching latency. Another embodiment of chip 510 integrates blocks 520 and 525 together with advantageously low real estate and reduced pinout, and PCI/PCI block 530 is a separate chip.

In FIG. 6, another embodiment 600 of an improved computer system is comparable to FIG. 5 except that a north bridge-type block 610 has a first VSP core enhancing the north bridge PCI/MCU circuitry and that first VSP runs 3D geometry and multimedia extensions acceleration. A second VSP block 620 virtualizes 3D audio, graphics, slope/setup and MPEG audio/video compression/decompression. Blocks 610 and 620 are integrated together into a single integrated circuit chip, and both blocks 610 and 620 are coupled to PCI bus 330 as master/slave agents. An accelerator bus 615 couples blocks 610 and 620. PCI/PCI bridge 530 is on or off-chip in different embodiments.

In FIG. 7, another embodiment 700 of an improved computer system for hard disk drive control, telecom, 3D audio, networking, and graphics illustrates one, two or many VSPs are distributed in any, some or all of the places where "DSP" is indicated on FIG. 7. Advantageously, when VSP wrapper/DSPs are very much less expensive than the host CPU 106, distributing a number of them becomes quite attractive from both performance and engineering-economics viewpoints.

In FIG. 7, CPU 106 is coupled to VSP-enhanced north bridge chip 108 which includes a PCI bridge to PCI bus 330. Chip 108 further has integrated therein a IEEE 1394 serial bus interface 116 and an AGP (advanced graphics port) interface 118. In system 700, a chip 710 includes its own VSP for hard disk drive control and outlying processing integrated together with a IEEE 1394 serial bus interface, and coupled to interface 116 in chip 108.

A wrapper/DSP chip 720 for 3D graphics has its wrapper adapted for AGP instead of PCI, and chip 720 is coupled to AGP interface 118 of chip 108. A real-time RT link couples 3D chip 720 to a LAN/IEEE 1394 wrapper/DSP chip 725. A IEEE 1394 link couples chip 725 to a wrapper/DSP 730 which has its wrapper adapted for serial bus interface instead of PCI. By contrast chip 725 has a PCI master/slave interface built into it and coupled to PCI bus 330, as indicated a line from chip 725 to PCI bus 330. (The reader should thus note that these diagrams use a compressed style of representation to show the types of interfaces used. Further in the compressed style, each legend suggests pinout embodiment type as well as software appropriate to the legend.)

Further in FIG. 7, a south bridge 735 chip couples to an ISA bus (PC slower speed peripheral bus) 740 on which a wrapper/DSP 745 is coupled via an ISA interface in the wrapper of chip 745. Chip 735 chip is improved with a USB interface 750 coupled via a first USB serial link to a wrapper/DSP chip 755 for comm/audio. Chip 755 has a master/slave interface to PCI bus 330 and not only the first USB link to/from chip 735, but also a second USB interface coupled via a second USB interface in chip 755 to a DSP or wrapper/DSP 760.

Notice then that the provision of two or more of various interfaces (e.g. PCI, IEEE 1394, USB, AGP, RT, XP, ISA, SYNCLINK, RAMBUS) suffice to create various wrapper/DSP/interface embodiments. Any one (or more) of these embodiments are suitably interconnected in tinker-toy style to construct numerous different system embodiments.

Figure 8:
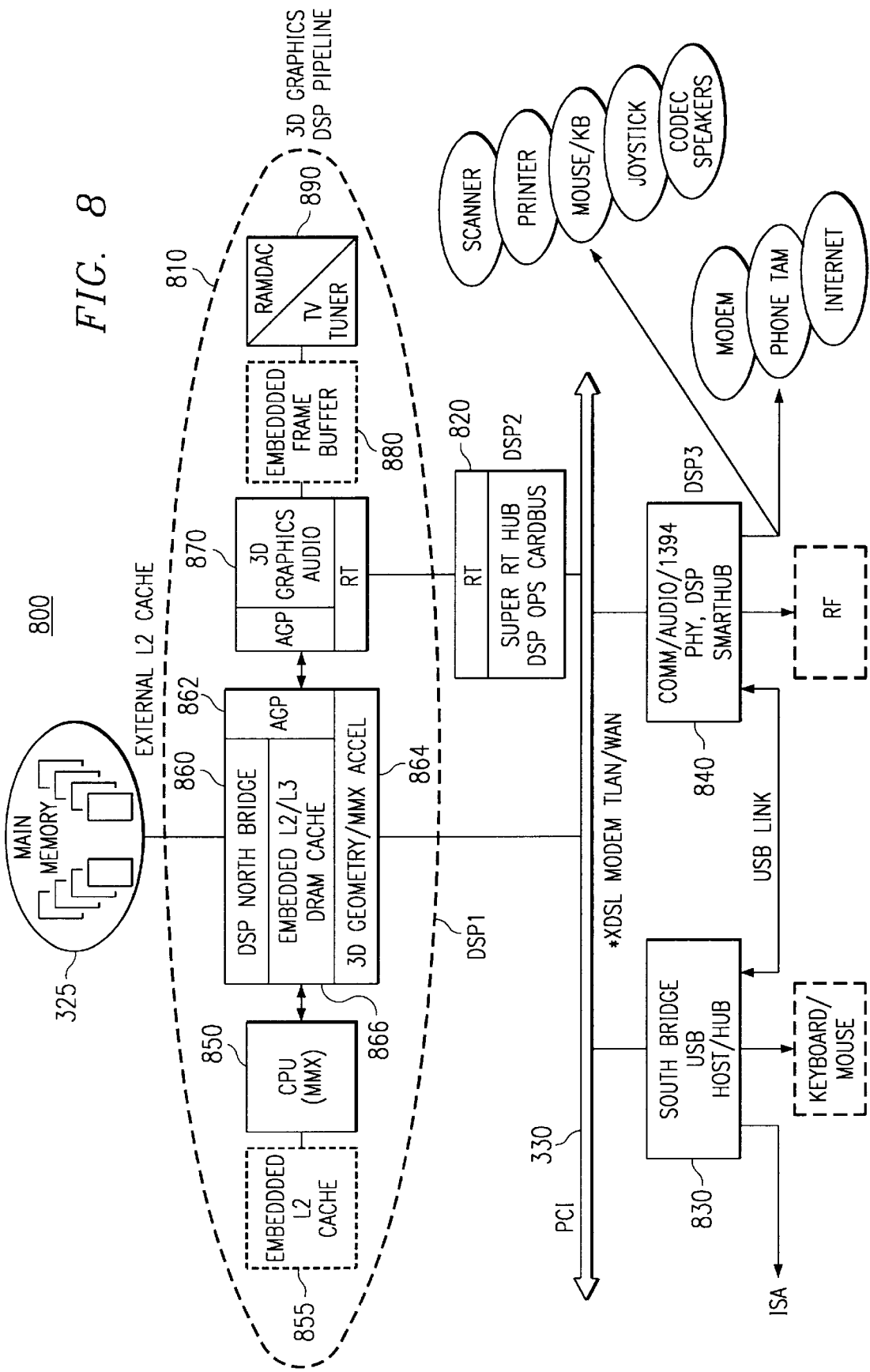
FIG. 8 is a block diagram of improved integrated circuits and computer system embodiments for desktop and mobile computers, television sets, set-top boxes and appliances improved with asymmetrical multiprocessors.

FIG. 8 shows improved integrated circuits and computer system embodiments for desktop and mobile computers, television sets, set-top boxes and appliances improved with asymmetrical multiprocessors. South of PCI bus, chips 830 and 840 are constructed and interconnected as already described and further enhanced for xDSL (digital subscriber line WAN) modem and ThunderLAN(™) local area network. Various peripherals for use in either FIG. 1 or FIG. 8 are shown in ovals in FIG. 1 and 8.

North of PCI bus 330, a wrapper/DSP chip 820 has a main memory 325 coupled to a single chip 810 which has pinout for memory bus to DRAM, for PCI bus 330, for a real-time RT port, and for TV tuner and RAM and DAC integrated onto the same single chip. By using 0.25 micron-or-less CMOS and mixed signal technology, this chip provides attractively compact package. Another embodiment partitions off the TV-tuner/RAMDAC block 890 from chip 810.

In chip 810, block 850 is a Host CPU at P5, P6, P7, P68, P8 or other level of functionality, enhanced as the skilled worker may desire with multimedia extensions in instruction set. An embedded L2 cache 855 is coupled with Host 850. Dotted lines indicate that this cache 855 is omitted in another embodiment. Block 850 is coupled to a north bridge block 860 having PCI bridge/MCU, embedded L2/L3 DRAM cache, AGP interface 862 and 3D geometry/MMX accelerator wrapper DSP 864. A block 870 on the same chip 810 has wrapper/DSP for 3D graphics and audio, an AGP interface coupled to AGP 862, and a real-time RT interface. Note that the two interfaces are on the same single chip, and another embodiment may vary the interfaces or eliminate them. The block 870 wrapper/DSP is coupled to an embedded frame buffer 880 which in turn couples to TV tuner/RAMDAC 890.

An additional wrapper/DSP 820 has at least three interfaces: 1) RT interface coupled to block 870 of chip 810, 2) PCI master/slave interface coupled to PCI bus 330 and 3) cardbus interface to cardbus slots. The wrapper/DSP virtualizes super-real-time hub functions and cardbus data processing such as audio and modem processing advantageously architecturally near the cardbus slots even when chip 840 is also present.

Figure 9:
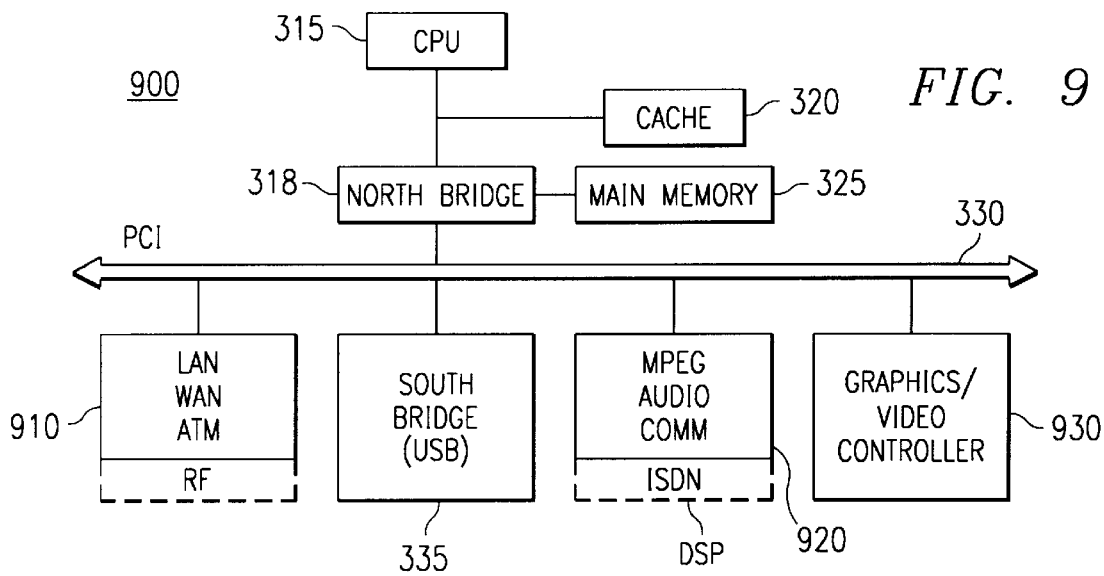
FIG. 9 is an electrical block diagram of another embodiment of an improved computer system for telecom, audio, networking, and graphics.

In FIG. 9, another embodiment 900 of an improved computer system for telecom, audio, networking, and graphics provides still different chips coupled to PCI bus: A) wrapper/DSP chip 910 dedicated to virtualizing LAN, WAN, ATM and with RF interface, B) wrapper/DSP chip 920 dedicated to virtualizing MPEG, audio, comm and ISDN interface, B) wrapper/DSP chip 930 dedicated to virtualizing graphics/video controller.

Figure 10:
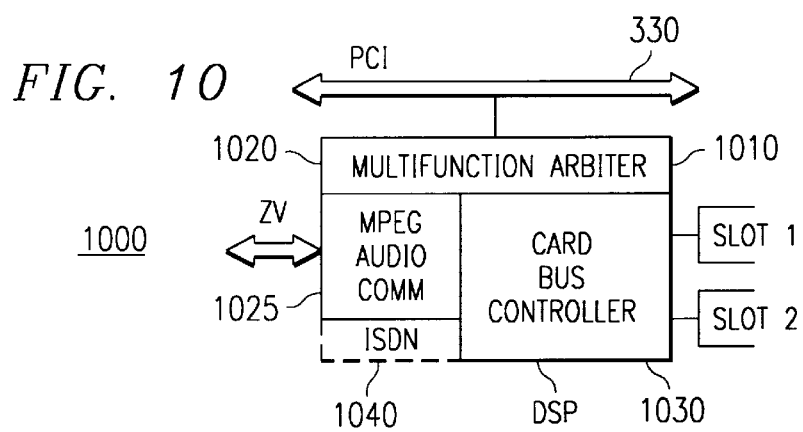
FIG. 10 is an electrical block diagram of another embodiment of an improved integrated circuit for use in computer system for telecom, audio, networking, and graphics.

In FIG. 10, another embodiment 1000 of an improved integrated circuit 1010 has on single chip: a cardbus controller 1030 coupled to at least two slots—Slot 1 and Slot 2, a DSP block 1025 dedicated to virtualizing MPEG, audio, comm, ISDN and with ISDN interface 1040, and a wrapper including a single PCI master/slave interface to service all other blocks via a multifunction arbiter block 1020.

In FIG. 11, integrated circuits and buses in another embodiment 1100 of an improved computer system for telecom, audio, networking, and graphics emphasize three chips: A) wrapper/DSP chip 1110 dedicated to virtualizing MPEG, audio, comm and ISDN interface, B) wrapper/DSP chip 1120 with PCI/bridge to bus 330 and virtualizing zoom video graphics, chip 1120 being coupled by a zoom video ZV link to chip 1110, and C) IEEE 1394 serial link layer controller chip 1130 with PHY, chip 1130 being coupled via an accelerator bus 1125 to chip 1110.

In FIG. 12, integrated circuits and buses in another embodiment 1200 combines the chips 1110 and 1130 of FIG. 11 into corresponding functional blocks sharing a wrapper including a single PCI master/slave interface to service all via a multifunction arbiter block 1230. Chip 1210 has DSP block 1220 virtualize MPEG, audio, comm, and ISDN, with ISDN interface 1240, as well as a IEEE 1394 block 1230. Pinouts and interfaces for each of the functions are suggested by the legends as discussed above in this compressed illustration.

Figure 13:
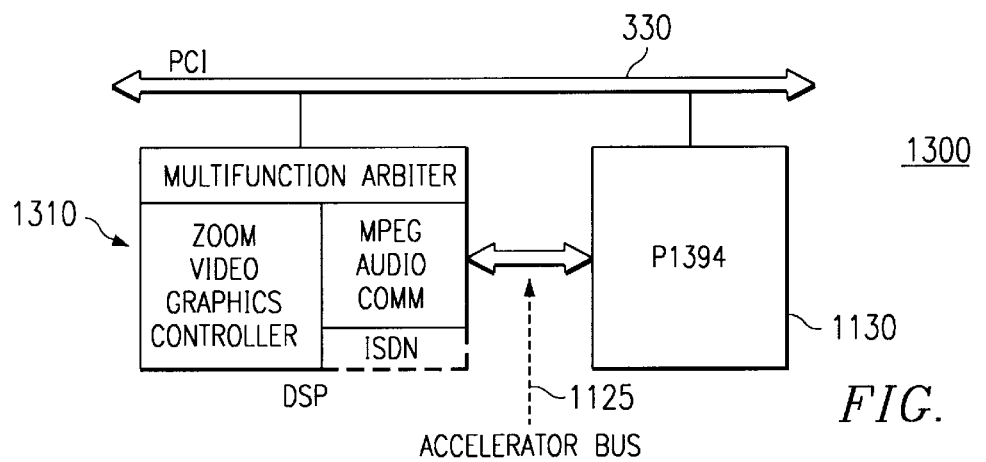
FIG. 13 is an electrical block diagram of integrated circuits and buses in another embodiment of an improved computer system for telecom, audio, networking, and graphics.

In FIG. 13, integrated circuits and buses in another embodiment 1300 combines the chips 1120 and 1130 of FIG. 11 into corresponding functional blocks sharing a wrapper including a single PCI master/slave interface to service all via a multifunction arbiter block in chip 1310. Chip 1310 has a powerful DSP block to virtualize zoom video graphics, MPEG, audio, comm, and ISDN, with ISDN interface. Accelerator bus 1125 still couples IEEE 1394 chip 1130 to its neighbor chip, this time chip 1310.

Figure 14:
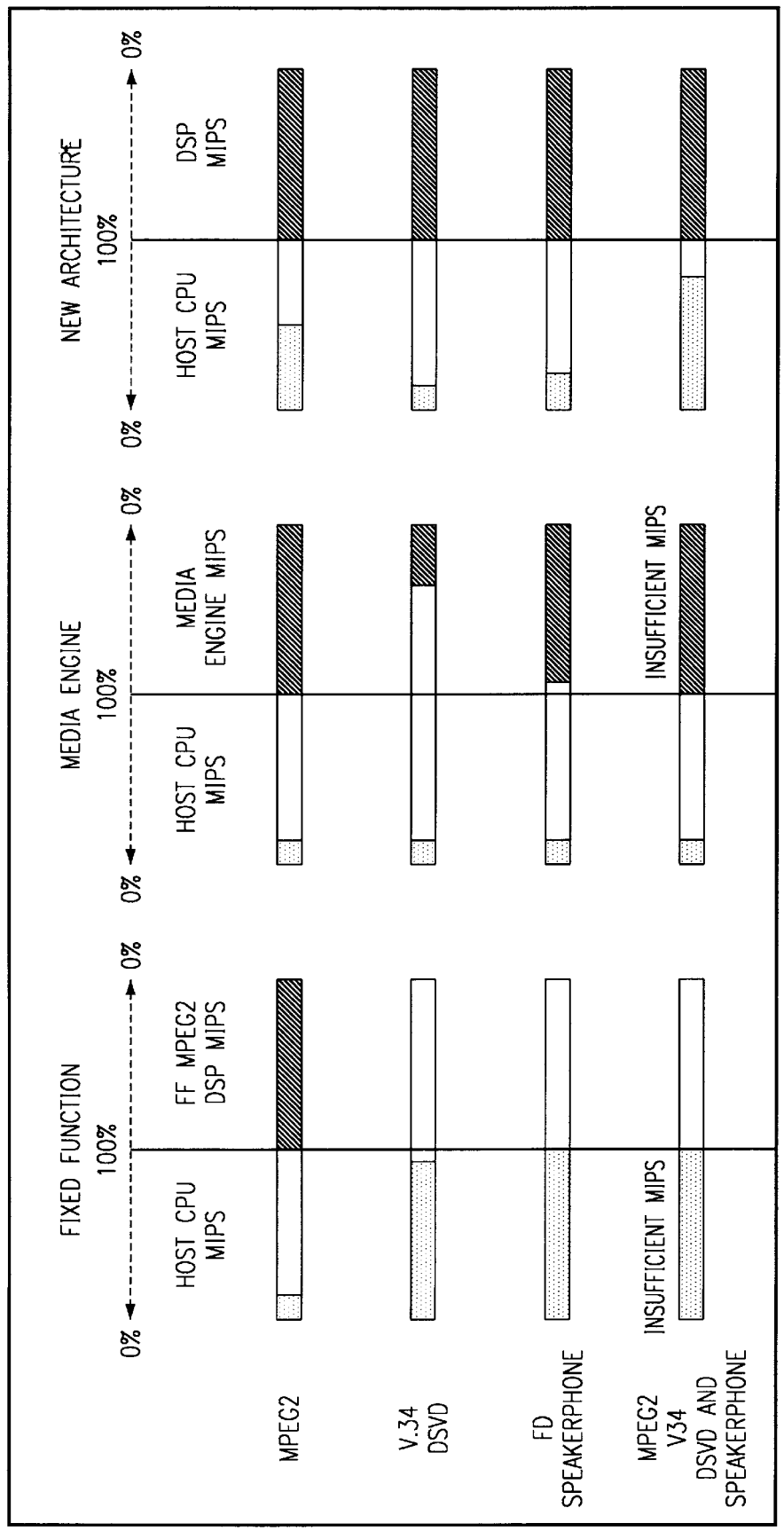
FIG. 14 is a set of three bar charts comparing computer power (MIPS—millions of instructions per second) of three alternative systems: 1) a fixed function device, 2) a media engine, and 3) the new architecture herein, where each bar chart has left-side bars for host CPU MIPS in given operations and right-side bars for a particular additional device in the given operations.

In FIG. 14, three bar charts compare computer power (MIPS—millions of instructions per second) of three alternative systems: 1) fixed function, 2) media engine, and 3) new (e.g., USP) architecture herein, where each bar chart has left-side bars for host CPU MIPS in given operations and right-side bars for a particular additional device doing the given operations tabulated row-wise. For example, in MPEG2 (upper right) DSP MIPS sometimes offload granules to CPU in the new architecture, which the other approaches illustratively do not. In V.34 modem DSVD, DSP MIPS virtualize modem and DSP can be hardware tailored, or throttled or both, to efficiently run modem function, by contrast with the first two approaches. In FD speakerphone, the same analysis applies, wherein CPU is burdened and system unbalanced, and media engine is even more heavily loaded. When MPEG2, V32 DSVD and speakerphone applications are concurrently running, the new architecture efficiently loads and balances the MIPS between Host and VSP(s), while the host alone may have insufficient MIPS and the media engine illustratively has insufficient MIPS.

Figure 15:
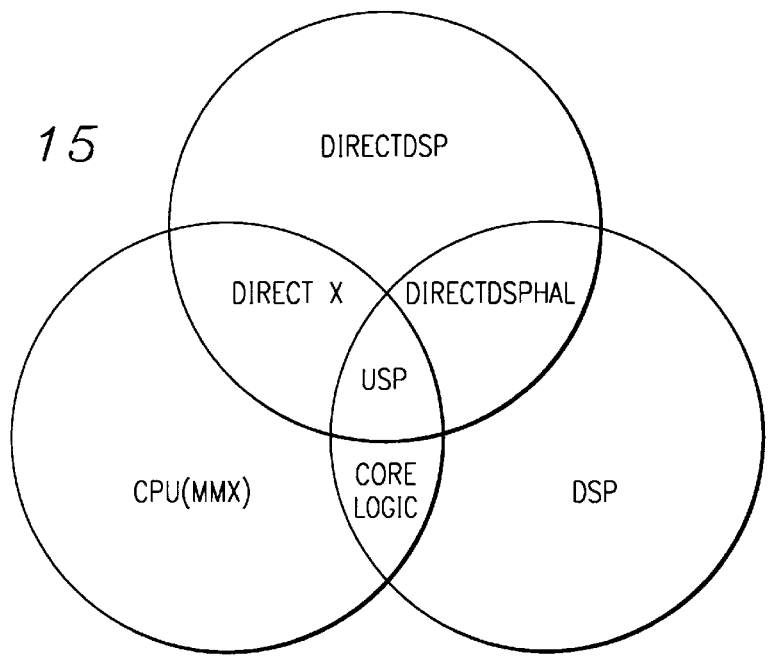
FIG. 15 is a set diagram with circles each representing a component of an improved system combination, the circles having overlapping regions indicating coupling elements and processes.

In FIG. 15, circles for DirectDSP, DSP and Host CPU-MMX overlap to represent an improved system combination. Hardware wrapper ASIC core logic 1720 overlaps or couples Host 106 and DSP 1730. DirectDSP API and DirectX processes run on the CPU. DirectDSP API couples to DSP via DirectDSP HAL (hardware abstraction layer) and VSP Kernel processes.

In FIG. 16, interrelated improved processes 1600 and structure in a network videoconferencing and full-featured system of FIG. 1 include a suite 1610 of applications, tools, and content as well as COM-based (component object model) applications 1615 such as ActiveMovie and ActiveX Animation. Both suite 1600 and applications 1615 are coupled to a DirectX library, e.g. Direct3D, DirectDraw, DirectInput, DirectPlay, DirectSound). 32-bit WDM (windows driver model) interface 1625 and a 16-bit HAL 1630 for DirectX are improved with DirectDSP API as described extensively herein. DirectDSP API has a new layer 1635 of DirectDSP HAL, VSP kernel and VSP hardware. Further in FIG. 16, multimedia processes such as WinMM/MMSystem and MSVideo ACM 1640 are coupled to suite 1610. OpenGL graphics 1645 couples to DirectX 1620 and suite 1610. Suite 1610 further couples to GDI (graphics display interface) 1650 which in turn couples to HAL/DDI and to the DirectDSP HAL improvements controlling graphics applications for chips 126, 350, 420, 525, 610, 620, 720, 864, 870, 930, 1120, 1310, 8310, 8440, 8510, among other graphics chips disclosed herein.

In FIG. 17, an improved DSP (digital signal processor) integrated circuit embodiment having a wrapper-and-DSP-core (called VSP herein) and a serial bus backend interface on-chip, the improved integrated circuit connected to busses for some system embodiments.

In FIG. 18, interrelated improved processes called DirectDSP, DirectDSP HEL (host emulation), DirectDSP HAL (hardware abstraction layer), and VSP Kernel (DSP Real-Time Kernel).

In FIG. 19, an upgradable VSP with overdrive socket in another embodiment of an improved computer system for stereo, telecom, and voice.

In FIG. 20, an upgraded VSP system in another embodiment of an improved computer system for stereo, telecom, and voice.

Figure 21:
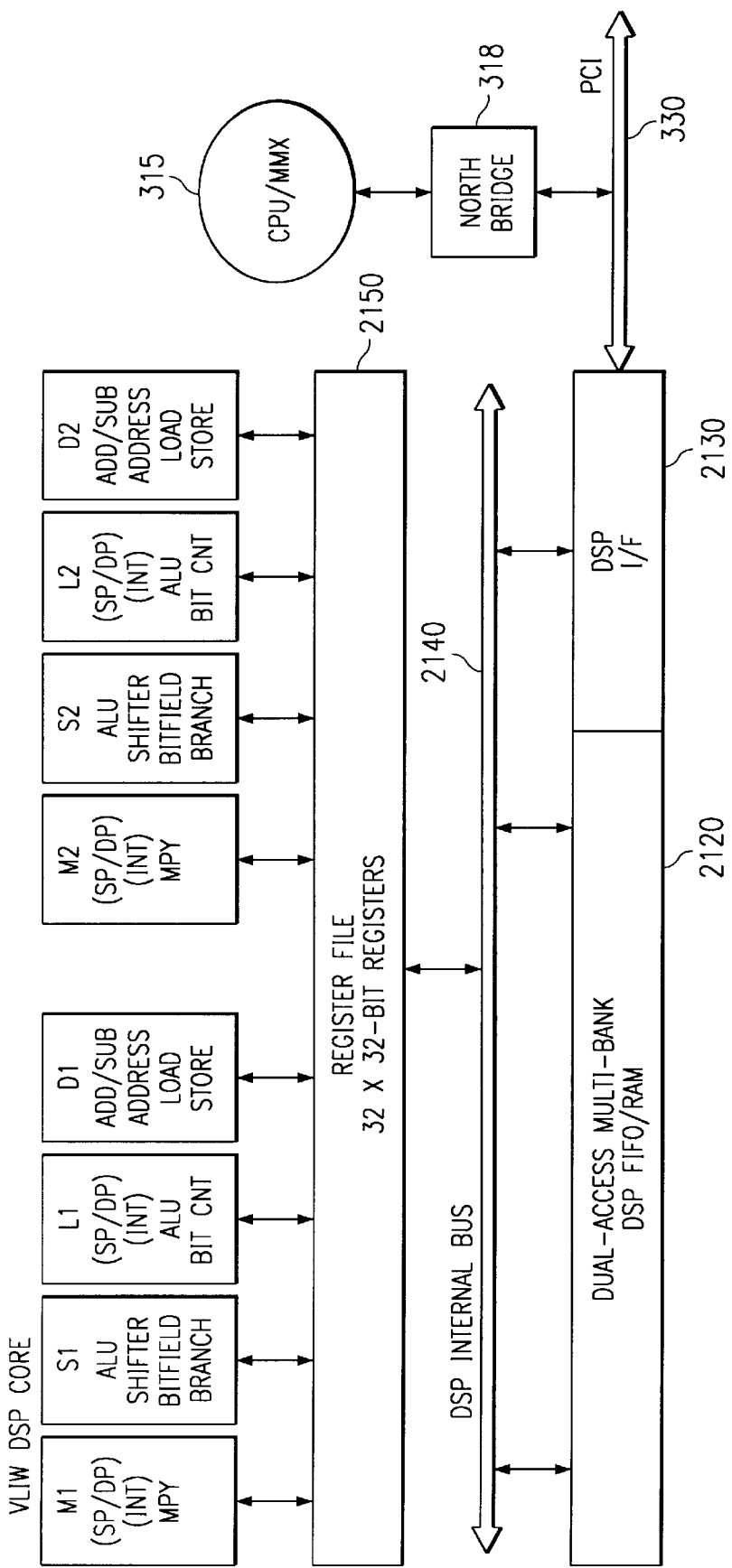
FIG. 21 is a block diagram and layout diagram of an improved VLIW (very long instruction word) DSP (digital signal processor) integrated circuit embodiment having a wrapper-and-DSP-core (called VSP herein), the improved integrated circuit connected to system embodiments herein.

In FIG. 21, an improved VLIW (very long instruction word) DSP (digital signal processor) integrated circuit such as Texas Instruments TMS320C6x DSP per incorporated application TI-25531IP is provided as a DSP core for a VSP. The VLIW DSP 2110 has two sets of powerful processing blocks including single precision/double precision integer multiply M1, M2, ALU/shifter/bitfield/branch unit S1, S2, single precision/double precision integer ALU/bit counter unit L1, L2, and add/subtract address/load-store unit D1, D2. These units couple to 32 registers of 32-bits each in a register file 2150 coupled to an internal DSP bus 2140. On the bus 2140 is a dual-access multi-bank DSP RAM such as 3330.1 and 3330.2 and other local RAM as discussed in more detail elsewhere herein. A wrapper interface such as described in connection with FIG. 50 is denoted 2130 in this FIG. 21. The interface has a PCI master/slave interface to the PCI bus 330, in turn coupled to north bridge 318 coupled to CPU/MMX 315.

In FIG. 22, an improved DSP (digital signal processor) integrated circuit north bridge embodiment has a wrapper-and-DSP-core (called VSP herein) and a serial bus backend interface on-chip, the improved integrated circuit connected to ports and busses for some system embodiments. CPU 106 with embedded L2 cache 114 couples to CPU i/f port 2232 to memory arbiter 2230 (which includes data paths as granted). A VSP includes a DSP wrapper 2220, a DSP core 2224 and a back end i/f 2226 to a serial bus. DSP wrapper 2220 couples to memory arbiter 2230 as well as to DSP overdrive socket via an i/f port 2234. Further the wrapper 2220 coupes to a PCI bus 124 via a PCI port 2236, which also couples to the memory arbiter for off-chip PCI agents. Memory arbiter 2230 also couples to AGP port 2238 linked to chips and blocks 126, 128, 130 and 132 as earlier described. Memory arbiter 2230 couples to main memory 110 via an MCU (cache and DRAM controllers) 2250, embedded L2/L3 DRAM cache (optional) and main memory interface port 2258 in improved bridge chip 2210.

Figure 23:
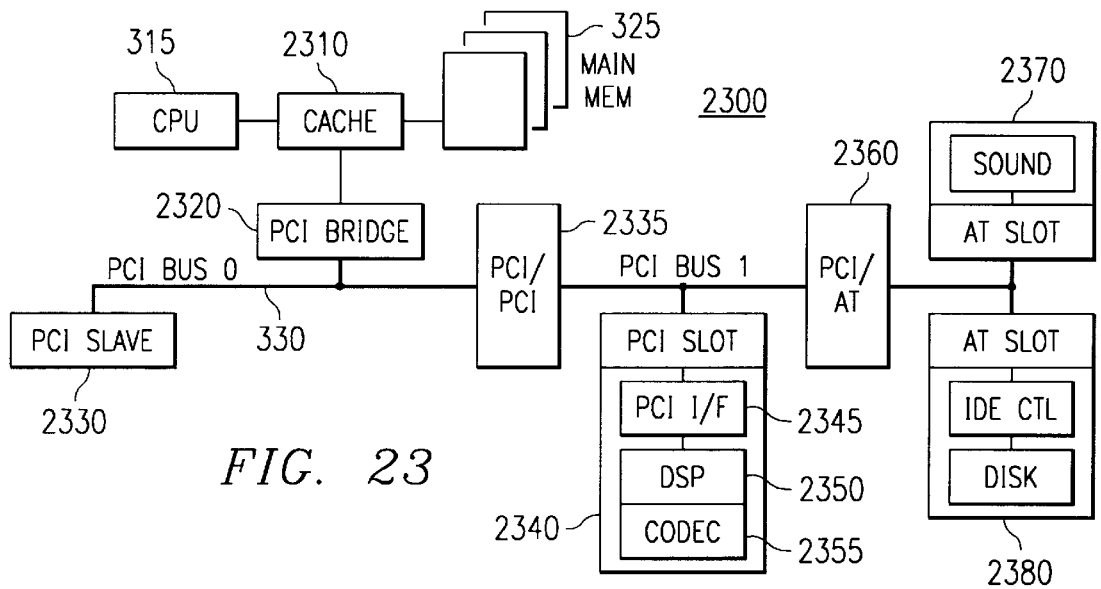
FIG. 23 is an electrical block diagram showing an improved computer system embodiment and its buses, couplings and interconnection for sound, disk, codec and other system components.

In FIG. 23, an improved computer system embodiment and its buses, couplings and interconnection for sound, disk, codec and other system components, includes CPU 315, cache 2310, main memory 325, and PCI bridge 2320 to PCI bus 330. A PCI slave 2330 couples to PCI bus 330 as does PCI/PCI bridge 2335 to a PCI bus 1. Then a VSP 2340 card fits in a PCI slot of PCI bus 1, and card 2340 has PCI I/F and wrapper 2345, DSP 2350, and codec 2355 for each application. A PCI/AT bridge 2360 couples bus PCI 1 to AT bus. A sound card 2370 plugs into AT slot. A disk drive 2380 plugs into another AT slot.

In FIG. 24, a process of software product manufacture and use begins with a step 2404 of writing source code for a software application program in a high-level language. An ISV would suitably write the application program with function calls to the granules which granules may themselves be absent. Then the ISV compiles the application program once to host object code.

The function granules to be called for a modem task or audio task, for example, are suitably written in high-level language by a hardware vendor and compiled into driver software for the hardware. The hardware is suitably a VSP add-in card, or motherboard with the VSP thereon.

Examples of high-level source language for the function granules are C, C++ or the like any of which languages is readily compiled into object code for at least two processors having different instruction sets. Here, for example, two processors are 1) any commercially available x86 microprocessor used to run Windows such as a 486, Pentium (R), M2, K6, Pentium Pro (R), and followons, and 2) any commercially available DSP such as a Texas Instruments TMS320 DSP like TMS320C5x, TMS320C54x, TMS320C6x, or other DSP. Other choices of processors might be 1) PowerPC 60x and 2) TI TMS320Cxx DSP. The host microprocessor is suitably also a RISC processor such as UltraSPARC, and the second processor is another selected RISC processor or DSP. While Windows operating systems are quite popular, the technology suitably utilizes any operating system, preferably one with multitasking, multi-threaded features.

Steps 2408 and 2412 compile into host object code and DSP object code, respectively, a same given portion or function in the process defined in source code in step 2404, and thereafter transfer and store the object code resulting from both compiles 2408 and 2412 in one or more drivers on hard disk in a step 2416. In operation of the computer, the software application is then transferred in parts or as a whole to DRAM 110 in a step 2420 for linking and execution.

Some portions, such as legacy code or spaghetti code are suitably only compiled for the host in step 2408. Some embodiments compile host object code corresponding to at least every granule compiled into DSP object code so that a system lacking a DSP can run the entire application on the host, thereby achieving upward compatibility with conventional systems. Other embodiments provide some DSP object code granules lacking a counterpart host code granule where upward compatibility is not an issue. When a granule compiled for one processor has no counterpart code compiled for a second different instruction set processor, an allocation algorithm 2424 detects a flag or ID indicating the only processor that can execute the object code, and allocates to that processor.

In step 2424, the host runs at least some of the operating system code including an allocation algorithm as described in connection with FIGS. 24A and 24B. A step 2428 determines whether a DSP object code granule is allocated to host by allocation in step 2424, and if no, operations proceed to execute the DSP object granule on DSP in a step 2436. If yes in step 2428, and a step 2432, allocation to host in step 2424 causes the host object code granule for the same function to instead be executed on the host in a step 2438. Operations loop back to step 2424 to continually allocate functions or pieces in application software to the host or DSP to dynamically balance the system 100. In a step 2442, execution of a granule either on host or DSP sends results to a common data structure or shared memory space in the main DRAM memory 110 (see FIG. 94 and FIGS. 57A–F).

In FIG. 24A, a library of tables 2452.1–2452.N correspond to software application programs respectively. Each table, say 2452.1 for a first program, has rows 2455.j for corresponding granules in the first program. Each row, for example, is a granule entry that has fields for a granule ID name, a set of system impact descriptors for the granule, and an associated default host/DSP entry and dynamic host/DSP entry. A table 0 holds System Operation Parameters, for example:

1A) total MIPS of Host

1B) MIPS currently used by Host: Host MIPS counter (for summation of host MIPS used by currently running granules and tasks on Host) (Note that modification to operating system beyond adding a new API is appropriately implemented to estimate MIPS for all of the software running on the Host. If this modification is not desired, it may be omitted in many embodiments.)

1C) available MIPS of Host=1A minus 1B 2A) total MIPS of (each) DSP

2B) MIPS currently used by (each) DSP: DSP MIPS Counter (for summation of (each) DSP MIPS used by currently running granules on (each) DSP)

2C) available MIPS of (each) DSP=2A minus 2B 3A) total bandwidth of (each) bus such as CPU bus, mezzanine bus (e.g., PCI), I/O bus (ISA, USB, AGP, IEEE 1394, Zoom Video, real-time RT bus, etc.)

3B) bandwidth currently used on (each) bus: Bus Bandwidth Counter for summation of bandwidth on each bus consumed by currently running granules on every processor: Host and DSP(s)

3C) available bandwidth of (each) bus=3A minus 3B 4A) total main memory space and each outlying memory space available 4B) total usage of main memory space and each outlying memory 4C) available main memory space and available space in each outlying memory. 4C=4A minus 4B.

5A) total main memory bandwidth and each outlying memory bandwidth available 5B) total usage of main memory bandwidth and each outlying memory 5C) available main memory bandwidth and available bandwidth in each outlying memory. 4C=4A minus 4B. The counters are alternatively preloaded with a given "A" quantity above and then decremented as the system element is additionally loaded, or incremented as loading is released by completion of execution of a given granule.

System impact descriptors represent the impact (MIPS or bandwidth consumption) of a granule on the system. Types of system impact descriptors are selected judiciously to provide information useful in making an appropriate allocation. For example, some impact descriptors types suitably include:

I4A) Host MIPS impact

I4B) (each) bus/memory bandwidth impact if granule run on Host

I5A) (each) DSP/memory MIPS impact

I5B) (each) bus bandwidth impact if granule run on (each) DSP

I6) Granule in pipelineable software process

Further in FIG. 24A, the default entries (0=Host, 1=DSP) represent a best-guess predetermination of the host or DSP as the better processor on which to run the granule. Some embodiments only use default entries for simplicity, and can balance a system reasonably well. Other embodiments also use dynamic entries wherein counter information about the current operation of the system from Table 0 above, is also utilized to determine on-the-fly whether the default predetermination should be overridden, and another processor be used to execute the granule instead.

In FIG. 24B, a portion of a DirectDSP embodiment uses the library of FIG. 24A and allocation logic operations for performing resource management and dynamic load balancing for computer systems. Operations commence with a START 2460 and proceed to a step 2460 to retrieve the granule library of FIG. 24A from hard disk and put it on DRAM main memory 110. Next a step 2468 recognizes any new granules in a software application program which is to be launched per FIG. 120, and then a step 2472 updates the library for such new granules. Then a next step 2476 initializes the dynamic entries of FIG. 24A with the predetermined default entries of host or DSP processor allocation of the granules.

If the application has been launched on the same system before, the foregoing operations are already completed, and operations instead commence at a BEGIN 2480 and proceed to a step 2484. Step 2484 obtains and calculates the real-time loading of the DSP, Host CPU, memory, and I/O, such as described in connection with Table 0 above. A succeeding step 2488 executes allocation logic, as discussed earlier hereinabove in connection with this FIG. 24B.

Also, see the following pseudocode for example. Advantageously, available-MIPS counts and/or the system impact information can be arranged in logic in numerous ways by the skilled worker as system balancing considerations make appropriate.

The pseudocode example below basically says that if the new granule can MIPS-fit on VSP, then put it there. If new granule can't MIPS-fit on VSP, try to reallocate some currently VSP-allocated granule according to some more or less selective sift or search of all VSP-allocated granules. The pseudocode illustrates a fairly rigorous sift, and one or more of the criteria can be added to, modified, or dropped in various embodiments. The illustrated sift picks a VSP allocated granule, if one can be found, that itself can MIPS-fit on Host; that releases enough VSP MIPS to allow the new granule to MIPS-fit on VSP, that together would not overload PCI bus and system memory bandwidth nor by transfer to host uses more than e.g. twice the PCI or system memory bandwidth that the new granule would if allocated to host. (Some embodiments are contemplated that continue the search to look for pairs, triplets, etc. of VSP-allocated granules to put on Host, whereupon a new granule is allocated to VSP.) If no such VSP-allocated old granule can be found, then the new granule is allocated to host.

Pseudocode Example
BEGIN
k <-- k0 //initialize launch of application program
i <-- i0 //initialize launch of granule i in appln k
IF (dsp_mips_impact(granule(k,i)) LESSTHNOREQL available_dsp_mips)

THEN dynamic_allocation(granule(k,i)) <dsp
ELSE
    busfactor <--2.0;
    memfactor <--2.0;
    FOR ALL m NOT_EQUAL k DO
    FOR ALL j DO
    IF [(dynamic_allocation(granule(m,j))=dsp) AND (dsp_mips_impact(granule(k,i) LESSTHAN (available_dsp_mips+dsp_mips_impact(granule(m,j)))
    AND (host_mips_impact(granule(m,j) LESSTHAN available_host_mips)
    AND (pci_bus_impact(granule((m,j), host)+pci_bus_impact(granule((k,i), dsp)) LESSTHAN (available_pci_bandwidth+pci_bus_impact(granule((m,j),dsp)))
    AND (mem_bus_impact(granule(m,j),host)+mem_bus_impact(granule(k,i),dsp)) LESSTHAN (available_mem_bandwidth+mem_bus_impact(granule((m,j),dsp)))
    AND (pci_bus_impact(granule((m,j), host) LESSTHAN (busfactor TIMES pci_bus_impact(granule((k,i), host))]
    AND (mem_bus_impact(granule((m,j),host)LESSTHAN (memfactor TIMES mem_bus_impact(granule((k,i), host))]
    THEN {dynamic_allocation(granule(m,j)) <-- Host;
        dynamic_allocation(granule(k,i)) <-- dsp; GOTO RETURN}
    END FOR}
    END FOR}
    dynamic_allocation (granule(k,i)) <-- Host;
END ELSE}
RETURN.

In FIG. 24B, following step 2488, a step 2492 updates the dynamic entries in the library if they should depart from the default entries as determined by the allocation logic of step 2488. (Step 2492 is illustrated by the last few lines of the above pseudocode inserting Host or DSP as updated dynamic allocations.) These operations are completed and reach a RETURN 2496.

In FIG. 25, interrelated improved processes relate to DirectX and 32-bit WDM operating system, the improved processes called DirectDSP WDM, DirectDSP HEL, DirectDSP HAL, and VSP Kernel.

In FIG. 26, a DirectDSP HAL embodiment 2600 loads audio and modem applications with dynamic balancing herein. An application opens at step 2602 and calls a function in the DirectDSP improved API whereupon operations proceed through a DirectDSP HAL entry point (X) to a step 2606. In step 2606 the Host checks that a Host granule for the function and that a VSP granule for the same function are opened. Next, a step 2608 checks the option table (dynamic allocation in FIG. 24A) to determine the best option. A succeeding decision step 2610 determines whether audio and modem are both required. If yes, then a step 2612 loads the VSP modem granules and host controller to run, and a step 2614 loads VSP audio and host system code to run, whereupon the granules are executed in step 2660.

If no in step 2610, then a decision step 2616 determines whether modem is required. If yes in step 2616, then a decision step 2618 determines if modem data pump is loaded an running on VSP. If yes in 2618, then Stop 2 step 2620 is reached as described in text elsewhere earlier hereinabove. If no in 2618, then a decision step 2622 determines whether there are VSP MIPS available. If yes in step 2622, then step 2624 loads VSP modem granules and host controller to run, followed by execute 2660. If no in step 2622, then a decision step 2626 determines whether a level 2 implementation is required, as indicated by a table. If no in step 2626, then a step 2628 loads level 1 host modem granules and host controller to run, followed by execute 2660. If yes in step 2626, the a step 2630 replaces audio VSP granules with host emulation granules, then a step 2632 synchronizes and/or swaps audio VSP granules with host audio granules, and a step 2634 loads VSP modem granules, followed by execute 2660 to execute modem granules on VSP and execute audio host emulation granules on host.

Looking at step 2616 (determination if modem required), if the result is no, then operations branch to a decision step 2636 to determine whether audio is required. If no in step 2636, then step 2638 "STOP 1" is reached, as defined earlier hereinabove. If yes in step 2636, then a decision step 2640 determines whether audio granules are loaded and running on VSP. If yes in step 2640, then step 2642 "STOP 3" is reached, as defined earlier hereinabove. If no in step 2640, then a decision step 2644 determines whether there are enough VSP MIPS available to run the audio granules. If no in step 2644, then a step 2646 loads host audio emulation granules, followed by execute 2660. If yes in step 2644, then a step 2648 loads VSP audio granules and Host system code to run, followed by execute 2660.

Turning to the subject of handles, a function call in Direct DSP translates the handle logical address to physical address when pages are locked down. The 32-bit physical address is sent to VSP. If VSP executes granule in DSP code then it uses the physical address. On the other hand, if host emulation is used, then host code recognizes the logical address. The driver code is transparent to APP.exe. VSP 1720, 1730 advantageously walks the entire virtual memory space of the host (e.g. 64 terabytes) with no virtual paging logic implemented on VSP at all.

In FIG. 27, interrelated improved processes 2700 related to operating system, DirectDSP HAL, and VSP Kernel have a multithreaded, multitasking OS 2710 with pre-emptive scheduler and realtime priorities and services 2720 coupled to API oval including DirectDSP improvement 1810 and DirectX 2510. Multi-threaded resource management 2600 services single VSP, or even multiple VSPs of FIGS. 122, 123, 126 for example. DirectDSP HAL 1830 couples to VSP kernels 1840.i for each VSP in the system.

In FIG. 28, memory spaces representing a shared memory model utilized in embodiments of processes, devices and systems illustrate the source handle, destination handle and VSP handle arrangement.

Figure 28A:
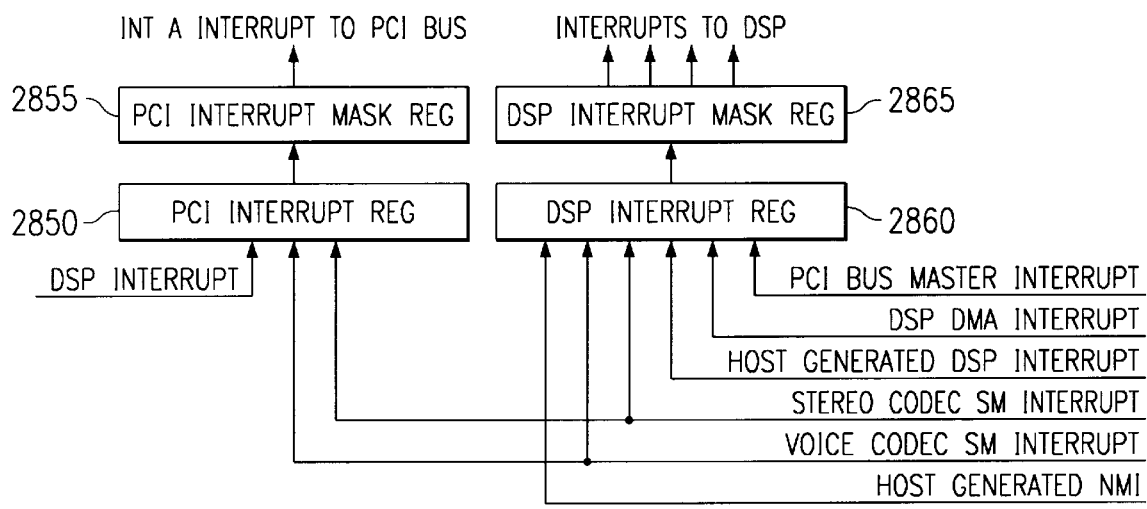
FIG. 28A is an electrical circuit diagram of interrupt-related registers and interrupt lines to the PCI bus and to the DSP, used in process, device and system embodiments.

In FIG. 28A, interrupt-related registers and interrupt lines to the PCI bus and to the DSP, used in process, device and system embodiments have interrupts for PCI bus master 5016, DSP DMA SM 5030 interrupt, host-generated interrupt to DSP, stereo codec SM 5050 interrupt and voice code SM 5040 interrupt and host-generated NMI. These interrupts are supplied as indicated to the respective PCI interrupt register 2850 and DSP interrupt register 2860 as indicated in FIG. 28A, whereupon they are masked in the respective PCI interrupt mask register 2855 and DSP interrupt mask register 2855 earlier tabulated hereinabove. The results are INTA interrupt to PCI and thence to Host, as well as various interrupts to DSP 1730.

Figure 29:
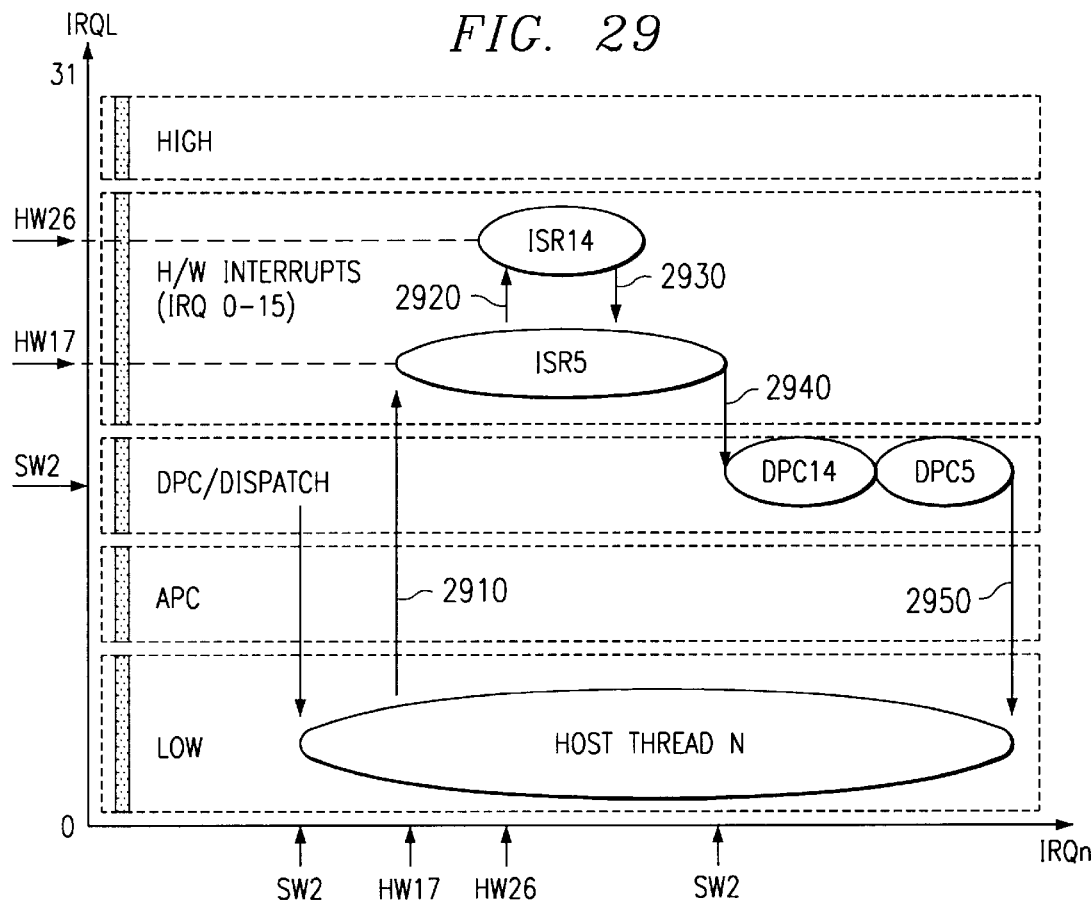
FIG. 29 is a diagram of interrupt levels utilized in connection with hardware interrupts and deferred procedure calls (DPCs) in process, device and system embodiments.

In FIG. 29, interrupt levels are utilized in connection with hardware interrupts and deferred procedure calls (DPCs) in process, device and system embodiments as shown. Notice use of both IRQs and DPCs. Priority raising occurs at arrow 2910 and 2920. Priority falls as indicated by arrows 2930, 2940 and 2950. This advantageous behavior used by the DirectDSP HAL and VSP Kernel is also depicted in FIGS. 30 and 32.

Figure 30:
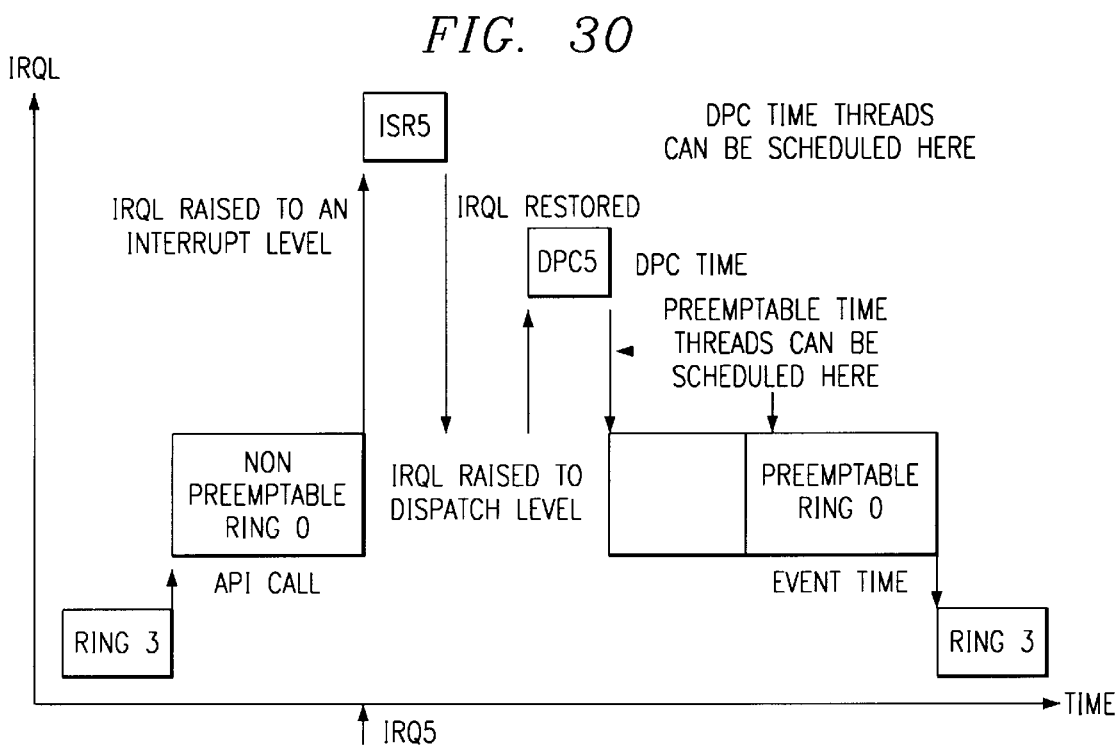
FIG. 30 is a further diagram of interrupt levels over time utilized in connection with hardware interrupts and deferred procedure calls (DPCs) in process, device and system embodiments.

In FIG. 30, interrupt levels over time utilized in connection with hardware interrupts and deferred procedure calls (DPCs) in process, device and system embodiments.

Figure 31:
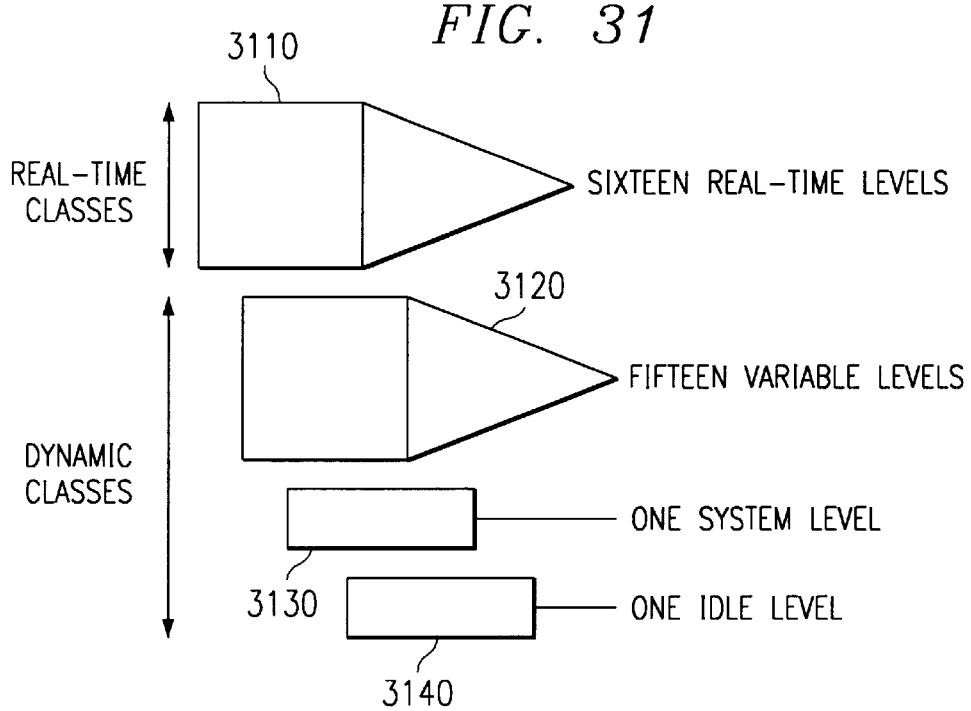
FIG. 31 is a classification diagram of interrupt levels in real-time and dynamic classes in connection with process, device and system embodiments.

In FIG. 31, interrupt levels in real-time classes 3110 and dynamic classes 3120, 3130 and 3140 are shown.

Figure 32:
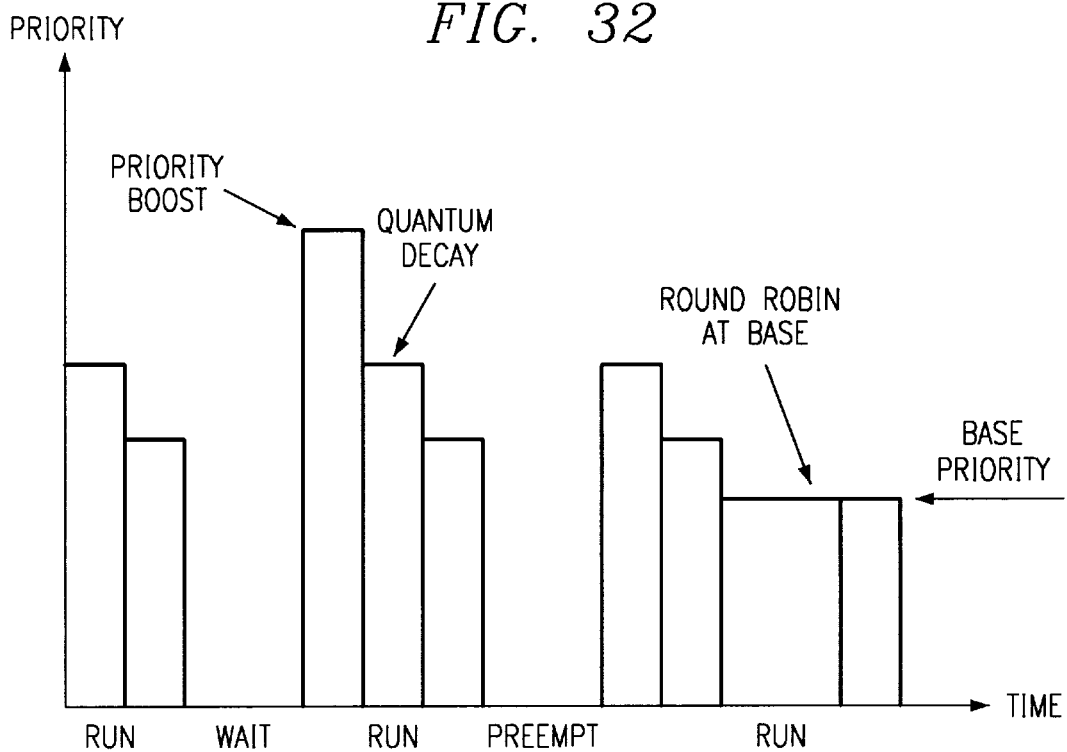
FIG. 32 is a further diagram of interrupt priority levels over time in process, device and system embodiments.

In FIG. 32, interrupt priority levels over time in process, device and system embodiments are boosted by VSP hardware interrupt to host.

In FIG. 33, see VSP kernel operations on audio DirectDSP applications. Wrapper ASIC 1910 is coupled to PCI bus 330. The VSP kernel has processes including a DSP message ISR interrupt service routine 3310, a PCI bus master ISR 3315, and a DSP message handler 3320 all coupled to a PCI request queue 3325 (BM means "bus master."). Local memory 3330 holds in-buffers 3335.i, audio out buffer 3382 and other task in buffers 3384 and 3388. The VSP runs the various tasks such as audio out task 3340.i, audio in task 3380 and other task 3385. Audio out buffers 3345.i are supplied with processed audio data by the audio out tasks 3340.i, whereupon to be mixed by audio out mixer 3350 coupled to stereo codec interface process 3360. Process 3360 has stereo codec SC transmit ping-pong buffer 3362, and SC xmt i/f 3364 to stereo codec 1930.

Data from SC 1930 goes to SC receive i/f 3366 to SC receive ping-pong buffer 3368 to SC receive ISR 3370 to SC in ping-pong 3375 to audio in task 3380. Note interrupt from interfaces 3364 and 3366 to SC xmt ISR 3350 and SC receive ISR 3370 respectively.

Figure 34:
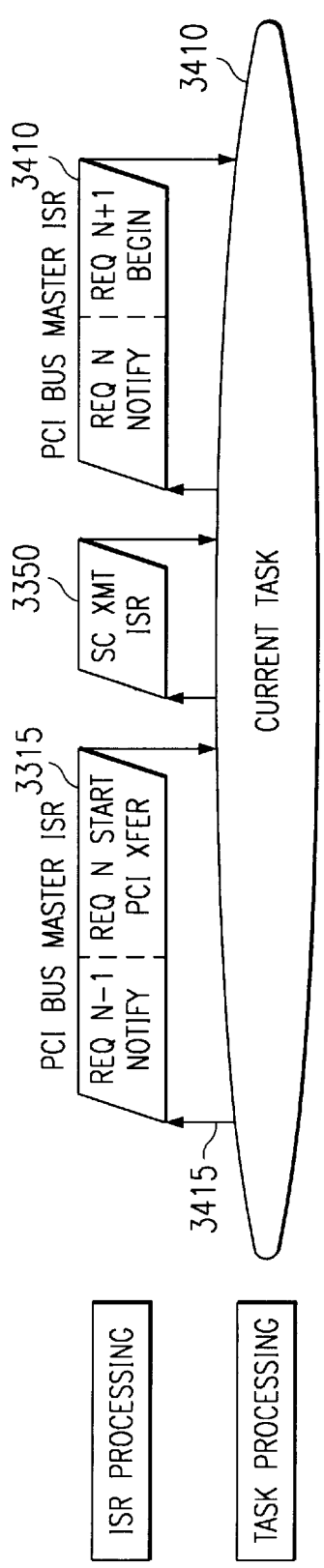
FIG. 34 is a further diagram of interrupts over time in process, device and system embodiments having a bus master interrupt service routine (ISR) and a transmit ISR during a sound task involving PCI request processing.

In FIG. 34, interrupts over time in process, device and system embodiments having a bus master interrupt service routine (ISR) and a transmit ISR during the current task involve PCI request processing.

Figure 35:
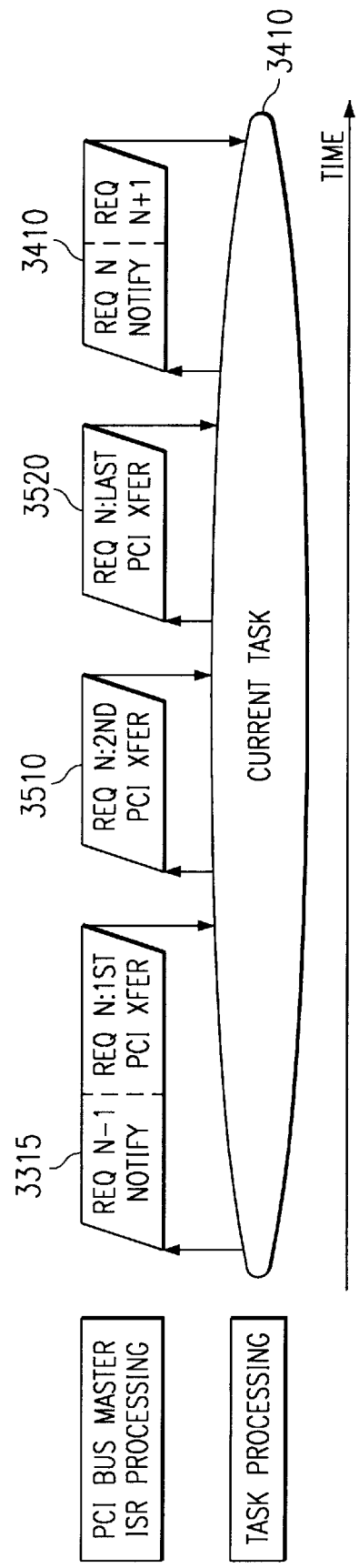
FIG. 35 is a further diagram of interrupts over time in process, device and system embodiments having multiple bus master ISRs during a sound task involving a PCI request with multiple PCI transactions.

In FIG. 35, interrupts over time in process, device and system embodiments having multiple bus master ISRs during the current task involve a PCI request with multiple PCI transactions.

In FIG. 36, host memory program and data spaces (at left) and DSP on-chip and off-chip memories (at right) represent an example of the shared memory model utilized in embodiments of processes, devices and systems.

In FIG. 37, VSP kernel operations on audio applications, similar to FIG. 33 show a DirectSound task with various functions obj1, obj2, objn in the kernel-sense of object.

In FIG. 38, see DSP program, data and I/O spaces, including on-chip and off-chip memories and registers utilized in embodiments of processes, devices and systems.

Figure 39:
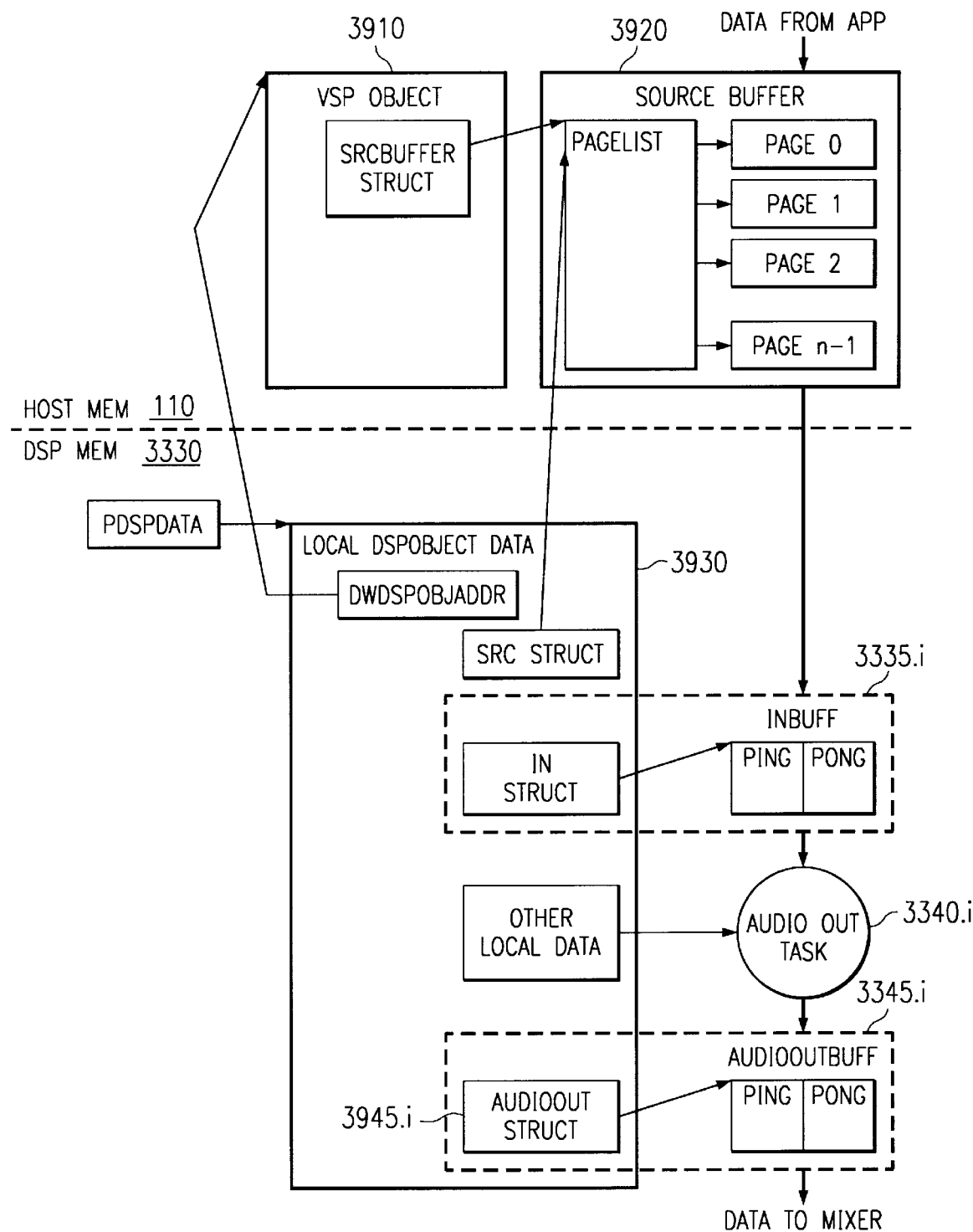
FIG. 39 is a memory space diagram of host memory program and data spaces (at top) and DSP memory space (at bottom) representing an example of handles and data structures in the shared memory model of FIG. 36 utilized in FIG. 33 sound-related embodiments of processes, devices and systems herein.

In FIG. 39, host memory program and data spaces (at top) and DSP memory space (at bottom) represent an example of handles and data structures in the shared memory model of FIG. 36 utilized in FIG. 33. DWDSPOBJADDR is a pointer derived from a handle when the memory space is locked down. In Windows a handle is an identifier for a 32-bit address. When the memory is locked down, the full address becomes known at that time and becomes a pointer.

Figure 40:
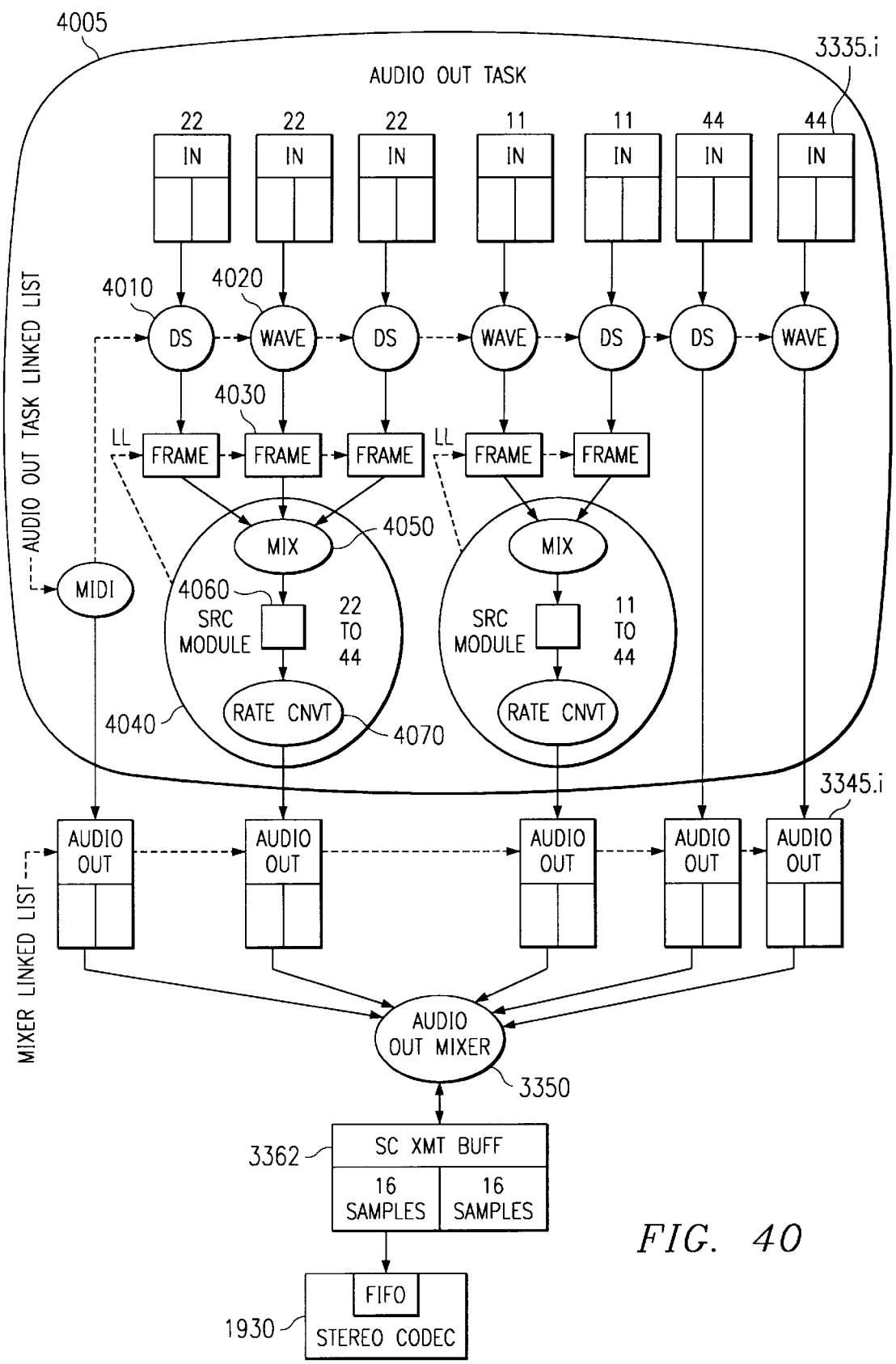
FIG. 40 is a process or method flow diagram depicting multiple stereo audio task operations and mixing of sources having different data rates.

In FIG. 40, audio out task 4005 accommodates multiple stereo audio sources with different data rates of 11, 22 and 44 KHz to in-buffers 3335.i. DirectSound 4010 and wave operations 4020 next occur, followed by framing 4030. Mixing of same-rate sources occurs in MIX operation 4050 of SRC module 4040 prior to rate conversion 4070 to a common rate of 44 KHz. 44 KHz Audio in buffers are coupled directly to audio out buffers. The 22 and 11 KHz audio in buffers are respectively pre-mixed such as at process 4040 as noted, and then sent to further audio out buffers. The audio out buffers 3345.i are established according to a mixer linked list. An audio out mixer mixes all the audio out buffers and sends the mixed audio to a stereo codec (SC) transmit buffer to stereo codec fifo. Advantageously, VSP 1720, 1730 performs all of these tasks.

Figure 41:
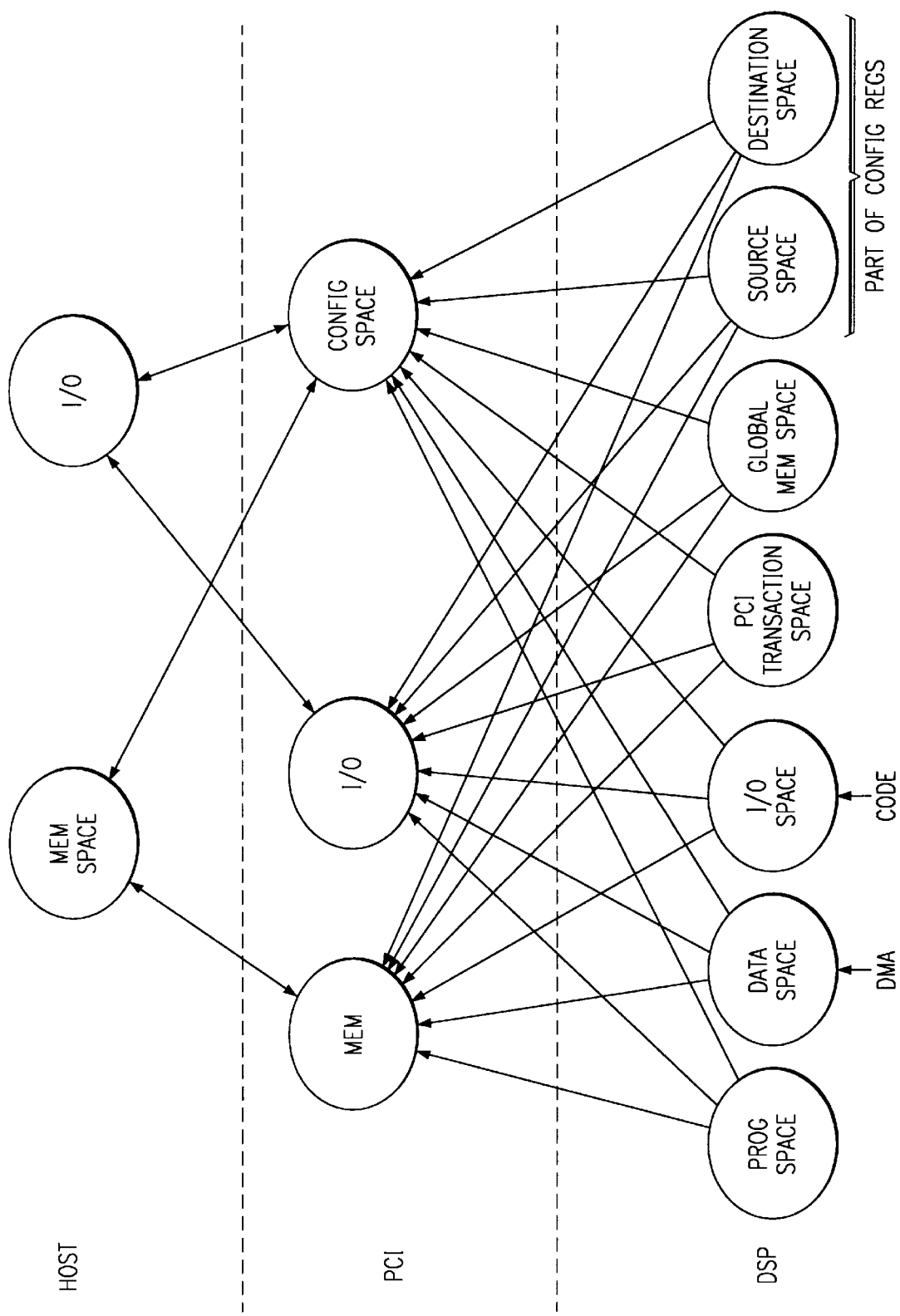
FIG. 41 is a memory space diagram showing improved coupling between Host spaces, PCI spaces, and DSP spaces in system embodiments.

In FIG. 41, improved coupling between host spaces, PCI spaces, and DSP spaces in system embodiments remarkably process-integrates the very different address spaces of DSP and those of Host/PCI as shown.

In FIG. 42, see audio mixing and the audio output buffers in the lower part of FIG. 40. An audio out mixer structure from PEIRST to PLAST organizes the audio out structures 3945.1–.n indicated as 3945.i.

Figure 43:
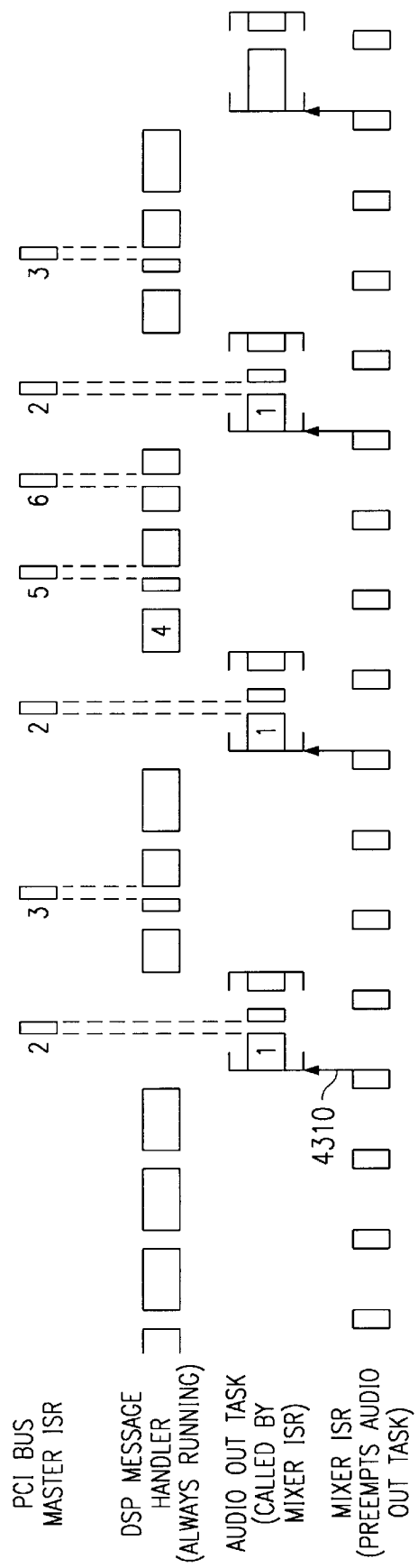
FIG. 43 is a real-time-flow diagram of four processes (PCI Bus Master ISR, DSP Message Handler, Audio Out Task, Mixer ISR) in the audio process of FIG. 33 in an example of single-tasking VSP kernel execution.

FIG. 43 shows single-tasking VSP kernel execution of four processes (PCI bus master ISR, DSP message handler, audio out task, mixer ISR) in the audio process of FIG. 33. The DSP message handler runs in the background. The lengths of bars do not show MIPS utilization to scale.

In FIG. 44, VSP kernel message processing couples host memory at top and DSP memory below using handles, objects and data structures in the shared memory model of FIG. 36 utilized in FIG. 33 wave-sound and other embodiments of processes, devices and systems. Note that waveobj is a kernel-object in a sense distinct from the VSP objects of FIG. 95.

In FIG. 45, a VSP (wrapper/DSP) embodiment has a DSP bypass, and couples both modem and audio.

Figure 46:
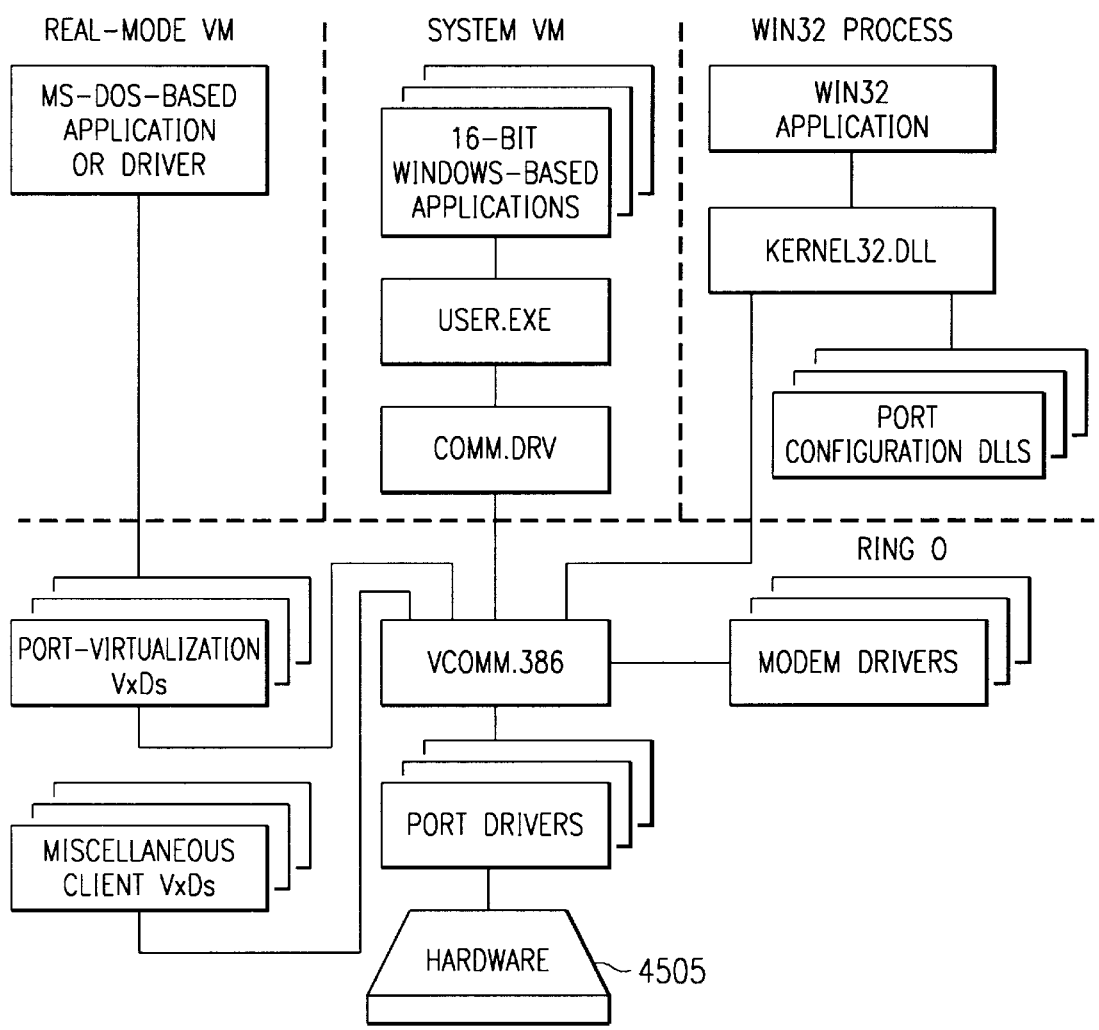
FIG. 46 is a process diagram or method-of-operation diagram showing interrelated improved processes related to DirectDSP improved modem operation under Windows95, Windows 3.1, and DOS of various system embodiments.

In FIG. 46, modem operation under Windows95, Windows 3.1, and DOS has VSP is at hardware site 4505. DirectDSP HAL is coupled with any or all of the VxDs and other drivers.

In FIG. 47, a printed circuit add-in card 4720 (e.g. PC card has add-in card) is reduced essentially to physical layer elements as marked therein, and connected to a DSP-enhanced computer motherboard 4710 for various applications as marked for it.

In FIG. 48, a system 4800 has a VSP-based combined audio controller 4830, 4840, 4850 and modem 4860. AC link and control block 4850 links to AC97 audio/modem codec 4870. Sample rate converter and mixer block 4820 is also included. VSP advantageously virtualizes these functions.

In FIG. 49, note control lines interconnecting wrapper ASIC 1720, a DSP 1730 and a stereo codec 1930 in a system embodiment having left and right microphones 4910 and left and right loudspeakers 4920.

In FIG. 50, the system of FIG. 51 has wrapper ASIC 1720 including a PCI block 5010 coupled via a three-state buffer 5011 to PCI bus 330. PCI block 5010 has PCI configuration registers 5012, PCI I/O registers 5014, PCI bus master (memory and I/O spaces) 5016 and PCI bus slave (memory and I/O spaces) 5018 all coupled to buffer 5011.

In wrapper ASIC 1720, ASIC control registers 5020 in DSP I/O space 3830 of FIG. 38 are coupled with a DSP DMA state machine SM 5030 to an external local DSP bus coupled to a DSP 1730 such as commercially available Texas Instruments TMS320C5x, C54x, C6x, or otherwise. In some embodiments, additional external SRAM 3330.2, e.g., 64K×16 provides memory for the DSP 1730 and some DMA transfers. DMA transfers may couple to on-chip DSP memory (SARAM is on-chip DSP single-access RAM) or the external SRAM 3330.2. A gate 5025 also couples DSP 1730, SRAM 3330.2, DSP DMA SM 5030 and ASIC control registers 5020 to port B of dual-port RAM DPRAM 3330.1 which acts as a DMA buffer among other uses. With memory arbitration as described in FIG. 53, various blocks for PCI 5016 arid 5108, and the state machines voice codec DMA SM 5040, and Stereo Codec DMA SM 5050 are selectively coupled via gate circuitry such as 5017, 5018, 5045 and 5055 to port A of DPRAM 3330.1. (In an enhanced embodiment a modem (telco) codec DMA state machine is included on chip with its own access to port A of DPRAM 3330.1 and providing similar serial I/F logic for accessing external codec.) A joystick interface 5060 couples between slave block 5018 and external joystick input. A MIDI interface 5070 with frequency determining crystal 5082 couples between slave block 5108 and external MIDI input/output. Voice codec SM 5040 with frequency determining crystal 5084 provides serial input/output to a voice codec AC56 5086, which in turn is coupled via driver circuit 5088 and switches 5092 and 5094 to either of RJ11 telephone connectors for telephone or data transmit/receive T/R operation. Switch 5094 also couples a microphone 4910 for voice input to voice codec 5086. Microphone 4910 is also coupled to a mic input of stereo codec 1930, which has crystals X1 and X2, and supplies parallel data to stereo codec DMA SM 5050. Stereo codec 1930 has terminals and inputs/outputs MIN to switch 5092 and T/R, CD for compact disk, mic, line in, and OUT to a speaker 4920 for connection in the various system arrangements indicated thereby.

DSP 1730 is suitably coupled via a telephone codec 4528 (e.g. AC01) via switch 5092 to RJ11 connector to telco T/R line for modem implementation. The same crystal 5084 is advantageously used to provide time base for both telephone codec 5428 and voice codec 5086.

Hitherto, modem, voice, stereo audio, and other interfaces have often been implemented on respective add-in cards with respective software drivers and respective slave bus interfaces. Such system architecture has burdened OEM and business and consuming public with space requirements and financial expense. CPU MIPS are expended on the numerous slave transactions as well. Advantageously, FIG. 50 embodiment shows how a single bus master serves all these application hardwares, and relieves the Host of the extra burden of communicating to slave circuits, reducing Host I/O MIPS significantly. Without the DSP 1730 connected, wrapper ASIC 1720 provides basic scatter-gather bus master capability for traversal of some memory spaces. With the DSP 1730 in place, wrapper ASIC 1720 and DSP 1730 together provide super-bus-mastering to access the entire memory space in the system, and in Host terms the entire virtual memory space accessible by Host.

In FIG. 51, an overview of the system of FIG. 50 such as a DSVD system has numerals for easy comparison with FIG. 50. ASIC 1720 and DSP 1730 are suitably fabricated on the same chip to save board real estate.

In FIG. 51A, address ADDR 15:0 and control lines CTL interconnect the wrapper ASIC, a DSP and two SRAM chips in a system embodiment such as in FIG. 50. SRAM 3330.2 is implemented as two SRAM chips 3330.21 and 3330.22 for the upper and lower 32K of addresses for example. Connection lines connect to pins or terminals as shown.

In FIG. 51B, see DSP clock, address, data, and output enable control signal waveforms in a system embodiment such as in FIGS. 50 and 51. CLKOUT1 is DSP clock.

In FIG. 52, dual port memory DPRAM 3330.1 is operated in part as a ping-pong buffer in the wrapper ASIC 1720 with the voice codec interface DMA SM 5040 in a system with host 106, PCI bus 330, DSP 1730, and stereo codec 1930.

Figure 52A:
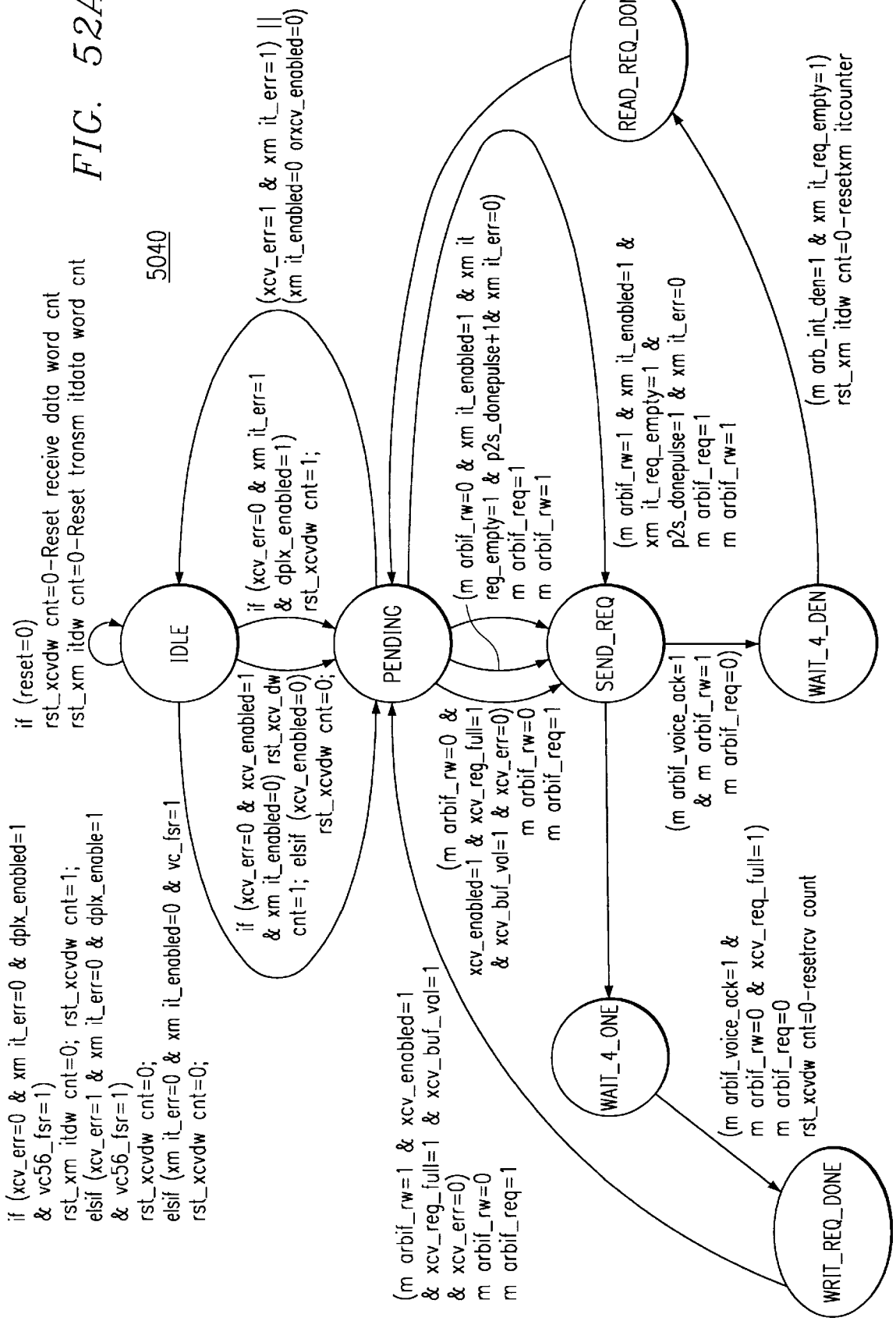
FIG. 52A is a state transition diagram describing a process of operation of a voice codec DMA state machine (SM) interface in the wrapper ASIC of FIGS. 50 and 52.

In FIG. 52A, a process of operation of a voice codec DMA state machine (SM) interface in the wrapper ASIC of FIGS. 50 and 52 has states IDLE, PENDING, SEND REQUEST, WAIT FOR ONE CLOCK, WRITE REQUEST DONE, WAIT FOR DATA ENABLE, and READ REQUEST DONE.

In the various state machine diagrams herein, state transition arrows have legends indicating logic conditions, which when true, trigger a transition in the direction of the arrow from one state bubble to another joined by the arrow (or to itself, as in FIG. 52A IDLE state). The legend within each state bubble indicates an output of the state machine that is activated when the state machine occupies the state for that bubble, and all other states are inactive at such time.

The transition logic conditions are set forth in mnemonic form which is readily understood by a little careful attention and reflection. The mnemonics represent words and phrases relating to the hardware circuitry as discussed herein. A glossary of letter-groups in the mnemonics follows:

buf: buffer
elsif: else if
ack: acknowledge
if: if
m arb: memory arbitration
rst: reset
dplx: duplex
xmt, xmit, xm it, x mit: transmit
dw: data word
cnt: count
err: error
reg: register
vc: voice codec
xcv: receive
xmt, x mit, xm it: transmit
m arbif: memory arbitration if
rw: read/write
den: data enable
resetxm it counter: reset transmit counter In FIG. 53, a circuitry embodiment couples a wrapper ASIC DPRAM 3330.1 to PCI macro, or block, 5010. ASIC control registers 5020 are read/writeable by DSP 1730 in a portion of the wrapper ASIC embodiment of FIG. 50. A byte channeling circuitry block 5310 routes, or channels, bytes of 32-bit nonaligned data to word-aligned form and is constructed to operate in accordance with the description elsewhere herein of FIGS. 53, 54, 54A, 54B, and 54C.

A mux 5312 has inputs for 1) data from byte channeling unit 5310, 2) data_out from a memory arbitration unit 5330, 3) information from PCI slave registers in slave unit 5018, and 4) data temporarily held in a feedback flip-flop 5314 coupled from an output of mux 5312 back to its fourth input. A further flip-flop 5316 couples the output of mux 5312 to PCI master/slave block 5010.

DSP-accessible ASIC control registers 5020 provide respective DMA address and DPRAM address lines to a mux 5355 in a PCI interface control block 5340. This mux selects the appropriate address information in response to a control line for type of transfer coupled and then supplies that information to the rest of PCI interface control block 5340 for memory accesses, and to the byte channeling block 5310 for address translation and appropriate byte accessing of DPRAM 3330.1.

PCI block 5010 couples data from PCI bus 330 via a flip-flop in block 5010 to data_in lines to byte channeling unit 5310. PCI block 5010 couples byte enables PCI bus 330 via lines C_E to byte channeling unit 5310. Slave addresses, data-in, and byte enables are coupled from PCI block 5010 to PCI slave registers in block 5018. Slave addresses are also coupled to PCI interface control block 5340.

A memory arbitration unit 5330 in wrapper 1720 has various request inputs coupled from, and respective arbitration pending arb_pend and Grant GNT lines connecting to, the following units of FIGS. 53 and 50: 1) PCI interface control (shown) including PCI bus master 5016 and PCI bus slave 5018, 2) DSP DMA SM 5030, 3) voice codec DMA SM 5040 and 4) stereo codec DMA SM 5050. Memory arbitration 5330 grants access to DPRAM to a particular requesting block or unit, whereupon it passes DPRAM addresses and data to complete a DPRAM memory access. In FIG. 50, byte channeling unit 5310 supplies addresses B1S_ADDR to PCI interface control 5340 to provide ad addresses marb_addr to arbitration block 5330.

In FIG. 54, wrapper ASIC DPRAM is split into four individually addressable byte-sections and used in a process or method of byte channeling involving operating address counters in a byte addressing circuit block 5606, and operating byte strobes by a circuit 5402 in response to a byte channeling circuit 5404 in the wrapper ASIC 1720 for stream I/O between a host CPU and host memory operating on 32-bit nonaligned data and a DSP operating on 16-bit word-aligned data. Description earlier hereinabove specifies the circuitry and method of activating or inactivating the byte strobes by circuit 5402, and setting the addresses all the same or some different as the case may be in the byte addressing 5406.

In FIG. 54A, an eight-byte read with byte alignment in an example uses 3 PCI data phases in the process of FIG. 54.

In FIG. 54B, a nine-byte read with byte alignment in an example uses 3 PCI data phases in the process of FIG. 54.

In FIG. 54C, a five-byte read with byte alignment and byte padding uses 2 PCI data phases in the process of FIG. 54.

In FIG. 54D, see PCI configuration registers in PCI configuration space of FIG. 128, specifying their address decodes and read or read/write circuits associated with those configuration registers in the wrapper ASIC of VSP.

In FIG. 54E, see PCI I/O space registers in PCI I/O space of FIG. 128, their address decodes and write or read/write circuits associated with those I/O space registers in the wrapper ASIC of VSP.

In FIG. 54F, an address translation circuit and its method of operation in the wrapper ASIC translates DSP 16-bit word-oriented addresses from the various DSP address spaces of FIGS. 38 and/or 128 to a PCI address. The selected DSP address (shifted left by one place to multiply by 2 if 0x57 bit 8 calls for word transfer) is then added to an address offset. Then a cache line (16 bytes from host main memory having the resultant PCI address as lowest address) is transferred to the location defined by the DSP address in the particular one of the various DSP address spaces.

In FIG. 54G, see a PCI transaction state machine for coupling a TI TMS320C52 DSP for FIFO reads and writes from/to PCI bus according to a read sequence and/or write sequence detailed in incorporated patent application TI-21753P. State machine outputs are indicated next to each state bubble.

In FIG. 54H, a PCI transaction state machine for wrapper ASIC of VSP has some transitions responsive to mstr_busy_retry, mst_addr_rst and start_qq from PCI block 5010. Unmarked arrows indicate transitions wait for one clock. State machine outputs are indicated next to each state bubble.

In FIG. 54I, PCI host accessible registers start at Base Address BA0 in PCI I/O space and replicated start at Base Address BA1 in PCI memory space of FIG. 128, (BA0, BA1 defined in PCI Configuration Register 0x10, 0x14). FIG. 54I further indicates address offset decodes and read or read/write circuits associated with those PCI host accessible registers in the wrapper ASIC of VSP.

In FIG. 54J, a process or method of operation of a stereo audio codec state machine in the wrapper ASIC of FIG. 50. Unmarked arrows indicate transitions wait for one clock.

In FIG. 54K, a D-latch represents any bit of PCI Interrupt Register 0x04 illustrated thereabove, and associated control circuitry to controllably OR a given interrupt with the one/zero in the D-latch.

In FIG. 54L, a process or method of operation of a EEPROM state machine in the wrapper ASIC of FIG. 50 has numerous states. Unmarked arrows indicate transitions wait for one clock.

In FIG. 54M, see waveform of operation of the EEPROM state machine EESM in the wrapper ASIC of FIG. 50.

In FIG. 55, a D-latch (upper right) represents any bit which is shared between DSP and the host in PCI voice codec register 0x16, with associated control circuitry and FIG. 55A methods of operation.

FIG. 55A shows a process or method of operation of each shared register bit in the wrapper ASIC of FIG. 50.

In FIG. 56, a state machine in the wrapper ASIC of FIG. 50.

In FIG. 57, see waveforms of a process or method of operation of the memory arbitration MARB in the wrapper ASIC of FIG. 50.

Figure 57A:
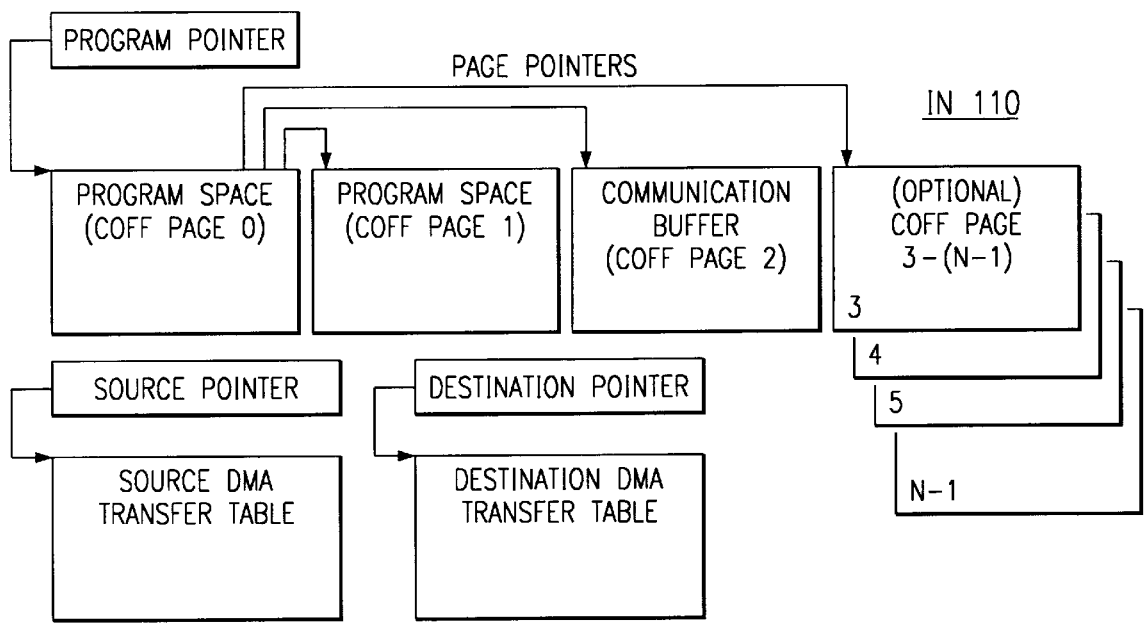
FIG. 57A is a memory space diagram of host main DRAM memory showing memory allocation and pages locked during initialization in a shared memory model method and system embodiment.

In FIG. 57A, see host main DRAM memory showing memory allocation and pages locked during initialization in a shared memory model method and system embodiment.

Figure 57B:
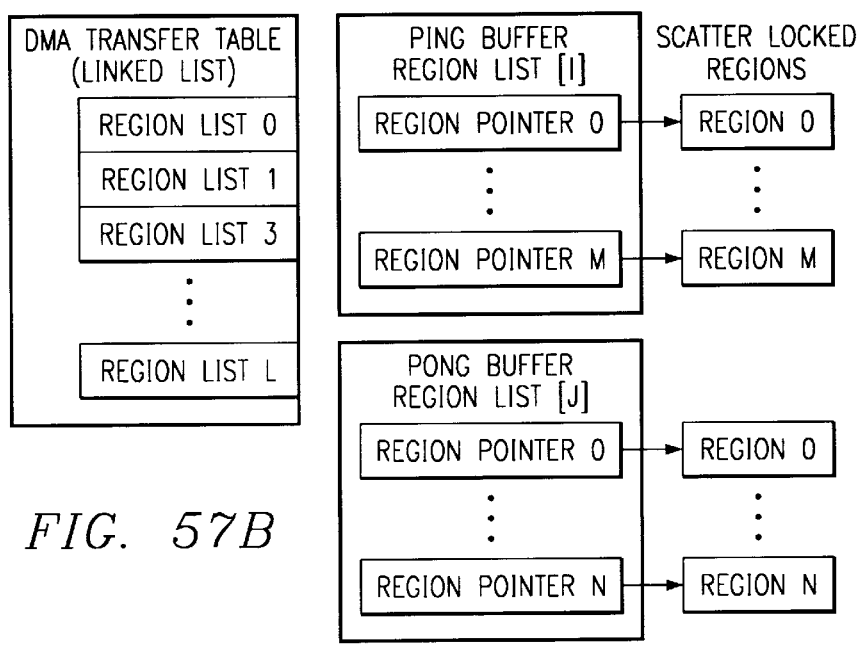
FIG. 57B is a memory space diagram of host main DRAM memory showing memory allocation and pages scatter-locked in a shared memory model method and system embodiment for source/destination data DMA transfers.

In FIG. 57B, see host main DRAM memory showing memory allocation and pages scatter-locked in a shared memory model method and system embodiment for source/destination data DMA transfers.

Figure 57C:
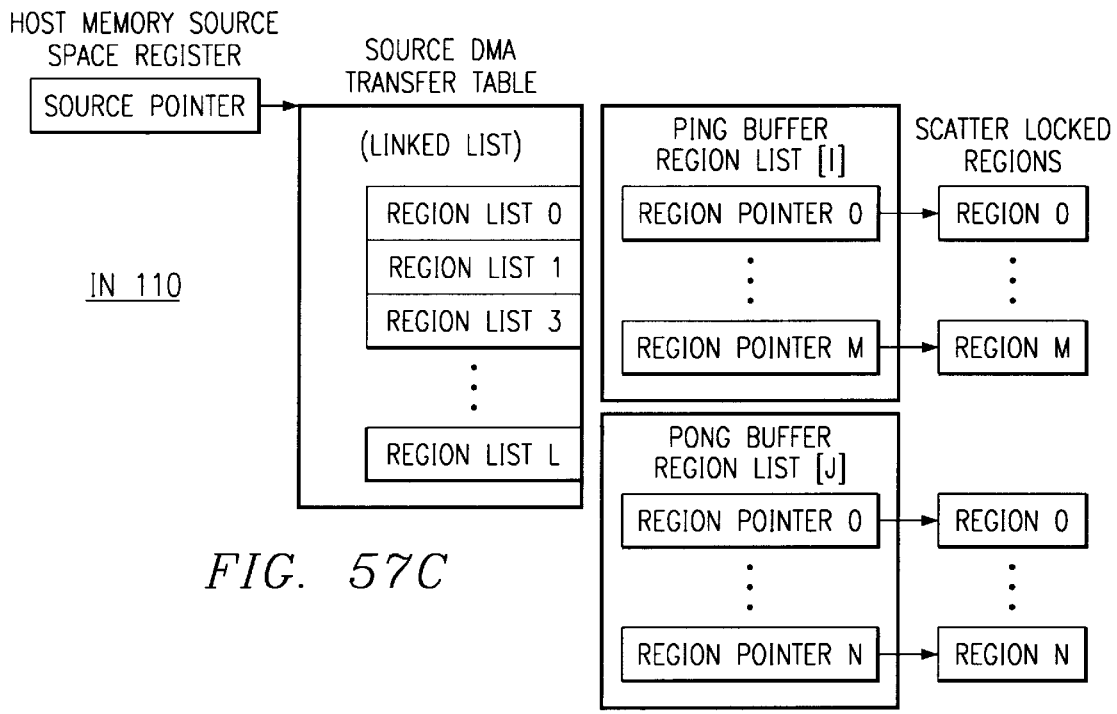
FIG. 57C is a memory space diagram of host main DRAM memory showing memory allocation and regions locked in a shared memory model method and system embodiment for source DMA transfer table.

In FIG. 57C, see host main DRAM memory showing memory allocation and regions locked in a shared memory model method and system embodiment for source DMA transfer table.

Figure 57D:
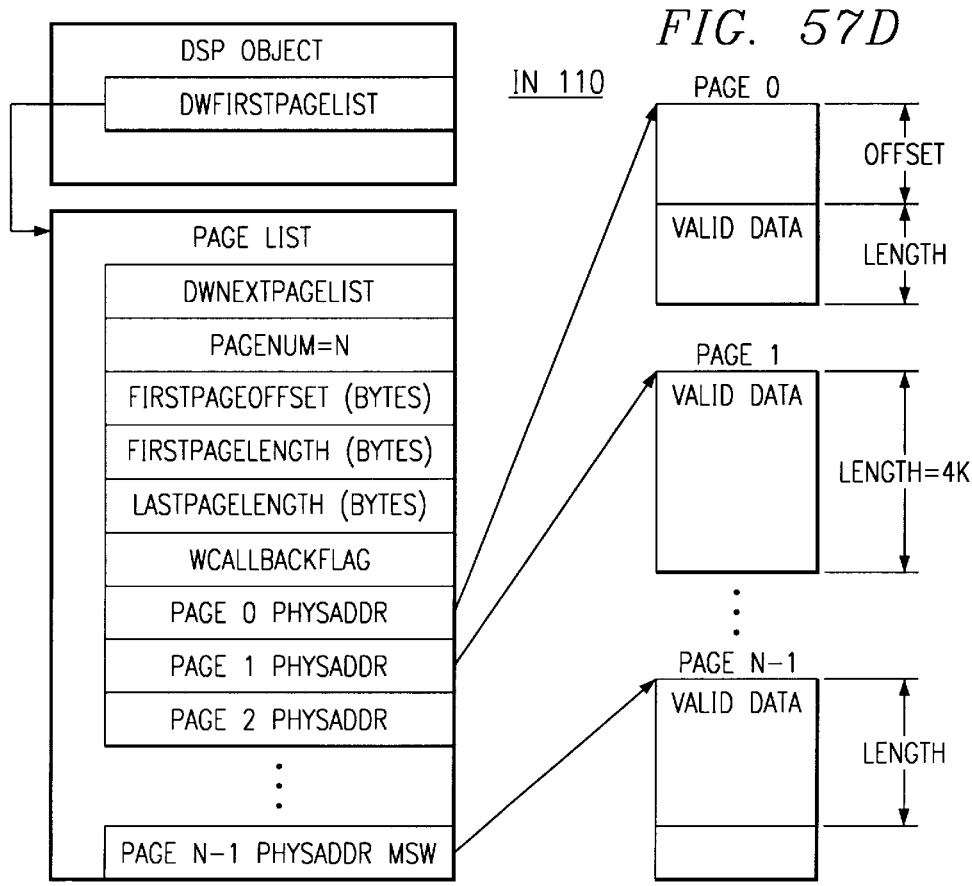
FIG. 57D is a memory space diagram of host main DRAM memory showing a page list structure in a shared memory model method and system embodiment for stream I/O processing.

In FIG. 57D, see host main DRAM memory showing a page list structure in a shared memory model method and system embodiment for stream I/O processing.

Figure 57E:
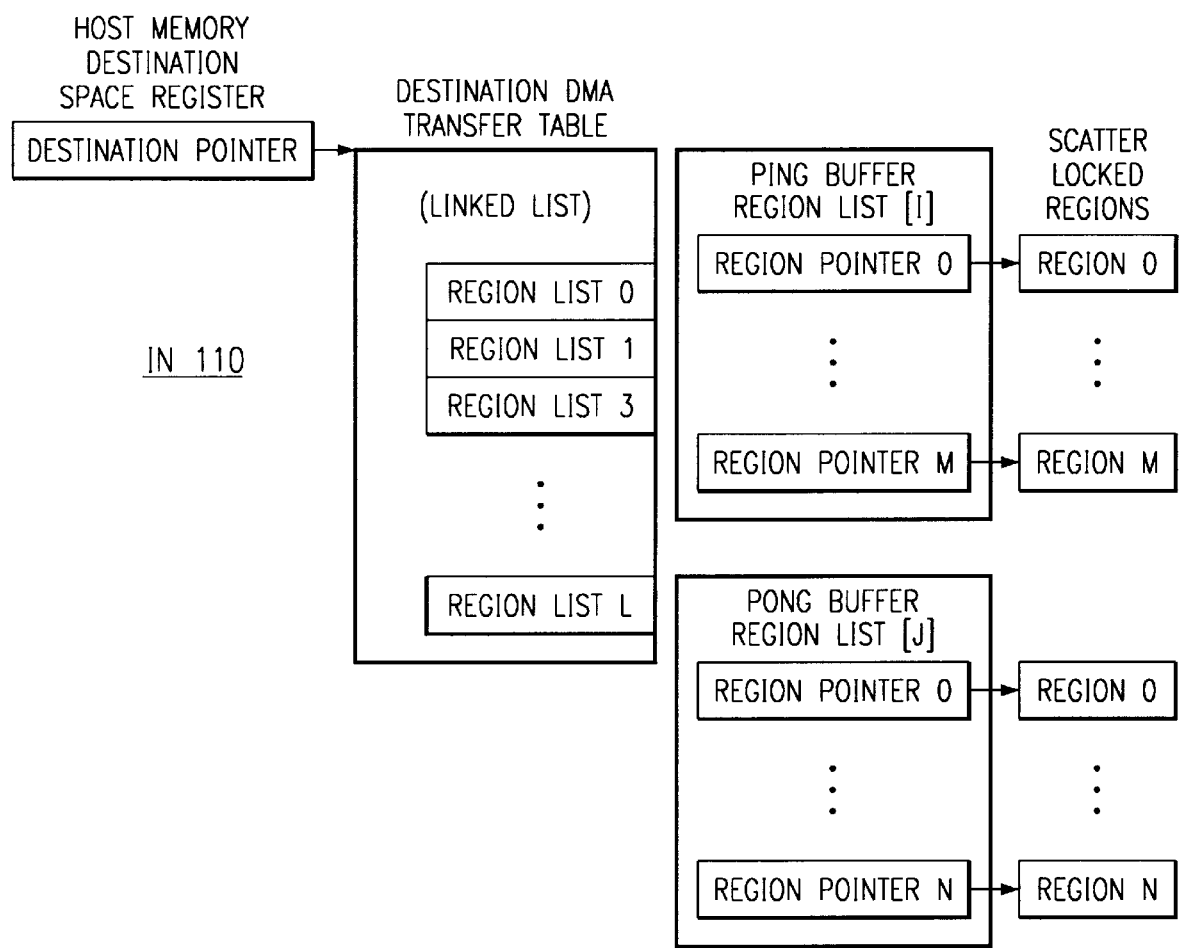
FIG. 57E is a memory space diagram of host main DRAM memory showing memory allocation and regions locked in a shared memory model method and system embodiment for destination DMA transfer table.

In FIG. 57E, see host main DRAM memory showing memory allocation and regions locked in a shared memory model method and system embodiment for destination DMA transfer table.

Figure 57F:
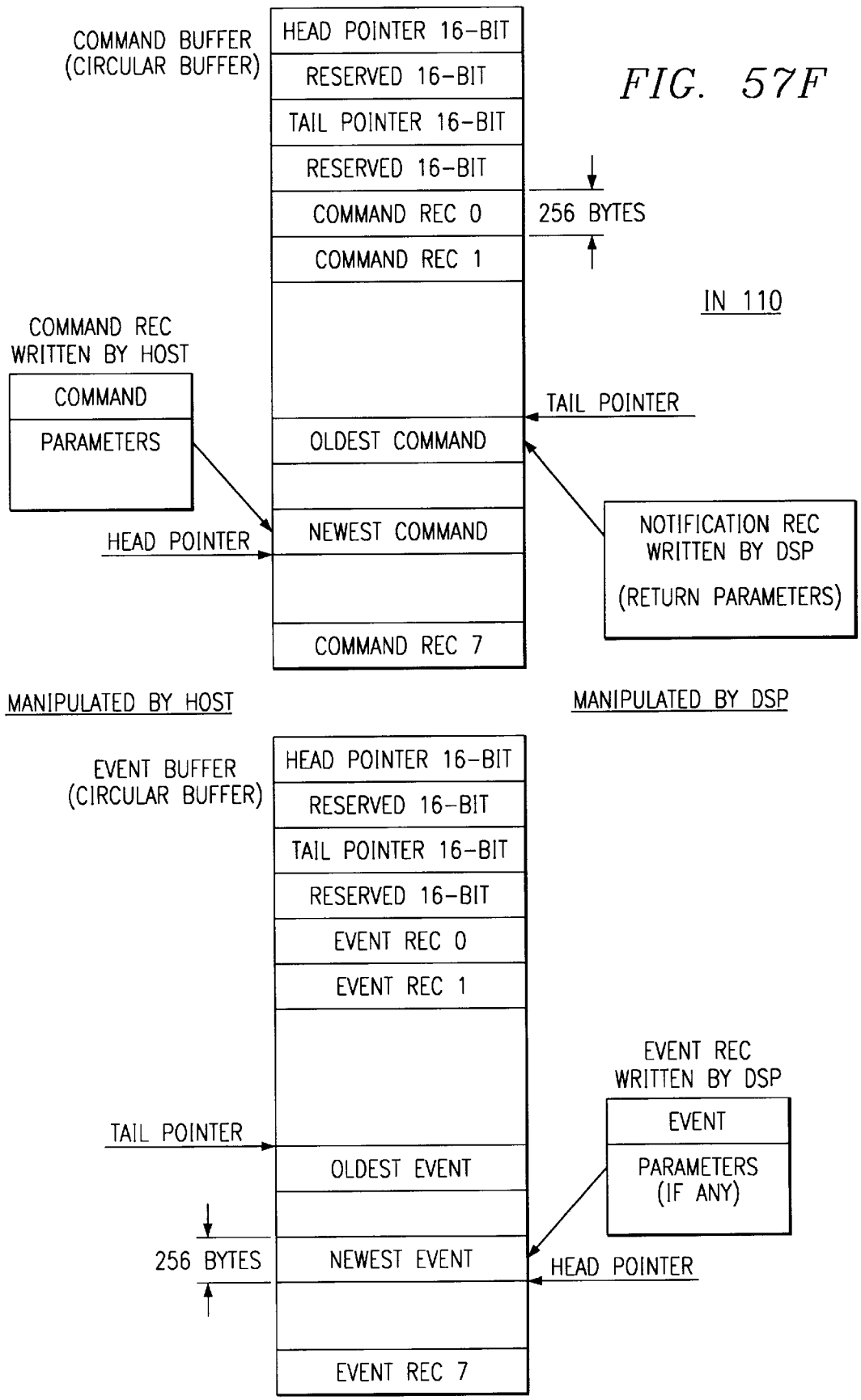
FIG. 57F is a memory space diagram of host main DRAM memory showing a DSP message queue and a host message queue with host manipulated head and tail pointers on the left side, and DSP manipulated head and tail pointers on the right side.

In FIG. 57F, host main DRAM memory has a DSP message queue and a host message queue with host manipulated head and tail pointers on the left side, and DSP manipulated head and tail pointers on the right side.

In FIG. 58, see a DMA write portion of DSP DMA SM state machine hardware and its process shown in FIGS. 61, 58 and 59 for the wrapper ASIC of FIG. 50. Glossary: XFR transfer, CTR counter, EN enable, GRAN granularity for DMA, DLY delay.

In FIG. 59, see a DMA read portion of DSP DMA SM state machine hardware and its process shown in FIGS. 61, 58 and 59 for the wrapper ASIC of FIG. 50.

In FIG. 60, see timing and method for read to local off-DSP SRAM external to wrapper ASIC in FIG. 62.

In FIG. 61, an entry portion of a DSP DMA SM state machine hardware and its process is shown in FIGS. 61, 58 and 59 for the wrapper ASIC of FIG. 50. Where no legend is next to an arrow, the transition occurs on clock.

Figure 61A:
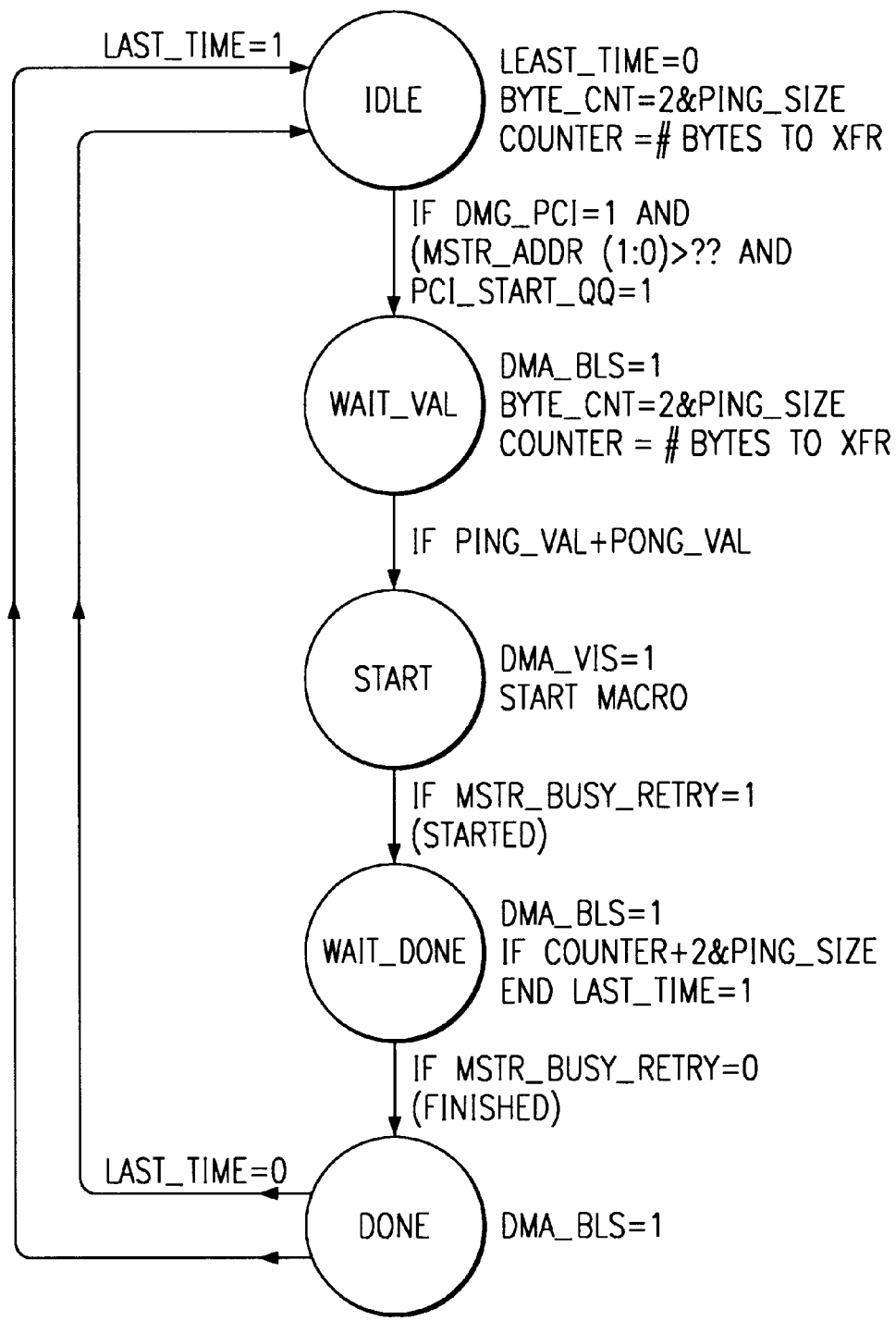
FIG. 61A is a state transition diagram of a portion of a DMA channel steering SM state machine hardware and its process for the wrapper ASIC of FIG. 50.

In FIG. 61A, see a DMA byte channeling state machine to combine host to SRAM DMA and byte channeling and its process for the wrapper ASIC of FIG. 50. Glossary: BCS byte channeling section control, BUF buffer, VAL value, CNT count. A series of 5 states loops back from a Done state to first state IDLE is last_time=1 otherwise to a second state wait_val. Mstr_busy_retry is a control signal from PCI block 5010.

In FIG. 62, circuit blocks and control lines in the wrapper ASIC of FIG. 50 coupling to DSP and SRAM.

In FIG. 63 is a waveform diagram illustrating timing and method for writing to local off-DSP SRAM external to wrapper ASIC in FIG. 62.

Figure 64:
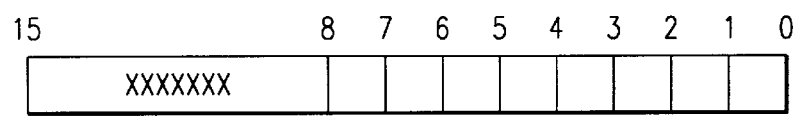
FIG. 64 is a block diagram of a DSP Interrupt Register 0x51.

In FIG. 64, a DSP interrupt register 0x51 has DSP interrupt INT1 coupled to bits for stereo codec xmit, receive; INT2 coupled to bits for voice codec xmit, receive; INT3 coupled to bits for PCI bus master, DSP DMA; INT4 coupled to bits for host generated DSP interrupt, stereo codec IRQ.

In FIG. 65, a D-flip-flop representing any bit of DSP interrupt register 0x51 illustrated in FIG. 64, and associated control circuitry to controllably OR a given interrupt with the one/zero in the D-flip-flop.

In FIG. 66, a D-flip-flop representing any bit of DSP I/O registers 0x50, 0x52–0x6F (FIG. 38) in the wrapper ASIC, and associated control circuitry to supply DSP Data In to put a one/zero in the D-flip-flop.

Figure 70:
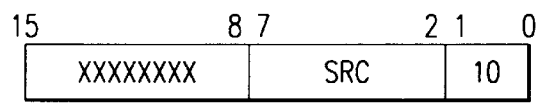
FIG. 70 is an electrical block diagram of a register used in the ASIC wrapper for DSP bootload purposes, and having an address SRC pointing to the data structure of FIG. 67, and the register also having a code for EPROM mode.

In FIG. 67, wrapper ASIC DPRAM memory space for DSP bootload purposes, the memory space pointed to by an SRC address of FIG. 70

In FIG. 68, host data in host address space, and corresponding data in DSP address space in a method embodiment.

In FIG. 68A, circuitry and method for DSP read of wrapper ASIC DPRAM via I/O space for C54x bootload, for instance.

In FIG. 69, a circuitry and method embodiment for producing a READY signal for wrapper ASIC DPRAM read operations.

In FIG. 70, a register used in the ASIC wrapper for DSP bootload purposes, and having an address SRC pointing to the data structure of FIG. 67, and the register also having a code for EPROM mode.

In FIG. 71, waveforms illustrate a method of operating the DSP and circuitry of FIGS. 72-1 and 72-2 to interface a DSP to the wrapper ASIC DPRAM.

In FIGS. 72-1 and 72-2 a zero-wait-state read interface circuit and method embodiment coupled between wrapper ASIC DPRAM and a DSP 1730 further achieves the remarkable interfacing in connection with the other ASIC 1720 circuits.

Glossary:
DP dual port
EN enable
STRB strobe
WE write enable
RD read

In FIG. 74, how DSP registers, voice codec state machine, and interrupt generation logic have transmit/receive ping/pong lines connected in wrapper ASIC shared registers 0x16, 0x18, 0x1C, 0x5C, 0x5D, 0x6E, 0x6F.

In FIGS. 75A and 75B pinout for the VSP wrapper ASIC 1720 has functions and integrated circuit terminals as tabulated earlier hereinabove. The various terminal names correlate to the various descriptions herein.

Figure 78:
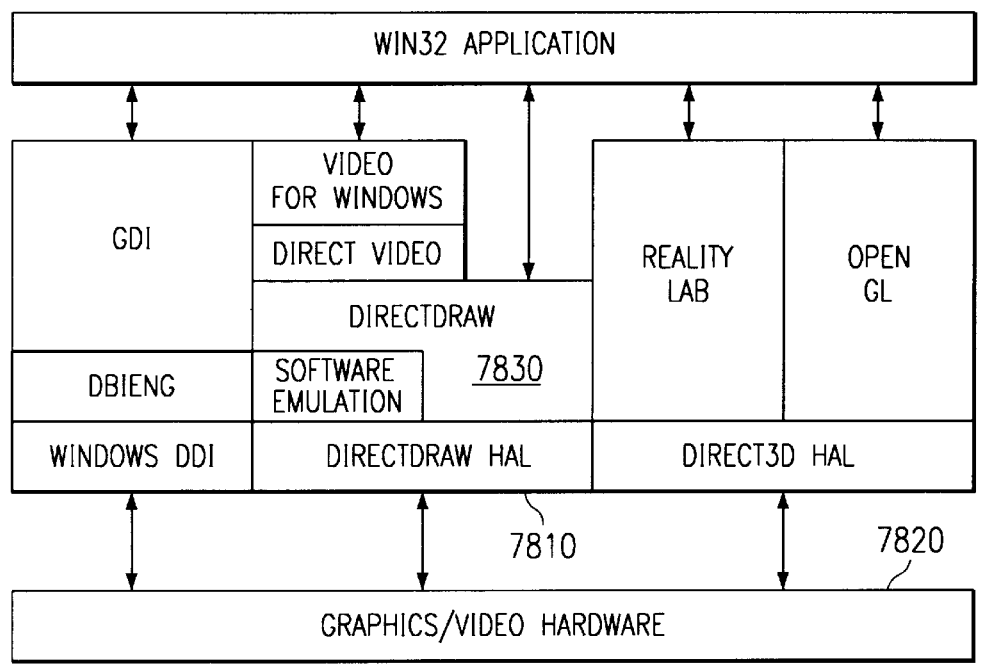
FIG. 78 is a process diagram or method-of-operation diagram showing interrelated DirectX processes, HAL display driver interfaces and hardware for unified signal processing improvements herein.

In FIG. 78, interrelated DirectX processes, HAL coupled by DirectDSP HAL in improved system) display driver interfaces and USP hardware are suitably improved and virtualized with VSP. GDI graphics display interface, DIBENG device independent bit map engine, and Windows DDI display driver interface are coupled to VSP graphics video hardware 7820. Other process components include Video for Windows, DirectVideo, DirectDraw 7830, software emulation, DirectDraw HAL 7810, Reality Lab, Open GL graphics language, Direct3D HAL all coordinated and improved with DirectDSP HAL and coupled to VSP kernel and VSP.

Figure 79:
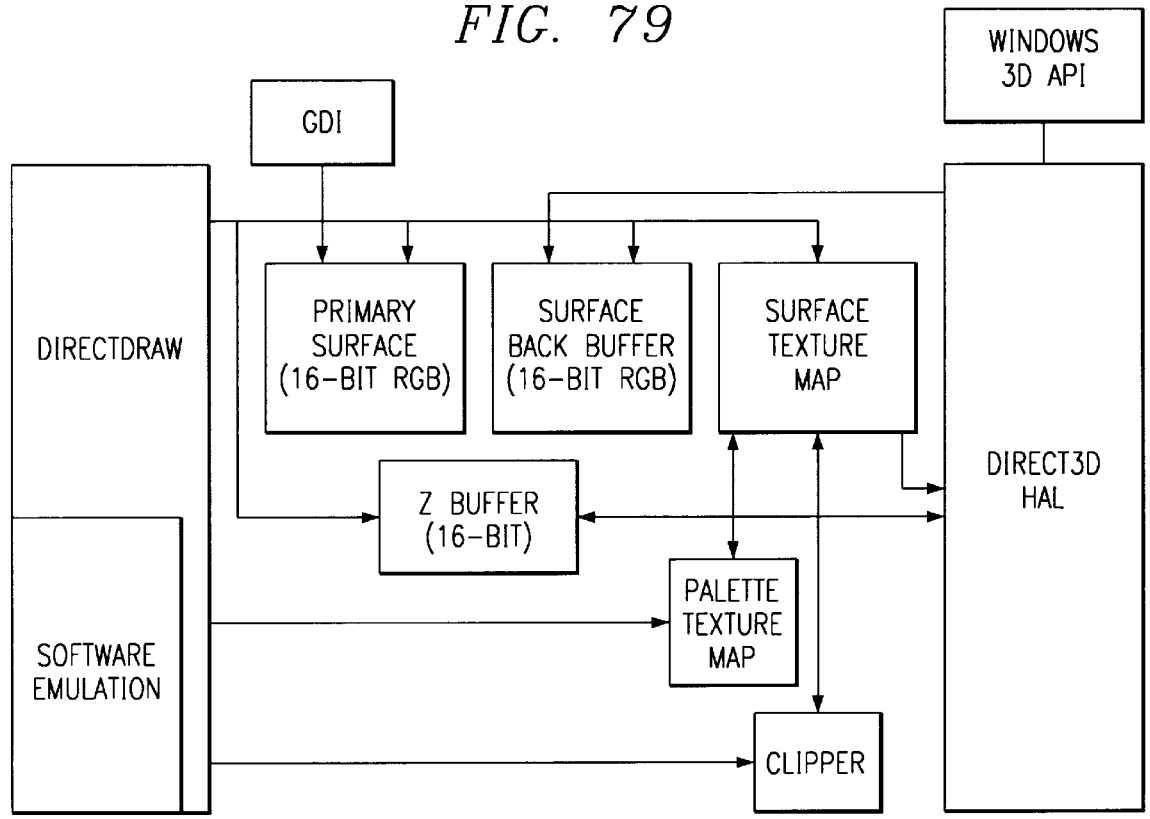
FIG. 79 is a process diagram or method-of-operation diagram more specifically showing interrelated processes in a 3D graphics process architecture and interface for unified signal processing improvements herein.

In FIG. 79 a 3D graphics process architecture and interface is improved and virtualized with VSP. Processes include GDI, primary surface, surface back buffer, surface texture map, z-buffer, palette texture map, clipper and Direct3D HAL improved and coordinated with DirectDSP and DirectDSP HAL.

Figure 80:
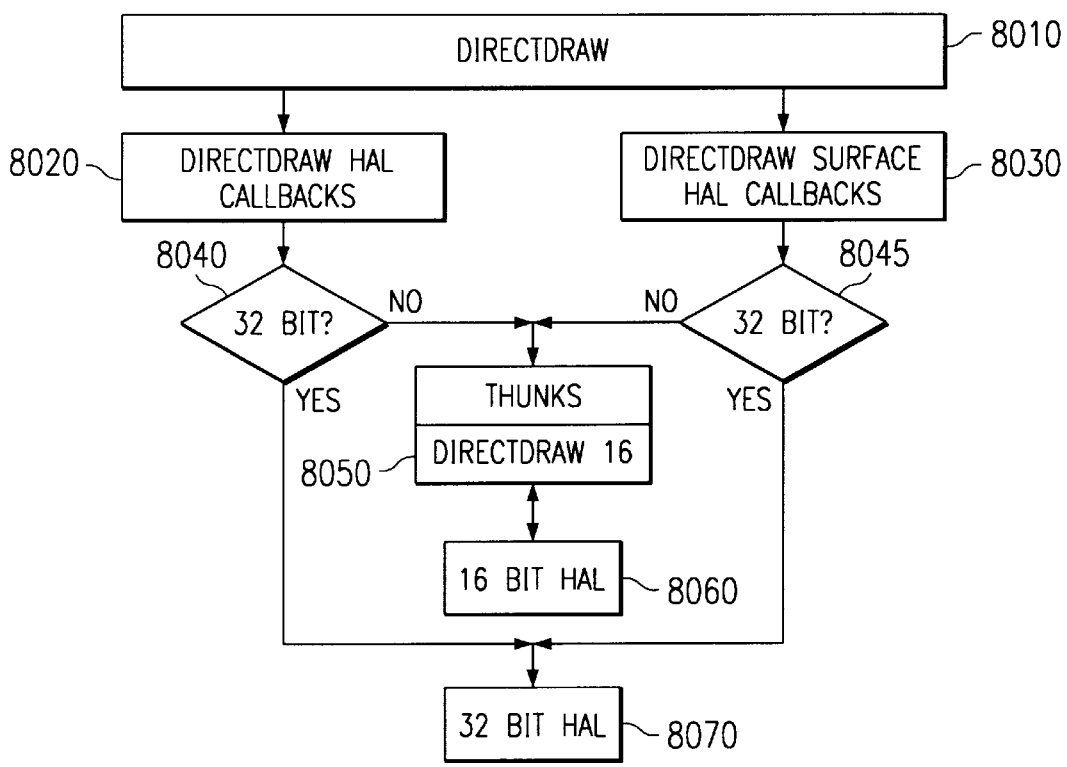
FIG. 80 is a process diagram or method-of-operation diagram more specifically showing interrelated processes in a DirectDraw driver interface for unified signal processing improvements herein.

In FIG. 80 is a process diagram or method-of-operation diagram more specifically showing interrelated processes in a DirectDraw driver interface for improvement with DirectDSP HAL. DirectDraw 8010 couples to DirectDraw HAL callbacks 8020, and surface HAL callbacks 8030. 32-bit or 16-bit decision steps 8040 and 8045 branch to thunks 8050 to 16-bit HAL 8060; or go to 32-bit HAL 8070 respectively.

Figure 81:
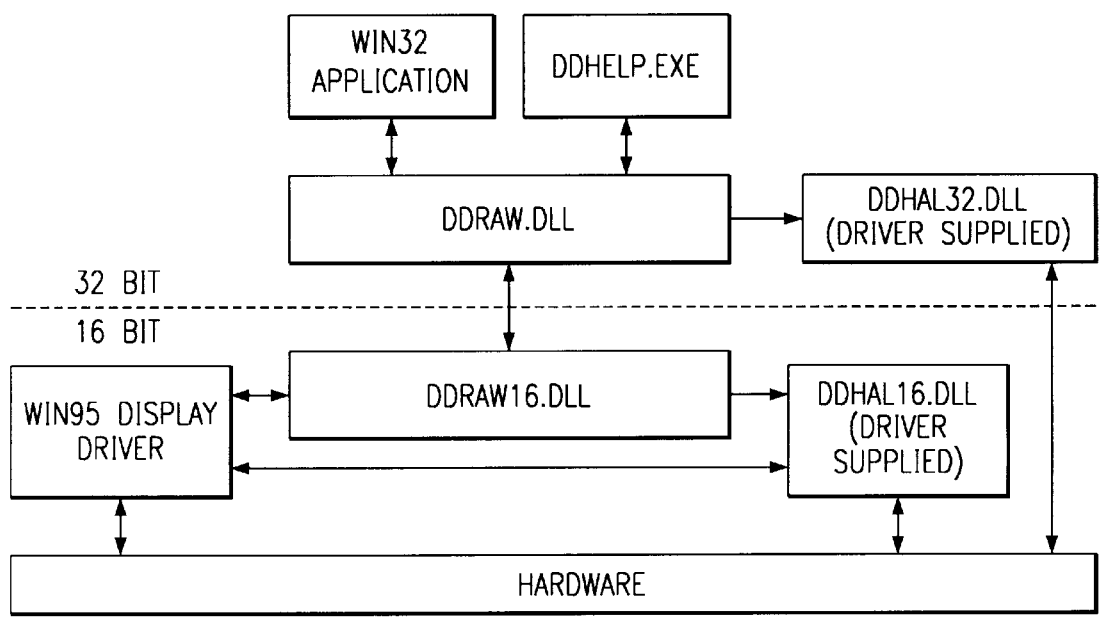
FIG. 81 is a process diagram or method-of-operation diagram showing interrelated 16-bit and 32-bit processes in a DirectDraw driver interface for unified signal processing improvements herein.

In FIG. 81, interrelated 16-bit and 32-bit processes in a DirectDraw driver interface are further shown with the DLLs for coordination and improvement with DirectDSP and DirectDSP HAL.

Figure 82:
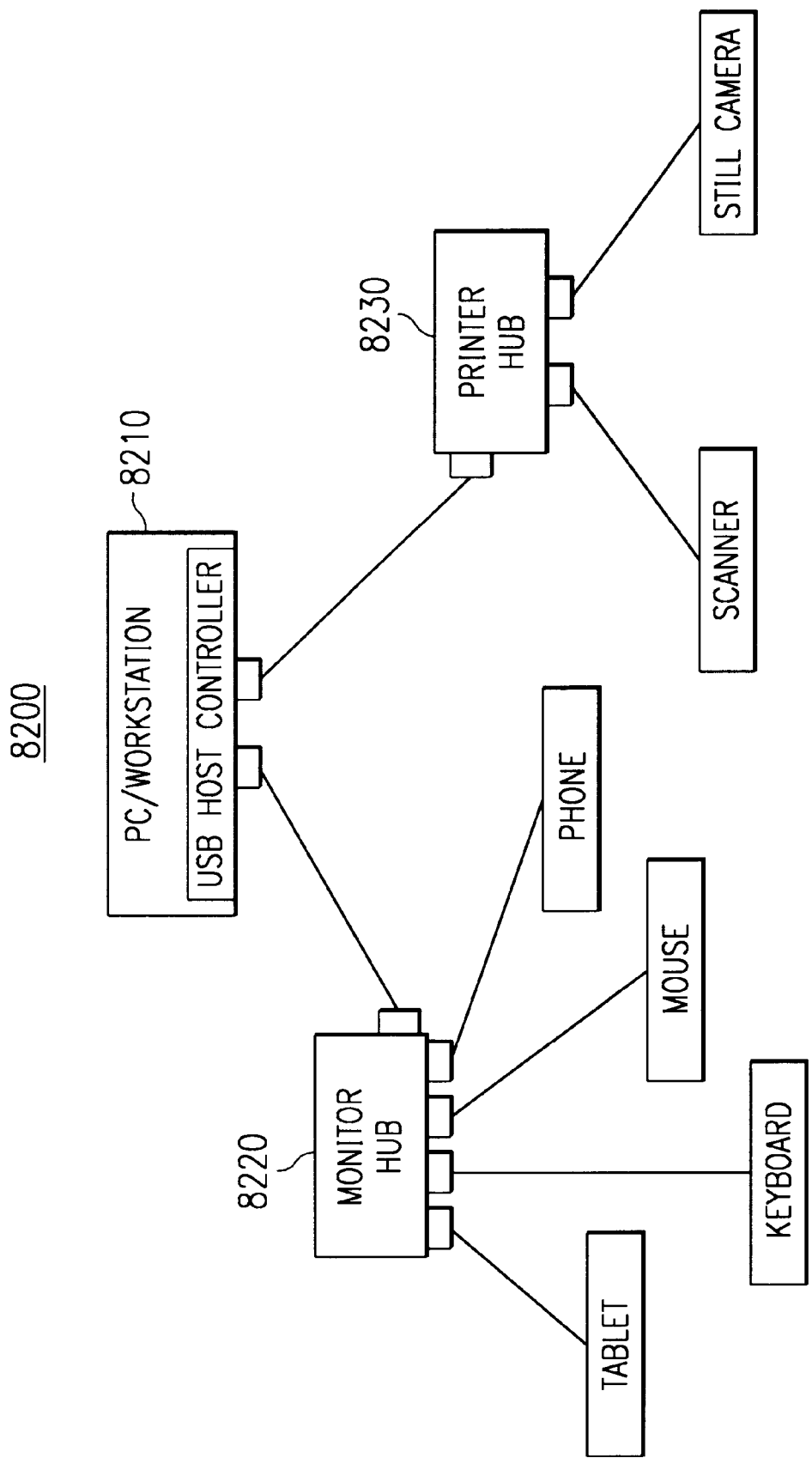
FIG. 82 is an electrical block diagram of components and architecture of an improved USB universal serial bus-connected system embodiment improved by unified signal processing herein.

In FIG. 82, components and architecture of an improved USB universal serial bus-connected system embodiment comprise a PC/workstation 8210 with an improved USB host controller interface (HCI) and two USB ports coupled to a monitor hub 8220 and a printer hub 8230. Hub 8220 has four ports coupled respectively to tablet, keyboard, mouse and phone. Hub 8230 has two ports coupled to scanner and still camera. See FIGS. 83 and 85–89 for more detailed description.

Figure 83:
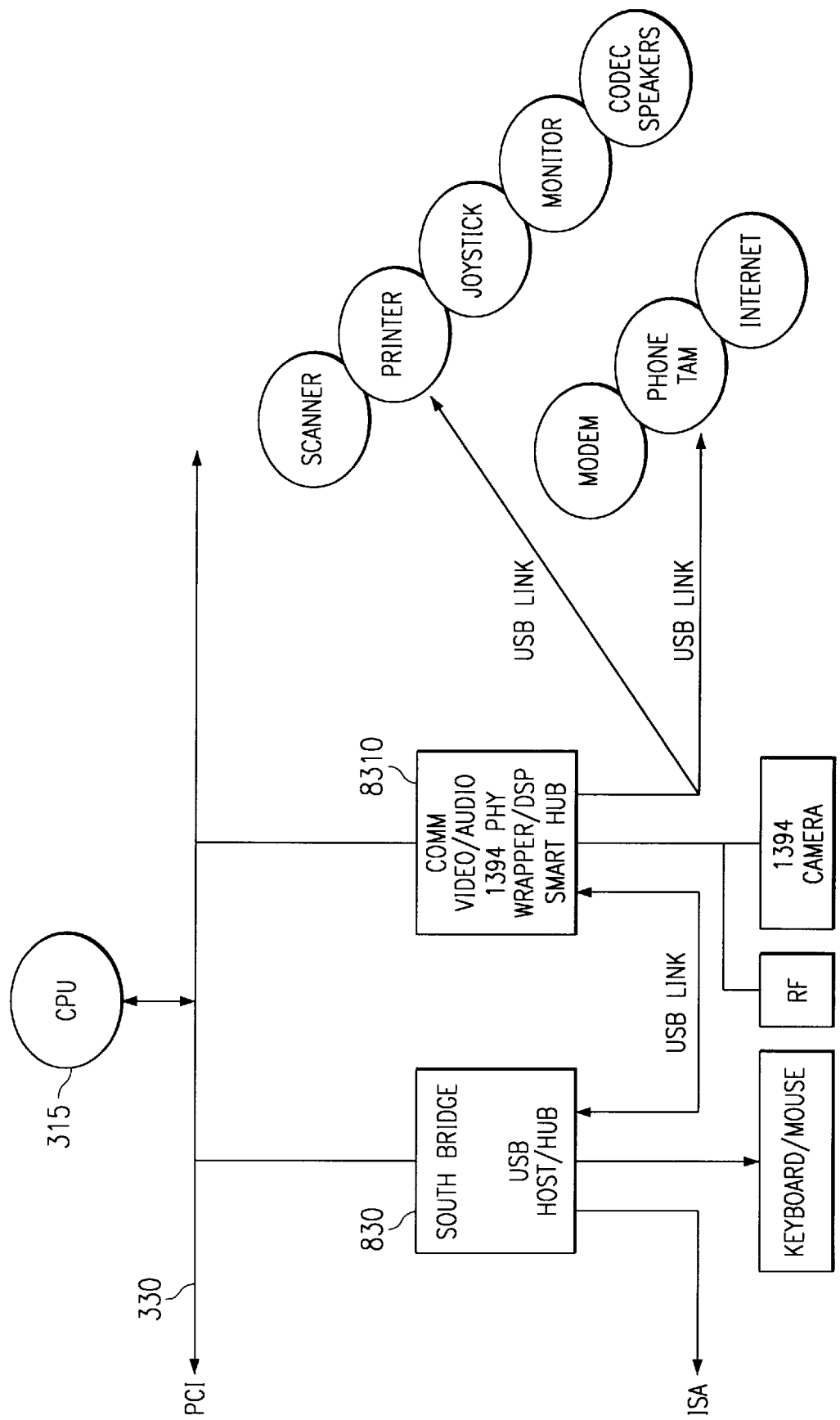
FIG. 83 is an electrical block diagram of a system embodiment with improved VSP south bridge and VSP integrated circuits interconnected by a serial bus as well as PCI bus.

In FIG. 83, a system embodiment has VSP-enhanced south bridge with ISA interface, keyboard/mouse interface, and USB interface coupled to a corresponding USB interface in a chip 8310. Chip 8310 has wrapper coupled to PCI bus and internal DSP. Chip 8310 advantageously virtualizes and combines comm, video/audio, IEEE 1394 link layer, and USB hub. An IEEE 1394 PHY is integrated onto the same single chip or partitioned therefrom. A radio frequency RE interface and an IEEE 1394-compatible camera device couple to chip 8310 for advanced imaging and connectivity. USB links couple to any one or more of modem, phone TAM, Internet/Intranet, Scanner, printer, joystick, monitor, and codec speakers.

Figure 84:
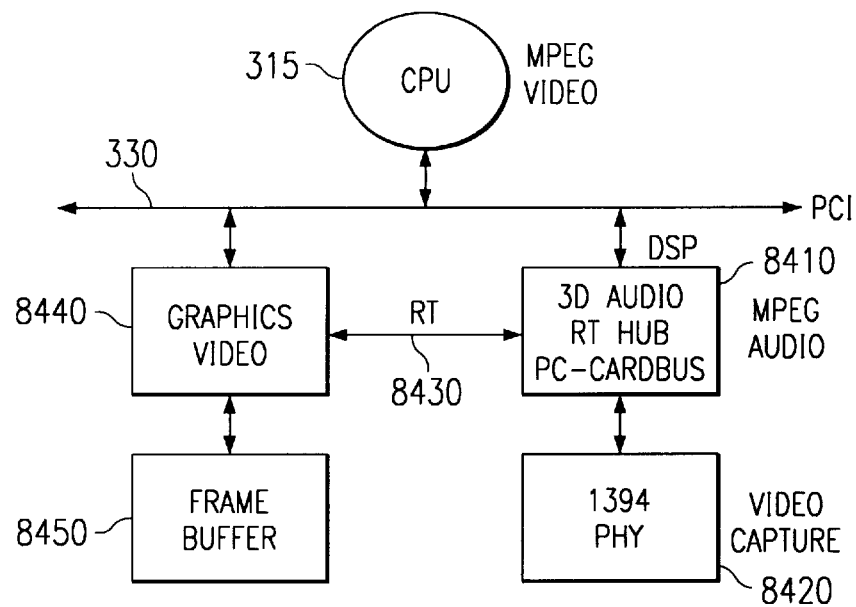
FIG. 84 is an electrical block diagram of components and architecture of an improved real-time private bus-connected VSP-graphics/video chip and VSP-comm-audio-cardbus chip in a system embodiment improved by unified signal processing herein.

In FIG. 84, VSP-graphics/video chip 8440 and VSP-comm-audio-MPEG-RThub-cardbus chip 8410 are respectively coupled by real-time private bus RT 8430. Chip 8440 is supported by frame buffer 8450 coupled thereto. Chip 8410 bidirectionally communicates IEEE 1394 serial data via an IEEE 1394 PHY (physical layer) chip 8420 for video capture, for example.

Figure 85:
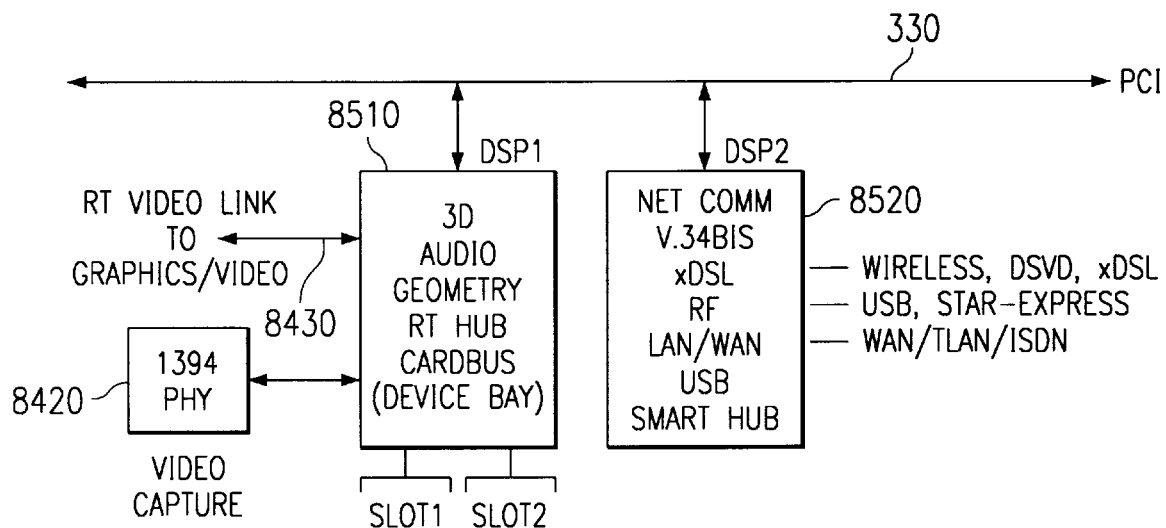
FIG. 85 is an electrical block diagram of components and architecture of an improved real-time private bus-connected graphics/video chip and VSP-comm-audio-cardbus in a further improved multimedia system embodiment improved by unified signal processing herein.

In FIG. 85, chip 8510 integrates on a single chip a wrapper/DSP that virtualizes 3D audio, geometry, RT hub and cardbus controller functions. Chip 8510 is coupled to a device bay for insertion and extraction of external peripherals, and/or to cardbus slots Slot1 and Slot2. A real-time RT video link 8430 couples to a graphics/video chip such as 1120 of FIG. 11. An IEEE 1394 serial bus PHY chip 8420 mediates video capture and couples to chip 8510.

A chip 8520 integrates on a single chip a wrapper/DSP coupled to PCI bus 330 and dedicated to virtualizing networking comm, V.34bis modem, xDSL modem, wireless modem to RF interface, DSVD, USB and/or Star-express connectivity, LAN/WAN by WAN, Texas Instruments ThunderLAN(R), and USB smart hub operations.

In FIG. 86, USB serial bus-based system in 8210 has PCI bus 330 coupled to a device 8310 comprising a wrapper PCI master/slave 1720 and other wrapper/DSP hardware 1710 running VSP kernel 1840 and virtualizing USB controller. Processes on Host include wrapper/DSP class driver feeding minidriver to wrapper/DSP hardware driver (DirectDSP HAL). Application and OS layers above couple to the wrapper/DSP class driver and a USB device driver. DirectDSP HAL and USB device driver couple to USB bus class driver, then to host controller minidriver to system bus class driver to PCI and USB to USB smart hub in device 8310.

In FIG. 87, interrelated improved processes in a WDM accelerator with digital audio and embedded VSP serial bus hub have a device 8710 with VSP kernel and wrapper/DSP coupled to PCI bus 330. DirectDSP HAL 1830 process couples to VSP kernel.

Figure 88:
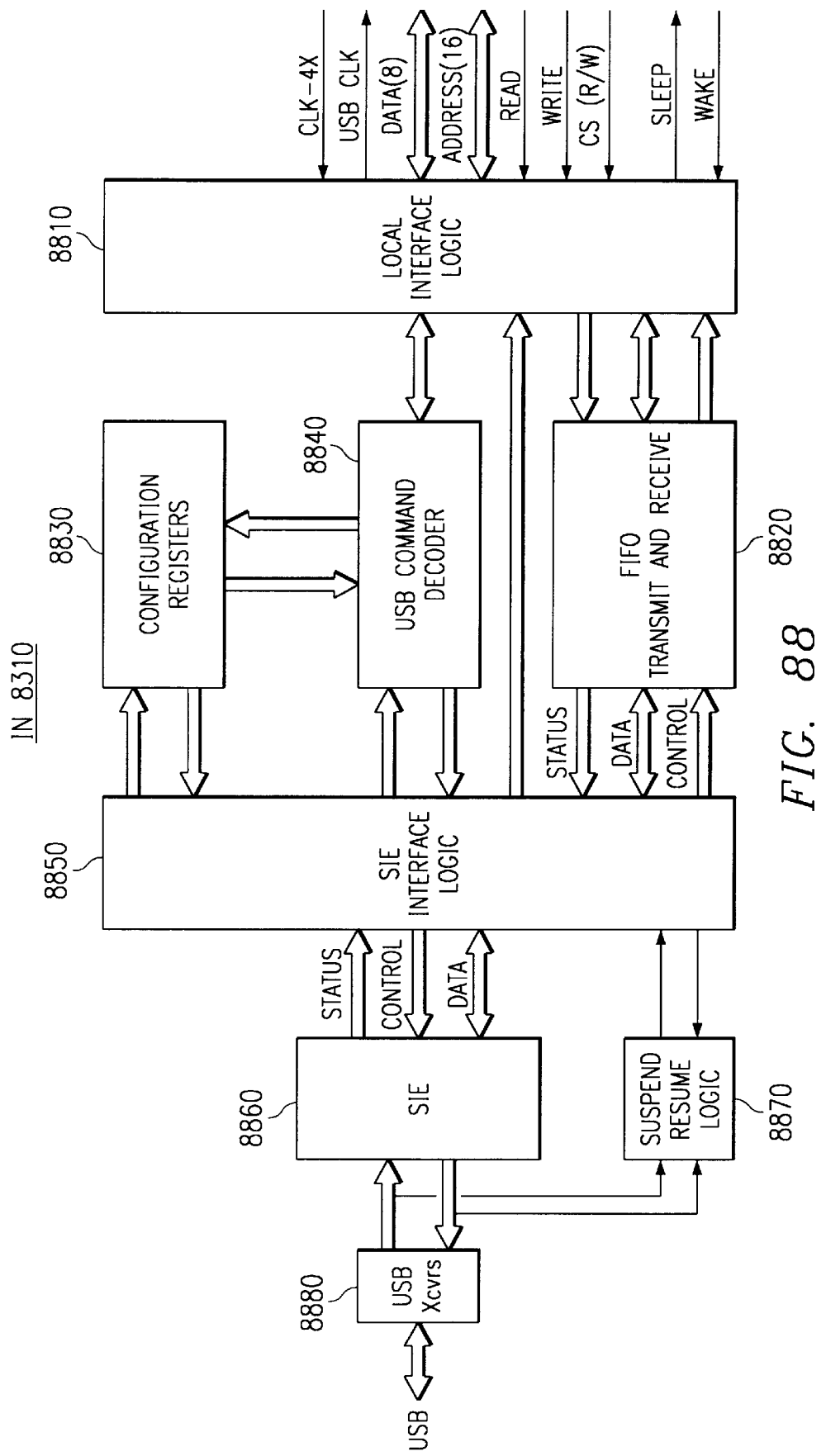
FIG. 88 is an electrical block diagram and/or method-of-operation diagram showing interrelated blocks and processes for coupling VSP to USB serial bus in system embodiments improved with unified signal processing herein.

In FIG. 88, interrelated blocks and processes for coupling VSP to USB serial bus include local interface logic 8810 coupled to a transmit/receive FIFO 8820 and a USB command decoder 8840. Configuration registers 8830 couple with the decoder 8840 and SIE serial interface logic 8850. The latter logic is coupled to blocks 8820 and 8840 as well as to SIE block 8860. SIE 8860 couples to USB transceivers 8880 and suspend/resume logic 8870 couples from the transceivers 8880 and logic 8850. This logic is used as is in some embodiments, and virtualized by VSP in other embodiments.

Figure 89:
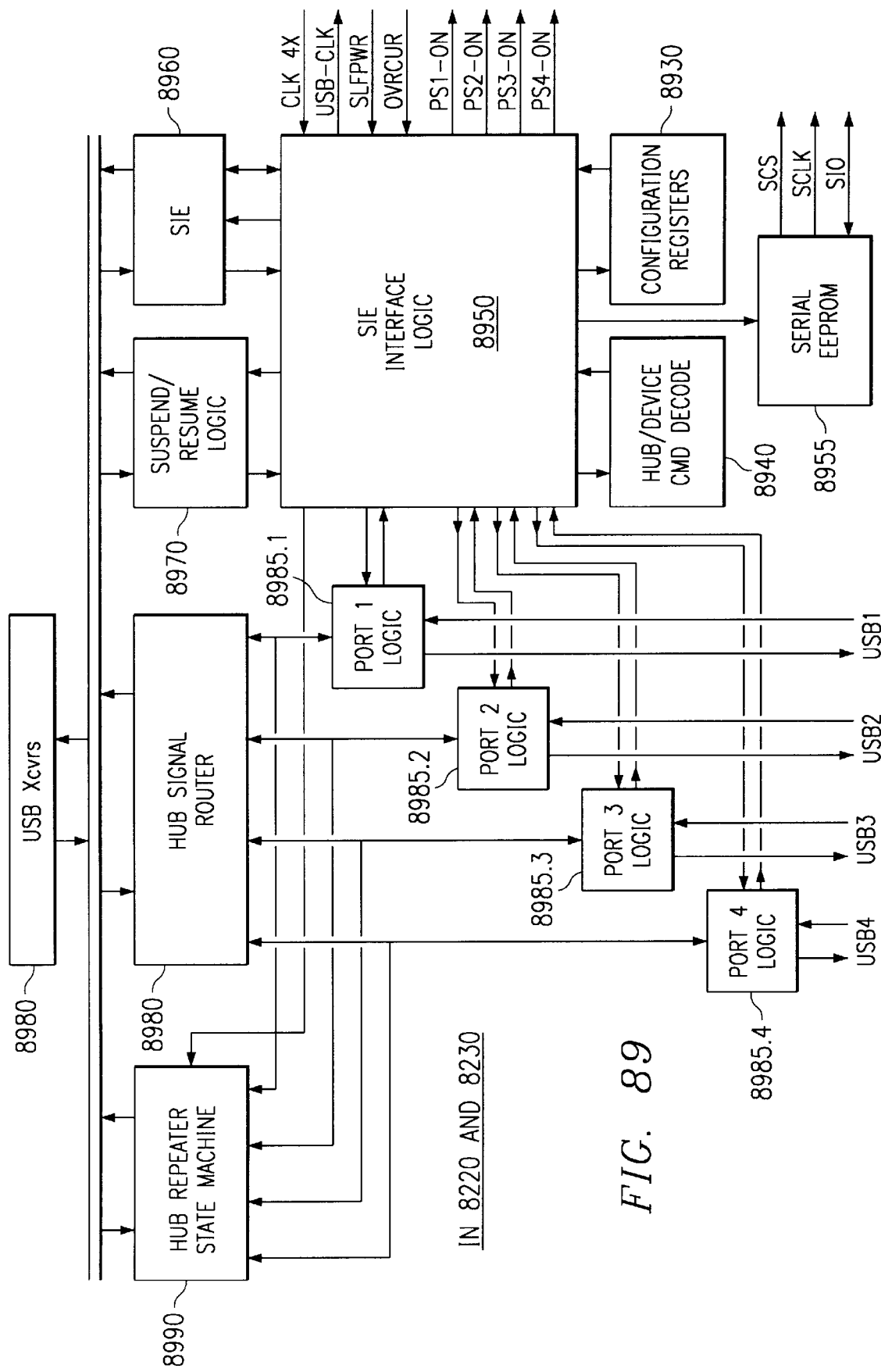
FIG. 89 is an electrical block diagram and/or method-of-operation diagram showing interrelated blocks and processes for a serial bus hub in system embodiments such as in FIG. 82 improved with unified signal processing herein.

In FIG. 89 a serial bus hub in system as in FIG. 82 has numbers approximately analogous in last two digits to FIG. 88. SIE interface logic 8950 has configuration registers 8930 and hub/device command decode block 8940 and serial EEPROM 8955 coupled to it. Logic 8950 couples to SIE 8960 to a hub bus to USB transceivers 8980. A hub signal router 8980 couples hub bus to Port Logic blocks 8985.1–.4 for illustratively four USB lines USB1–4. A hub repeater state machine 8990 is responsive to the router 8980 and logic 8950 and couples to the hub bus. This logic is used as is in some embodiments, and virtualized by VSP in other embodiments.

Figure 90:
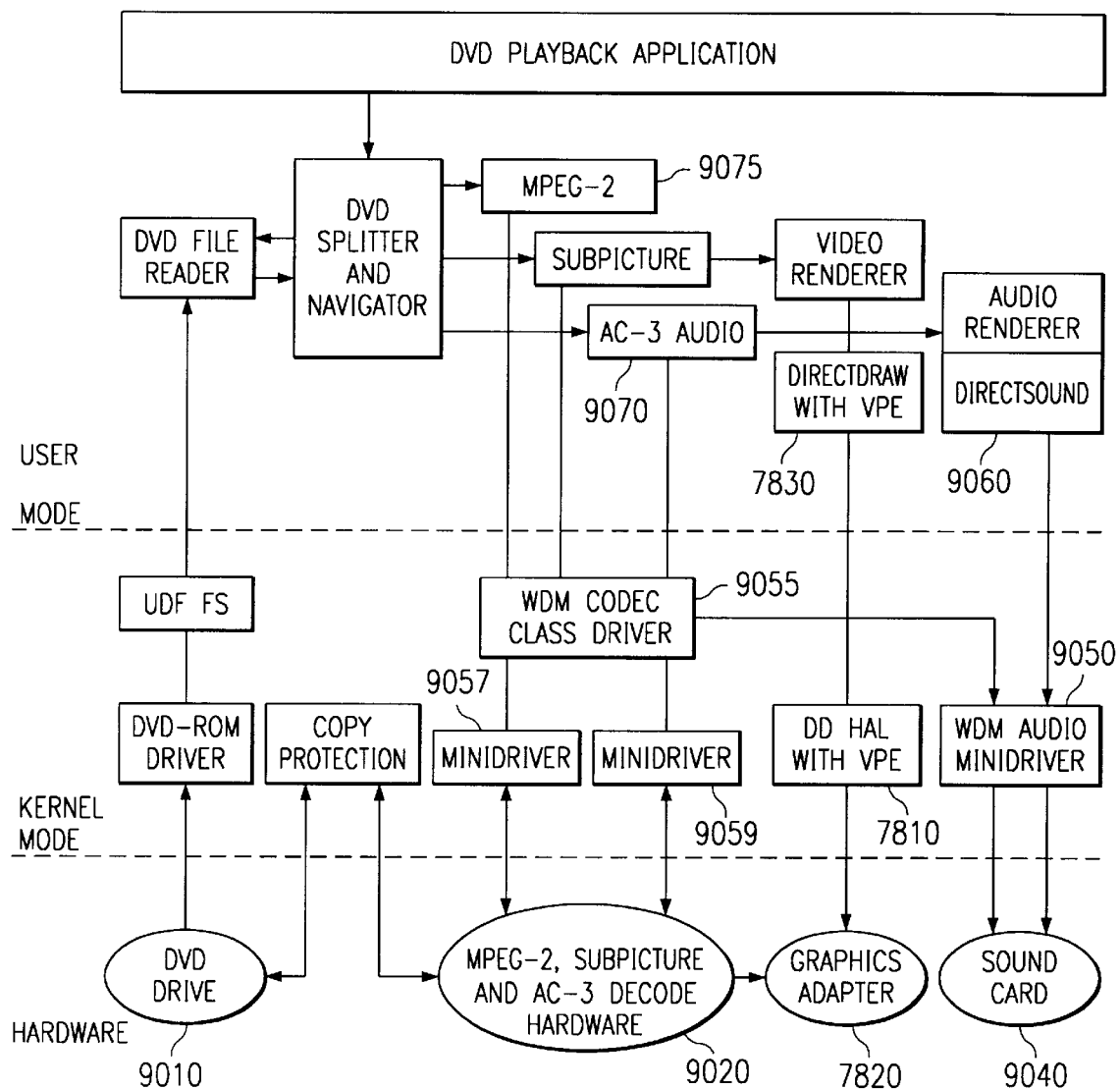
FIG. 90 is a process diagram or method-of-operation diagram showing interrelated improved processes in a DVD digital video disk for unified signal processing improvements herein.

In FIG. 90, interrelated improved processes for DVD digital video disk operate a DVD drive 9010, decode hardware 9020, a graphics adapter 7820, and a sound card 9040 with any or all improved with VSPs, VSP kernel, and DirectDSP HAL. Various processes coupled as shown by arrows in FIG. 90 include a WDM audio minidriver 9050, WDM codec class driver 9055, with minidrivers 9057 and 9059 for MPEG-2, subG and AC-2 decode, DirectDraw HAL with VPE 7810 and its upper layer 7830, DirectSound block 9060, AC-3 Audio 9070, and MPEG 9075. The DVD drive has a DVD-ROM driver, UDF FS, DVD file reader, DVD splitter and navigator coupled centrally. A DVD playback application program lies atop the system process architecture.

In FIG. 91, interrelated improved processes in sound-related driver and HAL interface technology use ActiveDSP 9120 with ActiveDSP filters 9180, DirectDSP 1810 with wave 9130, MIDI 9140 and 16-bit DLL DSP16.DLL 9132, 9142, MPEG and AC-3 9070 and 9075, DirectSound 9060 and DirectSound HAL 9050 and other DirectX components 2510. DirectDSP 1810 couples to DirectDSP HAL 1830 and therebelow to VSP kernel 1840 and VSP hardware 1720, 1730.

In FIG. 92 an ActiveDSP level of FIG. 92 in system embodiments has ActiveX, DirectX, windows PC and web applications 9110, 9120 atop the process architecture. The applications are coupled to OLE controls 9210, COM (component object model) interfaces 9220, and MCI media control interface 9230. Lying in a next tier beneath is an ActiveDSP improved block 9120 with filter graph manager over blocks 9180 including source filter 9182, ActiveDSP transform 9184, ActiveDSP renderer filter 9186 and clock 9188. These blocks are detailed in code earlier hereinabove.

A file system 9240 is bidirectionally coupled to source filter 9182. Transform 9184 and renderer 9184 and clock 9188 couple to DirectDSP/DirectX 1810 and 2510, then to DirectDSP HAL 1830 and to VSP kernel 1840.

In FIG. 93 the process data streaming aspects in ActiveDSP level of FIG. 92 show data streaming 9310 arrows between source filter 9182, MPEG example of transform filter 9184, and a renderer 9186 device drivers 1810, 1830 and hardware 1840 in three respective blocks.

In FIG. 94 is a process diagram or method-of-operation diagram emphasizing a shared memory model coupling interrelated improved processes of DirectDSP HAL and DSP kernel in system embodiments.

In FIG. 95 is a process diagram or method-of-operation diagram emphasizing DSP task object structure in the shared memory model of FIG. 94 in system embodiments. A process of operating a computer system having a storage holding an operating system and an application program, a first processor having an instruction set, and a second processor having a different instruction set, has these steps among others: 1) running the first processor to determine whether a part of the application shall be run on the first processor or the second processor and then establishing a second processor object if that part shall be run on the second processor, and otherwise not establishing the second processor object. If run on second processor, a next step 2) runs at least some of the operating system on the first processor so that the first processor sets up for at least part of the application program at run time at least one second processor object. The second processor object is suitably established by using the data structures and VSPOBJECT listing earlier hereinabove to define and then lock down areas in the shared memory space. A step 3) concurrently runs the second processor to access the second processor object and thereby determine operations for the second processor to access second processor instructions for the part of the application program and data to be processed according to the second processor instructions. Then a step 4) runs the second processor to process the data according to said second processor instructions. The second processor object includes information defining a task type, a pointer to the data to be processed, a pointer to scratch space, a buffer in/out type information, buffer dimensions information, and page list information, among other advantageous selections. A DSP second processor and an OS with x86first processor code for IBM-compatible computer are used in some embodiments.

FIG. 119 shows one process embodiment for dynamic balancing of some system embodiments.

Bases or strategies of operation according to methods herein include:

1) give VSP granules preference and when VSP is fully loaded, spill granules over to host.

2) load both VSP and host in roughly comparable proportions.

3) load VSP and host according to a predetermined table of preferences function-by-function for host and VSP, regardless of MIPS loading proportions until one processor has no more available MIPS ("spillover" herein) and then load remaining granules into any remaining processor that has available MIPS.

4) Load VSP and host according to dynamic balancing logic either without any predetermined preferences or by starting with predetermined preferences and altering the preferences based on CPU, VSP, bus, memory and I/O loadings at time the allocation or loading is to occur.

5) Load the host up to an estimated optimum MIPS point and spill granules over to the VSP.

6) Other bases of operation as described or suggested herein.

In FIG. 119, basis 5) just mentioned loads the host up to an estimated optimum MIPS point and spills granules over to the VSP.

From a BEGIN 11910, operations proceed to a step 11920 wherein the operating system has a new DSP type task. Then a decision step 11930 determines whether the host is loaded to point where the DSP is needed (perhaps 75% or some other fraction of the MIPS loading beyond which host would not function). The operating system is modified to keep a running total of host MIPS estimated for each application currently running on the host, to implement step 11930. If no in step 11930, the host is loaded for optimal execution or underloaded, even though it can be loaded further, and operations go to step 11935 to allocate, load and run the new task on the Host.

If yes in step 11930, then decision step 11940 determines whether DSP MIPS are available. If yes in step 11940, operations go to step 11945 to allocate, load and run the new task on the DSP. If no in step 11940, the DSP is fully loaded (to maximum 100% test of step 11940, by contrast with step 11930 fractional level test) whereupon operations reach a decision step 11950. Step 11950 determines whether the current DSP task has higher priority (or no current DSP task has lower priority) compared to the new task which would be desirably run on DSP. A task running on the DSP is selected based on a priority table. If yes in step 11950 (no current DSP task has a lower priority), then the new task is run on the host at step 11935 whereupon step 11960 end of new task is reached. Notice that running the task on the host either impairs system performance by pushing the Host beyond optimal loading, or the OS simply cannot run the new task on Host because Host goes over 100%.

If no in step 11950, some current DSP task has a lower priority, and operations go to a step 11955 to shift current DSP task to the host or swap the current task out. "Swap" in step 11955 means the lower priority application is loaded for DSP but not currently executing thereon, and the new task will also be loaded on the DSP without shifting the current application to the host.

Some other illustrations of different bases of operation include FIGS. 26, 125, and 121.

In FIG. 120 a process flow links granules in a software development process, as by a hardware vendor preparing drivers as contemplated herein, and subsequently a user launches a software application product or program made by the development process according to improvements herein.

FIG. 120 describes an example of how an application can call DIRECTDSP API to perform various applications such as modems, audio, video, graphics, networking, etc., wherein the applications call one or more functions. Those functions (implemented by their respective pairs of granules in host code and DSP code) are built into the API of DirectDSP. Thus, a DirectDSP process embodiment has a set of functions that the application can be written to call selectively and programmably to execute modem, audio, graphics, networking, etc. application programs.

In step 12010 the ISV operates a commercially available software development kit (SDK) from a supplier of the operating system, such as Microsoft Corporation. The SDK is improved to include the DirectDSP API with a library of functions for VSP. A particular function therein suitably has a host object code granule compiled for that particular function, as well as a VSP object code granule compiled for that same particular function. Pairs of granules are available for some, many, or all of the functions in the library.

In writing an application, the ISV in one individual part of the programming process, programs a function call or request to a particular function ID in DirectDSP API function library 12024. When DirectDSP API is identified, the application calls that particular function among functions in that API library identified by the various function calls programmed by ISV into the application software. In one embodiment, at link time 12015 the functions are about to be linked. The link addresses 12022 of the respective functions, and the corresponding function IDs 12024 are tabulated in the library. An access step 12026 looks up a particular individual function ID in list 12024 called by the application being programmed. (List 12024 not only has the function IDs but also holds the entire function as a host-granule/VSP-granule pair with each granule compiled in linkable form.) A decision step 12030 determines whether the particular DDSP_ID function call is actually present in the function list 12024 of the DirectDSP API by table lookup. If no, then NULL message 12035 is generated. If yes, the function is found in the list 12024, and its corresponding link address is retrieved from list 12022, whereupon step 12040 executes a software development program called the linker, and in a step 12045 the linker creates or generates the ISV's software application program in executable form symbolized by the identifier APP.exe. Out of the linking process results an application that can be run for any combination of selected host and DSP granules to efficiently use system MIPS and bus bandwidths.

In one embodiment of the method, the linker step 12040 produces the APP.exe to have therein not the actual entire object code for both the host and DSP granules but just both their function call addresses for both granules in each pair selected from the table of link addresses 12022. The linking process step 12040 is contemplated to be ordinarily off-line to the user. This function call addressing by the linker is called prelinking of the granule pair herein.

In another embodiment, the process uses a dynamic linking (DLL) approach to link or load at user run-time the particular granule (one: Host or VSP) to be actually executed for a particular function in response to a selected one of the pair of function call addresses. The granule pairs have suitably been pre-compiled by a hardware vendor as contemplated herein and included in the drivers for the hardware add-in card or motherboard supplied to the computer manufacturer OEM. The DLL step at run time is part of load-to-run of the various alternative FIGS. 26, 125, 119 and 121.

Thus, DirectDSP library provides function object code granules, and DirectDSP HAL makes the decision for each function whether to use the VSP granule or the Host granule for that function.

The FIG. 120 operations down to 12045 occur, for example, in the contemplated ISV application development process and hardware vendor driver-development process. Now the FIG. 120 process description turns to operations in system embodiment use by user. At step 12050, the user has a PC or other computing system 100 supplied with application program APP.exe developed as above, and further supplied with DirectDSP and DirectDSP HAL. The user clicks mouse at step 12055, and the computing system 100 in step 12050 detects the click on a GUI icon representing the requested application program. In a step 12060, the OS loads the DDSP.DLL (the DirectDSP API) software driver. The object code of this DLL has all the host and DSP granules embedded in it.

In another embodiment, the DDSP.DLL software driver can be statically loaded when the VSP H/W is installed. The PC loads the application executable into main memory. DLL means dynamic link library because when user opens application there is still opportunity to load. Then in a step 12070 APP.exe starts to run and at step 12080 reaches a function call in APP.exe to go to the either the special host or VSP function call address that had been put into the API. At this point, DirectDSP is active and calls the HAL at entry point 12090. Further process steps of the HAL shown in FIGS. 26 or 125, for example, determine which of host or DSP to run each particular function on, and execute the selected Host object code granule or VSP object code granule for the particular function.

When the result of VSP execution is completed, then a callback or semaphore function or a H/W interrupt signals completion of the function, as shown in FIGS. 33 and 34 of incorporated U.S. patent application Ser. No. 08/823,257 and discussed further earlier hereinabove, whereupon the application program APP.exe makes another function call and the process is repeated. This process activity occurs for function calls corresponding to granules that have been put into the API. Other code in the application program APP.exe simply runs on the host.

In FIG. 121, one process embodiment has operations loading a host and/or loading a VSP subsequent to FIG. 120 operations. The process ground rules include:

1) first-come-first-serve basis;
2) once committed, resources for APP.exe are not revoked until the application closes;
3) MIPS on DSP or host are not pre-configured or committed
4) loading is dynamic and driven by system loading and applications opened.

In FIG. 121 an application opens and calls a function from the DirectDSP API set of functions 12024. Proceeding from DirectDSP HAL entry point 12090, a decision step 12110 determines whether the function is desired to run on host or DSP, such as indicated by the default entry host/DSP default allocation for the function in FIG. 24A. Predetermined preferences are thus stored in a lookup table, or alternatively program code provides the preference information. If default entry of DSP in step 12110, then operations proceed to a decision step 12115 to determine whether DSP MIPS are available for the whole task. A real-time MIPS usage counter or register indicates the available VSP MIPS. If yes in step 12115, then a step 12120 loads (in case of DLL) and executes the VSP object code granules for the task on the VSP. If no in step 12115, then a decision step 12125 determines whether granules of the task are required and MIPS available. If yes in step 12125, then a decision step 12130 determines whether partial execution is supported on host. If yes in step 12130, then step 12135 executes partial task emulation and sets a grant flag for a step 12170 described later hereinbelow. If "Host" in step 12110, or no in either step 12125 or in step 12130, then operations proceed to a decision step 12140 to determine whether DirectX host emulation is available. If no in step 12140 then a decision step 12150 determines whether DirectDSP host emulation is available. If yes in step 12140 or no in step 12150, then an exit step 12145 has the host emulate the function by DirectX emulation, and the DSP does not execute the function. If yes in step 12150, then a decision step 12160 determines whether whole task emulation is required, and if no in step 12160, then a decision step 12170 determines whether partial task is supported on DSP. If either yes in step 12160 or no in step 12170, then a step 12175 executes DirectDSP host emulation to run or emulate the whole task on the host. If yes in step 12170, then step 12135 executes partial task emulation on the host and the rest of the task on the VSP.

In FIG. 122, interrelated improved processes involve multiple VSPs (see also e.g., FIGS. 1–13 and 126 among others) are coupled to and supply VSP MIPS-load information for the improved DirectDSP process. A new application opens in a step 12210 and another step 12220 of DirectDSP queries DirectDSP HAL subprocesses designated VSP1 HAL, VSP2 HAL, etc. Illustratively, VSP1 is completely loaded. VSP2 has some available MIPS either at its given clock rate, or because VSP2 clock can be sped up per FIG. 124.

In FIG. 123, interrelated improved processes also have the multiple VSPs of FIG. 122 coupled to improved DirectDSP process to do task allocation to the multiple VSPs. With the queries of FIG. 122 return-messaged by each VSPi kernel, the DirectDSP HAL performs task allocation in a further step 12230 and messages additional granule(s) to each DSP which the allocation algorithm selects. The allocation algorithm described in FIGS. 24, 24A, 24B and 26 has its logic arranged to search through the various VSPi choices as well as the host as sites to run each given granule.

In some embodiments dynamic entries of FIG. 24A are extended to indicate not only host/DSP but also which of several DSPs. System impact descriptors are extended to indicate impacts of various VSPs and any task specialization descriptor information respective to the individual VSPs that suits them for some tasks and not others.

If a particular VSP is specialized for some tasks and a new granule relates to some other task which would be better run on some other VSP, then the allocation logic searches through the system impact descriptor information including the task specialization descriptor(s) until a VSP with available MIPS is found for the task whereupon the dynamic entry is updated to indicate allocation to that selected VSP. Illustratively, VSP1 is sent no new granule because it is loaded. But VSP2 receives a new granule Subtask 1, and VSPn receives a new granule Subtask 2.

In FIG. 124, an improved process for speed scaling of VSP by host begins with a step 12410 wherein the DSP in the VSP is either idling or running one or more current granules. Then a VSP-enabled application opens on the host in a step 12420. In a step 12430 the host determines DSP clock speed required, e.g. by lookup table. Then the host commands DSP to switch speed in a step 12440, waits for DSP to switch to higher clock rate (in sense of this process but the host CPU does other things in meantime) in a step 12450, then runs the DSP task 12460 by sending a message to DSP Message Queue and/or interrupting DSP as discussed elsewhere hereinabove. Next in a step 12470, the DSP finishes the task granule and notifies host via host message queue. In a succeeding step 12480, the host determines commands the DSP to switch to slowest or slower frequency wherein the remaining granules running on DSP have just enough DSP MIPS to sustain them, to advantageously retain performance but conserve power. Next in a step 12490, the host waits for DSP to switch to slower clock rate, in the sense of this process, whereupon operations loop back to step 12410. This process is included in the DirectDSP HAL for example, which performs its other HAL operations, as described in connection with FIG. 125 and elsewhere herein, as well to unify DSP processing with the rest of system processing.

In some embodiments the VSP 1720, 1730 conversely throttles the host 106 by setting appropriate control register bits in the wrapper 1720 and interrupting host according to operations established in the VSP kernel. Further the VSP can send a throttling waveform to the stop-clock or mask-clock pin or its equivalent found on some host microprocessors such as Pentium(R).

In FIG. 125 improved process coordination with DirectX involves improved operations loading a host and/or loading a VSP subsequent to FIG. 120 operations. In FIG. 125, an application opens and proceeds to either DirectX 2510 or DirectDSP 1810 depending on which part of the library the application is calling, whereupon DirectDSP HAL is entered at (X) entry point 12090. Next a step 12510 checks that host granule(s) for a function and VSP granule(s) for the same function are opened, followed by a step 12515 to check VSP MIPS loading and availability.

A decision step 12520 determines whether a DirectX function was called at 2510 in FIG. 125. If yes, then a decision step 12525 determines whether hardware acceleration is required or requested by the application. In this COM-based interface the OS, when each application opens, has interrogated the hardware in the system to determine what hardware is actually present. If acceleration hardware is not present, a step 12530 performs host emulation of the DirectX function. If hardware acceleration is present, the hardware presence is reported back to the application which requested it. For example, under DirectX audio mixing is a hardware acceleration feature. Thus, step 12525 determination of H/W acceleration required is based on information derived by the operation of DirectX as a result of the present application opening. If yes, then operations proceed to a step 12535 to load VSP granules with pre-budgeted MIPS loading to run, and executes them on VSP in step 12540.

As described above, steps 12520, 12525, 12535 and 12540 represent an important method and system improvement wherein the VSP actually performs operating system OS acceleration.

Looking further at step 12520, if no DirectX call, then the call is to a function in the improvements 12024 of DirectDSP API, and operations branch to a decision step 12545 to determine whether VSP MIPS are available for the whole task. If yes, then a step 12550 loads VSP granules with pre-budgeted MIPS loading to run, followed by an execute step 12555 running VSP granules on VSP. If no in step 12545, then a decision step 12560 determines whether VSP MIPS are available for part of the task. If yes in step 12560, then a step 12565 loads some of the VSP granules, i.e. partial task VSP granules. Further in step 12565, host emulation granules corresponding to the balance of the task are loaded instead of VSP granules for that balance of task. Operations in step 12570 then execute the host granules for balance of task on the Host, and execute the partial task VSP granules on the VSP. If no in step 12560, then a step 12575 loads host emulation granules for the whole task to run, followed by Execute step 12580 of the entire task on host.

In FIG. 126, a VSP-improved north bridge coupled to VSP bus, to host CPU, to main memory, to AGP port and AGP chip, and to PCI bus with PCI agent(s) thereon in system embodiments.

In FIG. 127, data paths in a VSP-improved north bridge coupled to VSP bus, to host CPU, to main memory, to AGP port and AGP chip, and to PCI bus with PCI agent(s) thereon in system embodiments.

Turning to Figures in patent application TI-21753P which is incorporated herein by reference, the following description is confirmed and/or added.

In FIG. 39A–FIG. 39G of U.S. patent application Ser. No. 08/823,257, system chips and connectors are tabulated as follows:

U1A,B: DSP sockets for TI TMS320C52 and C50) plug in one or the other DSP but not both U2: oscillator
U3: wrapper ASIC (broken up into two areas)
U4, U5, U6, U7: optional external SRAM 3330.2
U8: Stereo Codec
U9, U10: op amps
U11: voltage regulator
J1: PCI connector to plug into PC motherboard
J2: DSP Signals brought out to a connector for a duagher card to interface modem codec or other peripheral to wrapper ASIC
J3: TI XDS emulator port
J4, J5: Stereo jacks
J6: Audio jack
J7: RJ-11 telephone jack for DAA on daughter card via J2
R1: resistor block FIG. 55 of U.S. patent application Ser. No. 08/823,257 depicts a system having a CPU and a memory. A top interface 5550 is a CPU local bus, and an interface 5560 is a local bus such as ISA or PCMCIA. A graphics block 1520 communicates with the memory bus through interface 5550. Block 1520 is an improved VSP device having one end connected to PC local bus and the other end tied to another PC bus such as PCI. The VSP devices along the middle row of FIG. 55 act as parallel processing elements including the graphics element 1520 using system memory for texture, z-buffering, frame buffer and other graphics data (cf. FIG. 4a U.S. patent application Ser. No. 08/823,257). Such graphics element 1520 is connected to zoom video ZV bus. Element 5510 is a VSP improved north bridge. Additional elements include another processor 5530 such as an improved CPU single-chip with assymetrical VSP processing elements integrated thereon that has also an interface to one of the system buses. In a Pentium Pro and Klamath environment all processing elements advantageously are coupled to the CPU bus via interface 5550. In a further embodiment represented by said U.S. patent application Ser. No. 08/823,257 FIG. 55, all the depicted blocks are integrated onto one single mega-chip integrated circuit which is complementary to the CPU and memory components.

A few preferred embodiments are described in detail herein. It is to be understood that the scope of the invention also comprehends embodiments different from those described, yet within the scope of the claims.

For example, color display devices can be raster-scanned cathode ray tubes or other raster-scanned devices; devices that are not raster-scanned and have parallel line or frame drives; color printers, film formatters, or other hard copy displays; liquid crystal, plasma, holographic, deformable micromirror, field-emission or other displays of CRT or non-CRT technology; or three-dimensional or other devices using nonplanar image formation technologies.

"Microcomputer" in some contexts is used to mean that microcomputer requires a memory and "microprocessor" does not. The usage herein is that these terms can also be synonymous and refer to equivalent things. The phrase "processing circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Words of inclusion are to be interpreted as nonexhaustive in considering the scope of the invention.

Internal and external connections and couplings can be ohmic, capacitive, direct or indirect, via intervening circuits or otherwise. Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware. Process diagrams are also representative of flow diagrams for microcoded and software based embodiments.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore in-ended that the appended claims encompass any such modifications or embodiments.

What is claimed is:

1. A process of operating a computer system having a storage holding an operating system and an application program and a third program, a first processor having an instruction set, and a second processor having a different instruction set, the process comprising:

running the first processor to determine whether a part of the application shall be run on the first processor or the second processor and then establishing a second processor object if said part shall be run on the second processor and the first processor sending a message that the second processor is to run said at least part of the application program;

the third program establishing message handling functions and bus mastering data transfer operations for the second processor between the first processor running the operating system and the second processor running the third program;

concurrently running the second processor to perform operations defined by the third program, including to access memory to detect the message that the second processor is to run said at least part of the application program, running the second processor to access the second processor object and thereby determine operations for the second processor to access second processor instructions for said part of the application program and data to be processed according to said second processor instructions; and running the second processor to process data according to said at least part of the application program and supplying data thus processed by bus mastering operations defined by the third program.

2. The process of claim 1 further comprising determining whether a part of the application shall be run on the first processor or the second processor by determining whether the second processor has computing availability to run said part of the application, and if so, allocating that part of the application to the second processor.

3. The process of claim 2 wherein if the second processor does not have computing availability and the second processor is already running a task, then executing logic to determine whether said task can be allocated to the first processor to provide computing availability, and if so, then allocating said task to the first processor and allocating said part of the application to said second processor.

* * * * *